(12) United States Patent
Schneider et al.

(10) Patent No.: US 12,651,490 B2
(45) Date of Patent: Jun. 9, 2026

(54) METHODS AND SYSTEMS FOR IDENTIFYING POTENTIAL VEHICLE DEFECTS

(71) Applicant: ACV Auctions Inc., Buffalo, NY (US)

(72) Inventors: Philip Schneider, Amherst, NY (US); Justas Birgiolas, Milton, VT (US); Livio Forte, III, Lloyd Harbor, NY (US); Shawn Galante, Depew, NY (US); Akhil Kanna Devarashetti, Amherst, NY (US); William Giegerich, Buffalo, NY (US); Charles Frederick Cluss, Buffalo, NY (US); Frank Pollina, Lockport, NY (US); Margaret Donnelly, Buffalo, NY (US); Dennis Christopher Fedorishin, Amherst, NY (US); Alexander W. Stone, East Amherst, NY (US); Michael Pokora, Tonawanda, NY (US)

(73) Assignee: ACV Auctions Inc., Buffalo, NY (US)

( * ) Notice: Subject to any disclaimer, the term of this patent is extended or adjusted under 35 U.S.C. 154(b) by 143 days.

(21) Appl. No.: 18/778,284

(22) Filed: Jul. 19, 2024

(65) Prior Publication Data

US 2025/0027844 A1 Jan. 23, 2025

Related U.S. Application Data

(60) Provisional application No. 63/610,315, filed on Dec. 14, 2023, provisional application No. 63/515,053, filed on Jul. 21, 2023.

(51) Int. Cl.
G07C 5/08 (2006.01)
G01M 17/007 (2006.01)
(Continued)

(52) U.S. Cl.
CPC ......... G07C 5/0808 (2013.01); G01M 17/007 (2013.01); G06N 3/045 (2023.01);
(Continued)

(58) Field of Classification Search
CPC ................. G07C 5/0808; G07C 5/008; G01M 17/007; G06N 3/045; G06N 3/0464; G06N 20/20; G06Q 30/0278; G06Q 10/20; G06Q 40/08
See application file for complete search history.

(56) References Cited

U.S. PATENT DOCUMENTS

2002/0072808 A1* 6/2002 Li ........................... G06Q 30/02
700/28
2018/0260793 A1* 9/2018 Li ........................... G06Q 10/20
(Continued)

OTHER PUBLICATIONS

U.S. Appl. No. 18/778,247, filed Jul. 19, 2024, Birgiolas et al.
(Continued)

*Primary Examiner* — Donald J Wallace
(74) *Attorney, Agent, or Firm* — Wolf, Greenfield & Sacks, P.C.

(57) ABSTRACT

The inventors have developed technology to facilitate the inspection of vehicles, such as cars, for the presence of defects. The technology may be used to facilitate detection of any defects of one or more vehicle defects before, during, and/or after inspection of the vehicle. The technology includes software and trained machine learning models for performing analyses to determine likely vehicle defects prior to completion of a vehicle inspection, to determine whether any vehicle defects are present based on data acquired during the vehicle inspection, and/or to determine, after completion of the vehicle inspection, whether there are any discrepancies between any defects identified by an inspector during the vehicle inspection and defects automatically detected by analyzing data collected during the inspection of the vehicle.

20 Claims, 39 Drawing Sheets

(51) Int. Cl.

| | |
|---|---|
| *G06N 3/045* | (2023.01) |
| *G06N 3/0464* | (2023.01) |
| *G06Q 30/02* | (2023.01) |
| *G07C 5/00* | (2006.01) |
| *G06Q 10/20* | (2023.01) |
| *G06Q 40/08* | (2012.01) |

(52) U.S. Cl.

CPC ....... *G06N 3/0464* (2023.01); *G06Q 30/0278* (2013.01); *G07C 5/008* (2013.01); *G06Q 10/20* (2013.01); *G06Q 40/08* (2013.01)

(56) References Cited

U.S. PATENT DOCUMENTS

| | | | | |
|---|---|---|---|---|
| 2019/0095877 | A1* | 3/2019 | Li | G06N 20/00 |
| 2020/0064230 | A1* | 2/2020 | Kain Venkatadri | G06N 5/01 |
| 2020/0322546 | A1 | 10/2020 | Carolus et al. | |
| 2022/0028188 | A1* | 1/2022 | Singh | G07C 5/0808 |
| 2022/0222440 | A1* | 7/2022 | Chowdhury | G06F 16/3344 |
| 2022/0222984 | A1* | 7/2022 | Singh | G07C 5/006 |
| 2023/0054982 | A1* | 2/2023 | Corda | G07C 5/0808 |
| 2023/0063381 | A1* | 3/2023 | Brunda | G07C 5/008 |
| 2023/0204461 | A1 | 6/2023 | Schneider et al. | |
| 2025/0029434 | A1 | 1/2025 | Birgiolas et al. | |

OTHER PUBLICATIONS

Breiman, Random forests. Machine learning. Oct. 2001;45:5-32.

He et al., Deep residual learning for image recognition. Proceedings of the IEEE conference on computer vision and pattern recognition. 2016:770-8.

Tan et al., Efficientnet: Rethinking model scaling for convolutional neural networks. Proceedings of the 36th International Conference on Machine Learning. 2019. 10 pages.

Yan et al., A real-time apple targets detection method for picking robot based on improved YOLOv5. Remote Sensing. Apr. 21, 2021;13(9):1619.

* cited by examiner

700

Start

702

Obtaining an image of the undercarriage of the vehicle

704

Generating an image input from the image of the undercarriage of the vehicle

706

Processing the image input using a trained machine learning model to obtain output indicative of quality defects in the image of the undercarriage of the vehicle End

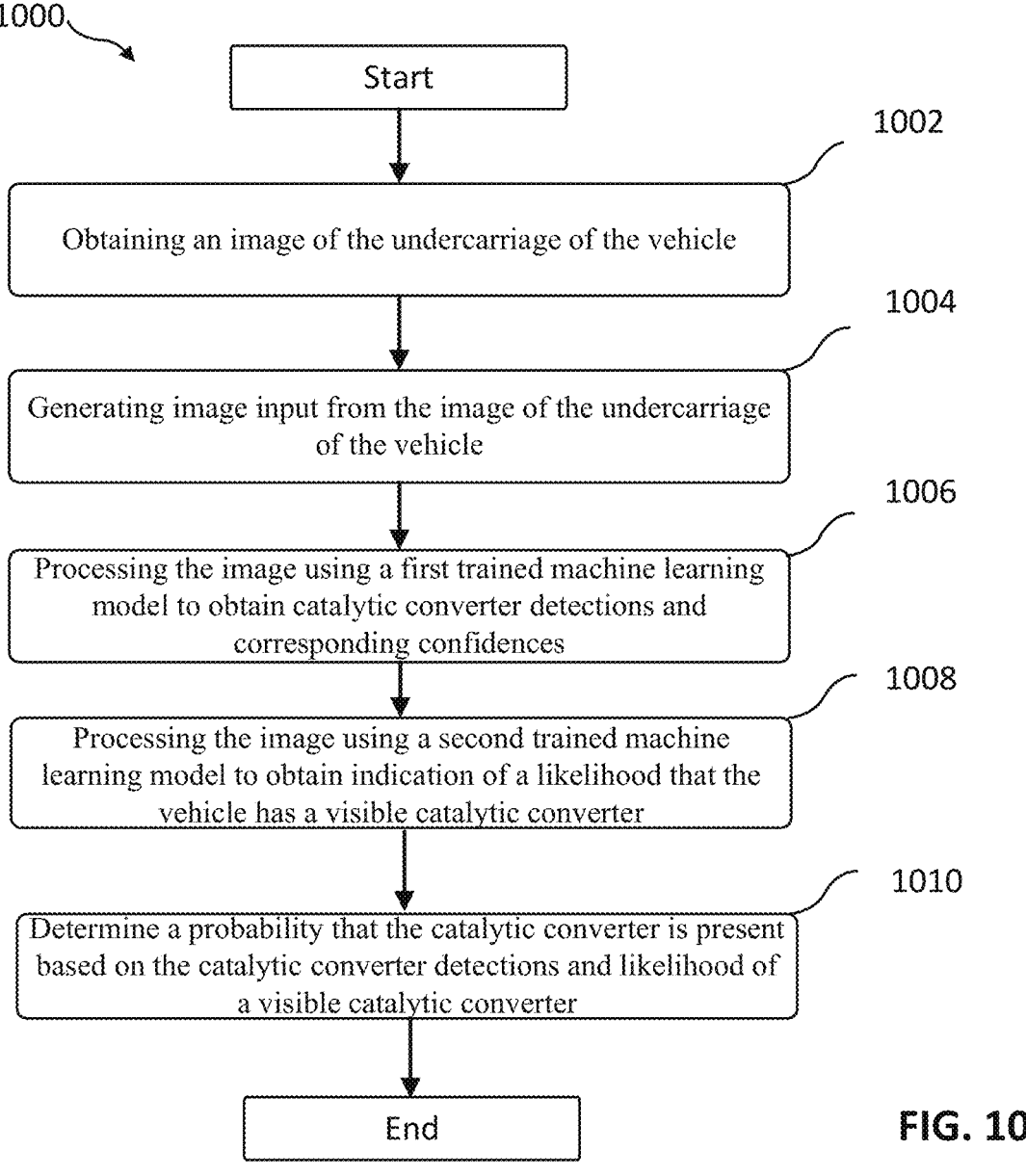

1000

Start

1002

Obtaining an image of the undercarriage of the vehicle

1004

Generating image input from the image of the undercarriage of the vehicle

1006

Processing the image using a first trained machine learning model to obtain catalytic converter detections and corresponding confidences

1008

Processing the image using a second trained machine learning model to obtain indication of a likelihood that the vehicle has a visible catalytic converter

1010

Determine a probability that the catalytic converter is present based on the catalytic converter detections and likelihood of a visible catalytic converter End

Image of the undercarriage of the vehicle

1104

Trained Machine Learning (ML) Model for Processing the Image

Generate Input Image
1108

First Portion of Trained ML Model   1110

Second Portion of Trained ML Model   1112

Determination if Catalytic Converter is Present   1114

1106

Outputs

Likelihood of Catalytic Converter being present in the image
1116

1200

1300

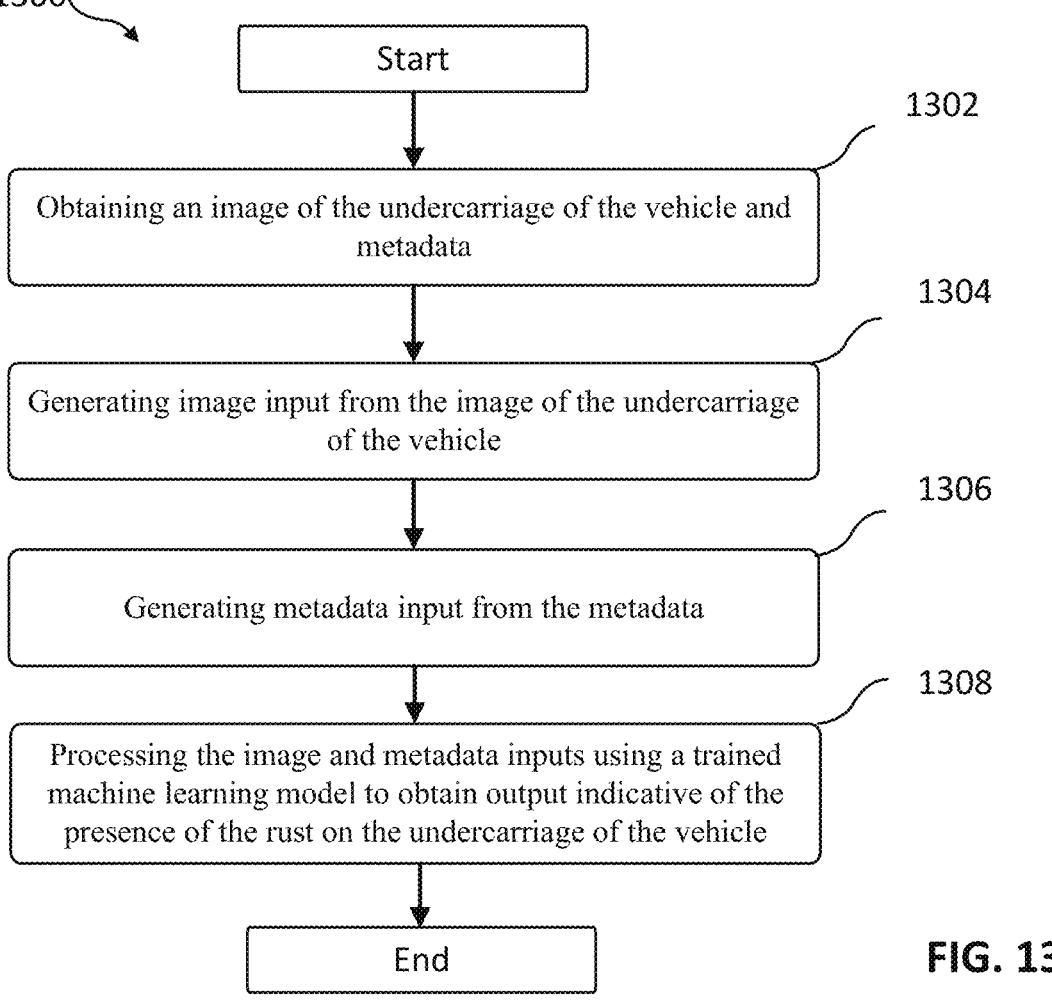

Start

Obtaining an image of the undercarriage of the vehicle and metadata

1302

Generating image input from the image of the undercarriage of the vehicle

1304

Generating metadata input from the metadata

1306

Processing the image and metadata inputs using a trained machine learning model to obtain output indicative of the presence of the rust on the undercarriage of the vehicle

1308

End

FIG. 13

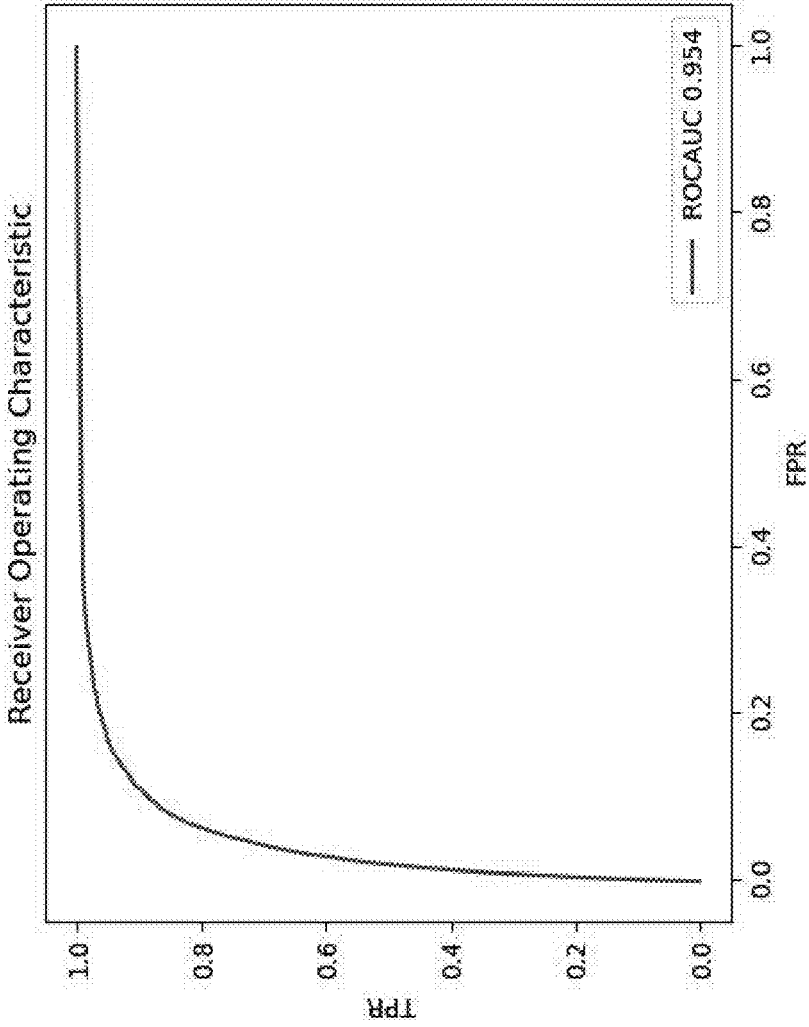
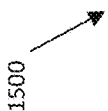
FIG. 15

1610

1612

1614

9:41

ArbGuard

Windshield Crack     AMP/APEX Quality     Virtual Lift Quality

Missing One Rev Period

Before Engine Start     Startup     Idle Period     Rev Period

1616

View data collected from audio recording

Dispute     Accept 1620     1618

1622

1624

1626

1628

1632

1630

1644

1650

1700

1702

1704

1706

1708

1710

1800

1802

1804

1806

1808

1810

METHODS AND SYSTEMS FOR IDENTIFYING POTENTIAL VEHICLE DEFECTS

CROSS-REFERENCE TO RELATED APPLICATIONS

This application claims the benefit of priority under 35 U.S.C. § 119(e) to U.S. Provisional Patent Application Serial No. "63/610,315", filed on Dec. 14, 2023, and entitled "METHODS AND SYSTEMS FOR IDENTIFYING POTENTIAL VEHICLE DEFECTS," and U.S. Provisional Patent Application Serial No. "63/515,053", filed on Jul. 21, 2023, and entitled "METHODS AND SYSTEMS FOR IDENTIFYING POTENTIAL VEHICLE DEFECTS," each of which is incorporated by reference herein in its entirety.

BACKGROUND

In many situations it is important to determine the condition of a vehicle (e.g., a car, a truck, a boat, a plane, a bus, etc.). For example, a buyer, seller, and/or owner of a vehicle may wish to understand the condition of the vehicle and, in particular, whether the vehicle has any defects. For example, a buyer may wish to understand whether the engine, the transmission, and/or any other system of the vehicle has any defects. If so, the buyer may wish to pay a different amount for the vehicle and/or consider repairing the vehicle. As another example, a seller may wish to understand whether the vehicle has any defects to determine whether to purchase the vehicle and at what price.

Conventional methods of identifying defects in vehicles include having a vehicle inspected, for example, by a professional mechanic. The mechanic may use on-board diagnostics provided by a vehicle (e.g., OBDII codes for cars) to help identify any issues with the vehicle. However, using a mechanic is time-consuming and costly. In circumstances where the condition of many vehicles needs to be established (e.g., by a car dealer, a car auction marketplace, etc.), having a professional mechanic evaluate each vehicle is impractical and prohibitively costly.

SUMMARY

Some embodiments provide for a method for assisting an inspector to inspect a vehicle by providing the inspector with information about potential vehicle defects via a mobile device used by the inspector, the method comprising: using at least one computer hardware processor to perform, prior to completion of the inspector's inspection of the vehicle: obtaining first information about the vehicle, the first information about the vehicle comprising a vehicle identifier; obtaining second information about the vehicle using the vehicle identifier; identifying one or more potential vehicle defects by using one or more trained machine learning (ML) defect detection models, the trained ML defect detection models being trained to detect vehicle defects of different types and including a first trained ML model trained to detect vehicle defects of a first type, the identifying comprising: generating a first set of features using the first information about the vehicle and/or the second information about the vehicle; processing the first set of features using the first trained ML model to obtain a first likelihood that the vehicle has a defect of the first type; and identifying, based on the first likelihood, the defect of the first type as a first potential vehicle defect for the vehicle; and notifying the inspector of the identified one or more potential vehicle defects, the notifying comprising notifying the inspector of the first potential vehicle defect.

Some embodiments provide for a system, comprising: at least one computer hardware processor; and at least one non-transitory computer-readable storage medium storing processor executable instructions that when executed by the at least one computer hardware processor perform a method for assisting an inspector to inspect a vehicle by providing the inspector with information about potential vehicle defects via a mobile device used by the inspector, the method comprising: obtaining first information about the vehicle, the first information about the vehicle comprising a vehicle identifier; obtaining second information about the vehicle using the vehicle identifier; identifying one or more potential vehicle defects by using one or more trained machine learning (ML) defect detection models, the trained ML defect detection models being trained to detect vehicle defects of different types and including a first trained ML model trained to detect vehicle defects of a first type, the identifying comprising: generating a first set of features using the first information about the vehicle and/or the second information about the vehicle; processing the first set of features using the first trained ML model to obtain a first likelihood that the vehicle has a defect of the first type; and identifying, based on the first likelihood, the defect of the first type as a first potential vehicle defect for the vehicle; and notifying the inspector of the identified one or more potential vehicle defects, the notifying comprising notifying the inspector of the first potential vehicle defect.

Some embodiments provide for at least one non-transitory computer-readable storage medium storing processor executable instructions that when executed by the at least one computer hardware processor perform a method for assisting an inspector to inspect a vehicle by providing the inspector with information about potential vehicle defects via a mobile device used by the inspector, the method comprising: obtaining first information about the vehicle, the first information about the vehicle comprising a vehicle identifier; obtaining second information about the vehicle using the vehicle identifier; identifying one or more potential vehicle defects by using one or more trained machine learning (ML) defect detection models, the trained ML defect detection models being trained to detect vehicle defects of different types and including a first trained ML model trained to detect vehicle defects of a first type, the identifying comprising: generating a first set of features using the first information about the vehicle and/or the second information about the vehicle; processing the first set of features using the first trained ML model to obtain a first likelihood that the vehicle has a defect of the first type; and identifying, based on the first likelihood, the defect of the first type as a first potential vehicle defect for the vehicle; and notifying the inspector of the identified one or more potential vehicle defects, the notifying comprising notifying the inspector of the first potential vehicle defect.

In some embodiments, notifying the inspector of the first potential vehicle defect comprises: providing the inspector with information indicating the first potential vehicle defect and the first likelihood that the vehicle has the defect of the first type.

In some embodiments, notifying the inspector of the first potential vehicle defect comprises: providing the inspector with instructions indicative of one or more actions for the inspector to take to confirm whether the first potential vehicle defect is present in the vehicle.

In some embodiments, the first potential vehicle defect of the first type is an engine defect, an exhaust smoke defect, a transmission defect, a drivetrain defect, a frame rot defect, a frame damage defect, a vehicle title defect, a vehicle modification defect, a drivability defect, and/or a hail damage defect.

In some embodiments, notifying the inspector of the identified one or more potential vehicle defects-, comprises: providing the inspector with information indicating: (1) a plurality of potential vehicle defects, including the first potential vehicle defect; and (2) a ranking of the plurality of potential vehicle defects, the ranking of potential vehicle defects being based on respective likelihoods of the vehicle defects being present in the vehicle.

In some embodiments, the first information about the vehicle further comprises an odometer reading from the vehicle.

In some embodiments, the second information about the vehicle further comprises information selected from the group consisting of: a year of manufacture of the vehicle, a make and model of the vehicle, an age of the vehicle at time of inspection, an engine displacement volume of the vehicle, a longitude coordinate of an inspection location, a latitude coordinate of the inspection location, a Koppen climate code associated with the inspection location, a drive train type of the vehicle, a fuel type of the vehicle, engine description keywords, a US state code associated with the inspection location, a Carfax® alert associated with the vehicle, and a National Highway Traffic Safety Administration (NHTSA) recall profile associated with the vehicle.

In some embodiments, the first trained ML model is trained to detect an engine noise defect by processing the first set of features to obtain the first likelihood that the vehicle has the engine noise defect.

In some embodiments, the first set of features comprises: an odometer reading of the vehicle, a year of manufacture of the vehicle, an age of vehicle at inspection, an engine displacement volume of the vehicle, a longitude coordinate of an inspection location, a latitude coordinate of the inspection location, a Koppen climate code associated with the inspection location, a drive train type of the vehicle, a fuel type of the vehicle, a make and model of the vehicle, engine description keywords, and a Carfax® alert associated with the vehicle.

In some embodiments, the one or more trained ML defect detection models include a second trained ML model trained to detect vehicle defects of a second type different from the first type, wherein the identifying comprises: generating a second set of features using the first information about the vehicle and/or the second information about the vehicle; processing the second set of features using the second trained ML model to obtain a second likelihood that the vehicle has a defect of the second type; and identifying, based on the second likelihood, the defect of the second type as a second potential vehicle defect, and wherein the notifying comprises: notifying the inspector of the second potential vehicle defect.

In some embodiments, the first set of features are different from the second set of features.

In some embodiments, the first set of features comprise at least one feature obtained from the first information and at least one feature obtained from the second information.

In some embodiments, the second trained ML model is trained to detect a transmission defect by processing the second set of features to obtain the second likelihood that the vehicle has the transmission defect.

In some embodiments, the second set of features comprises: an odometer reading of the vehicle, a year of manufacture of the vehicle, an age of vehicle at inspection, an engine displacement volume of the vehicle, a drive train type of the vehicle, a fuel type of the vehicle, a make and model of the vehicle, engine description keywords, a Carfax® alert associated with the vehicle, and a National Highway Traffic Safety Administration (NHTSA) recall profile associated with the vehicle.

In some embodiments, the first trained ML model is a trained random forest model having between 0.5 million and 17 million parameters.

Some embodiments provide for a method for using trained machine learning (ML) models to process data about a vehicle in furtherance of identifying one or more vehicle defects, the method comprising: using at least one computer hardware processor to perform, subsequent to completion of an inspector's inspection of the vehicle: obtaining an initial vehicle condition report comprising inspection results, the inspection results indicating a first set of zero, one or more vehicle defects that the inspector determined to be present in the vehicle; obtaining data about the vehicle gathered at least in part during inspection of the vehicle by the inspector; applying the trained ML models to the data about the vehicle to obtain a second set of zero, one or more vehicle defects that are indicated by the trained ML models to be present in the vehicle; generating an indication of agreement or discrepancy between the first set of vehicle defects that the inspector determined to be present in the vehicle and the second set of vehicle defects that are indicated by the trained ML models to be present in the vehicle; and outputting the initial vehicle condition report and/or the indication of agreement or discrepancy.

Some embodiments provide for a system, comprising: at least one hardware processor; and at least one non-transitory computer-readable storage medium storing processor executable instructions that when executed by the at least one computer hardware processor perform a method for using trained machine learning (ML) models to process data about a vehicle in furtherance of identifying one or more vehicle defects, the method comprising: obtaining an initial vehicle condition report comprising inspection results, the inspection results indicating a first set of zero, one or more vehicle defects that the inspector determined to be present in the vehicle; obtaining data about the vehicle gathered at least in part during inspection of the vehicle by the inspector; applying the trained ML models to the data about the vehicle to obtain a second set of zero, one or more vehicle defects that are indicated by the trained ML models to be present in the vehicle; generating an indication of agreement or discrepancy between the first set of vehicle defects that the inspector determined to be present in the vehicle and the second set of vehicle defects that are indicated by the trained ML models to be present in the vehicle; and outputting the initial vehicle condition report and/or the indication of agreement or discrepancy.

Some embodiments provide for at least one non-transitory computer-readable storage medium storing processor executable instructions that when executed by the at least one computer hardware processor perform a method for using trained machine learning ML models to process data about a vehicle in furtherance of identifying one or more vehicle defects, the method comprising: obtaining an initial vehicle condition report comprising inspection results, the inspection results indicating a first set of zero, one or more vehicle defects that the inspector determined to be present in the vehicle; obtaining data about the vehicle gathered at least in part during inspection of the vehicle by the inspector; applying the trained (ML) models to the data about the vehicle to obtain a second set of zero, one or more vehicle defects that are indicated by the trained ML models to be present in the vehicle; generating an indication of agreement or discrepancy between the first set of vehicle defects that the inspector determined to be present in the vehicle and the second set of vehicle defects that are indicated by the trained ML models to be present in the vehicle; and outputting the initial vehicle condition report and/or the indication of agreement or discrepancy.

In some embodiments, generating the indication of agreement or discrepancy between the first set of vehicle defects and the second set of vehicle defects comprises:

processing the first set of vehicle defects and the second set of vehicle defects using a trained ML risk model to obtain a likelihood of a discrepancy being present between the first set of vehicle defects and the second set of vehicle defects.

In some embodiments, the trained ML risk model comprises a trained random forest model trained to determine whether the likelihood of the discrepancy being present exceeds a threshold.

In some embodiments, the trained ML risk model is trained to determine a likelihood a vehicle defect is present in the vehicle, the vehicle defect being from the group consisting of: engine noise, exhaust system, and structural rust.

In some embodiments, generating the indication of agreement or discrepancy between the first set of vehicle defects and the second set of vehicle defects is performed using one or more ML risk models or is performed using one or more rules and generating the indication of agreement or discrepancy involves processing the inspection results and likelihoods, obtained by applying the trained ML models to the data about the vehicle, with the one or more ML risk models or one or more rules.

In some embodiments, each of the trained ML models is trained to generate a likelihood that a respective type of a vehicle defect is present in the vehicle.

In some embodiments, the trained ML models include a first trained ML model trained to generate a first likelihood that a first type of vehicle defect is present in the vehicle, wherein the first type of vehicle defect is an undercarriage defect, engine audio defect, dashboard defect, and/or exterior/mechanical defect.

In some embodiments, comprising generating a revised vehicle condition report, the generating comprising: providing the initial vehicle condition report and the indication of agreement or discrepancy between the first set of vehicle defects and the second set of vehicle defects to a reviewer through a device used by the reviewer; receiving input from the device whether or not to modify the initial vehicle condition report based on the indication; and generating a final vehicle condition report, based on the input received from the device.

In some embodiments, upon receiving input from the device to modify the initial vehicle report, the generating the final vehicle condition report comprises modifying the inspection results indicating the first set of zero, one or more vehicle defects by replacing an indication of one or more vehicle defects in the first set with one or more corresponding indications from the second set.

In some embodiments, prior to receiving the input whether or not to modify the initial vehicle condition report, providing, to an inspector, a recommendation to obtain additional inspection results; and subsequent to obtaining additional inspection results, determining whether or not to modify the initial vehicle condition report.

In some embodiments, the first set of vehicle defects does not indicate a vehicle defect of a first type being present in the vehicle; the second set of vehicle defects indicates a likelihood of the vehicle defect of the first type being present in the vehicle; and generating the indication of agreement or discrepancy comprises generating an indication of discrepancy with respect to the vehicle defect of the first type when the likelihood exceeds a threshold.

In some embodiments, the trained ML models include a first trained ML model trained to detect vehicle defects of the first type, and applying the trained (ML) models to the data about the vehicle comprises applying the first trained ML model to at least some of the data about the vehicle to obtain the likelihood of the vehicle defect of the first type being present in the vehicle.

In some embodiments, the first set of vehicle defects does not indicate presence of an engine vehicle defect; the second set of vehicle defects does indicate a likelihood of the engine vehicle defect being present in the vehicle; and generating the indication of agreement or discrepancy comprises generating an indication of discrepancy with respect to the engine vehicle defect based on the likelihood.

In some embodiments, the first trained ML model comprises: a first neural network portion comprising a plurality of one-dimensional (1D) convolutional layers configured to process an audio waveform; a second neural network portion comprising a plurality of two-dimensional (2D) convolutional layers configured to process a 2D representation of the audio waveform; and a fusion neural network portion comprising one or more fully connected layers configured to combine outputs produced by the first neural network portion and the second neural network portion to obtain a likelihood indicative of the presence or absence of the at least one vehicle defect.

In some embodiments, the data about the vehicle comprises data gathered during the inspection of the vehicle using at least one hardware sensor configured to record audio of the vehicle during operation and/or capture one or more images and/or videos of the vehicle.

In some embodiments, the data about the vehicle comprises: an audio recording of the vehicle during its operation, an image of at least a portion of the vehicle, a video of at least a portion of the vehicle, and/or one or more on-board diagnostic (OBD) codes.

Some embodiments provide for a method for using a trained machine learning (ML) model to evaluate quality of an image of an undercarriage of a vehicle, the method comprising: using at least one computer hardware processor to perform: obtaining an image of the undercarriage of the vehicle; processing the image using the trained ML model, the processing comprising: generating image input from the image; processing the image input using the trained ML model to obtain output indicative of presence of zero, one, or multiple image quality defects in the image of the undercarriage of the vehicle.

Some embodiments provide for a system comprising, at least one computer hardware processor; and at least one non-transitory computer-readable storage medium storing processor executable instructions that, when executed by the at least one computer hardware processor, cause the at least one computer hardware processor to perform a method for using a trained machine learning (ML) model to evaluate quality of an image of an undercarriage of a vehicle, the method comprising: obtaining an image of the undercarriage of the vehicle; processing the image using the trained ML model, the processing comprising: generating image input from the image; processing the image input using the trained ML model to obtain output indicative of presence of zero, one, or multiple image quality defects in the image of the undercarriage of the vehicle.

Some embodiments provide for at least one non-transitory computer-readable storage medium storing processor executable instructions that, when executed by at least one computer hardware processor, cause the at least one computer hardware processor to perform a method for using a trained machine learning (ML) model to evaluate quality of an image of an undercarriage of a vehicle, the method comprising: obtaining an image of the undercarriage of the vehicle; processing the image using the trained ML model, the processing comprising: generating image input from the image; processing the image input using the trained ML model to obtain output indicative of presence of zero, one, or multiple image quality defects in the image of the undercarriage of the vehicle.

In some embodiments, the image of the undercarriage of the vehicle is a composite image of the undercarriage of the vehicle having been generated by combining multiple images of the undercarriage of the vehicle.

In some embodiments, generating the image input from the image comprises: normalizing the image, per channel, at least in part by: subtracting, in each particular channel, mean pixel values in the particular channel of a training set of images on which the trained ML model was trained; and dividing by a standard deviation of pixel values in the particular channel of the training set of images on which the trained ML model was trained.

In some embodiments, the trained ML model is a deep neural network model.

In some embodiments, the trained ML model comprises a plurality of 2D convolutional layers.

In some embodiments, the trained ML model comprises a plurality of parameters, wherein the plurality of parameters comprises between one million and fifty million parameters, and wherein processing the image input using the trained ML model to obtain the output indicative of the presence of zero, one, or multiple image quality defects in the image of the undercarriage of the vehicle comprises computing the output using values of the plurality of parameters and the image input.

In some embodiments, the trained ML model comprises a plurality of parameters, wherein the plurality of parameters comprises between ten million and thirty million parameters, and wherein processing the image input using the trained ML model to obtain the output indicative of the presence of zero, one, or multiple image quality defects in the image of the undercarriage of the vehicle comprises computing the output using values of the plurality of parameters and the image input.

In some embodiments, the output indicates a plurality of defect likelihoods for a respective plurality of image quality defects, each of the plurality of defect likelihoods indicating a likelihood that the image of the undercarriage of the vehicle has a respective image quality defect of the plurality of image quality defects.

In some embodiments, the plurality of image defects includes one or more image defects selected from the group consisting of: an improper cropping defect, an insufficient detail defect, a dirty mirror defect, a glare defect, an incorrect trim defect, a lighting defect, and a recording defect.

In some embodiments, the output indicates a likelihood that the image of the undercarriage of the vehicle is of sufficient quality for subsequent processing.

In some embodiments, determining that the image of the undercarriage of the vehicle is of sufficient quality for subsequent processing when the likelihood that the image of the undercarriage of the vehicle is of sufficient quality for subsequent processing is greater than each of the plurality of defect likelihoods; and when it is determined that the image of the undercarriage of the vehicle is of sufficient quality for subsequent processing, processing the image of the undercarriage of the vehicle with one or more other trained ML models to determine whether the vehicle has one or more respective defects.

In some embodiments, determining, based on the output, that the image of the undercarriage of the vehicle is of sufficient quality for subsequent processing; and when it is determined that the image of the undercarriage of the vehicle is of sufficient quality for subsequent processing, processing the image of the undercarriage of the vehicle with one or more other trained ML models to determine whether the vehicle has one or more respective defects.

In some embodiments, a first trained ML model trained to detect presence of rust on the undercarriage of the vehicle, and wherein processing the image of the undercarriage of the vehicle comprises processing the image of the undercarriage of the vehicle using the first trained ML to determine whether the undercarriage of the vehicle has rust.

In some embodiments, the one or more trained ML models comprises a second trained ML model trained to detect presence of catalytic converters in images of vehicles, and wherein processing the image of the undercarriage of the vehicle comprises processing the image of the undercarriage of the vehicle using the second trained ML to detect the presence of a catalytic converter in the image of the undercarriage of the vehicle.

Some embodiments provide for a method for using machine learning (ML) models to detect presence of a catalytic converter in an image of an undercarriage of a vehicle, the method comprising: using at least one computer hardware processor to perform: obtaining an image of the undercarriage of the vehicle; generating image input from the image of the undercarriage of the vehicle; and processing the image input using multiple trained ML models to determine a probability that the catalytic converter is present in the image, the processing comprising: processing the image input using a first trained ML model, which is trained to detect catalytic converters in vehicle undercarriage images, to obtain first output indicating zero, one, or multiple catalytic converter detections and corresponding confidences; processing the image input using a second trained ML model, which is trained to determine from vehicle undercarriage images whether vehicles have visible catalytic converters, to obtain second output indicating a likelihood that the vehicle has a visible catalytic converter; and determining a probability that the catalytic converter is present in the image using the first output and the second output.

Some embodiments provide for a system comprising, at least one computer hardware processor; and at least one non-transitory computer-readable storage medium storing processor executable instructions that, when executed by the at least one computer hardware processor, cause the at least one computer hardware processor to perform a method for using machine learning (ML) models to detect presence of a catalytic converter in an image of an undercarriage of a vehicle, the method comprising: obtaining an image of the undercarriage of the vehicle; generating image input from the image of the undercarriage of the vehicle; and processing the image input using multiple trained ML models to determine a probability that the catalytic converter is present in the image, the processing comprising: processing the image input using a first trained ML model, which is trained to detect catalytic converters in vehicle undercarriage images, to obtain first output indicating zero, one, or multiple catalytic converter detections and corresponding confidences; processing the image input using a second trained ML model, which is trained to determine from vehicle undercarriage images whether vehicles have visible catalytic converters, to obtain second output indicating a likelihood that the vehicle has a visible catalytic converter; and determining a probability that the catalytic converter is present in the image using the first output and the second output.

Some embodiments provide for at least one non-transitory computer-readable storage medium storing processor executable instructions that, when executed by at least one computer hardware processor, cause the at least one computer hardware processor to perform a method for using machine learning (ML) models to detect presence of a catalytic converter in an image of an undercarriage of a vehicle, the method comprising: obtaining an image of the undercarriage of the vehicle; generating image input from the image of the undercarriage of the vehicle; and processing the image input using multiple trained ML models to determine a probability that the catalytic converter is present in the image, the processing comprising: processing the image input using a first trained ML model, which is trained to detect catalytic converters in vehicle undercarriage images, to obtain first output indicating zero, one, or multiple catalytic converter detections and corresponding confidences; processing the image input using a second trained ML model, which is trained to determine from vehicle undercarriage images whether vehicles have visible catalytic converters, to obtain second output indicating a likelihood that the vehicle has a visible catalytic converter; and determining a probability that the catalytic converter is present in the image using the first output and the second output.

In some embodiments, the image of the undercarriage of the vehicle is a composite image of the undercarriage of the vehicle having been generated by combining multiple images of the undercarriage of the vehicle.

In some embodiments, prior to processing the image input using the multiple trained ML models to determine the probability that the catalytic converter is present in the image, processing the image using a third trained ML model to obtain output indicative of presence of zero, one, or multiple image quality defects in the image of the undercarriage of the vehicle; and determining, based on the output, whether the image of the undercarriage of the vehicle is of sufficient quality for subsequent processing; and when it is determined that the image of the undercarriage of the vehicle is of sufficient quality for subsequent processing, processing the image input using the multiple trained ML models to determine the probability that the catalytic converter is present in the image.

In some embodiments, generating the image input from the image comprises: normalizing the image, per channel, at least in part by: subtracting, in each particular channel, mean pixel values in the particular channel of a training set of images on which the first and second trained ML models were trained; and dividing by a standard deviation of pixel values in the particular channel of the training set of images on which the first and second trained ML models were trained.

In some embodiments, the first trained ML model is a deep neural network model for object detection.

In some embodiments, the first trained ML model comprises a plurality of 2D convolutional layers and a spatial pyramid pooling layer.

In some embodiments, the first trained ML model is implemented using architecture of the YOLOv5 object detection neural network.

In some embodiments, wherein the first trained ML model comprises a plurality of parameters, wherein the plurality of parameters comprises between ten million and one hundred million parameters, and wherein processing the image input using the first trained ML model to obtain the first output indicating zero, one, or multiple catalytic converter detections and corresponding confidences comprises computing the first output using values of the plurality of parameters and the image input.

In some embodiments, wherein the first trained ML model comprises a plurality of parameters, wherein the plurality of parameters comprises between thirty million and one sixty million parameters, and wherein processing the image input using the first trained ML model to obtain the first output indicating zero, one, or multiple catalytic converter detections and corresponding confidences comprises computing the first output using values of the plurality of parameters and the image input.

In some embodiments, the second trained ML model is a deep neural network classification model.

In some embodiments, the second trained ML model comprises a plurality of 2D convolutional layers.

In some embodiments, wherein the second trained ML model comprises a second plurality of parameters, wherein the second plurality of parameters comprises between one million and one fifty million parameters, and wherein processing the image input using the second trained ML model to obtain the second output indicating the likelihood that the vehicle has a visible catalytic converter comprises computing the second output using values of the second plurality of parameters and the image input.

In some embodiments, wherein the second trained ML model comprises a second plurality of parameters, wherein the second plurality of parameters comprises between one million and one thirty million parameters, and wherein processing the image input using the second trained ML model to obtain the second output indicating the likelihood that the vehicle has a visible catalytic converter comprises computing the second output using values of the second plurality of parameters and the image input.

In some embodiments, identifying, from the first output, a catalytic converter detection having a highest confidence; determining the probability that the catalytic converter is present in the image as a product of the highest confidence and the likelihood that the vehicle has a visible catalytic converter.

In some embodiments, identifying, from the first output, a catalytic converter detection having a highest confidence; determining that a catalytic converter is missing from the vehicle when the highest confidence is below a first threshold and the likelihood that the vehicle has a visible catalytic converter is above a second threshold.

In some embodiments, determining that the catalytic converter is missing from the vehicle; obtaining an initial vehicle condition report comprising inspection results, the inspection results indicating a first set of zero, one or more vehicle defects that the inspector determined to be present in the vehicle; and generating an indication of agreement or discrepancy between the first set of vehicle defects that the inspector determined to be present in the vehicle and the determination that the catalytic converter is missing from the vehicle.

Some embodiments provide for a method for using a trained machine learning (ML) model to detect presence of rust on an undercarriage of a vehicle, the method comprising: using at least one computer hardware processor to perform: obtaining at least one image of the undercarriage of the vehicle and metadata indicating one or more properties of the vehicle; processing the at least one image and the metadata to detect presence of the rust, the processing comprising: generating image input from the at least one image; generating metadata input from the metadata; and processing the image input and the metadata input using the trained ML model to obtain output indicative of presence or absence of the rust on the undercarriage of the vehicle.

Some embodiments provide for a system comprising, at least one computer hardware processor; and at least one non-transitory computer-readable storage medium storing processor executable instructions that, when executed by the at least one computer hardware processor, cause the at least one computer hardware processor to perform a method for using a trained machine learning (ML) model to detect presence of rust on an undercarriage of a vehicle, the method comprising: obtaining at least one image of the undercarriage of the vehicle and metadata indicating one or more properties of the vehicle; processing the at least one image and the metadata to detect presence of the rust, the processing comprising: generating image input from the at least one image; generating metadata input from the metadata; and processing the image input and the metadata input using the trained ML model to obtain output indicative of presence or absence of the rust on the undercarriage of the vehicle.

Some embodiments provide for at least one non-transitory computer-readable storage medium storing processor executable instructions that, when executed by at least one computer hardware processor, cause the at least one computer hardware processor to perform a method for using a trained machine learning (ML) model to detect presence of rust on an undercarriage of a vehicle, the method comprising: obtaining at least one image of the undercarriage of the vehicle and metadata indicating one or more properties of the vehicle; processing the at least one image and the metadata to detect presence of the rust, the processing comprising: generating image input from the at least one image; generating metadata input from the metadata; and processing the image input and the metadata input using the trained ML model to obtain output indicative of presence or absence of the rust on the undercarriage of the vehicle.

In some embodiments, the at least one image comprises: at least one image of at least one rocker panel of the vehicle; at least one image of the vehicle's frame; and at least one composite image of the undercarriage of the vehicle, the at least one composite image having been generated by combining multiple images of the undercarriage of the vehicle.

In some embodiments, the at least one image of the at least one rocker panel comprises an image of the right rocker panel of the vehicle and an image of the left rocker panel of the vehicle, and wherein the at least one image of the vehicle's frame comprises an image of a left portion of the vehicle's frame, a rear portion of the vehicle's frame, and a right portion of the vehicle's frame.

In some embodiments, the at least one image comprises a plurality of images of the undercarriage of the vehicle, and wherein generating image input from the at least one image comprises concatenating the plurality of images into a single wide image to be used as the image input.

In some embodiments, prior to the concatenating, normalizing each of the plurality of images.

In some embodiments, the properties of the vehicle are selected from the group consisting of: a reading of the vehicle's odometer, an age of the vehicle, a type of drivetrain in the vehicle, a measure of displacement of the vehicle's engine, a fuel type of the vehicle, a longitude coordinate of an inspection location, a latitude coordinate of the inspection location, a Koppen climate code associated with the inspection location, a U.S. state code associated with the inspection location, a model of the vehicle, a make of the vehicle, one or more Carfax® alerts associated with the vehicle, and a type of transmission in the vehicle.

In some embodiments, the metadata comprises text indicating at least one of the one or more properties, and generating the metadata features from the metadata comprises a numeric representation of the text.

In some embodiments, the trained ML model is a deep neural network model.

In some embodiments, the trained ML model comprises: a first neural network portion comprising a plurality of 2D convolutional layers and configured to process the image input; a second neural network portion comprising a plurality of residual neural network blocks and configured to process the metadata input; and a fusion neural network portion comprising one or more 2D convolutional layers and configured to combine outputs produced by the first neural network portion and the second neural network portion to obtain the output indicative of presence or absence of the rust.

In some embodiments, the trained ML model comprises a plurality of parameters, wherein the plurality of parameters comprises between one million and ten million parameters, and wherein processing the image input and the metadata input using the trained ML model to obtain output indicative of presence or absence of the rust comprises computing the output using values of the plurality of parameters, the image input, and the metadata input.

In some embodiments, the trained ML model comprises a plurality of parameters, wherein the plurality of parameters comprises between one million and one hundred million parameters, and wherein processing the image input and the metadata input using the trained ML model to obtain output indicative of presence or absence of the rust comprises computing the output using values of the plurality of parameters, the image input, and the metadata input.

In some embodiments, the output is a numeric value indicative of a likelihood that the undercarriage of the vehicle has rust.

In some embodiments, prior to processing the at least one image and the metadata to detect presence of the rust, processing the at least one image using a second trained ML model to obtain output indicative of presence of zero, one, or multiple image quality defects in the at least one image; determining, based on the output, whether the at least one image of the undercarriage of the vehicle is of sufficient quality for subsequent processing; and when it is determined that the at least one image of the undercarriage of the vehicle is of sufficient quality for subsequent processing, processing the at least one image and the metadata to detect presence of the rust.

In some embodiments, generating an electronic vehicle condition report indicating the presence or absence of rust based on the output.

In some embodiments, the trained ML model is trained to detect, from the at least one image and the metadata, presence or absence of structural rust.

In some embodiments, obtaining an initial vehicle condition report comprising inspection results, the inspection results indicating a first set of zero, one or more vehicle defects that the inspector determined to be present in the vehicle; and generating an indication of agreement or discrepancy between the first set of vehicle defects that the inspector determined to be present in the vehicle and the output of the trained ML model indicating the presence or absence of rust in the undercarriage of the vehicle.

Some embodiments provide for a method for using a trained machine learning (ML) model to detect a presence of a fluid leak in an image of an undercarriage of a vehicle, the method comprising: using at least one computer hardware processor to perform: obtaining the image of the undercarriage of the vehicle; and processing the image of the undercarriage of the vehicle using the trained ML model to obtain an output indicating whether a fluid leak is present in the image of the undercarriage of the vehicle, the processing comprising: generating image input from the image of the undercarriage of the vehicle; and processing the image input using the trained ML model to obtain the output indicating whether the fluid leak is present in the image of the undercarriage of the vehicle.

In some embodiments, obtaining the image of the undercarriage comprises: obtaining multiple images of portions of the undercarriage of the vehicle; and generating the image of the undercarriage of the vehicle by combining the multiple images of portions of the undercarriage of the vehicle into a composite image of the undercarriage of the vehicle.

In some embodiments, generating the image input from the image of the undercarriage of the vehicle comprises: normalizing the image of the undercarriage of the vehicle, per channel, at least in part by: subtracting, in each particular channel, mean pixel values of pixel values in the particular channel, the mean pixel values being determined from pixel values of a training set of images on which the trained ML model was trained; and dividing, in each particular channel, the pixel values in the particular channel by standard deviation values, the standard deviation values being standard deviations determined from the training set of images on which the trained ML model was trained.

In some embodiments, the trained ML model is a deep neural network model comprising a plurality of 2D convolutional layers.

In some embodiments, the trained ML model comprises between 14 and 26 convolutional blocks.

In some embodiments, the convolutional blocks are organized into 4 groups for sequential analysis.

In some embodiments, the trained ML model comprises a plurality of parameters, wherein the plurality of parameters comprises between one million and fifty million parameters, and wherein processing the image input using the trained ML model to obtain the output indicating whether the fluid leak is present in the image of the undercarriage of the vehicle comprises computing the output using values of the plurality of parameters and the image input.

In some embodiments, the output indicating whether the fluid leak is present in the image of the undercarriage of the vehicle is a binary indication whether a fluid leak is present in the image of the undercarriage.

In some embodiments, the output indicating whether the fluid leak is present in the image of the undercarriage of the vehicle indicates a plurality of likelihoods for a respective plurality of fluid leaks, each of the likelihoods indicating a likelihood that the image of the undercarriage of the vehicle has a respective fluid leak of the plurality of fluid leaks.

In some embodiments, the output indicating whether the fluid leak is present in the image of the undercarriage of the vehicle indicates a likelihood that the fluid leak is present in the image of the undercarriage of the vehicle.

In some embodiments, the fluid leak is selected from the group consisting of an oil leak, a transmission fluid leak, a coolant fluid leak, a brake fluid leak, and a power steering fluid leak.

In some embodiments, the fluid leak is an oil leak.

In some embodiments, prior to processing the image of the undercarriage of the vehicle to detect the presence of fluid leaks in the image of the undercarriage of the vehicle, the method further comprises: processing the image of the undercarriage of the vehicle using a second trained ML model to obtain output indicative of a presence of zero, one, or multiple image quality defects in the image of the undercarriage of the vehicle; determining, based on the output indicative of the presence of image quality defects, whether the image of the undercarriage of the vehicle is of sufficient quality for subsequent processing; and when it is determined that the image of the undercarriage of the vehicle is of sufficient quality for subsequent processing, processing the image to obtain the output indicating whether the fluid leak is present in the image of the undercarriage of the vehicle.

In some embodiments, the zero, one, or more image quality defects are identified as one or more defects from the group consisting of: an improper cropping defect, an insufficient detail defect, a dirty mirror defect, a glare defect, an incorrect trim defect, a lighting defect, and a recording defect.

In some embodiments, generating an electronic vehicle condition report indicating the presence or absence of fluid leaks based on the output.

In some embodiments, the method further comprises: obtaining an initial vehicle condition report comprising inspection results, the inspection results indicating a first set of zero, one, or more vehicle defects that the inspector determined to be present in the vehicle; and generating an indication of agreement or discrepancy between the first set of vehicle defects that the inspector determined to be present in the vehicle and the determination that the output indicating whether the fluid leak is present in the image of the undercarriage of the vehicle.

Some embodiments provide for a system comprising: at least one computer hardware processor; and at least one non-transitory computer-readable storage medium storing processor executable instructions that, when executed by the at least one computer hardware processor, cause the at least one computer hardware processor to perform a method for using a trained machine learning model to detect presence of a fluid leak in an image of an undercarriage of a vehicle, the method comprising: obtaining the image of the undercarriage of the vehicle; and processing the image of the undercarriage of the vehicle using the trained ML model to obtain an output indicating whether a fluid leak is present in the image of the undercarriage of the vehicle, the processing comprising: generating image input from the image of the undercarriage of the vehicle; and processing the image input using the trained ML model to obtain the output indicating whether the fluid leak is present in the image of the undercarriage of the vehicle.

Some embodiments provide for at least one non-transitory computer-readable storage medium storing processor executable instructions that, when executed by at least one computer hardware processor, cause the at least one computer hardware processor to perform a method for using a trained machine learning (ML) model to detect presence of a fluid leak in an image of an undercarriage of a vehicle, the method comprising: obtaining the image of the undercarriage of the vehicle; and processing the image of the undercarriage of the vehicle using the trained ML model to obtain an output indicating whether a fluid leak is present in the image of the undercarriage of the vehicle, the processing comprising: generating image input from the image of the undercarriage of the vehicle; and processing the image input using the trained ML model to obtain the output indicating whether the fluid leak is present in the image of the undercarriage of the vehicle.

BRIEF DESCRIPTION OF THE DRAWINGS

FIG. 10 is a flowchart of an illustrative process for using one or more trained machine learning models to detect the presence of a catalytic converter based on an image of an undercarriage of a vehicle, in accordance with some embodiments of the technology described herein.

FIG. 13 is a flowchart of illustrative process for using one or more trained machine learning models to detect the presence of rust on the undercarriage of a vehicle, in accordance with some embodiments of the technology described herein.

FIG. 15 illustrates a receiver operating characteristic (ROC) curve representing performance of a trained rust detection machine learning model, in accordance with some embodiments of the technology described herein.

DETAILED DESCRIPTION

I. Introduction

Figure 1:
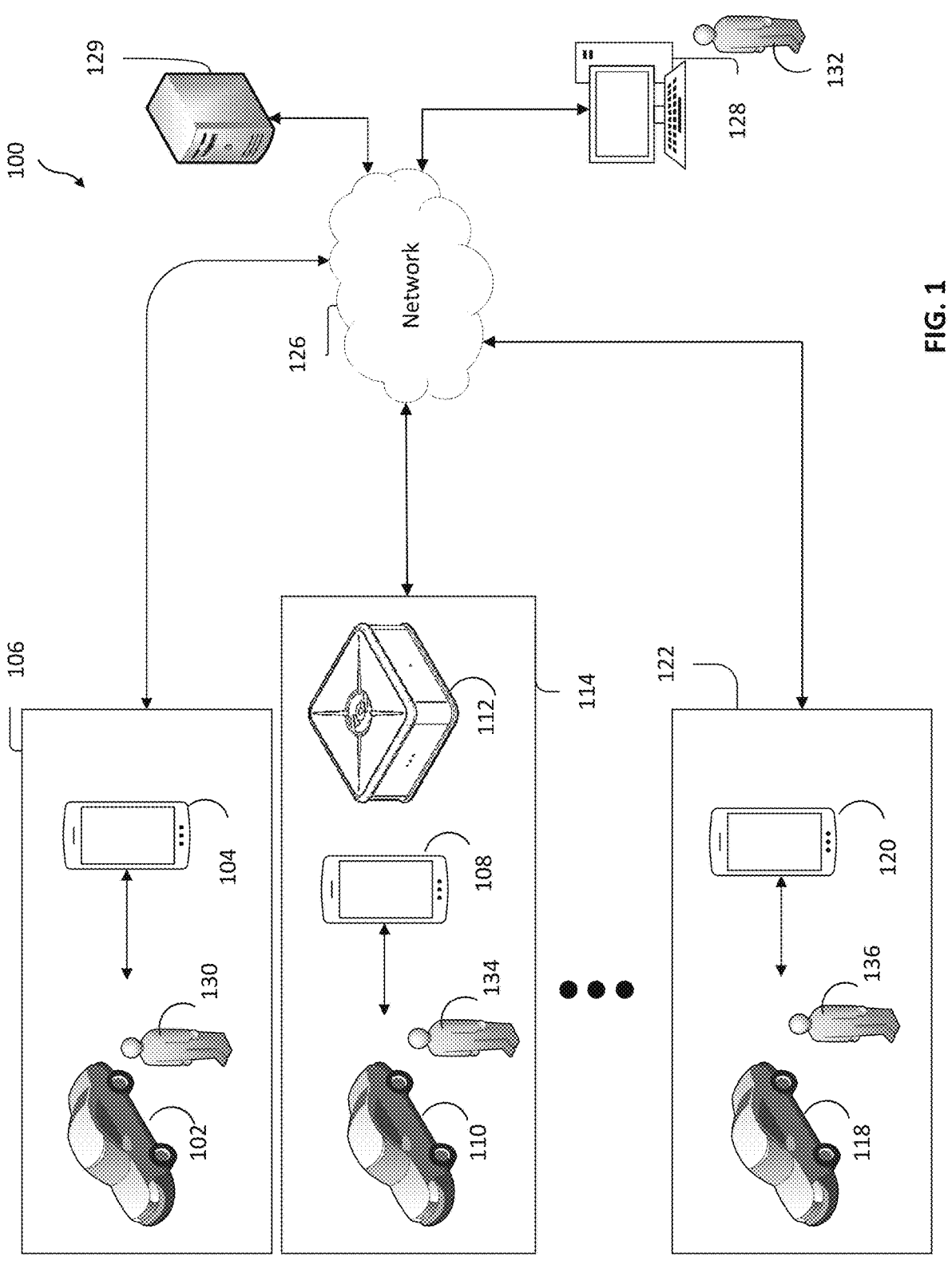
FIG. 1 illustrates an example of a vehicle diagnostic system, in accordance with some embodiments of the technology described herein.

The inventors have developed technology to facilitate the inspection of vehicles, such as cars, for the presence of defects. The technology may be used to facilitate detection of any defects of a vehicle before, during, and/or after inspection of the vehicle. The technology includes software and trained machine learning models for performing analyses to determine likely vehicle defects prior to completion of a vehicle inspection, to determine whether any vehicle defects are present based on data acquired during the vehicle inspection, and/or to determine, after completion of the vehicle inspection, whether there are any discrepancies between any defects identified by an inspector during the vehicle inspection and defects automatically detected by analyzing data collected during the inspection of the vehicle.

In the course of a vehicle inspection, a vehicle inspector may collect data about a vehicle using various vehicle inspection tools in order to determine whether any vehicle defects are present. This may be done for any suitable reason, for example, to assess the approximate value of the vehicle prior to its sale. Given the variety of different vehicle makes, models, and the complexity of vehicle systems, determining the presence of a vehicle defect either from an inspection of a vehicle or from examining data acquired during a vehicle inspection requires a substantial amount of inspector training. The inventors appreciated the difficulty of performing thorough and accurate vehicle inspections and have developed numerous machine learning techniques to aid in the detection of vehicle defects (prior to, during, after, and/or in conjunction with vehicle inspections), as described herein.

First, the inventors have developed techniques for facilitating a vehicle inspection by providing helpful information to a vehicle inspector prior to completion of the vehicle inspection (e.g., prior to start of the vehicle inspection or during the vehicle inspection). The techniques involve, receiving from the inspector, preliminary and easily accessible information about the vehicle (e.g., the make, model, and/or VIN of the vehicle, odometer reading on the vehicle), obtaining additional information about the vehicle using the received information, and processing the received information with one or more trained ML models to identify one or more potential vehicle defects that the vehicle may have. The vehicle inspector may be notified of any such defects, which facilitates the vehicle inspection, for example, by alerting the vehicle inspector to one or more potential defects to look for during the inspection. Additionally, for any potential defect, the vehicle inspector may be notified of one or more particular tests to perform during the inspection and/or defect indicators to check for during the inspection. Such techniques are described herein including in Section II titled "ML Techniques for Facilitating A Vehicle Inspection".

Second, the inventors have developed techniques to improve accuracy of vehicle inspections by: (1) processing data collected during a vehicle inspection using multiple machine learning models, developed by the inventors, to identify zero, one, or more potential vehicle defects; and (2) comparing any such identified defects with the inspection results prepared by the vehicle inspector (e.g., as part of a vehicle condition report). The inventors appreciated that some vehicle defects may be difficult to detect and may go unnoticed by a vehicle inspector in the course of a vehicle inspection. This can lead to various undesirable outcomes including potential liability for an entity conducting a sale of a given vehicle without an accurate disclosure of defects which may be found in the given vehicle. The ML models developed by the inventors can be used to identify errors in the inspection results and, in particular, identify defects that may have been missed by an inspector. Any discrepancies so identified can then be further reviewed to make sure that the vehicle inspection results are accurate. Resolving the discrepancies may mean adding further information to the vehicle inspection results, reviewing data collected during the inspection, and/or conducting further inspection of the vehicle. Such techniques are described herein including in Section III titled "ML Techniques for Identifying Errors in Vehicle Inspection Results."

Third, the inventors have recognized that numerous types of vehicle defects may be detected by analyzing images of a vehicle. To this end, the inventors have developed new ML techniques to identify the presence of various types of defects (e.g., presence of so-called "structural" rust, absence of a catalytic converter, presence of oil leaks, etc.) from images of vehicle undercarriages. In addition, the inventors have developed ML techniques for ensuring that the quality of vehicle undercarriage images is sufficient for performing the ML techniques developed by the inventors to identify various types of defects. Such image processing techniques are described herein including in Section IV titled "ML Techniques for Identifying Vehicle Defects from Images of Vehicle Undercarriages."

The various technologies developed by the inventors work in concert to enable efficient, distributed, and accurate inspection of vehicles. Indeed, the technologies described herein may be used to facilitate the inspection of thousands, tens of thousands, hundreds of thousands, or even millions of vehicles, and with a sensitivity to potential defects that are difficult to discern even for experienced inspectors. Additionally, the technologies described herein may be used to prevent mistakes and/or to detect mistakes that have occurred.

The techniques described herein may be implemented in any of numerous ways, as the techniques are not limited to any particular manner of implementation. Examples of details of implementation are provide herein solely for illustrative purposes. Furthermore, the techniques disclosed herein may be used individually or in any suitable combination, as aspects of the technology described herein are not limited to the use of any particular technique or combination of techniques.

FIG. 1 illustrates an example of vehicle diagnostic system 100, in accordance with some embodiments of the technology described herein. Vehicle diagnostic system 100 may be used to collect information about one or more vehicles and analyze the collected information to determine whether any one of the vehicles has or is likely to have one or more potential defects.

The collected information may be collected by an inspector in connection with a vehicle inspection, such as vehicle inspection 106. During a vehicle inspection, such as vehicle inspection 106, an inspector 130 (e.g., an trained vehicle inspector, a mechanic, a buyer, a seller, or any other party using vehicle diagnostic system 100) may use one or more mobile devices to transmit information about vehicle 102 through network 126 to a remote computer 128 and/or server(s) 129 where the vehicle information may be stored and/or processed by trained machine learning models. In some embodiments, the vehicle information includes data gathered at least in part during inspection of the vehicle. For example, the vehicle information may include audio recordings acquired by recording sounds of various vehicle components while the vehicle is in operation. As another example, the vehicle information may include a photo and/or video acquired during the vehicle inspection of the interior and/or exterior of the vehicle. As yet another example, the vehicle information may include on-board diagnostic data, such as on-board diagnostics II (OBDII) codes and/or a live data stream from the on-board diagnostic system of the vehicle. The vehicle diagnostic system 100 may collect and store the vehicle information gathered during a vehicle inspection using one or more mobile devices and may analyze the data collected about any of the vehicles for which data is available (e.g., received from an inspector or stored on a server associated with the vehicle diagnostic system) using one or more trained machine learning models.

The mobile device may be used by inspectors, prior to a vehicle inspection, to identify potential vehicle defects that may be present in the vehicle during the vehicle inspection, in accordance with some embodiments of the technology described herein. The mobile device may provide the inspector with a notification that a potential vehicle defect may be present, the presence of the potential vehicle defect being determined using one or more trained machine learning models. For example, prior to beginning vehicle inspection 106, inspector 130 may obtain identifying information (e.g., a vehicle identifier and/or the make, model, and year of the vehicle) about vehicle 103 and may provide the identifying information through mobile device 104, and network 126, to a remote computer 128 and/or server(s) 129 for storage and/or processing using trained machine learning models. The results of the processing, by the one or more trained machine learning models, may identify the likelihood of a potential vehicle defect being present in the vehicle. Accordingly, inspector 103 may be notified, through mobile device 104 that receives processed results through network 126, of the potential vehicle defect. Additionally, or alternatively, the mobile device may provide the inspector with directions to perform specific tests and/or perform specific tests under particular conditions as to determine whether the potential vehicle defect is present in the vehicle. Aspects of the systems and methods used to identify potential vehicle defects that may be present in the vehicle during the vehicle inspection are described further below, including in FIGS. 2-4.

The mobile device may be used by inspectors, subsequent to a vehicle inspection, to identify discrepancies between the inspection report and the vehicle data gathered during the inspection of the vehicle, in accordance with some embodiments of the technology described herein. For example, inspector 130 may conduct a vehicle inspection on vehicle 102, the vehicle inspection including gathering vehicle data (e.g., an audio recording, an image, a video, an OBDII code and/or data stream, etc.). The vehicle data may be acquired using mobile device 104 or may be input to mobile device 104 by the inspector. During the vehicle inspection, the inspector may identify a first list of vehicle defects which the inspector inputs to a vehicle condition report using mobile device 104. The vehicle condition report, including vehicle data, may be sent to remote computer 128 and/or server(s) 129 to be analyzed using trained machine learning models. The one or more trained machine learning models may generate a second set of vehicle defects that are indicated as present in the vehicle based on analysis of the vehicle data by the machine learning models. Furthermore, vehicle diagnostic system 100 may identify a discrepancy between the first set of vehicle defects identified in the results of the vehicle inspection and the second set of vehicle defects identified by the machine learning models. In some embodiments, following an identification of discrepancies between the first and the second list of defects, vehicle diagnostic system 100 may provide a reviewer 132 (e.g., an inspector, a mechanic, an engineer, a reviewer familiar with the outputs of the machine learning models and how to interpret them, etc.) with the identified discrepancies and the vehicle data. In response to input from the reviewer 132, through remote computer 128, the vehicle condition report may be updated to resolve the discrepancy. For example, if the second set of vehicle defects includes vehicle defects which were not included in the first set of vehicle defects, included with the vehicle condition report, then the reviewer may update the vehicle condition report to include the defects missing from the vehicle condition report. In some embodiments, the reviewer 132 may send a request to inspector 130 to gather more vehicle data. Aspects of the systems and methods used to identify the discrepancies are described further below, including in FIGS. 5-6B.

In the illustrated example of FIG. 1, vehicle diagnostic system 100 may include any suitable number of mobile devices for collecting data about any suitable number of vehicles as aspects of the technology described herein are not limited by the number of devices that are part of the vehicle diagnostic system or the number of vehicles that such devices may be used to examine. As shown in the example of FIG. 1, vehicle diagnostic system 100 includes a first mobile device 104 for conducting a first vehicle examination 106 on a vehicle 102 by an inspector 130, a second mobile device 108 for conducting a second vehicle examination 114 on vehicle 110 by inspector 134, and an $n^{th}$ mobile device 120 for conducting an $n^{th}$ vehicle examination 122 on an $n^{th}$ vehicle 118 by an $n^{th}$ inspector 136, where n is any suitable integer greater than or equal to three. Although the illustrated vehicle diagnostic system 100 has at least three mobile devices, in some cases, a vehicle diagnostic system may have one or two mobile devices, as aspects of the technology described herein are not limited in this respect.

Vehicle diagnostic system 100 may include a mobile vehicle diagnostic device (MVDD), containing one or more types of sensors, for gathering vehicle data during a vehicle inspection, in accordance with some embodiments of the technology described herein. An example of an MVDD is described in US Patent Publication number US2023/0204461A1, entitled "Multi-Sensor Devices and Systems for Evaluating Vehicle Conditions," filed Dec. 22, 2022, the entire contents of which are incorporated by reference herein. The MVDD may be positioned, by an inspector in accordance with a vehicle inspection, near or inside a vehicle to collect data about the vehicle which may be transmitted to one or more computing devices (e.g., a mobile device, one or more servers in a cloud computing environment) for subsequent analysis using machine learning techniques, as described herein.

For example, the vehicle diagnostic system 100 may use an MVDD to collect, for a particular vehicle, audio signals, vibration signals, and/or metadata containing one or more properties of the particular vehicle and analyze some or all of these data (e.g., audio signals alone, vibration signals alone, metadata alone, any combination of two of these types of data, all three of these types of data) to detect presence or absence of one or more defects in the particular vehicle (e.g., by detecting the presence or absence of engine noise, transmission noise, start-up engine rattle, and/or any other type of defect the presence of which may be reflected in the gathered data). The MVDD may be used to collect one or more other types of data (examples of which are provided herein) in addition to or instead of the above described three example data types (e.g., audio, vibration, metadata), as aspects of the technology described herein are not limited in this respect. Data collected by MVDDs 112, about vehicles 110 may be transmitted, via network 126 for example, to server(s) 129 for subsequent analysis using one or more trained machine learning models stored at server(s) 129. The results of the analysis may be provided to one or more recipients, for example, inspectors 130, 134, and 136 and/or reviewer 132.

Mobile devices 104, 108, and 120 may include a camera which may be used to acquire a photo and/or a video of portions of a vehicle. In some embodiments, vehicle diagnostic system 100 may further include virtual lift hardware and/or other hardware for acquiring images of an undercarriage portion of the vehicle. In some embodiments, a separate camera device may be used to acquire a photo and/or a video of portions of the vehicle. The acquired photos and/or videos may be sent, through one of mobile devices 104, 106, or 120 to remote computing device 128 and/or server(s) 129 through network 126.

Prior to a vehicle inspection, a vehicle inspector may gather information about the vehicle that they may provide to a vehicle diagnostic system, such as vehicle diagnostic system 100 described above, for processing—to aid the inspector to inspect the vehicle. Vehicle diagnostic system 100 may use a set of trained ML models to estimate the likelihood of a potential vehicle defect being present.

II. ML Techniques for Facilitating Performance of a Vehicle Inspection

The inventors have recognized that the accuracy of a vehicle inspection (e.g., the likelihood that a vehicle inspection will detect all the vehicle defects which are present in a vehicle) may be improved by determining which vehicle defects are likely to be present in a given vehicle prior to completion (e.g., prior to the start of or during) an inspection. Some defects may be difficult to detect without the use of special equipment and/or specially trained ML models which may detect the presence of defects beyond the observational ability of a vehicle inspector. For example, a vehicle defect which may induce a particular sound during operation of the vehicle may be unrecognizable or imperceptible to the human ear. Additionally, some defects may only be detectable under particular circumstances. For example, a vehicle defect may only be observable following a cold start of the engine. Therefore, having knowledge about potential vehicle defects which are likely to be present in a vehicle prior to initiating a test for said potential defect, or a broader test of the vehicle in general, may improve the likelihood of detecting the potential defect.

The inventors recognized that a number of factors may provide an indication as to whether a vehicle defect is present in a vehicle and have developed machine learning models that make use of information relating to these factors to predict whether one or more defects are likely to be present in a vehicle. For example, the inventors appreciated that the probability of detecting a particular vehicle defect for a particular vehicle overtime may depend on the age of the vehicle. The probability of detecting a particular defect may resemble a bathtub shaped probability distribution. The probability of detecting a particular defect may resemble a curve reflecting an increasing rate of failure over time. For example, the probability of detecting a particular vehicle defect for a particular vehicle overtime may include a high probability of the defect being present at a time early after manufacture of the vehicle, a high probability of the defect being present at a time late in the vehicles lifecycle (e.g., when the vehicle has high mileage), and a low probability of the defect being present during a time period after manufacture of the vehicle but before the vehicle is close to the end of its lifecycle. Additional factors such as the climate where the vehicle is operated, the geographic region where the vehicle is operated, and details associated with the particular make and model of the vehicle may impact the likelihood of that vehicle having a vehicle defect.

Therefore, the inventors have developed new machine learning techniques to assist an inspector to inspect a vehicle. The machine learning techniques may be used to analyze data about the vehicle (e.g., its make, model, and age) of the vehicle prior to completion of a vehicle inspection (e.g., before start of the vehicle inspection or while the inspection is ongoing but before it is completed) to provide the inspector with information about potential defects present in the vehicle. Based on the information about potential vehicle defects, the inspector may, in turn, conduct specific tests to determine whether the potential vehicle defects are present in the vehicle and/or the inspector may be provided, via the mobile device, with information on how to diagnose whether the potential vehicle defect is present based on a vehicle test. Notably, the machine learning models used to provide the inspector with actionable information to make use of during the inspection may do so without using sensor data collected during the inspection (e.g., without using audio, image, or video data collected by the inspector during the inspection).

Accordingly, some embodiments provide for a computer-implemented method for using one or more trained ML models for assisting an inspector to inspect a vehicle by providing the inspector with information about potential vehicle defects via a device (e.g., a mobile device, such as a mobile smartphone, laptop, tablet, etc.) used by the inspector, the method comprising, prior to completion of the inspector's inspection of the vehicle: (A) obtaining first information (e.g., a unique vehicle identifier such as a vehicle identification number (VIN)), an odometer gauge reading from the vehicle) about the vehicle, the first information about the vehicle comprising a vehicle identifier; obtaining second information (e.g., the make of the vehicle, model of the vehicle, age of the vehicle, historic data about the vehicle, etc.) about the vehicle using the vehicle identifier; identifying one or more potential vehicle defects by using one or more trained ML defect detection models, the trained ML defect detection models being trained to detect vehicle defects of different types (e.g., engine defects, transmission defects, exhaust defects, mechanical defects, exterior defects, etc.) and including a first trained ML model trained to detect vehicle defects of a first type, the identifying comprising: generating a first set of features (e.g., fields of data) using the first information about the vehicle and/or the second information about the vehicle; processing the first set of features using the first trained ML model to obtain a first likelihood that the vehicle has a defect of the first type; and identifying, based on the first likelihood, the defect of the first type as a first potential vehicle defect for the vehicle (e.g., when the first likelihood exceeds a given threshold, identifying the defect of the first type as a potential defect); and notifying the inspector of the identified one or more potential vehicle defects, the notifying comprising notifying the inspector of the first potential vehicle defect (e.g., providing the inspector with information indicating the first potential vehicle defect and the first likelihood that the vehicle has the defect of the first type and/or providing the inspector with instructions indicative of one or more actions for the inspector to take to confirm whether the first potential vehicle defect is present in the vehicle).

In some embodiments, the first potential vehicle defect of the first type is an engine defect, an exhaust smoke defect, a transmission defect, a drivetrain defect, a frame rot defect, a frame damage defect, a vehicle title defect, a vehicle modification defect, a drivability defect, and/or a hail damage defect.

In some embodiments, notifying the inspector of the identified one or more potential vehicle defects includes: providing the inspector with information indicating: (1) a plurality of potential vehicle defects, including the first potential vehicle defect; and (2) a ranking of the plurality of potential vehicle defects, the ranking of potential vehicle defects being based on respective likelihoods of the vehicle defects being present in the vehicle.

In some embodiments, the second information about the vehicle further comprises information selected from the group consisting of: a year of manufacture of the vehicle, a make and model of the vehicle, an age of the vehicle at time of inspection, an engine displacement volume of the vehicle, a longitude coordinate of an inspection location, a latitude coordinate of the inspection location, a Koppen climate code associated with the inspection location, a drive train type of the vehicle, a fuel type of the vehicle, engine description keywords, a US state code associated with the inspection location, a Carfax® alert associated with the vehicle, and a National Highway Traffic Safety Administration (NHTSA) recall profile associated with the vehicle.

In some embodiments, the first trained ML model is trained to detect an engine noise defect by processing the first set of features to obtain the first likelihood that the vehicle has the engine noise defect.

In some embodiments, the first set of features comprises: an odometer reading of the vehicle, a year of manufacture of the vehicle, an age of vehicle at inspection, an engine displacement volume of the vehicle, a longitude coordinate of an inspection location, a latitude coordinate of the inspection location, a Koppen climate code associated with the inspection location, a drive train type of the vehicle, a fuel type of the vehicle, a make and model of the vehicle, engine description keywords, and a Carfax® alert associated with the vehicle.

In some embodiments, the model may further include a second trained ML model trained to detect vehicle defects of a second type different from the first type, wherein the identifying comprises: generating a second set of features using the first information about the vehicle and/or the second information about the vehicle (e.g., the first set of features may be the same or may be different from the second set of features and may include at least one feature obtained from the first information and at least one feature obtained from the second information); processing the second set of features using the second trained ML model to obtain a second likelihood that the vehicle has a defect of the second type; and identifying, based on the second likelihood, the defect of the second type as a second potential vehicle defect, and wherein the notifying comprises: notifying the inspector of the second potential vehicle defect.

In some embodiments, the second trained ML model is trained to detect a transmission defect by processing the second set of features to obtain the second likelihood that the vehicle has the transmission defect.

In some embodiments, the second set of features comprises: an odometer reading of the vehicle, a year of manufacture of the vehicle, an age of vehicle at inspection, an engine displacement volume of the vehicle, a drive train type of the vehicle, a fuel type of the vehicle, a make and model of the vehicle, engine description keywords, a Carfax® alert associated with the vehicle, and a National Highway Traffic Safety Administration (NHTSA) recall profile associated with the vehicle.

In some embodiments, the first trained ML model is a trained random forest model having between 0.5 million and 17 million parameters.

Figure 2:
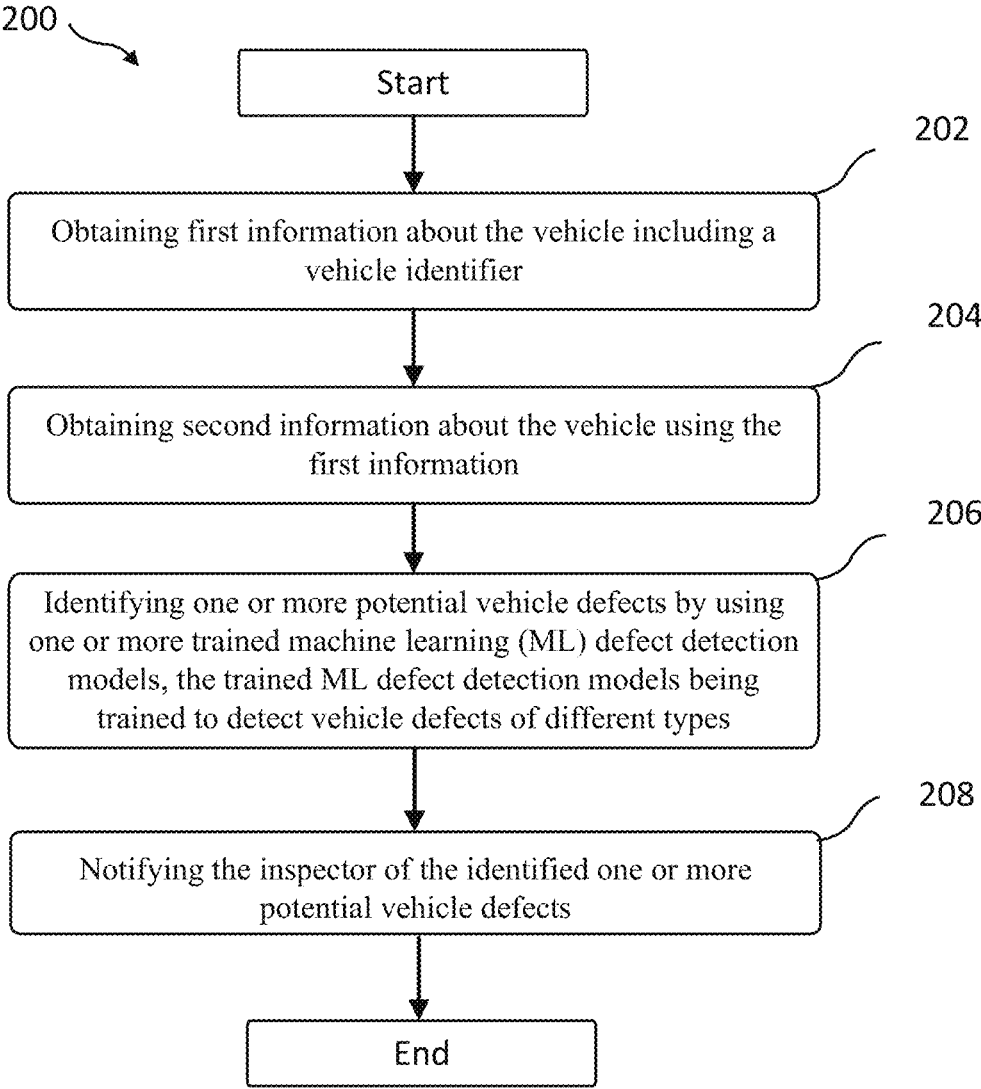
FIG. 2 is a flowchart of an illustrative process for using one or more trained machine learning models for assisting an inspector to inspect a vehicle by providing the inspector with information about potential vehicle defects via a mobile device used by the inspector, in accordance with some embodiments of the technology described herein.

FIG. 2 is a flowchart of an illustrative process 200 for using one or more trained machine learning models for assisting an inspector to inspect a vehicle by providing the inspector with information about potential vehicle defects via a mobile device used by the inspector, in accordance with some embodiments of the technology described herein. Process 200 may be executed by any suitable computing device(s). For example, process 200 may be executed by a mobile device (e.g., mobile device 104), a server or servers associated with (e.g., communicatively coupled to) the vehicle diagnostic system (e.g., server(s) 129), or any other suitable computing device(s) including any of the devices described herein, including with reference to FIG. 1.

Process 200 starts at act 202 by obtaining first information about the vehicle including a vehicle identifier, in accordance with some embodiments of the technology described herein. For example, the first information obtained may be a vehicle identification number (VIN) unique to the vehicle. The VIN may be obtained by a vehicle inspector. In some embodiments, first vehicle information may include a vehicle identifier and an odometer reading.

In some embodiments, the first information about the vehicle may be input by the inspector who identifies the first information from the vehicle and inputs the first information through a mobile device into vehicle diagnostic system 100. For example, the inspector may input a VIN and an odometer reading to a mobile device, such as mobile device 104, 108, and 120 described above in FIG. 1. In some embodiments, the first information about the vehicle may be extracted from images taken by the inspector. For example, the inspector may capture a photo of the VIN and the odometer gauge using a mobile device, such as mobile device 104, 108, or 120. The VIN and the odometer reading may then be extracted from the photo of the VIN and the photo of the odometer by the vehicle diagnostic system.

In some embodiments, the first information further includes a latitude and longitude indicative of the location where the vehicle is located at the time of the vehicle inspection. For example, the latitude and longitude may be acquired by the mobile device through a global positioning system (GPS) signal. The latitude and longitude may be associated with the VIN for purposes of storing the first information of the vehicle for a vehicle condition report.

In some embodiments, the first vehicle information is collected by an inspector prior to gathering other vehicle data in connection with the vehicle inspection. In some embodiments, the first vehicle information is collected during the gathering of the vehicle data during a vehicle inspection. In some embodiments, the first vehicle information is collected after gathering the vehicle data for the vehicle inspection.

In some embodiments, keywords describing aspects of the vehicle may be selected by the inspector to be included in the first vehicle information. For example, the inspector may select keywords associated with the condition of the engine during the vehicle inspection (e.g., cold start) that may be included with the first vehicle information.

Next, process 200 proceeds to act 204 where second information about the vehicle is obtained using the first vehicle information. Process 200 may use the first vehicle information to look up additional vehicle information, drivetrain information, inspection location information, and/or historical information.

In some embodiments, the first vehicle information is used to look up additional vehicle information—including the make, model, year of manufacture, and age at inspection of the vehicle. For example, the VIN may be used to look up the make, model, year of manufacture, age at inspection of the vehicle, and a list of vehicle component parts or specifications used by the manufacture.

In some embodiments, the vehicle identifier is used to look up drivetrain information—including the engine displacement, fuel type, and drivetrain of the vehicle. For example, the VIN may be used to look up the engine displacement, fuel type, and drivetrain associated with the make and model of the vehicle.

In some embodiments, the first vehicle information is used to look up inspection location information—including a Koppen climate code associated with the climate at the location of vehicle inspection, and a state code associated with the location of vehicle inspection. For example, the latitude and longitude may be used to look up the Koppen climate code associated with the climate at the location of vehicle inspection, and a state code associated with the location of vehicle inspection.

In some embodiments, the first vehicle information is used to look up historical information—including Carfax® alerts and US National Highway Traffic Safety Administration (NHTSA) recall profiles associated with the make and model of the vehicle. For example, the VIN may be used to look up Carfax® alerts and NHTSA recall profiles associated with the vehicle.

In some embodiments, a Carfax alert is specific to the vehicle associated with the vehicle inspection. For example, the Carfax alert may be used to identify if the vehicle has been involved in an accident, a salvage incident, and/or a previous vehicle auction. In some embodiments, the Carfax alert is specific to the make and model of a vehicle.

Additionally, or alternatively, other reports may be included with the historical information. In some embodiments, vehicle service records may be obtained with the vehicle historical information. In some embodiments, police reports associated with the vehicle may be obtained with the vehicle historical information.

A profile of NHTSA recalls is created for each make, model, and year in the historical records of the vehicle diagnostic system, in accordance with some embodiments of the technology described herein. In some embodiments, the NHTSA recall profile may be specific to each car (e.g., associated with a VIN number). In some embodiments, to adjust for common vehicles that have higher number of recalls but may have lower rates of recall relative to less common vehicles, the NHTSA profiles were created by counting the presence of non-stop word keywords mentioned in the NHTSA recall records and dividing the keyword counts by the number of vehicles of matching make, model, and year stored in the historical records of the vehicle diagnostic system.

Process 200 proceeds to act 206 where one or more potential vehicle defects is identified using one or more trained ML defect detection models, the trained ML defect detection models being trained to detect vehicle defects of different types. In some embodiments, the one or more trained ML defect detection models include a first trained ML model trained to detect vehicle defects of a first type of vehicle defect. In some embodiments, the first type of vehicle defect is an engine defect, an exhaust smoke defect, a transmission defect, a drivetrain defect, a frame rot defect, a frame damage defect, a vehicle title defect, a vehicle modification defect, a drivability defect, and/or a hail damage defect.

The one or more trained machine learning defect detection models identifies one or more potential vehicle defects by generating a first set of features using the first information about the vehicle and/or the second information about the vehicle. The first set of features is processed using the first trained machine learning model to obtain a first likelihood that the vehicle has a defect of the first type. The defect of the first type is identified as a first potential vehicle defect based on the first likelihood.

In some embodiments, generating the first set of features using the first and/or second information about the vehicle includes generating the first set of features using a subset of the first and/or second information about the vehicle. For example, the subset of features may be all of the features from the first information and all of the features from the second information. As another example, the subset of features may be all the features from the first information and none of the features from the second information. As yet another example, the subset of features may be all the features from the second information and none of the features from the first information. As yet another example, the subset of features may include a subset of features from the first information and a subset of information from the second information.

In some embodiments, the likelihood that the vehicle has a defect of the first type is a likelihood that the vehicle has a defect associated with one or more vehicle systems. For example, the defect associated with one or more vehicle systems may be an engine noise defect, exhaust smoke defect, transmission defect, drivetrain defect, exhaust defect, and/or another engine defect.

In some embodiments, the likelihood that the vehicle has a defect of the first type is a likelihood that the vehicle has a structural defect. A structural defect may be a defect that impacts a portion of the vehicle of the chassis or a portion of the car that secures other vehicle systems in place, such as the portion of the chassis to which the engine is attached. For example, the structural defect may be a frame rot defect and/or a frame damage defect.

In some embodiments, the likelihood that the vehicle has a defect of the first type is a likelihood that the vehicle has a vehicle modification. Vehicle modifications may involve removing a factory installed component or a manufacture's component and replacing the removed component with an aftermarket third-party component. For example, the vehicle modification may be an engine modification and/or a wheel modification. An engine modification may include the installation of a supercharger, aftermarket air filters, cold air intake kits, or lightweight aftermarket components. Wheel modifications may include installation of non-stock wheel and/or rim sizes.

In some embodiments, the likelihood that the vehicle has a defect of the first type is a likelihood that the vehicle has another defect. For example, the other defect may be a drivability defect, a title issue of the vehicle, or hail damage of the vehicle.

Figure 3A:
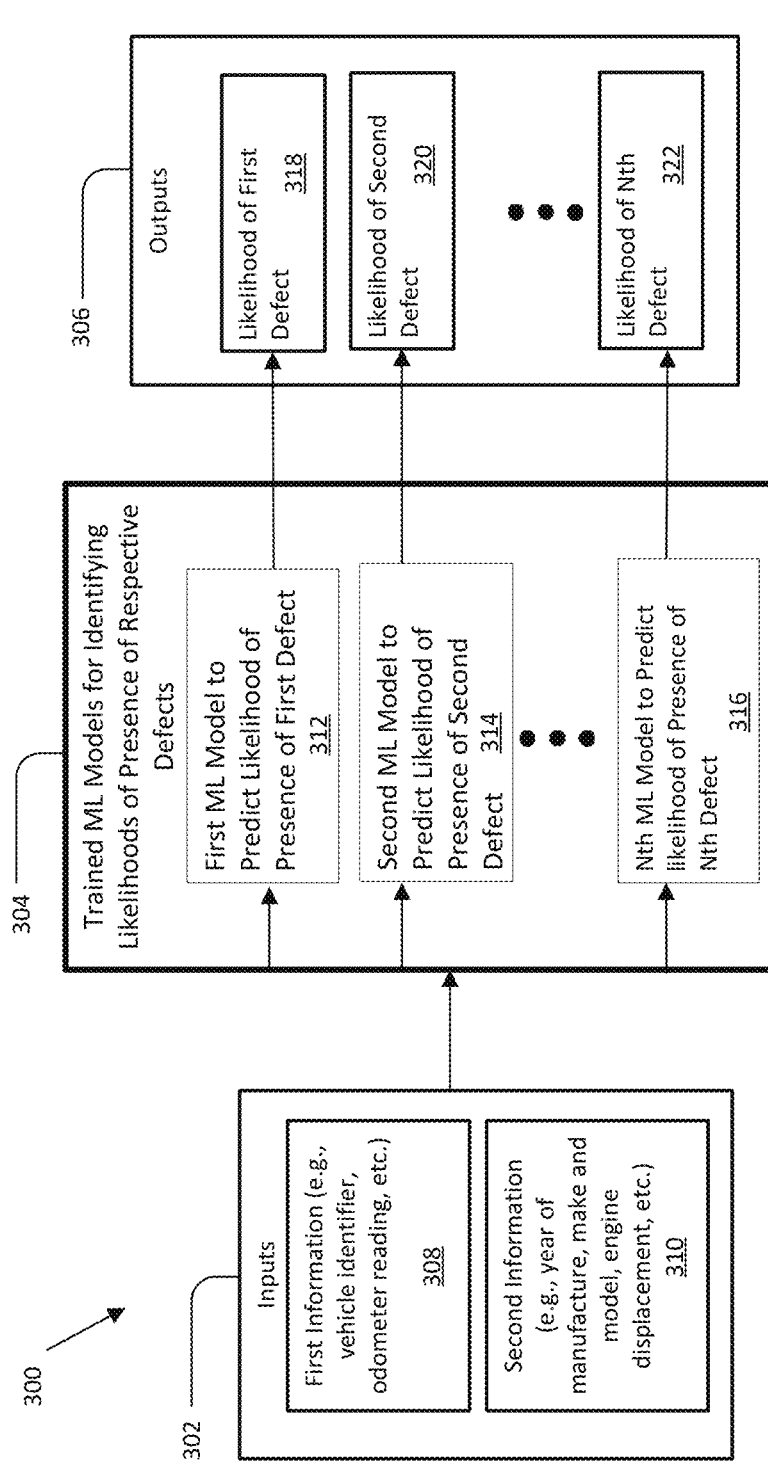
FIG. 3A illustrates a set of trained machine learning models for assisting an inspector to inspect a vehicle by providing the inspector with information about potential vehicle defects via a mobile device used by the inspector, in accordance with some embodiments of the technology described herein.
Figure 3B:
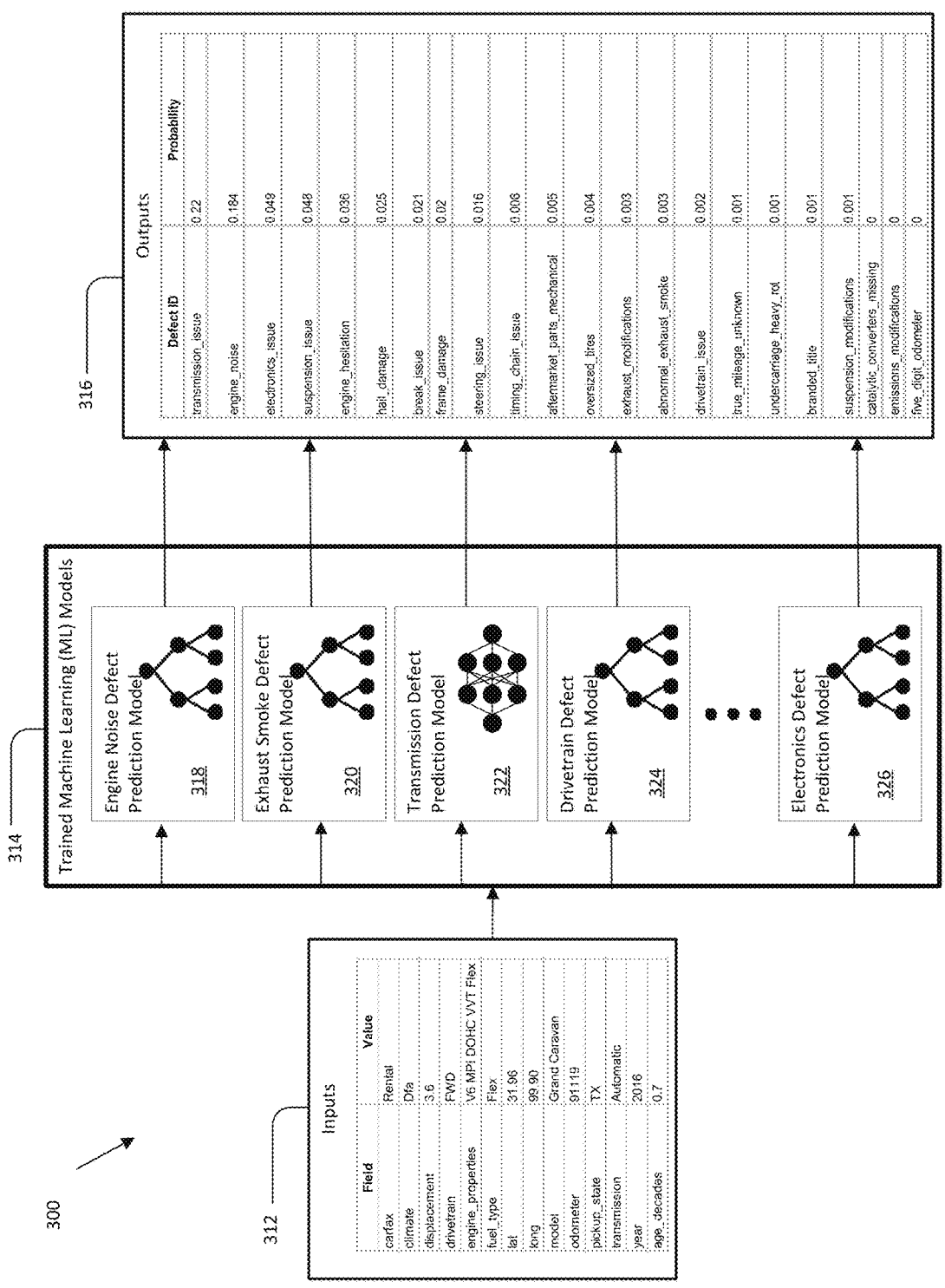
FIG. 3B illustrates an example of an embodiment of a set of trained machine learning models for assisting an inspector to inspect a vehicle by providing the inspector with information about potential vehicle defects via a mobile device used by the inspector, in accordance with some embodiments of the technology described herein.
Figure 4:
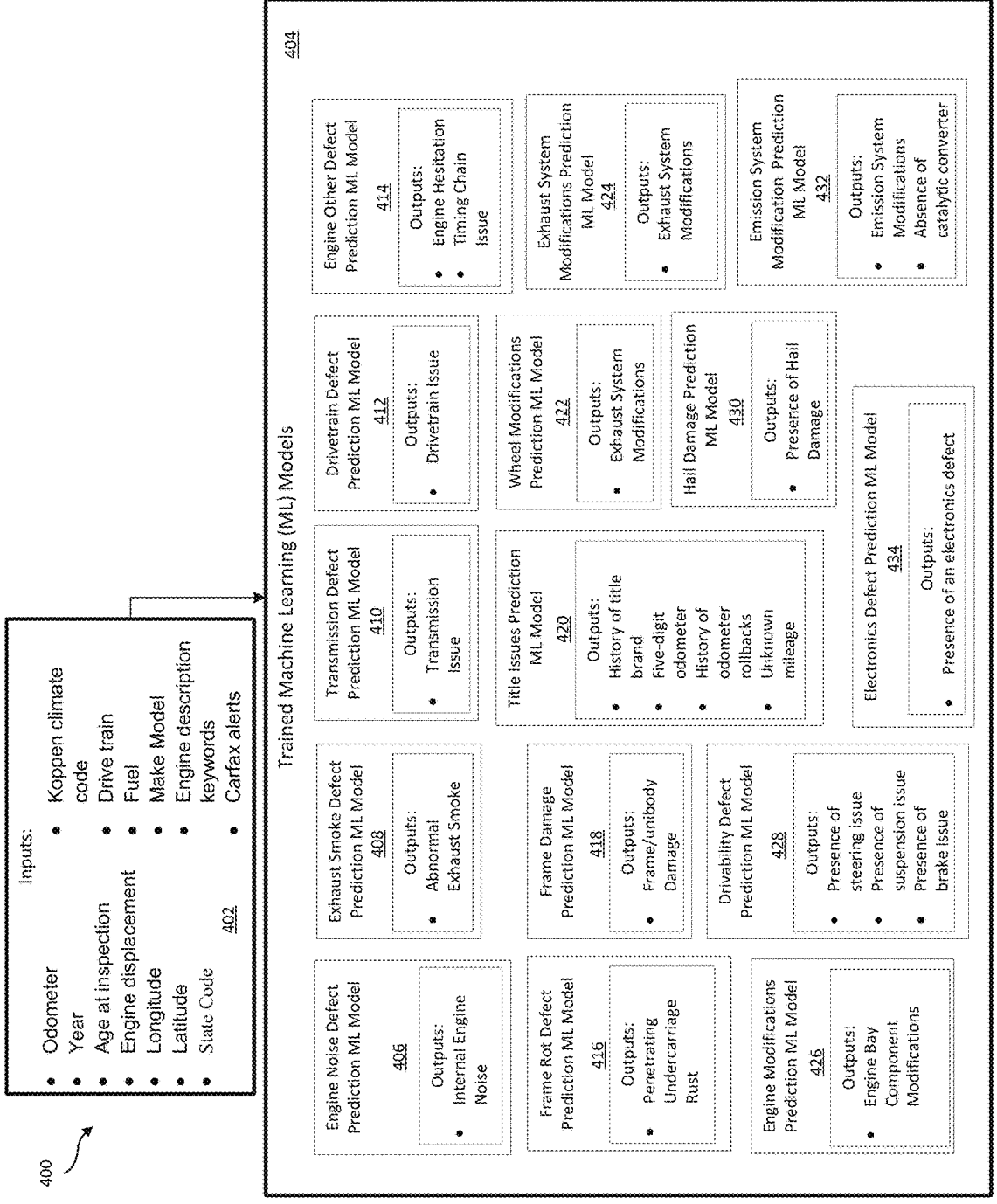
FIG. 4 illustrates a set of trained machine learning models as an example of the set of trained machine learning models described in connection with FIG. 3B, and in accordance with some embodiments of the technology described herein.

In some embodiments, processing the first set of features using the first trained ML model to obtain a first likelihood that the vehicle has a defect of the first type includes using a first trained ML model such as the trained ML models described herein including in connection with FIG. 3A-4.

In some embodiments, identifying, based on the first likelihood, the defect of the first type as a first potential vehicle defect for the vehicle includes comparing the first likelihood to a threshold likelihood. For example, the defect of the first type may be determined to be a potential vehicle defect when the likelihood that the defect of the first type being present in the vehicle is greater than or equal to 50%, greater than or equal to 60%, greater than or equal to 70%, greater than or equal to 80%, or greater than or equal to 90%.

Process 200 proceeds to act 208 where the inspector is notified of the identified one or more potential vehicle defects. In some embodiments, notifying the inspector of the identified one or more potential vehicle defects includes providing the inspector with information indicating the first potential vehicle defect and the first likelihood that the vehicle has the defect of the first type. In some embodiments, notifying the inspector of the identified one or more potential vehicle defects includes providing the inspector with instructions indicative of one or more actions for the inspector to take to confirm whether the first potential vehicle defect is present in the vehicle.

Following the conclusion of process 200, the inspector may proceed to conduct a vehicle inspection. Accordingly, in some embodiments, the inspector may use the likelihood that the potential vehicle defect is present and/or targeted professional inspection instructions to determine particular techniques to use during the vehicle inspection to check for the potential vehicle defects. Additionally, or alternatively, the targeted professional inspection instructions may alert the inspector of features indicative of the potential vehicle defects.

Additionally, or alternatively, the inspector may be a potential buyer who may use the output (e.g., the likelihood of potential vehicle defects and/or targeted professional inspection instructions) to make more informed pricing offers or to check for themselves the presence of a potential vehicle defect. Additionally, or alternatively, the inspector may be a potential seller who may use the output to anticipate potential customer complaints. Additionally, or alternatively, the inspector may be the vehicle owner who may use the output to anticipate component failures and repairs.

FIG. 3A illustrates a set of trained machine learning models 300 for assisting an inspector to inspect a vehicle by providing the inspector with information about potential vehicle defects via a mobile device used by the inspector, in accordance with some embodiments of the technology described herein. As shown in FIG. 3A, the set of trained machine learning models 300 obtains inputs 302. The one or more trained machine learning models for identifying likelihoods of presence of respective defects 304 receive the obtained inputs 302.

In some embodiments, inputs 302 comprise first information 308 and second information 310. For example, first information may include a vehicle identifier and an odometer reading. Furthermore, second information may include a year of manufacture of the vehicle, make and model of the vehicle, and engine displacement volume of the vehicle. In some embodiments, the second information is obtained by looking up the secondary information associated with the vehicle identifier. In some embodiments, first information 308 and second information 310 may be the first information and second information described in connection with FIG. 2 above.

Trained machine learning models 304 include a plurality of trained machine learning models, in accordance with some embodiments described herein. As shown in FIG. 3A, the plurality of trained machine learning models includes first machine learning model to predict likelihood of presence of first defect 312, second machine learning model to predict likelihood of presence of second defect 314, and n$^{th}$ machine learning model to predict likelihood of presence of an n$^{th}$ defect 316. Each trained machine learning models 312, 314, and 316 are configured to determine the likelihood of a respective vehicle defect by analyzing a set of features from inputs 102.

Models 312, 314, and 316 may each receive a respective subset of features from the set of input features including first information 308 and second information 310. In some embodiments, each respective subset of features received by each model may be the same subset. In some embodiments, the subset of features for each respective model may be particular to the given model. In some embodiments, the subsets of features may be any subset of features, as described herein.

Models 312, 314, and 316 produce respective outputs corresponding to the likelihood of each vehicle defect being present in the vehicle. As shown in FIG. 3A, first machine learning model 312 determines a likelihood of a first vehicle defect 318, second machine learning model 314 determines a likelihood of a second vehicle defect 320, and n$^{th}$ machine learning model 316 determines a likelihood of an n$^{th}$ vehicle defect 322. The respective output 306, including likelihood of a first vehicle defect 318, likelihood of a second vehicle defect 320, and likelihood of an n$^{th}$ vehicle defect 322.

In some embodiments, n$^{th}$ machine learning model to predict likelihood of presence of an n$^{th}$ defect 316 is a third trained machine learning model. In some embodiments, the n$^{th}$ machine learning model to predict likelihood of presence of an n$^{th}$ defect 316 is a fifth trained machine learning model. In some embodiments, the n$^{th}$ machine learning model to predict likelihood of presence of an n$^{th}$ defect 316 is a tenth trained machine learning model. In some embodiments, the n$^{th}$ machine learning model to predict likelihood of presence of an n$^{th}$ defect 316 is a thirteenth trained machine learning model. In some embodiments, trained machine learning models 304 may include more than thirteen trained machine learning models, as aspects of the technology described herein are not limited in this respect.

FIG. 3B illustrates an example of an embodiment of a set of trained machine learning models 300 for assisting an inspector to inspect a vehicle by providing the inspector with information about potential vehicle defects via a mobile device used by the inspector, in accordance with some embodiments of the technology described herein. The set of features 312 includes first information and second information, as described herein. Trained machine learning models 314, include a plurality of trained machine learning models, and processes the set of features 312 as inputs to generate a set of outputs 316 corresponding to the respective output of each model, of the plurality of trained machine learning models 314.

In the illustrated example of FIG. 3B, inputs 312 correspond to a 2016 Dodge Grand Caravan with 91,119 miles on the odometer gauge, the inputs 312 including the feature fields: Carfax® alerts, climate code associated with the climate designation at the vehicle inspection location, engine displacement volume of the vehicle, drivetrain type of the vehicle, engine properties of the vehicle engine, fuel type of the vehicle, latitude corresponding to the vehicle inspection location, longitude corresponding to the vehicle inspection location, model of the vehicle, odometer gauge reading, pickup state where the vehicle is currently located, vehicle transmission, year of vehicle manufacture, and age of the vehicle in decades. The features corresponding to the feature fields are shown in Table 1 below.

TABLE 1

| Field | Value |
|---|---|
| carfax | Rental |
| climate | Dfa |
| displacement | 3.6 |
| drivetrain | FWD |
| engine_properties | V6 MPI DOHC VVT Flex |
| fuel_type | Flex |
| lat | 31.96 |
| long | 99.90 |
| model | Grand Caravan |
| odometer | 91119 |
| pickup_state | TX |
| transmission | Automatic |
| year | 2016 |
| age_decades | 0.7 |

In some embodiments, the plurality of trained machine learning models 314 includes trained machine learning models 318, 320, 322, 324, and 326. Engine noise defect prediction model 318 may be configured to receive a first subset of inputs 312 and to output a likelihood that the vehicle includes an engine defect. Exhaust smoke defect prediction model 320 may be configured to receive a second subset of inputs 312 and to output a likelihood that the vehicle includes an exhaust smoke defect. Transmission defect prediction model 322 may be configured to receive a third subset of inputs 312 and to output a likelihood that the vehicle includes a transmission defect. Drivetrain defect prediction model 324 may be configured to receive a fourth subset of inputs 312 and to output a likelihood that the vehicle includes a drivetrain defect. Electronics defect prediction model 326 may be configured to receive a fifth subset of inputs 312 and to output a likelihood that the vehicle includes an electronics defect. In some embodiments, additional machine learning models may be included, as described further below in connection with FIG. 4.

In some embodiments, the first, second, third, fourth, and fifth subsets of inputs (e.g., sets of features) may all include the same features from the first and or second information about the vehicle. In some embodiments, the first, second, third, fourth, and fifth subsets of inputs may each include distinct sets of features from the first and or second information about the vehicle. In some embodiments, the features included in the first, second, third, fourth, and fifth subsets may be determined during the training of the respective machine learning models and selected for use as a feature for each respective subset of inputs based on the optimization of the respective trained machine learning model.

In some embodiments, the plurality of trained machine learning models are random forest models. In some embodiments, the plurality of trained machine learning models may be neural network models. For example, in the illustrated embodiment of FIG. 3B, engine noise defect prediction model 318, exhaust smoke defect prediction model 320, drivetrain defect prediction model 324, and electronics defect prediction model 326 are trained random forest models. Trained transmission machine learning model 322 is a trained neural network model. In other embodiments, other suitable machine learning models and/or combinations of machine learning models may be used, as aspects of the technology described herein are not limited in this respect. In some embodiments, all of the one or more trained machine learning models may be random forest models.

A random forest model comprises multiple decision tree models. The multiple decision tree models are constructed and trained during the training of the random forest model. The output of the random forest model is based on outputs of the constituent decision tree models. For example, the random forest model may output the mode of the class labels (produced by the decision trees) for classification or the mean prediction for regression (produced by the decision trees). During training of the random forest, the decision trees are trained by bootstrapping the training data and introducing randomness to variable selection. As a result, each constituent tree may be trained using a different subset of data and may make decision based on different subsets of features provided as input to the random forest model, which improves its generalization performance. Aspects of random forest models are described in Breiman, L. Random Forests. Machine Learning 45, 5-32 (2001), which is incorporated by reference in its entirety herein.

The outputs 316 of the plurality of trained machine learning models 314 includes a likelihood produced by each respective trained machine learning model. An example of the outputs 316 are illustrated in table 2 below.

TABLE 2

| Defect ID | Probability |
|---|---|
| transmission_issue | 0.22 |
| engine_noise | 0.184 |
| electronics_issue | 0.049 |
| suspension_issue | 0.048 |
| engine_hesitation | 0.036 |
| hail_damage | 0.025 |
| break_issue | 0.021 |
| frame_damage | 0.02 |
| steering_issue | 0.016 |
| timing_chain_issue | 0.006 |
| aftermarket_parts_mechanical | 0.005 |
| oversized_tires | 0.004 |
| exhaust_modifications | 0.003 |
| abnormal_exhaust_smoke | 0.003 |
| drivetrain_issue | 0.002 |
| true_mileage_unknown | 0.001 |
| undercarriage_heavy_rot | 0.001 |
| branded_title | 0.001 |
| suspension_modifications | 0.001 |
| catalytic_converters_missing | 0 |
| emissions_modifications | 0 |
| five_digit_odometer | 0 |

In some embodiments, the list of vehicle defects is organized from highest probability to lowest probability, as shown in Table 2. In some embodiments, the list of vehicle defects may be organized differently. For example, the list of vehicle defects may be organized alphabetically or in order of approximate repair cost. In some embodiments, the list of vehicle defects may have other organizations, as aspects of the technology described herein is not limited in this respect.

FIG. 4 illustrates a set of trained machine learning models 400 as an example of the set of trained machine learning models described in connection with FIG. 3B, and in accordance with some embodiments of the technology described herein. The set of trained machine learning models 400 includes input 402 which is processed by the plurality of trained machine learning models 404. The plurality of trained machine learning models 404 includes trained machine learning models 406, 408, 410, 412, 414, 416, 418, 420, 422, 424, 426, 428, and 430. The plurality of trained machine learning models 404 determines likelihoods that respective defects are present in the vehicle. In some embodiments, the defects are binary determinations of whether serious-to-medium severity defects were indicated as present in historical vehicle condition reports. If a condition report subsequently was associated with a valid arbitration claim, for an undisclosed vehicle defect in a vehicle sale, the original incorrect inspector disclosures were overridden by the issues reported in the arbitration claim. Inter-vehicle condition report correlations were used to cluster disclosures and form disclosure groups. Some groups contained only one target defect or modification.

In some embodiments, the one or more trained machine learning models, of the plurality of trained machine learning models, are trained random forest classifiers. For example, the one or more trained machine learning models may be random forest classifiers which are trained using scikit-learn RandomForrestClassfier class. Each model used hyper-parameter combinations that maximized the average classification performance on the validation dataset for each determination of the defect or modification associated with the model.

In some embodiments, each trained random forest classifier has the following hyper-parameters and their ranges: Max_depth, 26-70; Min_samples_leaf, 1-118; Min_samples_split, 4-1419; and N_estimators, 64-256. In other embodiments, different hyper-parameters and/or ranges for the hyper-parameters may be used.

In some embodiments, to ensure that the outputs of each random forest model represented the likelihood of a defect being present in the vehicle, each output of all the models was calibrated against a 20% held-out subset of the training dataset (scikit-learn CalibratedClassifierCV class). Each calibrator was trained using 5-fold validation and predictions from calibrators of each fold were averaged to produce the final predicted likelihood of a defect being present. The choice of calibration method 'isotonic' or 'sigmoid' were identified via defect type group hyper-parameter optimization. The performance of predicted defect likelihoods was assessed via the sum of the following three metrics: the receiver operating characteristic area under the curve (RO-CAUC), average precision (AP), and negative Brier score. To evaluate defect type, the sum of average scores across multiple defect types for each model was used. This sum of mean scores was called the overall group score.

In some embodiments, the hyper-parameter optimization of each defect includes individually optimizing each machine learning model. In some embodiments, the ray.tune library may be used to implement a nevergrad.OnePlusOne algorithm for identifying hyper parameter combinations that maximized the overall validation set scores of each group. For example, each group was budgeted to explore 300 parameter combinations, using 32 parallel workers. To identify parameter combinations that were more likely to consistently produce high overall scores, each parameter combination was evaluated 3 times and the mean and standard deviations of the overall scores across the three evaluations were computed. The search algorithm was set up to find the parameter combination that produced the highest mean minus 2 standard deviations overall score. The training process searched a hyper-parameter space configured with the following hyper-parameters and corresponding ranges: N_estimators, 16-256; Max_Depth, 1-75; Min_samples_s- plit, 2-2024 (log sampling); Min_samples_leaf, 1-512 (log sampling); calibration method, 'isotonic' or 'sigmoid;' and US NHTSA recall profiles, True/False.

In some embodiments, the one or more trained machine learning models are implemented using a REST microservice. For example, the microservice code may be implemented using the Django framework hosted inside a Kubernetes cluster. Accordingly, the exposed microservice accepted the model inputs for a given vehicle and produced a list of likelihoods corresponding to potential vehicle defects.

In some embodiments, input 402 includes an odometer reading of the vehicle corresponding to the mileage at the time of inspection, a year of manufacture of the vehicle, a make and model of the vehicle, an age of the vehicle at time of inspection, an engine displacement volume of the vehicle, a longitude coordinate of an inspection location, a latitude coordinate of the inspection location, a State code associated with the inspection location, a Koppen climate code associated with the inspection location, a drivetrain type of the vehicle, a fuel type of the vehicle, engine description keywords, a US state code associated with the inspection location, a Carfax® alert associated with the vehicle, and a National Highway Traffic Safety Administration (NHTSA) recall profile associated with the vehicle.

In some embodiments, engine noise defect prediction machine learning model 406 is a random forest model with 15.8 million parameters. A set of features including the odometer gauge reading, year of manufacture, age at inspection, engine displacement volume, longitude of the inspection location, latitude of the inspection location, Koppen climate code associated with the climate at the inspection location, drivetrain of the vehicle, fuel type of the vehicle, make and model of the vehicle, engine description keywords, and Carfax® alerts is processed by the trained random forest model to determine a likelihood that the vehicle has an internal engine noise defect.

In some embodiments, exhaust smoke defect prediction machine learning model 408 is a random forest model with 2.8 million parameters. A set of features including the odometer reading, year of manufacture, age at inspection, engine displacement volume, longitude, latitude, Koppen climate code, US State code, drive train, fuel type, make and model, engine description keywords, and Carfax® alerts is processed by the trained random forest model to determine a likelihood that the vehicle has an exhaust smoke defect.

In some embodiments, transmission defect prediction machine learning model 410 is a random forest model with 6.9 million parameters. A set of features including the odometer reading, year of manufacture, age at inspection, engine displacement volume, drive train, fuel type, make and model, engine description keywords, Carfax® alerts, and NHTSA recall profiles is processed by the trained random forest model to determine a likelihood that the vehicle has a transmission defect.

In some embodiments, drivetrain defect prediction machine learning model 412 is a random forest model with 0.6 million parameters. A set of features including the odometer reading, year of manufacture, age at inspection, engine displacement volume, longitude, latitude, Koppen climate code, drive train, fuel type, engine description keywords, and Carfax® alerts is processed by the trained random forest model to determine a likelihood that the vehicle has a drivetrain defect.

In some embodiments, engine other defect prediction machine learning model 414 is a random forest model with 16.6 million parameters. A set of features including the odometer reading, year of manufacture, age at inspection, engine displacement volume, longitude, latitude, Koppen climate code, US State code, drive train, fuel type, make and model, engine description keywords, and Carfax® alerts is processed by the trained random forest model to determine respective likelihoods that the vehicle has an engine hesitation defect or a timing chain defect.

In some embodiments, frame rot defect prediction machine learning model 416 is a random forest model with 0.8 million parameters. A set of features including the odometer reading, year of manufacture, age at inspection, engine displacement volume, longitude, latitude, Koppen climate code, US State code, drive train, fuel type, engine description keywords, Carfax® alerts, and NHTSA recall profiles is processed by the trained random forest model to determine a likelihood that the vehicle has penetrating undercarriage rust.

In some embodiments, frame damage defect prediction machine learning model 418 is a random forest model with 15.5 million parameters. A set of features including the odometer reading, year of manufacture, age at inspection, engine displacement volume, longitude, latitude, Koppen climate code, US State code, drive train, fuel type, engine description keywords, and Carfax® alerts is processed by the trained random forest model to determine a likelihood that the vehicle has a frame damage defect.

In some embodiments, title issue prediction machine learning model 420 is a random forest model with 4.8 million parameters. A set of features including the year of manufacture, age at inspection, engine displacement volume, longitude, latitude, Koppen climate code, US State code, drive train, fuel type, make and model of the vehicle, engine description keywords, and Carfax® alerts is processed by the trained random forest model to determine respective likelihoods that the vehicle has a history of title brand, a five-digit odometer reading, a history of odometer rollbacks, or unknown mileage.

In some embodiments, wheel modification prediction machine learning model 422 is a random forest model with 1.6 million parameters. A set of features including the year of manufacture, engine displacement volume, longitude, latitude, Koppen climate code, drive train, fuel type, make and model, engine description keywords, and Carfax® alerts is processed by the trained random forest model to determine respective likelihoods that the vehicle has oversized tires or a suspension modification.

In some embodiments, exhaust system modification prediction machine learning model 424 is a random forest model with 4.5 million parameters. A set of features including the year of manufacture, engine displacement volume, longitude, latitude, Koppen climate code, drive train, fuel type, make and model, engine description keywords, and Carfax® alerts is processed by the trained random forest model to determine a likelihood that the vehicle has an exhaust system modification.

In some embodiments, engine modification prediction machine learning model 426 is a random forest model with 4.6 million parameters. A set of features including the year of manufacture, engine displacement volume, longitude, latitude, Koppen climate code, drive train, fuel type, make and model, engine description keywords, and Carfax® alerts is processed by the trained random forest model to determine a likelihood that the vehicle has an engine bay compartment modification.

In some embodiments, drivability defect prediction machine learning model 428 is a random forest model with 6 million parameters. A set of features including an odometer reading of the vehicle, the year of manufacture, age of the vehicle at the time of inspection, engine displacement volume, longitude, latitude, Koppen climate code, US state code, drive train, fuel type, make and model of the vehicle, engine description keywords, and Carfax® alerts is processed by the trained random forest model to determine respective likelihoods that the vehicle has a steering defect, a suspension defect, or a brake defect.

In some embodiments, hail damage prediction machine learning model 430 is a random forest model with 2.9 million parameters. A set of features including an odometer reading of the vehicle, the year of manufacture, age of the vehicle at the time of inspection, engine displacement volume, longitude, latitude, Koppen climate code, US state code, drive train, fuel type, engine description keywords, and Carfax® alerts is processed by the trained random forest model to determine a likelihood that the vehicle has hail damage.

In some embodiments, emission system modification prediction machine learning model 432 is a random forest model with 5.1 million parameters. A set of features including the year of manufacture, engine displacement volume, longitude, latitude, Koppen climate code, drive train, fuel type, make and model, engine description keywords, and Carfax® alerts is processed by the trained random forest model to determine respective likelihoods that the vehicle is missing a catalytic converter or that the vehicle has an emission system modification.

In some embodiments, electronics defect machine learning model 434 is a random forest model with 3.2 million parameters. A set of features including an odometer reading of the vehicle, the year of manufacture, age of the vehicle at the time of inspection, engine displacement volume, longitude, latitude, Koppen climate code, US state code, drive train, fuel type, make and model of the vehicle, engine description keywords, and Carfax® alerts is processed by the trained random forest model to determine a likelihood that the vehicle has an electronics defect.

In some embodiments, the plurality of trained machine learning models 404 may include an oil leaks defect machine learning model. The oil leaks defect machine learning model may be a random forest model to determine the respective likelihoods that the vehicle has a head gasket issue, an oil leak, or an oil dipstick related defect.

In some embodiments, other trained machine learning models may be included in the plurality of trained machine learning models 404 to determine the likelihood that the vehicle includes other defects, as aspects of the technology described herein are not limited in this respect.

In some embodiments, the engine description keywords are obtained by a VIN decode service that obtains engine description keywords by looking up the VIN. For example, the VIN decode service may obtain engine description keywords using the VIN and a vehicle inspector may verify that the keywords are accurate and should be included in a vehicle condition report or as input to a model. In some embodiments, the engine description keywords may be selected from a list, or otherwise input, by the vehicle inspector.

The set of trained machine learning models described herein in connection with FIG. 4 were trained on historical vehicle condition reports acquired during previous vehicle inspections and stored in a computer system associated with (e.g., communicatively coupled to) the vehicle diagnostic system, such as server(s) 129 in vehicle diagnostic system 100. Inputs were sets of features based on vehicle information known at the start of an inspection. For example, vehicle information including the vehicle model and year, mileage, engine/drivetrain properties, location, Carfax® alerts, and recalls, as described herein. The prediction targets, used for training, were determinations of vehicle defects identified to be present in the vehicle by inspectors in past reports. In some embodiments, the models were trained on the most recent 1M condition reports created inspectors. To test the performance of the model, inspection records (e.g., vehicle condition reports) from the most recent 2 months (approximately 160,000 vehicle condition reports) were evenly split into validation and test sets.

In some embodiments, where the vehicle condition reports used for training may have missing portions or fields for which vehicle information is missing, a pre-processing may be used to replace missing values. For example, missing numeric values may be replaced by a special $-999$ numeric value. As another example, missing text values were replaced with a special '_missing_' value. In some embodiments, text columns were lower-cased and the presence/absence of words in a record were converted to 1s/0s respectively. For example, a function such as scikit-learn CountVectorizer class may be used to convert text columns to numeric representations.

In some embodiments, the pre-processing described herein may be used to pre-process vehicle information prior to analysis by the one or more trained machine learning models described herein.

In some embodiments, to improve the robustness of the one or more trained machine learning models to make accurate determinations when provided with incomplete input data, the training data was augmented to have a larger size than its original size. For example, the training dataset was re-sampled with replacement to twice its original size and each row had a chance to be randomly altered. Rows were altered at random accordingly to the follow probabilities: a 50% chance of having the odometer erased, a 10% chance of having Carfax® information erased, a 10% chance of having location and location-dependent information erased, and a 10% chance of having engine properties erased.

III. ML Techniques for Identifying Errors in Vehicle Inspection Results

A vehicle sale system may be used to facilitate the online vehicle transactions (e.g., sales) among buyers and sellers. Since potential buyers may want to know the condition of a vehicle, including any potential defects which may require repair or otherwise impact the value of the vehicle, a vehicle sale system may provide vehicle condition reports for vehicles and these reports include information about vehicle features as well as vehicle defects so that the parties transacting may make informed decisions about the value of the underlying vehicle(s).

Undetected vehicle defects may pose an arbitration risk for the owner of a vehicle sale system that provides a vehicle inspection report for vehicles being sold through the system. For example, when a buyer purchases a vehicle with an undisclosed vehicle defect, the buyer may file an arbitration report with the party facilitating the sale (e.g., the vehicle sale system which provided a vehicle inspection report that did not disclose the defect). Additionally, buyers may file multiple claims for separate issues related to a single vehicle sale. For example, one claim for an undisclosed engine noise and another claim for an undisclosed missing catalytic converter. Accordingly, a vehicle inspection report which may be referenced by potential buyers and sellers may carry an arbitration risk for multiple different arbitration claim categories. The inventors have appreciated that performing multiple vehicle inspections may be prohibitively time consuming. Additionally, the inventors have appreciated that using fully automated systems may similarly be prone to over or under reporting potential vehicle defects. For example, when a machine learning model returns a confidence value, or likelihood, of a defect being present, some threshold value for the confidence value is used to determine a positive class (e.g., a defect is present) vs a negative class (e.g., a vehicle is not present). In either case, the inclusion of false positives (e.g., listing a vehicle defect in a vehicle condition report that is not present in the vehicle) may result in undervaluing a vehicle. Similarly, the inclusion of false negatives (e.g., not listing a vehicle defect in a vehicle condition report that is present in the vehicle) can overvalue the vehicle and pose a risk of arbitration.

The inventors have recognized that using a system for identifying discrepancies between vehicle inspection results and automated machine learning based analysis, of data gathered during a vehicle inspection, would improve the accuracy of the vehicle condition report. This, in turn, reduces any risk of liability or arbitration resulting from transactions of vehicles with inaccurate vehicle condition reports. During a vehicle inspection, a vehicle inspector acquires data about a vehicle (e.g., an audio recording, an image, OBDII codes and/or data stream, vibrational data, location of the vehicle, make, model, and year of the vehicle, etc.). A set of trained machine learning models may process these acquired data about the vehicle to determine the respective likelihoods of a set of vehicle defects being present. The inventors have further recognized that, given the challenges associated with reviewing vehicle condition reports for errors or conducting follow-up vehicle tests, analyzing potential discrepancies between inspector reported defects and automatically detected defects both improve the accuracy of vehicle condition reports and reduces the risk of arbitration or other liability.

Accordingly, the inventors have developed trained machine learning models and rule-based analysis techniques, for identifying discrepancies between the respective likelihoods of a set of vehicle defects, identified by trained machine learning models, and a set of inspector-identified vehicle defects, included in the vehicle condition report. The one or more trained machine learning models and rule-based analysis techniques process the two sets of vehicle defects to identify potential missing vehicle defects (e.g., false negatives) and/or incorrectly identified vehicle defects (e.g., false positives) and assess whether the identified defects present a risk of arbitration or liability. For example, after completion of a vehicle inspection, all completed condition reports may be checked by the vehicle diagnostic system, which determines whether there are any undisclosed defects and whether those undisclosed defects pose an unacceptable risk of an arbitration claim. If so, the vehicle diagnostic system may flag the condition report for secondary review by a team of experienced inspectors (prescreen team). The prescreen team reviews may review the detected issues and make corrections to the condition report if necessary. The prescreen team may be limited in the number of reviews they may conduct, therefore, the thresholds for triggering an alert may be configured to be higher for the prescreen team than for the inspection team (e.g., inspectors who receive a list of potential vehicle defects that are likely to be present in a given vehicle prior to completion an inspection, as described above in Section II).

According to some aspects of the technology described herein, trained machine learning models and rule-based analysis techniques may be used after acquiring data during a vehicle inspection to identify one or more vehicle defects that the inspector may have missed or misidentified. For example, near the end of a vehicle inspection, the vehicle diagnostic system may be used to process data (e.g., audio data, image data, video data, vibration data, etc.) gathered during the vehicle inspection to identify potential vehicle defects. The system may obtain uploaded information about the vehicle, extract relevant data, pass the data to machine learning vehicle defect models, and return a list of detected issues that the inspector has not disclosed yet. The inspector can then review model predictions and take one or more actions to address the discrepancies identified, for example, by updating the condition report to include one or more defects previously not specified in the condition report, choosing not to add one or more defects to the condition report even if AI-based analysis suggests that such defects are present (e.g., because the inspector confirms that such defects are not in fact present), and/or conducting further inspection (e.g., looking at the vehicle again, doing further testing) to collect more data to resolve the ambiguity.

Accordingly, some embodiments provide for a computer-implemented method to process data about a vehicle using trained ML models in furtherance of identifying one or more vehicle defects, the method comprising using at least one computer hardware processor to perform, subsequent to completion of an inspector's inspection of the vehicle: (A) obtaining an initial vehicle condition report comprising inspection results (e.g., a list of information gathered from and/or about the vehicle by the inspector through the use of vehicle tests and hardware systems, information generated by inspection equipment, and information collected by the inspector), the inspection results indicating a first set of zero, one or more vehicle defects that the inspector determined to be present in the vehicle; (B) obtaining data about the vehicle gathered at least in part during inspection of the vehicle by the inspector (e.g., data gathered using at least one hardware sensor configured to acquire an audio recording of the vehicle during one or more stages of operation of the engine and/or other vehicle components, one or more vehicle images, one or more on-board diagnostic readings, a reading of the vehicle instrumentation such as the odometer, input from the inspector, etc.); (C) applying the trained ML models to the data about the vehicle to obtain a second set of zero, one or more vehicle defects that are indicated by the trained ML models to be present in the vehicle; (D) generating an indication of agreement or discrepancy between the first set of vehicle defects that the inspector determined to be present in the vehicle and the second set of vehicle defects that are indicated by the trained ML models to be present in the vehicle (e.g., processing the first set of vehicle defects and the second set of vehicle defects using a trained random forest model to obtain a likelihood of a discrepancy being present between the first set of vehicle defects and the second set of vehicle defects and/or is performed using one or more rules); and (E) outputting the initial vehicle condition report and/or the indication of agreement or discrepancy.

In some embodiments, the method further includes generating a revised vehicle condition report, the generating comprising: providing the initial vehicle condition report and the indication of agreement or discrepancy between the first set of vehicle defects and the second set of vehicle defects to a reviewer through a device used by the reviewer; receiving input from the device whether or not to modify the initial vehicle condition report based on the indication; and generating a final vehicle condition report, based on the input received from the device.

In some embodiments, upon receiving input from the device to modify the initial vehicle report, the generating the final vehicle condition report comprises modifying the inspection results indicating the first set of zero, one or more vehicle defects by replacing an indication of one or more vehicle defects in the first set with one or more corresponding indications from the second set.

In some embodiments, the method further includes, prior to receiving the input whether or not to modify the initial vehicle condition report, providing, to an inspector, a recommendation to obtain additional inspection results; and subsequent to obtaining additional inspection results, determining whether or not to modify the initial vehicle condition report.

In some embodiments, the first set of vehicle defects does not indicate a vehicle defect of a first type being present in the vehicle; the second set of vehicle defects indicates a likelihood of the vehicle defect of the first type being present in the vehicle; and generating the indication of agreement or discrepancy comprises generating an indication of discrepancy with respect to the vehicle defect of the first type when the likelihood exceeds a threshold.

In some embodiments, the trained ML models include a first trained ML model trained to detect vehicle defects of the first type, and applying the trained (ML) models to the data about the vehicle comprises applying the first trained ML model to at least some of the data about the vehicle to obtain the likelihood of the vehicle defect of the first type being present in the vehicle.

In some embodiments, the first set of vehicle defects does not indicate presence of an engine vehicle defect; the second set of vehicle defects does indicate a likelihood of the engine vehicle defect being present in the vehicle; and generating the indication of agreement or discrepancy comprises generating an indication of discrepancy with respect to the engine vehicle defect based on the likelihood.

In some embodiments, the one or more trained machine learning models comprises: a first neural network portion comprising a plurality of one-dimensional (1D) convolutional layers configured to process an audio waveform; a second neural network portion comprising a plurality of two-dimensional (2D) convolutional layers configured to process a 2D representation of the audio waveform; and a fusion neural network portion comprising one or more fully connected layers configured to combine outputs produced by the first neural network portion and the second neural network portion to obtain a likelihood indicative of the presence or absence of the at least one vehicle defect. In some embodiments, other neural network architectures, such as a transformer may be used for one or more portions of the neural network. In other embodiments, other neural network architectures may be used, as aspects of the technology described herein are not limited in this respect. In some embodiments, additional inputs such as accelerometer and/or vibration inputs may be used as inputs to the model or to a portion of the model. In some embodiments, data from other sensors may be used as inputs to the model, as aspects of the technology described herein are not limited in this respect.

In some embodiments, the trained ML model is trained to determine whether the likelihood of the discrepancy being present exceeds a specified threshold.

In some embodiments, the trained ML risk model is trained to determine a likelihood a vehicle defect is present in the vehicle, the vehicle defect being from the group consisting of: engine noise, exhaust system, and rust (e.g., structural rust).

In some embodiments, the trained ML models include a first trained ML model trained to generate a first likelihood that a first type of vehicle defect is present in the vehicle, wherein the first type of vehicle defect is an undercarriage defect, engine audio defect, dashboard defect, and/or exterior/mechanical defect.

Figure 5:
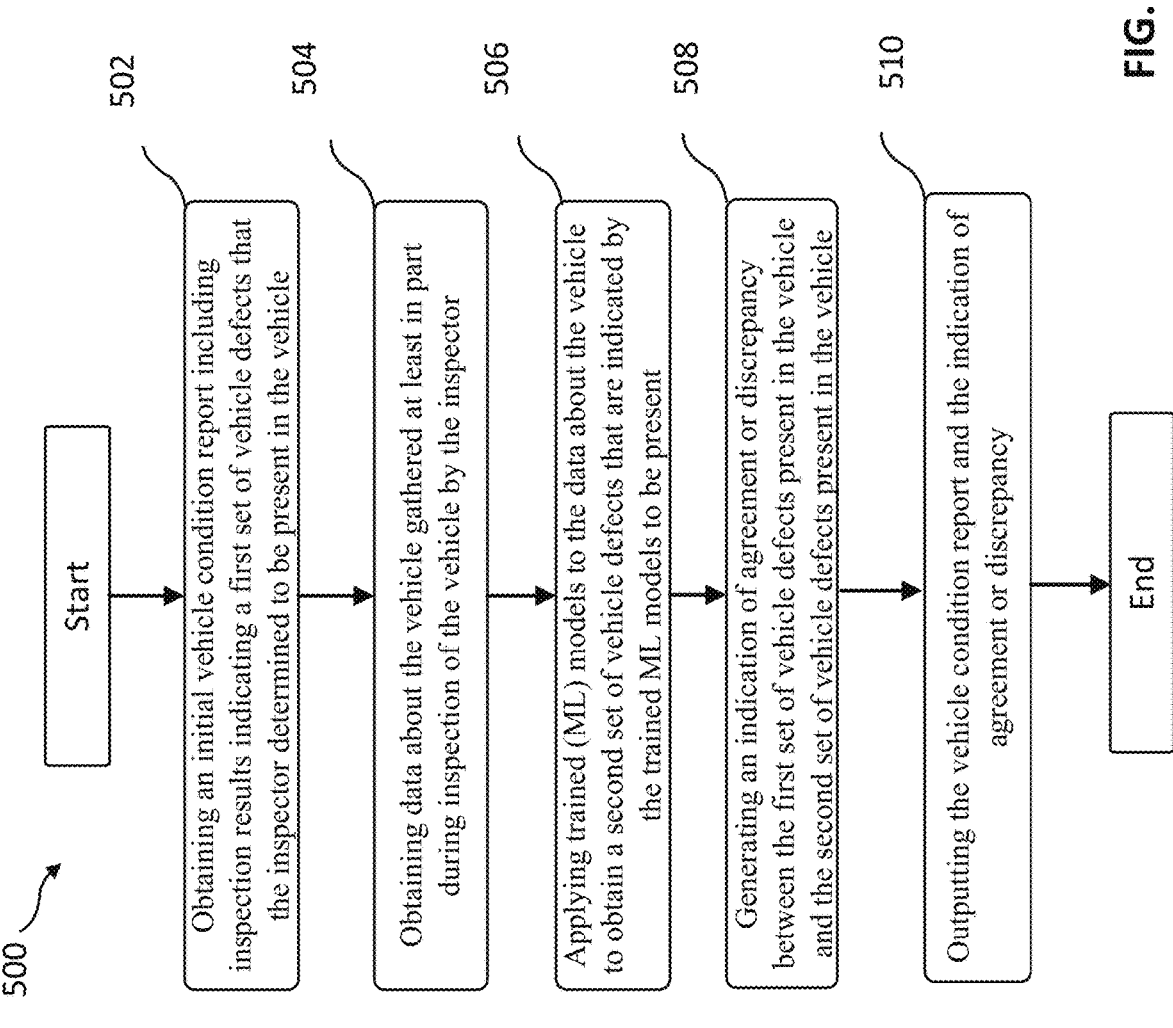
FIG. 5 is a flowchart of an illustrative process for using one or more trained machine learning models to process data about a vehicle in furtherance of identifying one or more vehicle defects, in accordance with some embodiments of the technology described herein.

FIG. 5 is a flowchart of an illustrative process 500 for using one or more trained machine learning models to process data about a vehicle in furtherance of identifying one or more vehicle defects, in accordance with some embodiments of the technology described herein. Process 500 may be executed by any suitable computing device(s). For example, process 500 may be executed by a mobile device (e.g., mobile device 104), a server or servers (e.g., server(s) 129), or any other suitable computing device(s) including any of the devices described herein including with reference to FIG. 1.

Process 500 starts at act 502 by obtaining an initial vehicle condition report including inspection results indicating a first set of vehicle defects that the inspector determined to be present in the vehicle. The initial vehicle condition report is generated by an inspector by inputting and/or gathering vehicle information using a mobile device, as described herein.

The inspector's determination as to whether the specific defects are present, or not, in the vehicle is reflected in the first set of vehicle defects included with the vehicle condition report. In some embodiments, the first set of vehicle defects may be a listing of affirmative defects, (e.g., defects that the inspector believes to be present in the vehicle). In some embodiments, the first set of vehicle defects may be a listing of all potential defects along with the inspector's determination as to whether those defects are present or not in the vehicle.

The first set of vehicle defects may include undercarriage defects, engine bay defects, dashboard defects, and/or exterior/mechanical defects. In some embodiments, undercarriage defects include a missing catalytic converter, an oil leak, a virtual lift quality, and/or the presence of structural rust. In some embodiments, engine bay defects include engine noise that is indicative of an engine defect (e.g., knocks, rattles, hesitations, etc.), component whine, and/or AMP recording quality. In some embodiments, dashboard defects include illuminated warning lights and the odometer value. In some embodiments, exterior/mechanical defects include glass crack defect (e.g., a cracked window), paint defects, engine modifications, suspension modifications, and/or oil quality.

In some embodiments, the first set of vehicle defects is a set of zero, one or more vehicle defects that the inspector has determined to be present in the vehicle. For example, the examiner may determine that the vehicle is free of defects. Accordingly, the first set of vehicle defects may have zero vehicle defects.

In some embodiments, the system extracts information from a condition report in stages. The first stage may take a single input: unique identifier of a condition report. This identifier is used to download the machine-readable version of the condition report that has been uploaded by the inspector to ACV systems. In the second stage, the following fields are extracted from the condition report: odometer, VIN, disclosed issues, OBDII readiness monitor statuses, OBDII trouble codes, a live data stream from the on-board diagnostic computer, paint depth readings, front-of-vehicle photo uniform resource locator (URL), undercarriage photo URLs, dashboard photo URL, engine bay photo URL, and side view photo URLs. In the third stage, the VIN is used to decode information about the vehicle's make, model, and year, and engine, transmission, and drivetrain properties. The VIN is also used to get the Carfax alerts, Virtual Lift undercarriage reconstruction image URL, and engine audio recording URL. In the fourth stage, engine audio recording metadata is used to extract the latitude and longitude of the recording location. Finally, in the fifth stage, the location coordinates are used to identify the location's US State and Koppen climate code. Subsets of these extracted fields may be routed to individual defect models that compute probabilities that a defect is present.

Next process 500 proceeds to act 504 where data about the vehicle is gathered at least in part during inspection of the vehicle by the inspector. In some embodiments, the data about the vehicle is gathered at least in part during inspection of the vehicle and may include an audio recording of the vehicle during operation. In some embodiments, the data about the vehicle is gathered at least in part during inspection of the vehicle and may include an image and/or video of at least a portion of the vehicle. In some embodiments, the data about the vehicle is gathered at least in part during inspection of the vehicle and may include OBDII codes. In some embodiments, the data about the vehicle is gathered at least in part during inspection of the vehicle and may include vibrational data.

The audio recording may be acquired by an inspector's mobile device, such as mobile device 104, 108, or 120 in FIG. 1, or a device configured for recording audio of a vehicle, such as MVDD 112 in FIG. 1. For example, a device having at least one acoustic sensor may acquire an audio recording, at least in part, during the operation of a vehicle engine. The operation of a vehicle engine may include a number of engine operations, including ambient sounds prior to start up, start-up sounds, idle sounds, load sounds, engine shut off sounds, and ambient sounds after engine shutoff. Accordingly, in some embodiments, the audio recording may begin prior to start-up and include at least an engine start-up operation. In some embodiments, the audio recording may end at or soon after engine shut off. In some embodiments, the audio recording may exclusively include vehicle engine noise including one or more engine operations. In some embodiments, vibrations of the vehicle may be recorded in parallel with the recording of the audio of the vehicle such as to capture vibrations produced during the same sequence of vehicle operations.

Additionally, the audio recording may also capture noise from other vehicle components either during the engine operations or through a separate procedure to investigate the performance of a vehicle component. For example, transmission sounds captured during the engine operations may be analyzed based on the same recording to determine whether there is a transmission vehicle defect present in the vehicle.

The image and/or video of at least a portion of the vehicle may be acquired by the inspector using a camera integrated into a mobile device, such as mobile device 104, 108, or 120. In some embodiments, the mobile device may be used with additional hardware, such as a virtual lift device for capturing an image and/or video of an undercarriage of the vehicle. In some embodiments, an image and/or video may be captured of portions of the exterior of the vehicle. For example, an image and/or video may capture a portion of the paint of the vehicle, the vehicle windshield, the wheels and/or tires of the vehicle, and/or the vehicle lights (e.g., break lights, headlights, etc.). In some embodiments, an image and/or video may be captured of portions of the interior of the vehicle. For example, an image and/or video may be captured of the dashboard, of a vehicle identification number located on the frame of the vehicle, of the cabin of the vehicle, or of the engine bay of the vehicle.

In some embodiments, the vehicle audio recording and/or image/video may be stored with the vehicle inspection report. In some embodiments, the vehicle audio recording and/or image/video may be stored separately from the vehicle inspection report. For example, the vehicle audio recording may be stored on a server, such as server(s) 129 described in connection to FIG. 1. The storage on the server may index the vehicle audio recording based on the vehicle identification number. Additionally, or alternatively, the vehicle condition report may include hyperlinks to the vehicle audio recording. In some embodiments, a representation of the vehicle audio recording and/or image/video may be stored with the vehicle inspection report. For example, a one-dimensional and/or a two-dimensional representation of a waveform of the audio recording may be stored with vehicle inspection report. As another example, a thumbnail of the image or a compressed video may be stored with the vehicle inspection report.

On-board diagnostic information may be acquired by the inspector during the vehicle inspection using a mobile device, such as mobile device 104, 108, or 120 described in connection with FIG. 1. For example, the mobile device may receive on-board diagnostic information through a Bluetooth receiver. As another example, the mobile device may receive on-board diagnostic information through an OBDII port. In some embodiments, the on-board diagnostic information includes an engine data stream, such as rotations per minute, voltage, and system temperature. For example, a live data stream may be received through the OBD interface such that real time data from the engine data stream may be received in parallel with data collected from other sensors of the mobile device.

Next process 500 proceeds to act 506 where trained machine learning models are applied to the data about the vehicle to obtain a second set of vehicle defects that are indicated by the trained ML models to be present. In some embodiments, each model returns the confidence score (reflecting the probability) of a vehicle defect being present in the vehicle.

Additionally, some models may output 1D or 2D heat maps which indicate where in the sample the defect is visible/audible. For example, a glass crack model may output an image of a heatmap which highlights where a crack is suspected, while the engine knock model heatmap indicates where in the audio sample the knock is audible.

The one or more trained machine learning models may include one or more trained machine learning models to detect the presence or absence of vehicle defects form audio acquired at least in part during the operation of the engine of a vehicle, in accordance with some embodiments described herein. A process of analyzing, using one or more trained machine learning models, may include obtaining an audio recording, which was acquired at least in part during operation of a vehicle engine, and metadata about the vehicle. The process may generate an audio waveform and a 2D representation of the audio waveform from the audio recording. The audio waveform, the 2D representation of the audio waveform, and the metadata may each be processed by a trained neural network and then their outputs combined using a fusion model to obtain output indicative of the presence or absence of an engine operation defect.

In some embodiments, the metadata includes a reading of the vehicle's odometer, a model of the vehicle, a make of the vehicle, an age of the vehicle, a type of drivetrain of the vehicle, a type of transmission of the vehicle, a measure of displacement of the engine, a fuel type of the vehicle, an indication of whether on-board diagnostics (OBD) codes could be obtained from the vehicle, a number of incomplete readiness monitors reported by the OBD scanner, one or more BlackBook-reported engine properties, a list of one or more OBD codes, a live data stream from the on-board vehicle system, location of the vehicle, information about weather at the location of the vehicle, and information about a seller of the vehicle.

The one or more trained machine learning models may include one or more trained machine learning models for processing an audio recording and/or metadata obtained for a vehicle to determine the presence of a potential transmission defect, in accordance with some embodiments of the technology described herein. A process of analyzing, using one or more trained machine learning models, may include obtaining an audio recording that was acquired at least in part during operation of a vehicle engine and may further obtain metadata indicating one or more properties of the vehicle. The process may generate an audio waveform and a 2D representation of the audio waveform from the audio recording. The process may further generate metadata features from the metadata by generating a numeric representation of the text indicating the properties described therein. The audio waveform and 2D representation of the audio waveform may each be processed by a trained neural network and their outputs combined using a fusion model. The output of the fusion model may be further analyzed using a dense network which also receives an input of metadata features in addition to the output of the fusion network. The result from analysis with the dense network obtains output indicative of the presence or absence of an abnormal transmission noise.

The one or more trained machine learning models may include one or more trained machine learning models to detect the presence of engine rattle from audio acquired at least in part during operation of an engine of a vehicle, in accordance with some embodiments of the technology described herein. In some embodiments, a process of analyzing, using one or more trained machine learning models, may include processing an audio recording that was acquired at least in part during operation of a vehicle engine to generate an audio waveform from the audio recording. The audio recording may be processed using the one or more trained machine learning models to obtain an output indicating for each particular time point of multiple time points, whether engine rattle was present in the audio recording at that time point.

In some embodiments, one or more models (e.g., engine modifications and oil leak defect detection models) also return a list of comparable samples from similar make-model-year combinations that have low defect probabilities. An inspector may use the list of comparable samples to quickly compare a problematic sample with reference clean samples.

In some embodiments, additional trained machine learning models are included with the one or more models, as aspects of the technology described herein are not limited in this respect.

Next process 500 proceeds to act 508 where an indication of agreement or discrepancy is generated between the first set of vehicle defects identified as being present in the vehicle by the inspector and the second set of vehicle defects identified as being present in the vehicle by the one or more trained machine learning models. Upon receiving the second set of vehicle defects, from the one or more trained machine learning models in act 506, each confidence score, which reflects the probability that a vehicle defect is present in the vehicle, may be analyzed to determine if the confidence score indicates a vehicle defect is present and, by extension, whether there is a discrepancy with the first set of vehicle defects.

In some embodiments, the threshold confidence to determine that a defect is present in the vehicle may be the same threshold for each type of defect. In some embodiments, the threshold confidence to determine that a defect is present in the vehicle may be particular to that type of vehicle defect.

In some embodiments, the second set of vehicle defects may be analyzed based on the type of defect and the magnitude of the confidence score. Each type of defect may have its own threshold for what level of confidence is required to be obtained by the model to consider the defect as being present. For example, a confidence level of greater than 0.6 (measured between 0 and 1) may be the threshold confidence to determine that an engine defect is present. At the same time, a confidence level of greater than 0.9 may be the threshold confidence to determine that a windshield defect is present.

Next process 500 proceeds to act 510 where an output including the vehicle condition report and the indication of agreement or discrepancy is provided through the vehicle diagnostic system for review. In some embodiments, the vehicle condition report and the indication of agreement or discrepancy is provided through the vehicle diagnostic system to an inspector for review. In some embodiments, the vehicle condition report and the indication of agreement or discrepancy is provided through the vehicle diagnostic system to a reviewer for review. Upon receiving the vehicle condition report and the indication of agreement or discrepancy, the inspector or reviewer may determine that the vehicle condition report should be modified based on a discrepancy between the first set of vehicle defects and the second set of vehicle defects. For example, when the discrepancy indicates that there is an additional vehicle defect included in the second set of vehicle defects, which does not appear in the first set of vehicle defects, the inspector or reviewer may then determine that the vehicle defect, not included in the first set of vehicle defects, should be added to the vehicle condition report. As another example, when the discrepancy indicates that there is an additional vehicle defect included in the first set of vehicle defects, which does not appear in the second set of vehicle defects, the inspector or reviewer may then determine that the vehicle defect, not included in the second set of vehicle defects, should be removed from the vehicle condition report. As yet another example, upon receiving the vehicle condition report and the indication of agreement or discrepancy between the first set of vehicle defects and the second set of vehicle defects, the inspector or reviewer may determine to ignore the discrepancy and not modify the vehicle condition report. As yet another example, when the inspector or reviewer receives an indication of agreement, no action may be taken, or the vehicle condition report may be submitted as finalized through the mobile device and or laptop/desktop computer.

In some embodiments, the output may include images for comparing to the vehicle that a vehicle inspector may use to resolve the indication of agreement or discrepancy. For example, upon generating an indication that a vehicle modification is present, the output may include one or more images of an unmodified vehicle and/or vehicle component that the inspector may use to resolve the indication of discrepancy by comparing the unmodified vehicle image to the vehicle under inspection.

Upon completion of act 510, process 500 completes. After the completion of process 500, the vehicle condition report may be uploaded, or otherwise linked to (such as through an impeded hyperlink), to an online vehicle listing. The vehicle listing may be viewed by the vehicle owner and/or a potential vehicle buyer.

Figure 6A:
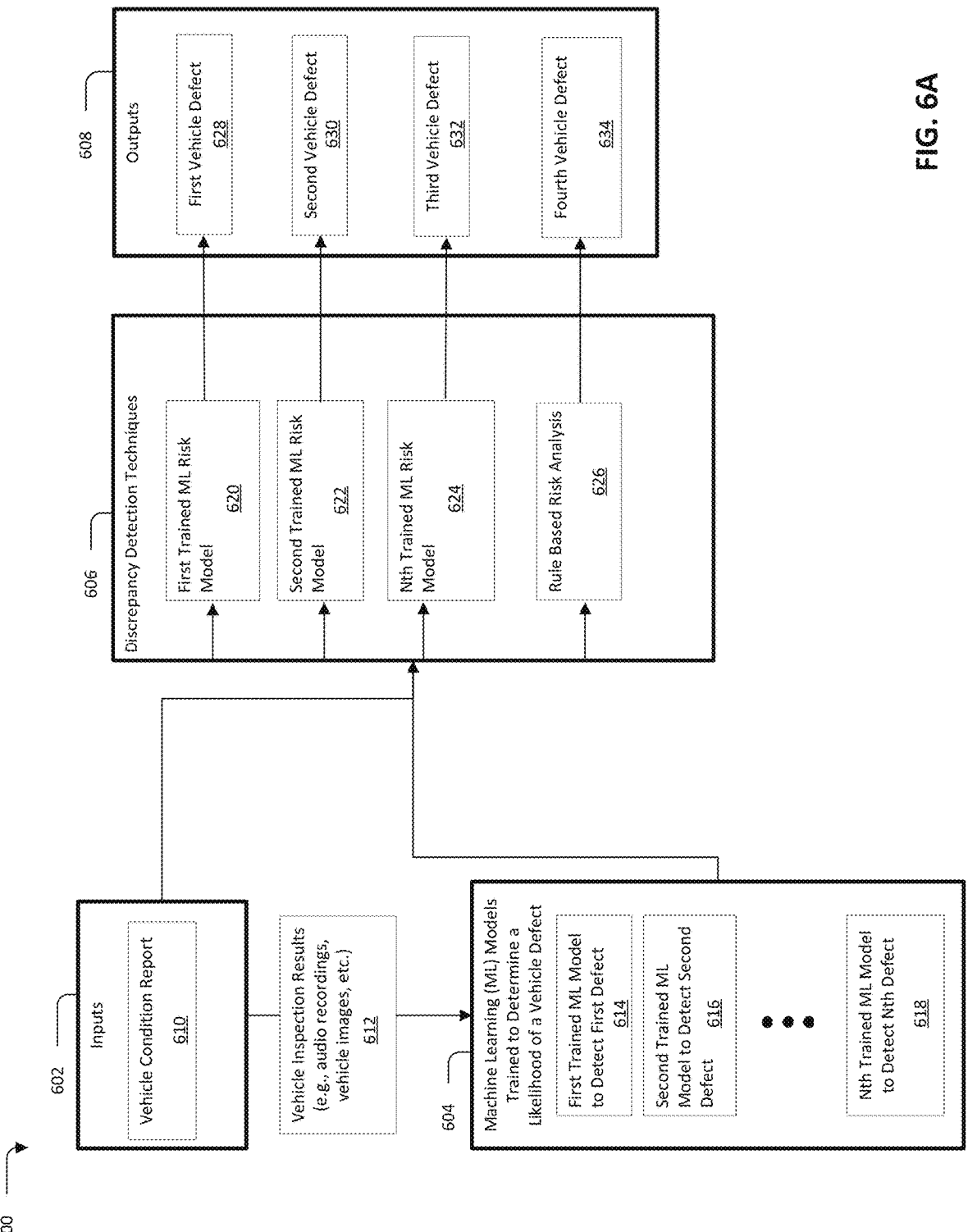
FIG. 6A illustrates components of a system for identifying discrepancies between vehicle inspection results and automated machine learning analysis of data gathered during the inspection, in accordance with some embodiments of the technology described herein.

FIG. 6A illustrates components of a system 600 for identifying discrepancies between vehicle inspection results and automated machine learning analysis of data gathered during the inspection, in accordance with some embodiments of the technology described herein. As shown in FIG. 6, system 600 includes a plurality of discrepancy detection techniques 606 which receive inputs 602 including data from a vehicle condition report 610 in addition to receiving additional inputs from a plurality of machine learning models 604 trained to determine likelihoods of corresponding vehicle defects.

The plurality of machine learning models 604 trained to determine likelihoods of corresponding vehicle defects may include any number of trained machine learning models. The plurality of machine learning models 604 receives vehicle inspection results 612 from the vehicle condition report. In some embodiments, the vehicle inspection results 612 may be included with vehicle condition report 610. In some embodiments, vehicle inspection results 612 may be located separately from the vehicle condition report, and the vehicle condition reports 610 may include a reference (e.g., a hyperlink or other suitable file location reference) to the vehicle inspection results 612. For example, vehicle inspection results 612 may be stored with a vehicle identifier such that the vehicle identifier included in vehicle condition report 610 is provided to the plurality of machine learning models 604 which upon receiving the vehicle identifier may retrieve from the storage location the vehicle inspection result 612 for processing by the plurality of trained machine learning models 604. In some embodiments, vehicle inspection results 612 may include an audio recording, a vehicle image and/or video, vibration data, and metadata associated with the vehicle inspection—as described herein.

In some embodiments, the plurality of discrepancy detection techniques 606 may include only trained machine learning risk assessment models for determining whether there is a discrepancy with regard to a plurality of vehicle defects. In some embodiments, the plurality of discrepancy detection techniques 606 may include only one or more rules for determining whether there is a discrepancy with regard to a plurality of vehicle defects. In some embodiments, the plurality of discrepancy detection techniques 606 may include a combination of trained machine learning risk assessment models for determining whether there is a discrepancy with regard to first type of vehicle defects and a set of one or more rules for determining whether there is a discrepancy with regard to a second type of vehicle defects. For example, a first trained machine learning risk assessment model 620 may be configured to receive a first defect type from a first set of vehicle defects included in vehicle condition report 610 and to receive a likelihood that the first defect type is present in the vehicle from the second set of vehicle defects. The likelihood that the first defect type is present may be generated by the first trained machine learning model 614. A second trained machine learning risk assessment model 622 may be configured to receive a second defect type from a first set of vehicle defects included in vehicle condition report 610 and to receive the likelihood that the second defect type is present in the vehicle from the second set of vehicle defects, where the likelihood that the second defect type is present is generated by the second trained machine learning model 616. An $n^{th}$ trained machine learning risk assessment model 624 may be configured to receive an $n^{th}$ defect type from a first set of vehicle defects included in vehicle condition report 610 and to receive the likelihood that the $n^{th}$ defect type is present in the vehicle from the second set of vehicle defects, where the likelihood that the $n^{th}$ defect type is present is generated by the $n^{th}$ trained machine learning model 618. Additional trained machine learning models which are trained to generate additional likelihoods that respective vehicle defect types are present in the vehicle may be included in the plurality of machine learning models 604. The rule-based discrepancy detection techniques risk analysis 626 may include rules for the first set of vehicle defects included in vehicle condition report 610 and rules for the respective likelihoods generated by the additional trained machine learning models that vehicle defect types are present in the vehicle.

In some embodiments, the outputs 608 from the discrepancy detection techniques 606 are provided to a vehicle inspector or reviewer, as described herein including with reference to FIG. 5 above. In some embodiments, the outputs 608 from the discrepancy detection techniques 606 may include indications of agreement or discrepancy with regard to vehicle defects in the first and second sets of vehicle defects. For example, output 608 may include a listing of vehicle defects and their corresponding indications, such as first vehicle defect 628 with an indication of agreement or discrepancy as well as second vehicle defect 630 third vehicle defect 632 and fourth vehicle defect 634 each with their respective indications of agreement or discrepancy. The indication for the first vehicle defect being generated by the first trained machine learning risk model 620, the indication for the second vehicle defect being generated by the second trained machine learning model 622, the indication for the third vehicle defect being generated by the $n^{th}$ trained machine learning model 624, and the indication for the fourth vehicle defect being generated by the one or more rule-based comparisons of defect scores 626.

In some embodiments, the likelihoods associated with the indications of a discrepancy may be further processed to include factors about the inspector and/or seller to determine a final arbitration risk. For example, the rate of inspector error or the rate of an inspector's report is subject to arbitration may be further used to determine an arbitration risk. Additionally, or alternatively, the rate of a seller's transactions which are associated with an arbitration may be used to further determine an arbitration risk.

Figure 6B:
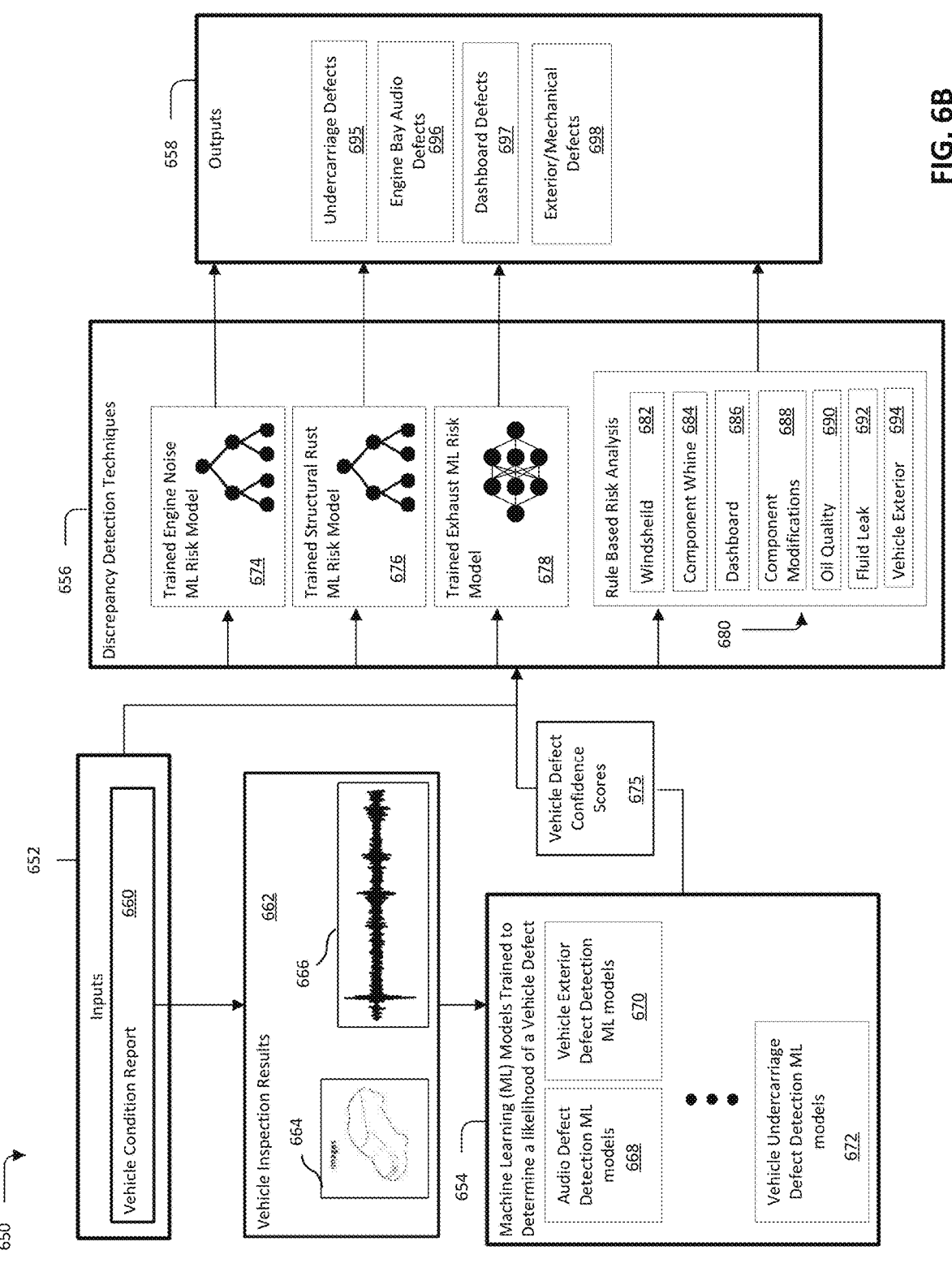
FIG. 6B illustrates components of a system for identifying discrepancies between vehicle inspection results and automated machine learning analysis of data gathered during the inspection, in accordance with some embodiments of the technology described herein.

FIG. 6B illustrates components of a system 650 for identifying discrepancies between vehicle inspection results and automated machine learning analysis of data gathered during the inspection, in accordance with some embodiments of the technology described herein. System 650 is configured to process data about a vehicle in furtherance of identifying one or more vehicle defects following a vehicle inspection report. Discrepancy detection techniques 656 are configured to generate an indication of agreement or discrepancy between a first set of vehicle defects received from inputs 652 and a second set of vehicle defects received from machine learning models trained to determine a likelihood of a vehicle defect 654. Outputs 658 from discrepancy detection technique 656 may be provided to an inspector or reviewer—as described herein.

Input section 652 includes vehicle condition report 660 which may be generated by an inspector during a vehicle inspection and may be provided to a vehicle diagnostic system (e.g., vehicle diagnostic system 100 as shown in FIG. 1) through a mobile device (e.g., mobile device 130, 134, or 136). In some embodiments, vehicle condition report 660 includes vehicle information and inspection results. For example, vehicle information may include a vehicle identifier such as a VIN unique to the vehicle. In some embodiments, vehicle information may include first vehicle information and second vehicle information as described in connection with process 200 in FIG. 2 above.

Machine learning models 654 are trained to determine a likelihood of a vehicle defect receive vehicle inspection results 662 from vehicle condition report 660, in accordance with some embodiments of the technologies described herein. Machine learning models 654, trained to determine a likelihood of a vehicle defect, output vehicle defect confidence scores 675 which may include a list of vehicle defect confidence scores. The list of vehicle defect confidence scores may include a confidence score corresponding to respective vehicle defect types and indicating a likelihood that the vehicle defect type is present in the vehicle based on the processing of the vehicle inspection results 662 by machine learning models 654.

Vehicle inspection result 662 may include an image and/or video 664 and an audio waveform 666, as described herein. Machine learning models 654, trained to determine a likelihood of a vehicle defect, may receive one or more results from the vehicle inspection results 662 as inputs to determine a corresponding vehicle defect confidence score. For example, audio defect detection model 668 may receive an audio waveform 666 in addition to metadata generated during the vehicle inspection and included in vehicle inspection results 662 to produce a vehicle defect confidence score corresponding to a likelihood that an engine defect is present in the vehicle.

In some embodiments, machine learning model 654, trained to determine a likelihood of a vehicle defect, may include audio defect detection machine learning models 668 vehicle exterior defect detection machine learning model 670, and vehicle undercarriage defect detection models 672. In some embodiments, additional machine learning models, trained to determine a likelihood of a vehicle defect, may be included in machine learning model 654, as aspects of the technology described herein are not limited in this respect.

In some embodiments, audio defect detection machine learning models 668 may include an engine defect detection model, a transmission defect detection model, and/or an audio quality detection model (e.g., an AMP recording quality and/or APEX recording quality detection models). The engine defect detection model, transmission defect detection model, and/or audio quality detection model may be configured, as described herein in connection with FIG. 5 above, to process inputs from vehicle inspection results 662 to determine vehicle defect confidence scores 675. An example of such engine defect detection, transmission defect detection, and/or audio quality detection models is described in US Patent Publication number US2023/0204461A1, entitled "Multi-Sensor Devices and Systems for Evaluating Vehicle Conditions," filed Dec. 22, 2022, the entire contents of which are incorporated by reference herein. In some embodiments, vehicle inspection result 662 may include vibration data. The vibration data may be acquired at the same time as the vehicle audio recording such that time points in the vibration data may be correlated with time points in the vehicle audio recording. Accordingly, in some embodiments, analysis techniques may use both the audio recording and the vibration data as inputs to identify defects based on noises at a particular frequency or set of frequencies in the audio recording and/or vibration at a particular frequency or set of frequencies in the vibration data.

In some embodiments, vehicle exterior defect detection machine learning models 670 may include trained machine learning models to identify cracked glass (e.g., a crack in a window and or windshield of the vehicle). In some embodiments, vehicle exterior defect detection machine learning models 670 may include trained machine learning models to detect if paint work is present on the vehicle (e.g., which may indicate the likelihood of non-factory repairs being present).

In some embodiments, vehicle undercarriage defect detection machine learning model 672 may include trained machine learning models to identify catalytic converter status. For example, the one or more trained machine learning models may be trained to detect if a catalytic converter is visible, damaged, or missing. In some embodiments, vehicle undercarriage defect detection machine learning model 672 may include trained machine learning models to identify an oil leak. For example, the one or more trained machine learning models may be trained to determine if an image and/or video of the undercarriage indicates signs of oil leaks. In some embodiments, vehicle undercarriage defect detection machine learning model 672 may include trained machine learning models to identify the quality of an image and/or video of the vehicle undercarriage. For example, images acquired using a virtual lift system may be reconstructed to generate an undercarriage image. The one or more trained machine learning models may be trained to determine whether the quality of the reconstructed undercarriage image is sufficient to be used as an input to other machine learning models. In some embodiments, vehicle undercarriage defect detection machine learning model 672 may include trained machine learning models to identify the presence of structural rust on the vehicle undercarriage. For example, the one or more trained machine learning models may be trained to identify structural rust.

Machine learning models trained to determine a likelihood of a vehicle defect 654 may include additional machine learning models, such as mechanical defect detection machine learning models and/or dashboard defect machine learning models, in accordance with some embodiments of the technology described herein.

Machine learning models 654 may include a mechanical defect detection machine learning model. Mechanical defects may include modifications of vehicle components. For example, modifications of vehicle components to remove factory installed components and replace than with aftermarket or third-party components. In some embodiments, the mechanical defect detection machine learning model may include trained machine learning models to identify non-factory installed components in the engine compartment. In some embodiments, the mechanical defect detection machine learning model may include trained machine learning models to identify non factory installed suspension components. In some embodiments, mechanical defect detection machine learning model may include trained machine learning models to detect if an oil dipstick and/or an oil cap indicates engine abnormalities.

Machine learning model 654 may include a dashboard defect detection machine learning model. Dashboard defect detection machine learning model may detect the presence of dashboard indications to a vehicle operator and/or may detect the readings of vehicle gauges. In some embodiments, the dashboard defect detection machine learning model may include trained machine learning models to identify whether any dashboard warning lights are visible. For example, the one or more trained machine learning models may be trained to detect whether the check engine light is illuminated in an image of the dashboard. In some embodiments, the dashboard defect detection machine learning model may include an odometer detection machine learning model. For example, the one or more trained machine learning models may be trained to detect an odometer gauge in an image of the dashboard and to extract a mileage reading from the detected odometer.

Discrepancy detection techniques 656 may include any suitable combination of machine learning risk models and rule-based risk analysis techniques. As illustrated in FIG. 6B, discrepancy detection techniques 656 include trained engine noise machine learning risk model 674, trained structural rust machine learning risk model 676, and trained exhaust machine learning risk model 678. Discrepancy detection techniques 656 further include rule-based risk analysis techniques including rules for the detection of risk associated with windshield cracks 682, rules for the detection of risk associated with component whine 684, rules for the detection of risk associated with dashboard indicators 686, rules for the detection of risk associated with component modifications 688, rules for the detection of risk associated with oil quality 690, rules for the detection of risk associated with fluid leaks 692, rules for the detection of risk associated with defects in the vehicle exterior 694.

For machine learning risk models, the one or more trained machine learning models may use the structured data present on the condition report and the defect model score as inputs to estimate the probability of an arbitration claim of a given category. From historical data, the arbitration risk model learns the exclusion criteria and further quantifies the risk of a given claim type. In some embodiments, the machine learning approach is utilized to estimate the arbitration claim probability of Engine Noise, Exhaust System, and Structural Rust claim risk determination.

In some embodiments, the arbitration risk models were trained on condition reports created by ACV inspectors since June 2019 (approximately 2.6M). Inspection records from the most recent 75 to 45 days (approximately 80K) were used as the validation set. Records from October 2020 were used as the test set. The most recent 45 days of records may not be used because their arbitration claims, if any, may not be resolved.

were extracted from the vehicle condition reports and/or were obtained from looking up a vehicle record associated with a vehicle identifier included in the vehicle condition report.

In some embodiments, the vehicle information, drivetrain information, and inspection location information are the same information as described herein including in connection with process 200 in FIG. 2. In some embodiments, the past vehicle arbitration information may include information indicating whether the vehicle had a previous arbitration claim of the same type. In some embodiments, vehicle inspector information may include a number of inspections performed by the inspector in the most recent year, and the rate of inspector-at-fault arbitration claims of same type among the inspections. In some embodiments, seller information may include a number of inspections performed at the selling dealer's location(s) in the most recent year, and the rate of seller-at-fault arbitration claims of same type among the inspections. In some embodiments, defect model scores are the scores returned by the respective defect model corresponding to the target arbitration claim type.

In some embodiments, the prediction targets used for training the machine learning risk models were binary presence of valid inspector-at-fault claims of the target arbitration type. In cases where the ACV arbitration policy had since been changed to disallow previously allowed claims, those claims were considered not valid for model training purposes. As described herein, pre-processing techniques may be applied to the training data to replace missing numeric values and/or missing text values.

The one or more trained machine learning models used for the discrepancy detection techniques may be any suitable type of machine learning model. For example, a random forest classifier. As another example, a neural network. As shown in FIG. 6B, trained engine noise machine learning model 674 and trained structural rust machine learning risk model 676 are trained random forest models. As further illustrated in FIG. 6B, trained exhaust machine learning risk model may be a trained neural network. In some embodiments, each of the three arbitration claim types which use a machine learning model (e.g., engine noise, structural rust, and exhaust) are trained random forest classifiers (scikit-learn RandomForrestClassfier class). Each model may use hyper-parameter combinations that maximize the classification performance on the validation dataset for each respective defect risk type. The hyper-parameters for each model are shown in Table 3 below.

TABLE 3

| Defect Risk Type Model | max_depth | min_samples_leaf | min_samples_split | n_estimators | Number of Parameters |
|---|---|---|---|---|---|
| Engine Noise | 26 | 128 | 16 | 256 | 2.1M |
| Structural Rust | 20 | 2 | 512 | 64 | 1.9M |
| Exhaust System | 9 | 512 | 4 | 64 | 0.26M |

As inputs for the machine learning risk models, features from the vehicle condition reports were extracted for use in training the models. In some embodiments, vehicle information, drivetrain information, inspection location information, past vehicle arbitration information, vehicle inspector information, seller information, and defect model scores To calibrate the performance of the trained random forest models, the outputs of each RandomForest model represented arbitration claim probabilities, model outputs were calibrated against a 20% held-out subset (the "calibration" dataset) of the training dataset (scikit-learn CalibratedClassifierCV class). Each calibrator was trained using 5-fold validation and predictions from calibrators of each fold were averaged to produce the final predicted arbitration claim probability. The 'isotonic' calibration method was used in all calibrators.

As a result of the performance calibration, the performance of the trained machine learning output likelihoods (e.g., probabilities) were assessed using the sum of the receiver operating characteristic area under the curve (RO-CAUC), average precision (AP), "Arbitration Score", and negative Brier score. The Arbitration Score is the percent of arbitration claims found within the 5th percentile of predictions in the validation dataset.

The hyper-parameters of each of the trained machine learning risk models were optimized independently. The ray.tune library was used to implement the nevergrad.OneePlusOne algorithm to identify hyper-parameter combinations that maximized the overall validation set scores of each model output. Each group was budgeted to explore 300 parameter combinations, using 32 parallel workers. Each parameter combination was evaluated 5 times and the mean and standard deviations of the overall scores across the evaluations were computed. to identify parameter combinations that were more likely to consistently produce high overall scores, the search algorithm was set up to find the parameter combination that produced the highest mean minus 2 standard deviations overall score. The training process searched a hyper-parameter space configured with the following hyper-parameters and corresponding ranges: N_estimators, 16-256; Max_Depth, 1-75; Min_samples_split, 2-2024 (log sampling); Min_samples_leaf, 1-512 (log sampling); and calibration method, 'isotonic' or 'sigmoid.'

For risk models that use the rules-based filtering approach, if a model returns a defect score that is above a configured model-specific threshold, a set of conditions are checked to see if the detected defect presents an arbitration risk (e.g., a risk that the failure to disclose the defect will result in a subsequent purchaser of the vehicle filing an arbitration). In some embodiments, the conditions replicate the exclusion criteria defined in the ACV arbitration policy. For example, if any of a set of exclusion conditions are true, the detected defect is considered to be a low risk for arbitration. In some embodiments, the exclusion conditions include if the detected defect has already been disclosed by the inspector, if the car has very high mileage (e.g., over 175 k miles), if the vehicle was inoperable during inspection, if the true mileage of the vehicle is unknown, if the vehicle is considered a Powersports vehicle. In some embodiments, if none of the conditions are true, the detected defect is considered to be high-risk. Unlike some embodiments which use a machine learning-based approach, such as trained machine learning models 674, 676, and 678, the heuristic rules-based technique does not attempt to further quantify the arbitration claim probability beyond the binary low- or high-estimates.

Outputs 648 include the outputs from discrepancy detection techniques 656, in accordance with some embodiments of the technologies described herein. As shown in FIG. 6B, outputs 658 include risk of undercarriage defects 695, risk of engine bay audio defects 696, risk of dashboard defects 697, and risk of exterior or mechanical defects 698. The undercarriage defects, engine bay defects, dashboard defects, and exterior or mechanical defects may include the respective defects associated with those components, as described herein especially in connection with the machine learning based defect detection models described in connection to machine learning models 654. For example, risk of undercarriage defects 695 may include an indication for structural rust, as determined by trained structural rust machine learning risk model 676.

As a further example, engine bay audio defects 696 may include an indication for an engine defect and a component whine. The indication for the engine defect may be determined by trained engine noise machine learning risk model 674. The indication for the component whine may be determined by the rule-based risk analysis 684. The component whine output may include risk associated with transmission defects, air conditioning systems, and/or steering defects.

As a further example, dashboard defects 697 may include an indication for an odometer and warning lights. The indication for the odometer and/or the warning lights may be determined by the rule-based risk analysis 686.

As a further example, exterior/mechanical defects 698 may include an indication for a missing catalytic converter, virtual lift quality, windshield crack, paint meter readings, exterior body damage, vehicle interior damage, engine modifications, suspension modifications, oil leaks, and oil quality. The indication for the missing catalytic converter may be determined by a machine learning risk model. The indication for the virtual lift quality, windshield crack, paint meter readings, engine modifications, suspension modifications, oil leaks, and oil quality may be determined by rule-based risk analysis. The oil quality output may include risk associated with head gasket defects, engine overheating defects, and/or fluid leak defects. The exterior body damage and vehicle interior damage may be determined using any appropriate model. For example, the model may be a trained ML model that is trained to analyze images of taken of the exterior of the vehicle to detect defects to the exterior vehicle body. The model may be a trained ML model that is trained to analyze images taken of the interior of the vehicle to defects to the interior of the vehicle. Examples of trained ML models to analyze images is described in US Patent Publication number US2020/0322546A1, entitled "Vehicle Undercarriage Imaging System," referenced above.

For defect models that assess arbitration risk using the heuristic rule, the defect may be flagged for review by the prescreen team (a team of one or more reviewers) if the arbitration risk is considered to be 'high' and the defect probability is above a configurable defect review threshold. In some embodiments, the defect review threshold is between 0.5 to 0.1, 0.5 to 0.95, 0.7 to 0.95 or 0.8 to 0.95. The higher the threshold, the fewer condition reports meet the alert condition, and thus fewer condition reports are flagged for review. The prescreen team may be consulted periodically to adjust the thresholds and the review volume of each defect.

For defect models that use the ML-based approach to arbitration risk, the estimated arbitration claim risk probabilities are multiplied by the average claim cost to estimate the expected arbitration risk in dollars. In some embodiments, thresholds for the ML-based risk models are in dollars, ranging from $1 to $25. Similar to the heuristic rule approach, the prescreen team is consulted to adjust the thresholds and resulting review volumes. In some embodiments, other thresholds for the ML-based risk models may be used. For example, the threshold for the ML-based risk models may range from $0.50 to $100, $25 to $500, $100 to $1000, or $100 to $25,000.

IV. ML Techniques for Identifying Vehicle Defects from Images of Vehicle Undercarriages The inventors have appreciated that visual inspections of vehicles, as a technique to detect vehicle defects, are limited either by the experience of the inspector and/or by the visibility of vehicle defects. Some vehicle components may be difficult to identify and/or diagnose as defective. For example, vehicle components may be hidden from view and/or the presence of a vehicle defect may be subtle and easy to overlook when performing a vehicle inspection.

Accordingly, the inventors have recognized that analyzing vehicle images using trained machine learning models to detect defects may improve the accuracy of vehicle defect detection. For example, an image or video, acquired in connection with a vehicle inspection report, may depict a view of a portion of a vehicle (e.g., an images of the vehicle's undercarriage). The image or video of the vehicle may include indications of rust, flood damage, frame damage, missing components, aftermarket replacements, indications of fluid leaks, and non-standard components which may not easily be observed from the engine bay or exterior of the vehicle.

Therefore, the inventors have developed machine learning models for analyzing images acquired during a vehicle inspection using a mobile device (such as one of the mobile devices described in connection with FIG. 1 above). In some embodiments, the images analyzed may be obtained by an undercarriage imaging system. For example, a device with a camera that is configured to capture images of a vehicle as the vehicle is driven over the camera may be used collect one or more images of the vehicle's undercarriage. The image(s) may be processed (e.g., multiple images may be combined) to obtain an image of the vehicle's undercarriage. An example of such a device is described in US Patent Publication number US2020/0322546A1, entitled "Vehicle Undercarriage Imaging System," filed Apr. 2, 2019, the entire contents of which are incorporated by reference herein. The virtual lift system may use a mobile device such as a smartphone to capture images (e.g., mobile device 104 shown in FIG. 1).

According to some aspects of the technology described herein, trained machine learning models may be used to identify vehicle defects based on data collected during a vehicle inspection. The one or more trained machine learning models may process one or more images (e.g., a vehicle undercarriage image) to identify one or more vehicle defects. Some aspects of the technology described herein are directed to one or more trained machine learning models for evaluating the quality of an image of an undercarriage of a vehicle—embodiments of which are described herein including with reference to FIG. 7 through FIG. 9B in section IV.A, titled "ML Techniques for Assessing Image Quality." Some aspects of the technology described herein are directed to one or more trained machine learning models for detecting the presence of a catalytic converter in an image of an undercarriage of a vehicle—embodiments of which are described herein including with reference to FIG. 10 through FIG. 12 in section IV.B, titled "ML Techniques for Detecting Presence of a Catalytic Converter." Some aspects of the technology described herein are directed to one or more trained machine learning models for detecting the presence of (e.g., structural) rust on an undercarriage of a vehicle—embodiments of which are described herein including with reference to FIG. 13 through FIG. 15 in section IV.C, titled "ML Techniques for Identifying Presence of Rust in Vehicle Undercarriage Images."

IV.A ML Techniques for Assessing Image Quality

The inventors have appreciated that when image defects are present in an image, the defects may cause errors in the detection of vehicle defects. Trained machine learning models which are configured to process an input image to determine whether defects are present in the vehicle may similarly be impacted by the image defects. Trained machine learning models may analyze images of an undercarriage of a vehicle to provide insights into missing components, damaged components, or vehicle modifications. However, image defects may interfere with the accuracy of the one or more trained machine learning models. For example, an improperly cropped image may not have a sufficiently complete view of an image defect. As another example, glare in an image may obscure the detection of features in the image itself. Therefore, a model may obtain a false negative or false positive result when analyzing an image that includes an image defect.

The inventors have recognized that machine learning models trained to detect vehicle defects by processing images of a vehicle would improve the accuracy of the detection of particular vehicle defects by a subsequent trained machine learning model. Therefore, the inventors have developed one or more trained machine learning models to detect image defects within an undercarriage image of a vehicle such that the quality of an image may be verified prior to analysis by a defect detection machine learning model. Accordingly, through the use of the image defect detection machine learning model, false negatives and/or false positives produced by defect detection models when processing images, which include image defects, are be reduced and the accuracy of a vehicle inspection report which includes the results of the defect detection models would be improved. The techniques developed by the inventors improve vehicle image processing techniques and downstream analysis of such imagery.

Accordingly, some embodiments provide for a computer-implemented method to evaluate the quality of an image of an undercarriage of a vehicle using a trained ML model, the method comprising using at least one computer hardware processor to perform: (A) obtaining an image of the undercarriage of the vehicle (e.g., a composite image of the undercarriage of the vehicle having been generated by combining multiple images of the undercarriage of the vehicle); (B) processing the image using the trained ML model (e.g., a deep neural network model including a plurality of 2D convolutional layers and model parameters), the processing comprising: (1) generating image input from the image (e.g., by preprocessing the image); (2) processing the image input using the trained ML model (e.g., using values of the parameters and the image input) to obtain output indicative of presence of zero, one, or multiple image quality defects in the image of the undercarriage of the vehicle.

In some embodiments, the output indicates a plurality of defect likelihoods for a respective plurality of image quality defects (e.g., one or more of: an improper cropping defect, an insufficient detail defect, a dirty mirror defect, a glare defect, an incorrect trim defect, a lighting defect, and a recording defect), each of the plurality of defect likelihoods indicating a likelihood that the image of the undercarriage of the vehicle has a respective image quality defect of the plurality of image quality defects.

In some embodiments, the output indicates a likelihood that the image of the undercarriage of the vehicle is of sufficient quality for subsequent processing.

In some embodiments, the method further includes determining that the image of the undercarriage of the vehicle is of sufficient quality for subsequent processing when the likelihood that the image of the undercarriage of the vehicle is of sufficient quality for subsequent processing is greater than each of the plurality of defect likelihoods; and when it is determined that the image of the undercarriage of the vehicle is of sufficient quality for subsequent processing, processing the image of the undercarriage of the vehicle with one or more other trained ML models to determine whether the vehicle has one or more respective defects (e.g., a catalytic converter detection model, a rust detection model, a fluid leak detection model, etc.).

In some embodiments, the method further includes determining, based on the output, that the image of the undercarriage of the vehicle is of sufficient quality for subsequent processing; and when it is determined that the image of the undercarriage of the vehicle is of sufficient quality for subsequent processing, processing the image of the undercarriage of the vehicle with one or more other trained ML models to determine whether the vehicle has one or more respective defects.

In some embodiments, the one or more trained machine learning models includes a plurality of parameters (e.g., between one million and fifty million parameters) and processing the image input using the trained ML model to obtain the output indicative of the presence of zero, one, or multiple image quality defects in the image of the undercarriage of the vehicle comprises computing the output using values of the plurality of parameters and the image input.

In some embodiments, generating image input from the image includes subtracting, in each particular channel, mean pixel values in the particular channel of a training set of images on which the first and second trained ML models were trained; and dividing by a standard deviation of pixel values in the particular channel of the training set of images on which the first and second trained ML models were trained.

In some embodiments, the method may involve a first trained ML model trained to detect presence of rust on the undercarriage of the vehicle, and wherein processing the image of the undercarriage of the vehicle comprises processing the image of the undercarriage of the vehicle using the first trained ML to determine whether the undercarriage of the vehicle has rust.

In some embodiments, the one or more trained ML models comprises a second trained ML model trained to detect presence of catalytic converters in images of vehicles, and wherein processing the image of the undercarriage of the vehicle comprises processing the image of the undercarriage of the vehicle using the second trained ML model to detect the presence of a catalytic converter in the image of the undercarriage of the vehicle.

Figure 7:
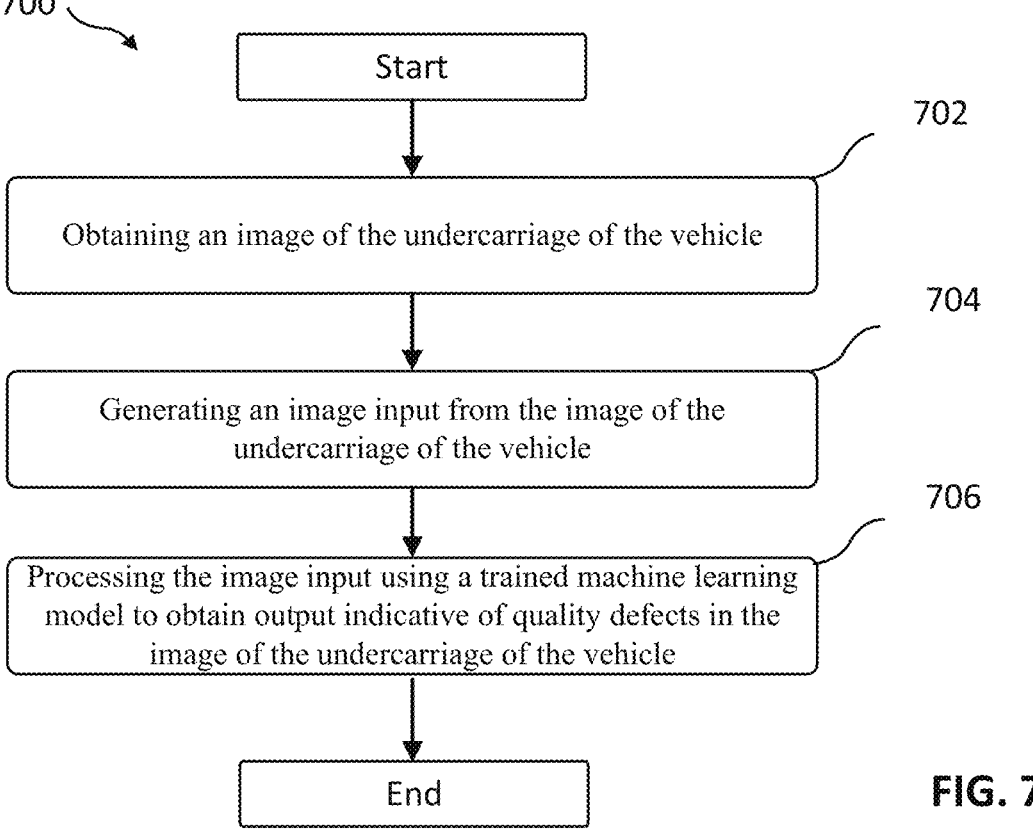
FIG. 7 is a flowchart of an illustrative process for using one or more trained machine learning models to evaluate the quality of an image of an undercarriage of a vehicle, in accordance with some embodiments of the technology described herein.

FIG. 7 is a flowchart of an illustrative process 700 for using one or more trained machine learning models to evaluate the quality of an image of an undercarriage of a vehicle, in accordance with some embodiments of the technology described herein. Process 700 may be executed by any suitable computing devices for example process 700 may be executed by a mobile device (e.g., mobile device 104), a server or servers (e.g., server(s) 129), or any other suitable computing device(s) including any of the devices described herein including with reference to FIG. 1.

Process 700 starts at act 702 by obtaining an image of the undercarriage of the vehicle. In some embodiments, obtaining the image of the undercarriage of the vehicle may include receiving a vehicle condition report including the image of the undercarriage. In some embodiments, obtaining the image of the undercarriage may include receiving a vehicle identifier and looking up, in a server associated with the vehicle diagnostic system, an image associated with the vehicle identifier. In some embodiments, obtaining the image of the undercarriage may involve obtaining a plurality of images, where each image of the plurality of images depicts a portion of the undercarriage of the vehicle. Accordingly, obtaining the image may include processing the plurality of images to output an undercarriage image. For example, the plurality of images may be acquired by an inspector using a mobile device directed at a mirror assembly while a vehicle is driven over the mirror assembly. The mobile device may be configured to repeatedly acquire an image in accordance with a time interval to capture the plurality of images. Accordingly, each image in the plurality of images will include a view of a different portion of the vehicle undercarriage which corresponded to the portion of the undercarriage which was visible to the camera sensor of the mobile device in the mirror assembly while the vehicle passed over the assembly.

In some embodiments, the image of the undercarriage of the vehicle may be generated from a video acquired by a mobile device of the undercarriage of a vehicle as it is driven over the mobile device. For example, portions of frames of the video may be extracted to form multiple images which may be combined into a composite image depicting the undercarriage of the vehicle. In some embodiments, the image of the undercarriage of the vehicle may be a single image acquired of the undercarriage of the vehicle. For example, the vehicle may be elevated on a mechanical lift such that a mobile device may capture an image of the full view of the undercarriage of the vehicle with a single image frame.

Next process 700 proceeds to act 704 where an image input is generated from the image of the undercarriage of the vehicle. Generating the image input from the image of the undercarriage of the vehicle includes an image processing technique. In some embodiments, the image processing technique includes normalizing the image per channel. For example, normalizing each channel of the image may include subtracting a mean pixel value in a particular channel of a training set of images, on which the one or more trained machine learning models was trained, for each respective channel of the image. Following subtraction, normalizing the image may further include dividing each channel of the image by a standard deviation of pixel values for the particular channel of the training set of images, on which the one or more trained machine learning models was trained. In some embodiments, the image processing technique includes a thresholding technique. In some embodiments, the image processing technique includes a noise reduction technique. In some embodiments, a combination of two or more image processing techniques may be used.

Next process 700 proceeds to act 706 where the image input is processed using one or more trained machine learning models to obtain output indicative of quality defects in the image of the undercarriage of the vehicle. The output of the one or more trained machine learning models may indicate the presence of zero, one, or multiple image quality defects in the image of the undercarriage of the vehicle, in accordance with some embodiments of the technology described herein.

The machine learning model may be any suitable machine learning model. In some embodiments, the one or more trained machine learning models is a deep neural network model. For example, the one or more trained machine learning models may include a plurality of 2D convolutional layers. The one or more trained machine learning models may further include a batch normalization layer, an activation layer, and a 2D pooling layer.

The one or more trained machine learning models may include a number of trainable and non-trainable parameters. Accordingly, processing the image input using the one or more trained machine learning models to obtain the output indicative of the presence of image quality defects in the image may include computing the output of the model using the values of the number of parameters and the image input. In some embodiments, the one or more trained machine learning models includes between 500,000 and 100 million parameters, 1 million and 50 million parameters, 5 million and 40 million parameters, or 10 million and 30 million parameters. For example, trained machine learning model may include approximately 21 million trainable parameters and no non-trainable parameters. In some embodiments, the one or more trained machine learning models may additionally include a plurality of non-trainable parameters.

The output obtained by processing the input image, using the one or more trained machine learning models, indicates one or more image quality defects that may be present in the image of the undercarriage of the vehicle. In some embodiments, the output indicates a plurality of defect likelihoods for a respective plurality of image quality defects, each of the plurality of defect likelihoods indicating a likelihood that the image of the undercarriage of the vehicle has a respective image quality defect of the plurality of image quality defects. For example, the output may indicate a likelihood, such as a probability indicated as a numeric value between zero and one, that a first image quality defect is present in the image of the undercarriage of the vehicle as well as the type of the indicated first image quality defect. The output may further indicate a likelihood that a second image quality defect is present in the image of the undercarriage of the vehicle as well as the type of the indicated second image quality defect. In some embodiments, the output may be limited to image quality defects associated with a likelihood above a threshold value. For example, a threshold value, indicative of the probability that the image quality defect is present, may be 0.5, 0.7, 0.8, 0.9, or 0.95. Accordingly, each image quality defect with a corresponding likelihood larger than the threshold value may be included in the output while image quality defects with a corresponding likelihood smaller than the threshold value may not be included in the output. Additionally, or alternatively, the listing of each type of potential image quality defect may include image quality defects associated with a likelihood above a threshold value specific to the respective image quality defect. For example, rather than having a single threshold value used to determine whether the image quality defects should be included in the output, each likelihood of a respective image quality defect may be compared to a threshold value determined for that particular image quality defect.

In some embodiments, a complete listing of each type of potential image quality defect may be included in the output and the corresponding likelihoods for each respective type of image quality defect may be included in the listing. In some embodiments, the plurality of image defects includes one or more image defects selected from the group consisting of: an improper cropping defect, an insufficient detail defect, a dirty mirror defect, a glare defect, an incorrect trim defect, a lighting defect, and a recording defect. These defects are described further in connection with FIG. 9B below.

In some embodiments, the output indicates a likelihood that the image of the undercarriage of the vehicle is of sufficient quality for subsequent processing. For example, the one or more trained machine learning models may determine that the image of the undercarriage of the vehicle is of sufficient quality for subsequent processing when the likelihood that the image of the undercarriage of the vehicle is of sufficient quality for subsequent processing is greater than each of the plurality of defect likelihoods. As another example, determining that the image of the undercarriage of the vehicle is of sufficient quality for subsequent processing may include determining that a likelihood associated with the image of the undercarriage being of sufficient quality is larger than each of the likelihoods of respective image quality defects being present in the image of the undercarriage by a threshold amount. The threshold amount may be 5%, 10%, 20%, or 30% greater than the likelihood of the image defect that is determined to be the most likely to be present.

Accordingly, when it is determined that the image of the undercarriage of the vehicle is of sufficient quality for subsequent processing, the image of the undercarriage of the vehicle is processed with one or more other trained machine learning models to determine whether the vehicle has one or more respective vehicle defects. For example, one or more trained machine learning models may be trained to detect the presence of rust on the undercarriage, frame, and rocker panels of the vehicle. Accordingly, processing the image of the vehicle using the one or more trained machine learning models may include processing the images of the vehicle using the one or more trained machine learning models to determine whether the vehicle has rust on any of the photographed components. As another example, one or more trained machine learning models may be trained to detect the presence of a catalytic converter in images of the undercarriage of the vehicle. Accordingly, processing the image of the undercarriage using the one or more trained machine learning models may include processing the image of the undercarriage of the vehicle using the one or more trained machine learning models to detect the presence of a catalytic converter in the image of the undercarriage of the vehicle.

Figure 8:
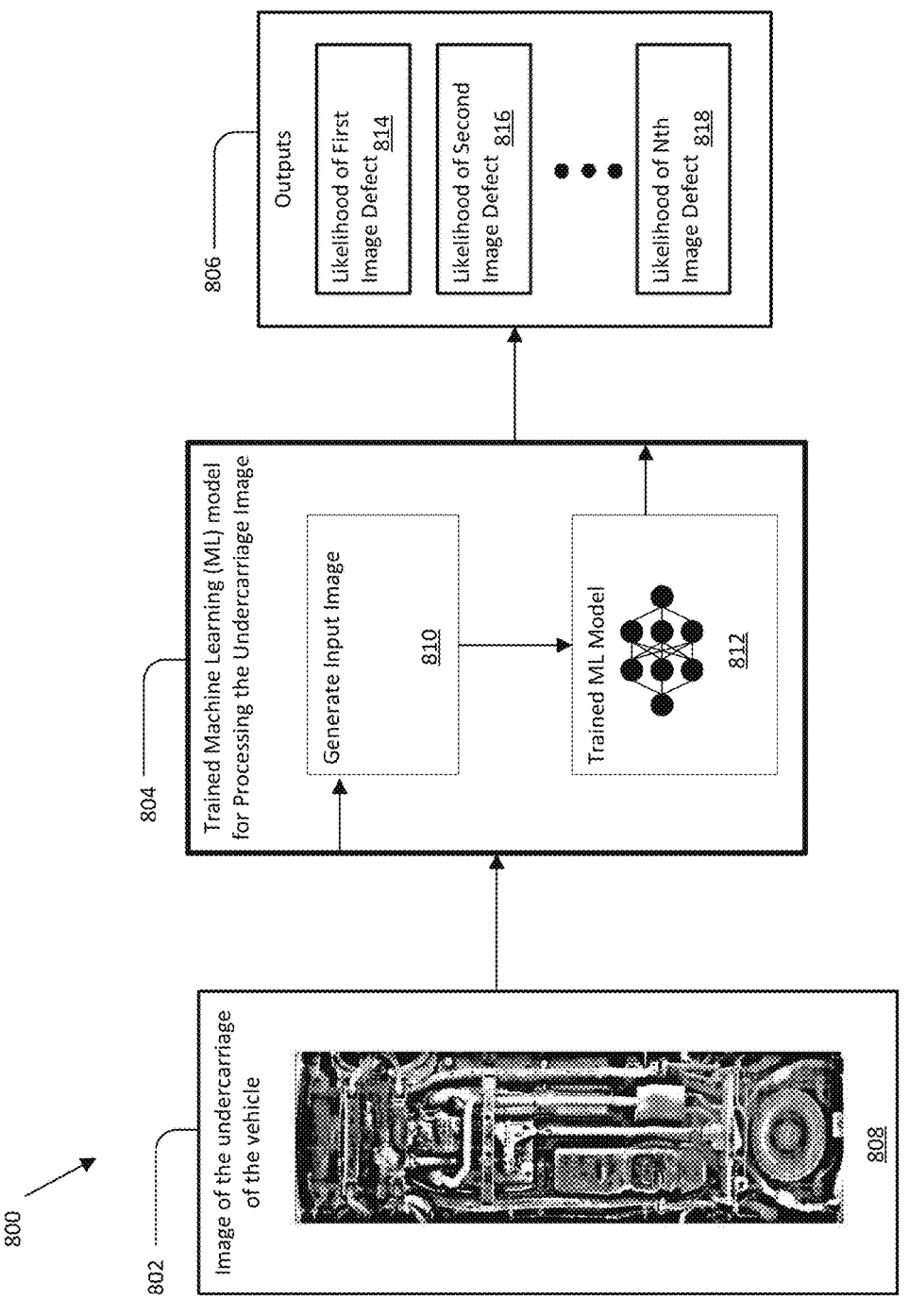
FIG. 8 illustrates one or more trained machine learning models for processing data about a vehicle to evaluate the quality of an image of an undercarriage of a vehicle, in accordance with some embodiments of the technology described herein.

FIG. 8 illustrates one or more trained machine learning models 800 for processing data about a vehicle to evaluate the quality of an image of an undercarriage of a vehicle, in accordance with some embodiments of the technology described herein. As shown in FIG. 8, trained machine learning model 800 includes trained machine learning model 804 for processing the undercarriage image 802 to obtain outputs 806.

In some embodiments, the image 808 of the undercarriage of the vehicle may be a series of images acquired of different views of the undercarriage of the vehicle or may be a single image constructed from processing a series of images as described herein. The image may include multiple color channels and may be formatted in any suitable image format. For example, the image may be a Joint Photographic Expert Group (JPEG) image or a Portable Network Graphics (PNG) image, where each pixel has a corresponding value indicating the red, blue, and green color components.

In some embodiments, the undercarriage image processed by the model may have a resolution of 650×224. The resolution of the undercarriage image may be upsampled (e.g., the number of pixels may be increased) or downsampled (e.g., the number of pixels may be reduced) such that the smaller dimension of the image is a same dimension as an input to the convolutional neural network architecture. For example, if the convolutional neural network is engineered for 224×224 inputs, the undercarriage image may be input as an image having 224 pixels for the width, and 650 pixels for the height to match the average aspect ratio of the images. In some embodiments, the images are resized using bilinear interpolation.

Trained machine learning model 804 for processing the undercarriage image of the vehicle may include preprocessing to generate in input image 810 and trained machine learning model 812. Preprocessing to generate in input image 810 may modify at least one characteristic of the image of the undercarriage of the vehicle, prior to the image being processed by the trained machine learning model 812. Preprocessing to generate in input image 810 may include any of the image processing techniques described above in connection with act 704 of FIG. 7.

In some embodiments, preprocessing 810 may normalize each channel of the image of the undercarriage of the vehicle based on a statistical average and standard deviation for each particular channel in a training set of images on which the one or more trained machine learning models was trained. For example, the images may be normalized using the mean pixel values and standard deviation of the virtual lift image dataset that it was trained on.

In some embodiments, the normalization process may use a mean value for the red channel between 0.3 and 0.4. The normalization process may use a standard deviation value for the red channel between 0.1 and 0.3. For example, the mean value for the red channel may be 0.3127. The standard deviation value for the red channel may be 0.1930.

In some embodiments, the normalization process may use a mean value for the green channel between 0.25 and 0.35. The normalization process may use a standard deviation value for the green channel between 0.1 and 0.3. For example, the mean value for the green channel may be 0.3002. The standard deviation value for the green channel may be 0.1789.

In some embodiments, the normalization process may use a mean value for the blue channel between 0.25 and 0.35. The normalization process may use a standard deviation value for the blue channel between 0.1 and 0.3. For example, the mean value for the blue channel may be 0.2871. The standard deviation value for the blue channel may be 0.1680.

Trained machine learning model 812 may be any suitable machine learning model for image analysis. In some embodiments, trained machine learning model 812 is a 2D convolutional neural network. For example, trained machine learning model 812 may be a 2D convolutional neural network having the layers described in Table 4 below.

TABLE 4

| Layer # | Layer Type | Output Shape | Parameters |
| --- | --- | --- | --- |
| 1 | Conv2d-1 | [−1, 64, 325, 112] | 9,408 |
| 2 | BatchNorm2d-2 | [−1, 64, 325, 112] | 128 |
| 3 | ReLU-3 | [−1, 64, 325, 112] | 0 |
| 4 | MaxPool2d-4 | [−1, 64, 163, 56] | 0 |
| 5 | Conv2d-5 | [−1, 64, 163, 56] | 36,864 |
| 6 | BatchNorm2d-6 | [−1, 64, 163, 56] | 128 |
| 7 | ReLU-7 | [−1, 64, 163, 56] | 0 |
| 8 | Conv2d-8 | [−1, 64, 163, 56] | 36,864 |
| 9 | BatchNorm2d-9 | [−1, 64, 163, 56] | 128 |
| 10 | ReLU-10 | [−1, 64, 163, 56] | 0 |
| 11 | BasicBlock-11 | [−1, 64, 163, 56] | 0 |
| 12 | Conv2d-12 | [−1, 64, 163, 56] | 36,864 |
| 13 | BatchNorm2d-13 | [−1, 64, 163, 56] | 128 |
| 14 | ReLU-14 | [−1, 64, 163, 56] | 0 |
| 15 | Conv2d-15 | [−1, 64, 163, 56] | 36,864 |
| 16 | BatchNorm2d-16 | [−1, 64, 163, 56] | 128 |
| 17 | ReLU-17 | [−1, 64, 163, 56] | 0 |
| 18 | BasicBlock-18 | [−1, 64, 163, 56] | 0 |
| 19 | Conv2d-19 | [−1, 64, 163, 56] | 36,864 |

TABLE 4-continued

| Layer # | Layer Type | Output Shape | Parameters |
| --- | --- | --- | --- |
| 20 | BatchNorm2d-20 | [−1, 64, 163, 56] | 128 |
| 21 | ReLU-21 | [−1, 64, 163, 56] | 0 |
| 22 | Conv2d-22 | [−1, 64, 163, 56] | 36,864 |
| 23 | BatchNorm2d-23 | [−1, 64, 163, 56] | 128 |
| 24 | ReLU-24 | [−1, 64, 163, 56] | 0 |
| 25 | BasicBlock-25 | [−1, 64, 163, 56] | 0 |
| 26 | Conv2d-26 | [−1, 128, 82, 28] | 73,728 |
| 27 | BatchNorm2d-27 | [−1, 128, 82, 28] | 256 |
| 28 | ReLU-28 | [−1, 128, 82, 28] | 0 |
| 29 | Conv2d-29 | [−1, 128, 82, 28] | 147,456 |
| 30 | BatchNorm2d-30 | [−1, 128, 82, 28] | 256 |
| 31 | Conv2d-31 | [−1, 128, 82, 28] | 8,192 |
| 32 | BatchNorm2d-32 | [−1, 128, 82, 28] | 256 |
| 33 | ReLU-33 | [−1, 128, 82, 28] | 0 |
| 34 | BasicBlock-34 | [−1, 128, 82, 28] | 0 |
| 35 | Conv2d-35 | [−1, 128, 82, 28] | 147,456 |
| 36 | BatchNorm2d-36 | [−1, 128, 82, 28] | 256 |
| 37 | ReLU-37 | [−1, 128, 82, 28] | 0 |
| 38 | Conv2d-38 | [−1, 128, 82, 28] | 147,456 |
| 39 | BatchNorm2d-39 | [−1, 128, 82, 28] | 256 |
| 40 | ReLU-40 | [−1, 128, 82, 28] | 0 |
| 41 | BasicBlock-41 | [−1, 128, 82, 28] | 0 |
| 42 | Conv2d-42 | [−1, 128, 82, 28] | 147,456 |
| 43 | BatchNorm2d-43 | [−1, 128, 82, 28] | 256 |
| 44 | ReLU-44 | [−1, 128, 82, 28] | 0 |
| 45 | Conv2d-45 | [−1, 128, 82, 28] | 147,456 |
| 46 | BatchNorm2d-46 | [−1, 128, 82, 28] | 256 |
| 47 | ReLU-47 | [−1, 128, 82, 28] | 0 |
| 48 | BasicBlock-48 | [−1, 128, 82, 28] | 0 |
| 49 | Conv2d-49 | [−1, 128, 82, 28] | 147,456 |
| 50 | BatchNorm2d-50 | [−1, 128, 82, 28] | 256 |
| 51 | ReLU-51 | [−1, 128, 82, 28] | 0 |
| 52 | Conv2d-52 | [−1, 128, 82, 28] | 147,456 |
| 53 | BatchNorm2d-53 | [−1, 128, 82, 28] | 256 |
| 54 | ReLU-54 | [−1, 128, 82, 28] | 0 |
| 55 | BasicBlock-55 | [−1, 128, 82, 28] | 0 |
| 56 | Conv2d-56 | [−1, 256, 41, 14] | 294,912 |
| 57 | BatchNorm2d-57 | [−1, 256, 41, 14] | 512 |
| 58 | ReLU-58 | [−1, 256, 41, 14] | 0 |
| 59 | Conv2d-59 | [−1, 256, 41, 14] | 589,824 |
| 60 | BatchNorm2d-60 | [−1, 256, 41, 14] | 512 |
| 61 | Conv2d-61 | [−1, 256, 41, 14] | 32,768 |
| 62 | BatchNorm2d-62 | [−1, 256, 41, 14] | 512 |
| 63 | ReLU-63 | [−1, 256, 41, 14] | 0 |
| 64 | BasicBlock-64 | [−1, 256, 41, 14] | 0 |
| 65 | Conv2d-65 | [−1, 256, 41, 14] | 589,824 |
| 66 | BatchNorm2d-66 | [−1, 256, 41, 14] | 512 |
| 67 | ReLU-67 | [−1, 256, 41, 14] | 0 |
| 68 | Conv2d-68 | [−1, 256, 41, 14] | 589,824 |
| 69 | BatchNorm2d-69 | [−1, 256, 41, 14] | 512 |
| 70 | ReLU-70 | [−1, 256, 41, 14] | 0 |
| 71 | BasicBlock-71 | [−1, 256, 41, 14] | 0 |
| 72 | Conv2d-72 | [−1, 256, 41, 14] | 589,824 |
| 73 | BatchNorm2d-73 | [−1, 256, 41, 14] | 512 |
| 74 | ReLU-74 | [−1, 256, 41, 14] | 0 |
| 75 | Conv2d-75 | [−1, 256, 41, 14] | 589,824 |
| 76 | BatchNorm2d-76 | [−1, 256, 41, 14] | 512 |
| 77 | ReLU-77 | [−1, 256, 41, 14] | 0 |
| 78 | BasicBlock-78 | [−1, 256, 41, 14] | 0 |
| 79 | Conv2d-79 | [−1, 256, 41, 14] | 589,824 |
| 80 | BatchNorm2d-80 | [−1, 256, 41, 14] | 512 |
| 81 | ReLU-81 | [−1, 256, 41, 14] | 0 |
| 82 | Conv2d-82 | [−1, 256, 41, 14] | 589,824 |
| 83 | BatchNorm2d-83 | [−1, 256, 41, 14] | 512 |
| 84 | ReLU-84 | [−1, 256, 41, 14] | 0 |
| 85 | BasicBlock-85 | [−1, 256, 41, 14] | 0 |
| 86 | Conv2d-86 | [−1, 256, 41, 14] | 589,824 |
| 87 | BatchNorm2d-87 | [−1, 256, 41, 14] | 512 |
| 88 | ReLU-88 | [−1, 256, 41, 14] | 0 |
| 89 | Conv2d-89 | [−1, 256, 41, 14] | 589,824 |
| 90 | BatchNorm2d-90 | [−1, 256, 41, 14] | 512 |
| 91 | ReLU-91 | [−1, 256, 41, 14] | 0 |
| 92 | BasicBlock-92 | [−1, 256, 41, 14] | 0 |
| 93 | Conv2d-93 | [−1, 256, 41, 14] | 589,824 |
| 94 | BatchNorm2d-94 | [−1, 256, 41, 14] | 512 |
| 95 | ReLU-95 | [−1, 256, 41, 14] | 0 |
| 96 | Conv2d-96 | [−1, 256, 41, 14] | 589,824 |
| 97 | BatchNorm2d-97 | [−1, 256, 41, 14] | 512 |

TABLE 4-continued

| Layer # | Layer Type | Output Shape | Parameters |
|---|---|---|---|
| 98 | ReLU-98 | [−1, 256, 41, 14] | 0 |
| 99 | BasicBlock-99 | [−1, 256, 41, 14] | 0 |
| 100 | Conv2d-100 | [−1, 512, 21, 7] | 1,179,648 |
| 101 | BatchNorm2d-101 | [−1, 512, 21, 7] | 1,024 |
| 102 | ReLU-102 | [−1, 512, 21, 7] | 0 |
| 103 | Conv2d-103 | [−1, 512, 21, 7] | 2,359,296 |
| 104 | BatchNorm2d-104 | [−1, 512, 21, 7] | 1,024 |
| 105 | Conv2d-105 | [−1, 512, 21, 7] | 131,072 |
| 106 | BatchNorm2d-106 | [−1, 512, 21, 7] | 1,024 |
| 107 | ReLU-107 | [−1, 512, 21, 7] | 0 |
| 108 | BasicBlock-108 | [−1, 512, 21, 7] | 0 |
| 109 | Conv2d-109 | [−1, 512, 21, 7] | 2,359,296 |
| 110 | BatchNorm2d-110 | [−1, 512, 21, 7] | 1,024 |
| 111 | ReLU-111 | [−1, 512, 21, 7] | 0 |
| 112 | Conv2d-112 | [−1, 512, 21, 7] | 2,359,296 |
| 113 | BatchNorm2d-113 | [−1, 512, 21, 7] | 1,024 |
| 114 | ReLU-114 | [−1, 512, 21, 7] | 0 |
| 115 | BasicBlock-115 | [−1, 512, 21, 7] | 0 |
| 116 | Conv2d-116 | [−1, 512, 21, 7] | 2,359,296 |
| 117 | BatchNorm2d-117 | [−1, 512, 21, 7] | 1,024 |
| 118 | ReLU-118 | [−1, 512, 21, 7] | 0 |
| 119 | Conv2d-119 | [−1, 512, 21, 7] | 2,359,296 |
| 120 | BatchNorm2d-120 | [−1, 512, 21, 7] | 1,024 |
| 121 | ReLU-121 | [−1, 512, 21, 7] | 0 |
| 122 | BasicBlock-122 | [−1, 512, 21, 7] | 0 |
| 123 | AdaptiveAvgPool2d-123 | [−1, 512, 1, 1] | 0 |
| 124 | Linear-124 | [−1, 8] | 4,104 |

The trained machine learning model shown in Table 4 includes 21,288,776 total parameters. All of the 21,288,776 parameters are trainable parameters and there are zero non-trainable parameters. The input size for the model is 1.67 MB. The forward/backward pass size is 281.18 MB. The parameter size is 81.21 MB. The estimated total size is 364.06 MB.

To train the 2D convolutional neural network, a data set of "bad" virtual lift images, which included one or more image quality defects, were identified and obtained through the investigation of false positive predictions from the catalytic converter detection model, described below. A false positive prediction can be identified an output from the catalytic converter detection model which predicts that no catalytic converters are present when there are actually catalytic converters on the vehicle. Through this investigation eight main classifications of virtual lift image quality and defects were identified. The data set of "bad" virtual lift images was partitioned into a training set and a validation set. The training set having 880 virtual lift images and the validation set having 219 virtual lift images. For training, the training configuration for the model included ten Epochs, an Adam optimization algorithm, a learning rate of 0.0001, an ImageNet pretrained weight initialization, and a loss configuration of binary cross entropy with logits. The model and training scripts were written in Python using the PyTorch deep learning framework.

Outputs 806 may include a list of image defects and the respective likelihood of the defect being present in the image of the undercarriage of the vehicle. As shown in FIG. 8 outputs 806 include the likelihood of a first image defect 814, the likelihood of a second image defect 816, and a likelihood of an $n^{th}$ image defect 818. For example, when n=8 there may be 8 output classes (e.g., types of image defects) including 7 defect classes and one affirmative quality class. The seven defect classes may include, incorrect cropping, insufficient detail, dirty mirror, haze or glare, incorrect trim, poor lighting, and bad virtual lift. For example, the defect classes may include labels such as "incorrect_crop_box", "insufficient_detail", "dirty_mirror", "haze_glare", "incorrect_trim", "poor_lighting", "bad_vl"—respectively. The one affirmative quality class may indicate that the undercarriage image is of sufficient quality for further processing by one or more trained machine learning models trained to identify a vehicle defect based on the undercarriage image. For example, the affirmative quality class may include a label such as "good_reconstruction." In some embodiments, additional classes may be included corresponding to additional image defects which may be detected by the one or more trained machine learning models. In some embodiments, the output of the model is an 8-dimensional vector, where the maximum value corresponds to the highest probability classification. The 8-dimensions may each indicate which error category is present in the virtual lift image.

Figure 9A:
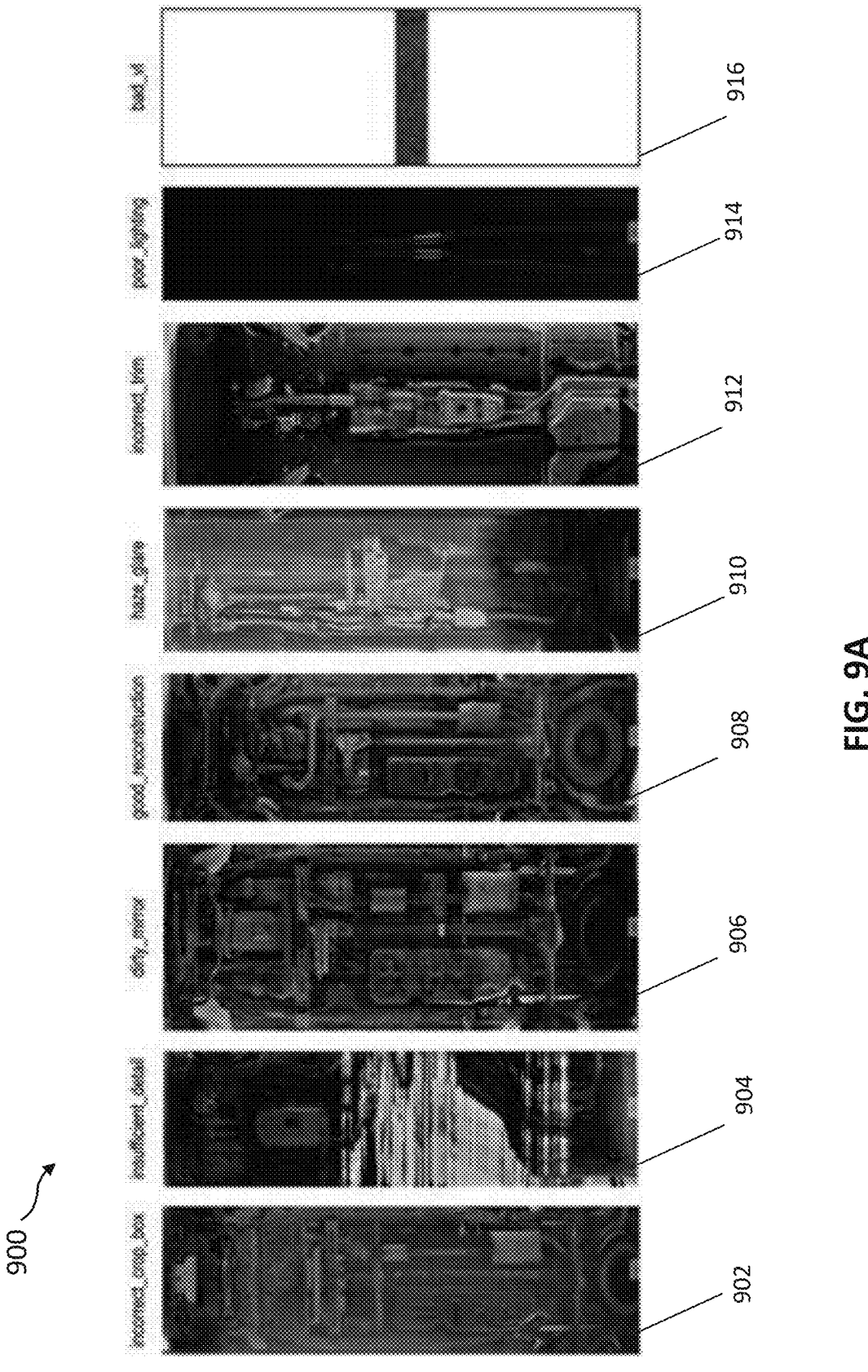
FIG. 9A illustrates examples of images associated with the output classes of a trained image defect detection machine learning model, in accordance with some embodiments of the technology described herein.

FIG. 9A illustrates examples of images 900 associated with the output classes of a trained image defect detection machine learning model, in accordance with some embodiments of the technology described herein. As shown in image 902, incorrect cropping can be identified by the presence of an orange line on the side of the image, resulting from poor image cropping. As shown in image 904, insufficient detail, which appears in the reconstruction as a choppy elongated image, is caused due to a software error during image reconstruction. As shown in image 906, a dirty mirror may cause the presence of lines/stripes down the image which is the result of the mirror of the virtual lift system being dirty. As shown in image 910, haze or glare can be identified through the presence of high image brightness and is caused by light reflecting off of the virtual lift mirror into the camera. As shown in image 912, incorrect trim is a result where an end section of the vehicle undercarriage is not captured in the view of the photo and is caused by incorrect/poor trimming of the image. As shown in image 914, poor lighting is a dark image resulting from poor lighting of the vehicle undercarriage during the time that the photo was taken. As shown in image 916, bad virtual lift is a small image of only the mirror, which is the result of having a recording issue. As shown in image 908, affirmative quality class is a usable, high-quality photo which includes adequate lighting, high resolution, and full end-to-end display of the undercarriage. Any image could have more than one of these image defects, and as a result can be labeled with multiple classes in the output.

Figure 9B:
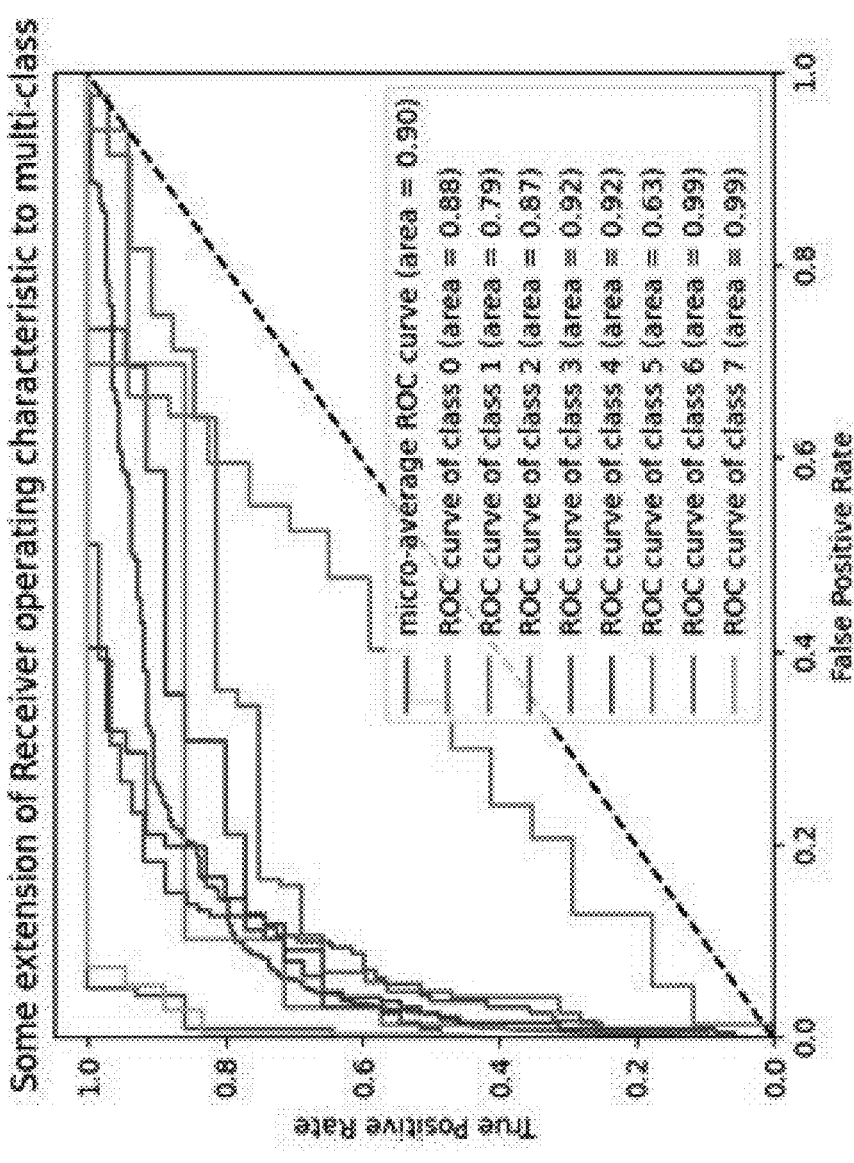
FIG. 9B illustrates receiver operating characteristic (ROC) curves representing the performance of a trained image defect detection machine learning model, in accordance with some embodiments of the technology described herein.

FIG. 9B illustrates receiver operating characteristic curves 920 representing the performance of a trained image defect detection machine learning model, in accordance with some embodiments of the technology described herein. The eight curves are numbered 0-7, and the corresponding labels are included in Table 5 below along with the corresponding ROC Score for each curve.

TABLE 5

| Output | Class Name | ROC Score |
|---|---|---|
| 0 | "Incorrect_crop_box_score" | 0.88 |
| 1 | 'Insufficient_detail_score' | 0.79 |
| 2 | 'Dirty_mirror_score' | 0.87 |
| 3 | 'good_reconstruction_score' | 0.92 |
| 4 | 'haze_glare_score' | 0.92 |
| 5 | 'incorrect_trim_score' | 0.63 |
| 6 | 'poor_lighting_score' | 0.99 |
| 7 | 'Bad_vl_score' | 0.99 |

IV.B ML Techniques for Detecting Presence of a Catalytic Converter

The inventors have appreciated that it can be difficult to determine whether or not a vehicle is missing a catalytic converter due to the difficulty in knowing where the catalytic converter should be located in the vehicle. The location of a catalytic converter for a given make, model, and year of a vehicle may be highly variable. Accordingly, the inventors have recognized that a machine learning model trained to identify the presence of a catalytic converter in an image will improve reliability of detecting catalytic converters across vehicle makes and models.

However, the inventors have recognized that a significant challenge for implementing one or more trained machine learning models, to identify whether a catalytic converter is present or absent from a vehicle, is determining whether a vehicle has any visible catalytic converters in the first place. For example, on some newer vehicles, the catalytic converter is hidden behind an underbody panel or tucked out of sight in a location downpipe of the exhaust. As a result, when a catalytic converter detection model returns an output that it detected no catalytic converters, it can be difficult to be sure if the catalytic converters are missing or hidden.

Therefore, the inventors have developed one or more trained machine learning models that includes a portion trained as a hidden catalytic converter classifier. The hidden catalytic converter portion of the model is trained to process an input image of the vehicle undercarriage to detect if a vehicle has hidden or visible catalytic converters independent of the actual presence of a catalytic converter. For example, a vehicle that is missing a visible catalytic converter may show no catalytic converter detections from an object detection portion of the model but will have a visible catalytic converter classification which indicates that there is something wrong with the vehicle.

Accordingly, some embodiments provide for a computer-implemented method to detect presence of a catalytic converter in an image of an undercarriage of a vehicle, the method comprising using at least one computer hardware processor to perform: (A) obtaining an image of the undercarriage of the vehicle (e.g., the image of the undercarriage of the vehicle is a composite image of the undercarriage of the vehicle having been generated by combining multiple images of the undercarriage of the vehicle); (B) generating image input from the image of the undercarriage of the vehicle (e.g., by preprocessing the image of the undercarriage of the vehicle); and (C) processing the image input using multiple trained machine learning models to determine a probability that the catalytic converter is present in the image, the processing comprising: (1) processing the image input using a first trained machine learning model (e.g., a deep neural network model including a plurality of 2D convolutional layers and a spatial pyramid pooling layer and a plurality of parameters), which is trained to detect catalytic converters in vehicle undercarriage images, to obtain first output indicating zero, one, or multiple catalytic converter detections and corresponding confidences; (2) processing the image input using a second trained machine learning model (e.g., a deep neural network classification model including a plurality of 2D convolutional layers and a plurality of parameters), which is trained to determine from vehicle undercarriage images whether vehicles have visible catalytic converters, to obtain second output indicating a likelihood that the vehicle has a visible catalytic converter; and (3) determining a probability that the catalytic converter is present in the image using the first output and the second output.

In some embodiments, determining a probability that the catalytic converter is present in the image using the first output and the second output includes: identifying, from the first output, a catalytic converter detection having a highest confidence; and determining the probability that the catalytic converter is present in the image as a product of the highest confidence and the likelihood that the vehicle has a visible catalytic converter.

In some embodiments, determining a probability that the catalytic converter is present in the image using the first output and the second output includes: identifying, from the first output, a catalytic converter detection having a highest confidence; and determining that a catalytic converter is missing from the vehicle when the highest confidence is below a first threshold and the likelihood that the vehicle has a visible catalytic converter is above a second threshold.

In some embodiments, the first trained machine learning model includes a plurality of parameters (e.g., between one million and one hundred million parameters) and processing the image input using the first trained ML model to obtain the first output indicating zero, one, or multiple catalytic converter detections and corresponding confidences comprises computing the first output using values of the plurality of parameters and the image input.

In some embodiments, the second trained machine learning model includes a plurality of parameters (e.g., between one million and one fifty million) and processing the image input using the second trained ML model to obtain the second output indicating the likelihood that the vehicle has a visible catalytic converter comprises computing the second output using values of the second plurality of parameters and the image input.

In some embodiments, generating image input from the image includes subtracting, in each particular channel, mean pixel values in the particular channel of a training set of images on which the first and second trained ML models were trained; and dividing by a standard deviation of pixel values in the particular channel of the training set of images on which the first and second trained ML models were trained.

In some embodiments, the first trained ML model is implemented using architecture of the YOLOv5 object detection neural network.

FIG. 10 is a flowchart of an illustrative process 1000 for using one or more trained machine learning models to detect the presence of a catalytic converter based on an image of an undercarriage of a vehicle, in accordance with some embodiments of the technology described herein. Process 1000 may be executed by any suitable computing device(s). For example, process 1000 may be executed by a mobile device (e.g., mobile device 104), a server or servers (e.g., server(s) 129), or any other suitable computing device(s) including any of the devices described herein including with reference to FIG. 1. Prior to the start of process 1000, an image of the undercarriage of the vehicle may be processed by one or more trained machine learning models to determine whether the image of the undercarriage is of sufficient quality to be processed by a subsequent trained machine learning model to detect the presence of a catalytic converter in the image of the undercarriage of the vehicle. For example, process 700 described above in connection with FIG. 7 may be used to process the image of the undercarriage to obtain an output indicative of the presence of zero, one, or multiple image quality defects in the image of the undercarriage of the vehicle in connection with determining whether the image of the undercarriage of the vehicle is of sufficient quality for subsequent processing.

Process 1000 starts at act 1002 by obtaining an image of the undercarriage of the vehicle. In some embodiments, the image of the undercarriage of the vehicle may be a composite image having been generated by combining multiple images of the undercarriage of the vehicle. For example, the image of the undercarriage of the vehicle may have been acquired using a mobile device in connection with a virtual lift system, as described herein.

Next process 1000 proceeds to act 1004 where an image input from the image of the undercarriage of the vehicle is generated. Generating the image input from the image of the undercarriage of the vehicle may include an image processing technique. The image processing technique may be any image processing technique as described herein. In some embodiments, the image processing technique includes normalizing each color channel of the image, as described herein. For example, normalizing each channel of the image may include subtracting a mean pixel value of a training set of images, on which the one or more trained machine learning models was trained, for each respective particular channel of the image. Following subtraction, normalizing the image may further include dividing each channel of the image by a standard deviation of pixel values in the particular channel of the training set of images on which the one or more trained machine learning models was trained.

Next process 1000 proceeds to act 1006 where the image input is processed using a first trained machine learning model to obtain catalytic converter detections and corresponding confidences. In some embodiments, the first trained machine learning model is a deep neural network classification model trained for object detection. For example, the first trained machine learning model may include a series of 2D convolutional layers and a spatial pyramid pooling layer. In some embodiments, the first trained ML model is implemented using a YOLOv5 architecture in an object detection neural network. Aspects of the YOLOv5 architecture are described herein as well as in Bin Yan, et al. "A Real-Time Apple Targets Detection Method for Picking Robot Based on Improved YOLOv5" Remote Sens. 2021, which is incorporated by reference herein its entirety.

The one or more trained machine learning models may include a number of trainable and non-trainable parameters. Accordingly, processing the image input using the one or more trained machine learning models to obtain the output indicative of the presence of image quality defects in the image may include computing the output of the model using the values of the number of parameters and the image input. In some embodiments, the one or more trained machine learning models includes between 500,000 and 200 million parameters, 1 million and 150 million parameters, 5 million and 100 million parameters, 10 million and 60 million parameters, or 30 million and 60 million parameters. For example, the one or more trained machine learning models may include approximately 47 million trainable parameters and no non-trainable parameters.

Processing the image input using the first trained machine learning model to obtain the first output may include obtaining an output indicating zero, one, or multiple catalytic converter detections and corresponding confidences by computing the first output using values of the plurality of parameters and the image input. In some embodiments, the zero, one, or multiple catalytic converter detections may be zero, one, or multiple components identified with the exhaust system. Based on the identified components of the exhaust system, the model may be able to identify the location where the catalytic converter should be located. For example, the first trained machine learning model, in response to processing the input image, may output catalytic converter detections corresponding to the exhaust system components intended to be on either side of the catalytic converter. The output may further include a detection corresponding to the catalytic converter itself as being present on the vehicle. Alternatively, the output may not include a detection corresponding to the catalytic converter and thus may indicate that while the components configured to be on either side of a catalytic converter or present on the undercarriage of the vehicle, the catalytic converter itself is not present.

In some embodiments, the zero, one, or multiple catalytic converter detections may be zero, one, or multiple portions of the catalytic converter itself. For example, the first trained machine learning model, may process the input image to determine an output including catalytic converter detections. The catalytic converter detections may correspond to an input portion, an output portion, or a shell portion of a catalytic compartment of the catalytic converter depicted in the input image. In some embodiments, the output of the first portion of the model may include a set of bounding boxes indicating locations corresponding to the undercarriage of the vehicle that potentially depict a catalytic converter and a respective confidence for each bounding box that the location identified therein is a catalytic converter.

Next process 1000 proceeds to act 1008 where the image input is processed using a second trained machine learning model to obtain an output indicating a likelihood that the vehicle has a visible catalytic converter (e.g., a catalytic converter that may be viewed from the underside of the vehicle rather than a catalytic converter which is obscured or hidden behind other vehicle components). In some embodiments, the second trained machine learning model is a deep neural network classification model. For example, the second trained machine learning model may include a series of 2D convolutional layers.

The one or more trained machine learning models may include a number of trainable and non-trainable parameters. Accordingly, processing the image input using the one or more trained machine learning models, to obtain the output indicative of the presence of image quality defects in the image, may include computing the output of the model using the values of the number of parameters and the image input. In some embodiments, the one or more trained machine learning models includes between 500,000 and 200 million parameters, 1 million and 150 million parameters, 5 million and 100 million parameters, 10 million and 60 million parameters, or 30 million and 60 million. For example, the one or more trained machine learning models may include approximately 18 million trainable parameters and no non-trainable parameters.

Processing the image input using the second trained machine learning model to obtain the second output may include obtaining an output indicating the likelihood that the vehicle has a visible catalytic converter by computing the second output using values of the plurality of parameters and the image input. In some embodiments, the output indicating the likelihood that the vehicle has a visible catalytic converter may indicate a likelihood that the vehicle has a hidden catalytic converter. For example, a given year, make, model, trim, and engine version of a vehicle may include a catalytic converter hidden behind an underbody panel or otherwise obscured from view by other vehicle components. Accordingly, the lack of a catalytic converter in an image of the undercarriage of the vehicle may not be indicative of a missing catalytic converter.

In some embodiments, the model may further consider metadata that identifies a given year, make, model, trim, and engine version of a vehicle in connection with determining whether a catalytic converter should be visible in the image.

In some embodiments, such as the embodiment described below in FIG. 11 the model may only consider visual inputs to identify whether or not the catalytic converter is visible or hidden give in the configuration of vehicle components visible in the image of the undercarriage of the vehicle.

Next process 1000 proceeds to act 1010 where a probability that the catalytic converter is present is determined based on the catalytic converter detections and the likelihood that a visible catalytic converter is present on the vehicle. Determining that a catalytic converter is missing from the vehicle may be determined when the highest confidence is below a first threshold and the likelihood that the vehicle has a visible catalytic converter is above a second threshold.

In some embodiments, the output of the first trained machine learning model and the second trained machine learning model are further processed to determine a likelihood that a visible catalytic converter is present on the vehicle. In some embodiments, the output of the first model, including a set of zero, one, or more bounding boxes indicating potential locations of a catalytic converter along with respective confidences, may be filtered down to a single bounding box corresponding to the highest confidence of the detected locations in the image. The output of the second model, including a probability of having a visible catalytic converter (rather than a hidden catalytic converter), may be a number between zero and one. The second output may be multiplied by the highest confidence of the detected locations and the image output by the first model to produce an overall likelihood (e.g., probability) of having a visible catalytic converter in the image of the undercarriage of the vehicle. For example, when the second output corresponds with a high score, indicating that a visible catalytic converter should be present in the undercarriage image of the vehicle, and a low score from the first output, then it may be determined that the catalytic converter is missing from the vehicle.

Following act 1010, process 1000 concludes. Accordingly, following the conclusion of process 1000, the output may be provided to an inspector or otherwise included in a vehicle condition report that may include a tag that the vehicle is missing a catalytic converter. Additionally, following the conclusion of process 1000, an initial vehicle condition report comprising inspection results may be obtained. The inspection results may indicate a first set of zero, one, or more vehicle defects that the inspector determined to be present in the vehicle. Based on the first set of zero, one, or more vehicle defects, and the output of process 1000, an indication of agreement or discrepancy between the first set of vehicle defects, that the inspector determined to be present in the vehicle, and the determination that the catalytic converter is missing from the vehicle may be generated.

Figure 11:
FIG. 11 illustrates one or more trained machine learning models for detecting the presence of a catalytic converter in an image of an undercarriage of a vehicle, in accordance with some embodiments of the technology described herein.

FIG. 11 illustrates one or more trained machine learning models 1100 for detecting the presence of a catalytic converter in an image of an undercarriage of a vehicle, in accordance with some embodiments of the technology described herein. As shown in FIG. 11, trained machine learning model 1100 includes one or more trained machine learning models 1104 for processing the image of the undercarriage of the vehicle 1102 to obtain outputs 1106.

The image of the undercarriage of the vehicle 1102 may be a composite image, as described herein. In some embodiments, the image of the undercarriage of the vehicle 1102 may be acquired by an inspector in connection with a vehicle inspection through a mobile device, as described herein. In some embodiments, the image of the undercarriage of the vehicle may be received in connection with a vehicle inspection report and/or may be retrieved from a link which indicates a file location of the image on a server associated with a vehicle diagnostic system, as described herein.

The image of the undercarriage of the vehicle 1102 may be a virtual lift image of the vehicle undercarriage. In some embodiments, the image may be resized based on a size of a dimension of the one or more trained machine learning models. For example, the image may be resized to be 650×224 pixels, where the width of the image (e.g., 224 pixels) corresponds to the size that the convolutional neural network models were designed for and pretrained on.

Accordingly, the height of the image may be selected to match the average aspect ratio of virtual lift images, which may not be a fixed size. For example, the height of the image may be 650 pixels. In some embodiments, a resizing method may be used to adjust the size of the image such that it is appropriately sized for processing by the model. As an example, the resizing method may use bilinear interpolation.

Trained machine learning model 1104 may receive the image of the undercarriage of the vehicle 1102 and may generate an input image 1108 prior to processing by the one or more trained machine learning models. In some embodiments, generating the input image 1108 may include modifying a characteristic of the image using an image processing technique, as described herein.

In some embodiments, two preprocessing techniques may be used to generate the input image. First, a filtering technique that detects defects in the virtual lift reconstruction, such as the technique described above in connection with FIG. 7. Second, a normalization technique that normalizes the values of the pixels for each color channel of the image is used to normalize the channels of the image. For example, each color channel of the image may be normalized based on the mean and standard deviation of each respective color channel in the images of a training set that was used to train the machine learning model. Equation 1 below illustrates one such normalization equation which may be used in accordance with some embodiments described herein.

$$O_i = \frac{I_i - M_i}{Stdev_i} \qquad \text{Equation 1}$$

In equation 1 above, $O_i$ is the output for color channel i, $I_i$ is the input from the undercarriage image of the vehicle for color channel i, $M_i$ is the mean determined for color channel i of the images used in the training set, and $Stdev_i$ is the standard deviation for color channel i of the images used in the training set.

The input image 1108 may then be processed by the first portion of the trained machine learning model 1110 and by the second portion of the trained machine learning model 1112. The outputs of the first portion of the trained machine learning model 1110 and second portion of the trained machine learning model 1112 may be subsequently processed to determine if a visible catalytic converter is present in the undercarriage image of the vehicle 1114. In some embodiments, the first portion of the trained machine learning model is a 2D convolutional neural network. In some embodiments, the second portion of the trained machine learning model is a 2D convolutional neural network. In some embodiments, other types of trained machine learning models may be used either for the first portion of the trained machine learning model, the of the second portion trained machine learning model, or both the first and second portions of the trained machine learning models—as aspects of the technology described herein are not limited in this respect.

Table 6 bellow illustrates an exemplary embodiment of the first portion of the trained machine learning model, in accordance with some embodiments the technology described herein.

TABLE 6

| YOLOv5l Model-46.5M parameters | |
| --- | --- |
| Line # | Sample Code |

```
 1   AutoShape(
 2     (model): DetectMultiBackend(
 3       (model): DetectionModel(
 4         (model): Sequential(
 5           (0): Conv(
 6             (conv): Conv2d(3, 64, kernel_size=(6, 6), stride=(2, 2), padding=(2, 2))
 7             (act): SiLU(inplace=True)
 8           )
 9           (1): Conv(
10             (conv): Conv2d(64, 128, kernel_size=(3, 3), stride=(2, 2), padding=(1, 1))
11             (act): SiLU(inplace=True)
12           )
13           (2): C3(
14             (cv1): Conv(
15               (conv): Conv2d(128, 64, kernel_size=(1, 1), stride=(1, 1))
16               (act): SiLU(inplace=True)
17             )
18             (cv2): Conv(
19               (conv): Conv2d(128, 64, kernel_size=(1, 1), stride=(1, 1))
20               (act): SiLU(inplace=True)
21             )
22             (cv3): Conv(
23               (conv): Conv2d(128, 128, kernel_size=(1, 1), stride=(1, 1))
24               (act): SiLU(inplace=True)
25             )
26             (m): Sequential(
27               (0): Bottleneck(
28                 (cv1): Conv(
29                   (conv): Conv2d(64, 64, kernel_size=(1, 1), stride=(1, 1))
30                   (act): SiLU(inplace=True)
31                 )
32                 (cv2): Conv(
33                   (conv): Conv2d(64, 64, kernel_size=(3, 3), stride=(1, 1), padding=(1, 1))
34                   (act): SiLU(inplace=True)
35                 )
36               )
37               (1): Bottleneck(
38                 (cv1): Conv(
39                   (conv): Conv2d(64, 64, kernel_size=(1, 1), stride=(1, 1))
40                   (act): SiLU(inplace=True)
41                 )
42                 (cv2): Conv(
43                   (conv): Conv2d(64, 64, kernel_size=(3, 3), stride=(1, 1), padding=(1, 1))
44                   (act): SiLU(inplace=True)
45                 )
46               )
47               (2): Bottleneck(
48                 (cv1): Conv(
49                   (conv): Conv2d(64, 64, kernel_size=(1, 1), stride=(1, 1))
50                   (act): SiLU(inplace=True)
51                 )
52                 (cv2): Conv(
53                   (conv): Conv2d(64, 64, kernel_size=(3, 3), stride=(1, 1), padding=(1, 1))
54                   (act): SiLU(inplace=True)
55                 )
56               )
57             )
58           )
59           (3): Conv(
60             (conv): Conv2d(128, 256, kernel_size=(3, 3), stride=(2, 2), padding=(1, 1))
61             (act): SiLU(inplace=True)
62           )
63           (4): C3(
64             (cv1): Conv(
65               (conv): Conv2d(256, 128, kernel_size=(1, 1), stride=(1, 1))
66               (act): SiLU(inplace=True)
67             )
```

TABLE 6-continued

YOLOv5l Model-46.5M parameters

| Line # | Sample Code |
|--------|-------------|
| 68 | (cv2): Conv( |
| 69 | (conv): Conv2d(256, 128, kernel_size=(1, 1), stride=(1, 1)) |
| 70 | (act): SiLU(inplace=True) |
| 71 | ) |
| 72 | (cv3): Conv( |
| 73 | (conv): Conv2d(256, 256, kernel_size=(1, 1), stride=(1, 1)) |
| 74 | (act): SiLU(inplace=True) |
| 75 | ) |
| 76 | (m): Sequential( |
| 77 | (0): Bottleneck( |
| 78 | (cv1): Conv( |
| 79 | (conv): Conv2d(128, 128, kernel_size=(1, 1), stride=(1, 1)) |
| 80 | (act): SiLU(inplace=True) |
| 81 | ) |
| 82 | (cv2): Conv( |
| 83 | (conv): Conv2d(128, 128, kernel_size=(3, 3), stride=(1, 1), padding=(1, |
| | 1)) |
| 84 | (act): SiLU(inplace=True) |
| 85 | ) |
| 86 | ) |
| 87 | (1): Bottleneck( |
| 88 | (cv1): Conv( |
| 89 | (conv): Conv2d(128, 128, kernel_size=(1, 1), stride=(1, 1)) |
| 90 | (act): SiLU(inplace=True) |
| 91 | ) |
| 92 | (cv2): Conv( |
| 93 | (conv): Conv2d(128, 128, kernel_size=(3, 3), stride=(1, 1), padding=(1, |
| | 1)) |
| 94 | (act): SiLU(inplace=True) |
| 95 | ) |
| 96 | ) |
| 97 | (2): Bottleneck( |
| 98 | (cv1): Conv( |
| 99 | (conv): Conv2d(128, 128, kernel_size=(1, 1), stride=(1, 1)) |
| 100 | (act): SiLU(inplace=True) |
| 101 | ) |
| 102 | (cv2): Conv( |
| 103 | (conv): Conv2d(128, 128, kernel_size=(3, 3), stride=(1, 1), padding=(1, |
| | 1)) |
| 104 | (act): SiLU(inplace=True) |
| 105 | ) |
| 106 | ) |
| 107 | (3): Bottleneck( |
| 108 | (cv1): Conv( |
| 109 | (conv): Conv2d(128, 128, kernel_size=(1, 1), stride=(1, 1)) |
| 110 | (act): SiLU(inplace=True) |
| 111 | ) |
| 112 | (cv2): Conv( |
| 113 | (conv): Conv2d(128, 128, kernel_size=(3, 3), stride=(1, 1), padding=(1, |
| | 1)) |
| 114 | (act): SiLU(inplace=True) |
| 115 | ) |
| 116 | ) |
| 117 | (4): Bottleneck( |
| 118 | (cv1): Conv( |
| 119 | (conv): Conv2d(128, 128, kernel_size=(1, 1), stride=(1, 1)) |
| 120 | (act): SiLU(inplace=True) |
| 121 | ) |
| 122 | (cv2): Conv( |
| 123 | (conv): Conv2d(128, 128, kernel_size=(3, 3), stride=(1, 1), padding=(1, |
| | 1)) |
| 124 | (act): SiLU(inplace=True) |
| 125 | ) |
| 126 | ) |
| 127 | (5): Bottleneck( |
| 128 | (cv1): Conv( |
| 129 | (conv): Conv2d(128, 128, kernel_size=(1, 1), stride=(1, 1)) |
| 130 | (act): SiLU(inplace=True) |
| 131 | ) |
| 132 | (cv2): Conv( |
| 133 | (conv): Conv2d(128, 128, kernel_size=(3, 3), stride=(1, 1), padding=(1, |
| | 1)) |
| 134 | (act): SiLU(inplace=True) |
| 135 | ) |
| 136 | ) |
| 137 | ) |

TABLE 6-continued

YOLOv5l Model-46.5M parameters

| Line # | Sample Code |
|---|---|
| 138 | ) |
| 139 | (5): Conv( |
| 140 | (conv): Conv2d(256, 512, kernel_size=(3, 3), stride=(2, 2), padding=(1, 1)) |
| 141 | (act): SiLU(inplace=True) |
| 142 | ) |
| 143 | (6): C3( |
| 144 | (cv1): Conv( |
| 145 | (conv): Conv2d(512, 256, kernel_size=(1, 1), stride=(1, 1)) |
| 146 | (act): SiLU(inplace=True) |
| 147 | ) |
| 148 | (cv2): Conv( |
| 149 | (conv): Conv2d(512, 256, kernel_size=(1, 1), stride=(1, 1)) |
| 150 | (act): SiLU(inplace=True) |
| 151 | ) |
| 152 | (cv3): Conv( |
| 153 | (conv): Conv2d(512, 512, kernel_size=(1, 1), stride=(1, 1)) |
| 154 | (act): SiLU(inplace=True) |
| 155 | ) |
| 156 | (m): Sequential( |
| 157 | (0): Bottleneck( |
| 158 | (cv1): Conv( |
| 159 | (conv): Conv2d(256, 256, kernel_size=(1, 1), stride=(1, 1)) |
| 160 | (act): SiLU(inplace=True) |
| 161 | ) |
| 162 | (cv2): Conv( |
| 163 | (conv): Conv2d(256, 256, kernel_size=(3, 3), stride=(1, 1), padding=(1, 1)) |
| 164 | (act): SiLU(inplace=True) |
| 165 | ) |
| 166 | ) |
| 167 | (1): Bottleneck( |
| 168 | (cv1): Conv( |
| 169 | (conv): Conv2d(256, 256, kernel_size=(1, 1), stride=(1, 1)) |
| 170 | (act): SiLU(inplace=True) |
| 171 | ) |
| 172 | (cv2): Conv( |
| 173 | (conv): Conv2d(256, 256, kernel_size=(3, 3), stride=(1, 1), padding=(1, 1)) |
| 174 | (act): SiLU(inplace=True) |
| 175 | ) |
| 176 | ) |
| 177 | (2): Bottleneck( |
| 178 | (cv1): Conv( |
| 179 | (conv): Conv2d(256, 256, kernel_size=(1, 1), stride=(1, 1)) |
| 180 | (act): SiLU(inplace=True) |
| 181 | ) |
| 182 | (cv2): Conv( |
| 183 | (conv): Conv2d(256, 256, kernel_size=(3, 3), stride=(1, 1), padding=(1, 1)) |
| 184 | (act): SiLU(inplace=True) |
| 185 | ) |
| 186 | ) |
| 187 | (3): Bottleneck( |
| 188 | (cv1): Conv( |
| 189 | (conv): Conv2d(256, 256, kernel_size=(1, 1), stride=(1, 1)) |
| 190 | (act): SiLU(inplace=True) |
| 191 | ) |
| 192 | (cv2): Conv( |
| 193 | (conv): Conv2d(256, 256, kernel_size=(3, 3), stride=(1, 1), padding=(1, 1)) |
| 194 | (act): SiLU(inplace=True) |
| 195 | ) |
| 196 | ) |
| 197 | (4): Bottleneck( |
| 198 | (cv1): Conv( |
| 199 | (conv): Conv2d(256, 256, kernel_size=(1, 1), stride=(1, 1)) |
| 200 | (act): SiLU(inplace=True) |
| 201 | ) |
| 202 | (cv2): Conv( |
| 203 | (conv): Conv2d(256, 256, kernel_size=(3, 3), stride=(1, 1), padding=(1, 1)) |
| 204 | (act): SiLU(inplace=True) |
| 205 | ) |
| 206 | ) |
| 207 | (5): Bottleneck( |
| 208 | (cv1): Conv( |

TABLE 6-continued

YOLOv5l Model-46.5M parameters

| Line # | Sample Code |
|---|---|
| 209 | (conv): Conv2d(256, 256, kernel_size=(1, 1), stride=(1, 1)) |
| 210 | (act): SiLU(inplace=True) |
| 211 | ) |
| 212 | (cv2): Conv( |
| 213 | (conv): Conv2d(256, 256, kernel_size=(3, 3), stride=(1, 1), padding=(1, 1)) |
| 214 | (act): SiLU(inplace=True) |
| 215 | ) |
| 216 | ) |
| 217 | (6): Bottleneck( |
| 218 | (cv1): Conv( |
| 219 | (conv): Conv2d(256, 256, kernel_size=(1, 1), stride=(1, 1)) |
| 220 | (act): SiLU(inplace=True) |
| 221 | ) |
| 222 | (cv2): Conv( |
| 223 | (conv): Conv2d(256, 256, kernel_size=(3, 3), stride=(1, 1), padding=(1, 1)) |
| 224 | (act): SiLU(inplace=True) |
| 225 | ) |
| 226 | ) |
| 227 | (7): Bottleneck( |
| 228 | (cv1): Conv( |
| 229 | (conv): Conv2d(256, 256, kernel_size=(1, 1), stride=(1, 1)) |
| 230 | (act): SiLU(inplace=True) |
| 231 | ) |
| 232 | (cv2): Conv( |
| 233 | (conv): Conv2d(256, 256, kernel_size=(3, 3), stride=(1, 1), padding=(1, 1)) |
| 234 | (act): SiLU(inplace=True) |
| 235 | ) |
| 236 | ) |
| 237 | (8): Bottleneck( |
| 238 | (cv1): Conv( |
| 239 | (conv): Conv2d(256, 256, kernel_size=(1, 1), stride=(1, 1)) |
| 240 | (act): SiLU(inplace=True) |
| 241 | ) |
| 242 | (cv2): Conv( |
| 243 | (conv): Conv2d(256, 256, kernel_size=(3, 3), stride=(1, 1), padding=(1, 1)) |
| 244 | (act): SiLU(inplace=True) |
| 245 | ) |
| 246 | ) |
| 247 | ) |
| 248 | ) |
| 249 | (7): Conv( |
| 250 | (conv): Conv2d(512, 1024, kernel_size=(3, 3), stride=(2, 2), padding=(1, 1)) |
| 251 | (act): SiLU(inplace=True) |
| 252 | ) |
| 253 | (8): C3( |
| 254 | (cv1): Conv( |
| 255 | (conv): Conv2d(1024, 512, kernel_size=(1, 1), stride=(1, 1)) |
| 256 | (act): SiLU(inplace=True) |
| 257 | ) |
| 258 | (cv2): Conv( |
| 259 | (conv): Conv2d(1024, 512, kernel_size=(1, 1), stride=(1, 1)) |
| 260 | (act): SiLU(inplace=True) |
| 261 | ) |
| 262 | (cv3): Conv( |
| 263 | (conv): Conv2d(1024, 1024, kernel_size=(1, 1), stride=(1, 1)) |
| 264 | (act): SiLU(inplace=True) |
| 265 | ) |
| 266 | (m): Sequential( |
| 267 | (0): Bottleneck( |
| 268 | (cv1): Conv( |
| 269 | (conv): Conv2d(512, 512, kernel_size=(1, 1), stride=(1, 1)) |
| 270 | (act): SiLU(inplace=True) |
| 271 | ) |
| 272 | (cv2): Conv( |
| 273 | (conv): Conv2d(512, 512, kernel_size=(3, 3), stride=(1, 1), padding=(1, 1)) |
| 274 | (act): SiLU(inplace=True) |
| 275 | ) |
| 276 | ) |
| 277 | (1): Bottleneck( |
| 278 | (cv1): Conv( |
| 279 | (conv): Conv2d(512, 512, kernel_size=(1, 1), stride=(1, 1)) |

TABLE 6-continued

YOLOv5l Model-46.5M parameters

| Line # | Sample Code |
|---|---|
| 280 | (act): SiLU(inplace=True) |
| 281 | ) |
| 282 | (cv2): Conv( |
| 283 | (conv): Conv2d(512, 512, kernel_size=(3, 3), stride=(1, 1), padding=(1, 1)) |
| 284 | (act): SiLU(inplace=True) |
| 285 | ) |
| 286 | ) |
| 287 | (2): Bottleneck( |
| 288 | (cv1): Conv( |
| 289 | (conv): Conv2d(512, 512, kernel_size=(1, 1), stride=(1, 1)) |
| 290 | (act): SiLU(inplace=True) |
| 291 | ) |
| 292 | (cv2): Conv( |
| 293 | (conv): Conv2d(512, 512, kernel_size=(3, 3), stride=(1, 1), padding=(1, 1)) |
| 294 | (act): SiLU(inplace=True) |
| 295 | ) |
| 296 | ) |
| 297 | ) |
| 298 | ) |
| 299 | (9): SPPF( |
| 300 | (cv1): Conv( |
| 301 | (conv): Conv2d(1024, 512, kernel_size=(1, 1), stride=(1, 1)) |
| 302 | (act): SiLU(inplace=True) |
| 303 | ) |
| 304 | (cv2): Conv( |
| 305 | (conv): Conv2d(2048, 1024, kernel_size=(1, 1), stride=(1, 1)) |
| 306 | (act): SiLU(inplace=True) |
| 307 | ) |
| 308 | (m): MaxPool2d(kernel_size=5, stride=1, padding=2, dilation=1, ceil_mode=False) |
| 309 | ) |
| 310 | (10): Conv( |
| 311 | (conv): Conv2d(1024, 512, kernel_size=(1, 1), stride=(1, 1)) |
| 312 | (act): SiLU(inplace=True) |
| 313 | ) |
| 314 | (11): Upsample(scale_factor=2.0, mode=nearest) |
| 315 | (12): Concat( ) |
| 316 | (13): C3( |
| 317 | (cv1): Conv( |
| 318 | (conv): Conv2d(1024, 256, kernel_size=(1, 1), stride=(1, 1)) |
| 319 | (act): SiLU(inplace=True) |
| 320 | ) |
| 321 | (cv2): Conv( |
| 322 | (conv): Conv2d(1024, 256, kernel_size=(1, 1), stride=(1, 1)) |
| 323 | (act): SiLU(inplace=True) |
| 324 | ) |
| 325 | (cv3): Conv( |
| 326 | (conv): Conv2d(512, 512, kernel_size=(1, 1), stride=(1, 1)) |
| 327 | (act): SiLU(inplace=True) |
| 328 | ) |
| 329 | (m): Sequential( |
| 330 | (0): Bottleneck( |
| 331 | (cv1): Conv( |
| 332 | (conv): Conv2d(256, 256, kernel_size=(1, 1), stride=(1, 1)) |
| 333 | (act): SiLU(inplace=True) |
| 334 | ) |
| 335 | (cv2): Conv( |
| 336 | (conv): Conv2d(256, 256, kernel_size=(3, 3), stride=(1, 1), padding=(1, 1)) |
| 337 | (act): SiLU(inplace=True) |
| 338 | ) |
| 339 | ) |
| 340 | (1): Bottleneck( |
| 341 | (cv1): Conv( |
| 342 | (conv): Conv2d(256, 256, kernel_size=(1, 1), stride=(1, 1)) |
| 343 | (act): SiLU(inplace=True) |
| 344 | ) |
| 345 | (cv2): Conv( |
| 346 | (conv): Conv2d(256, 256, kernel_size=(3, 3), stride=(1, 1), padding=(1, 1)) |
| 347 | (act): SiLU(inplace=True) |
| 348 | ) |
| 349 | ) |
| 350 | (2): Bottleneck( |

TABLE 6-continued

YOLOv5l Model-46.5M parameters

| Line # | Sample Code |
|---|---|
| 351 | (cv1): Conv( |
| 352 | (conv): Conv2d(256, 256, kernel_size=(1, 1), stride=(1, 1)) |
| 353 | (act): SiLU(inplace=True) |
| 354 | ) |
| 355 | (cv2): Conv( |
| 356 | (conv): Conv2d(256, 256, kernel_size=(3, 3), stride=(1, 1), padding=(1, 1)) |
| 357 | (act): SiLU(inplace=True) |
| 358 | ) |
| 359 | ) |
| 360 | ) |
| 361 | ) |
| 362 | (14): Conv( |
| 363 | (conv): Conv2d(512, 256, kernel_size=(1, 1), stride=(1, 1)) |
| 364 | (act): SiLU(inplace=True) |
| 365 | ) |
| 366 | (15): Upsample(scale_factor=2.0, mode=nearest) |
| 367 | (16): Concat( ) |
| 368 | (17): C3( |
| 369 | (cv1): Conv( |
| 370 | (conv): Conv2d(512, 128, kernel_size=(1, 1), stride=(1, 1)) |
| 371 | (act): SiLU(inplace=True) |
| 372 | ) |
| 373 | (cv2): Conv( |
| 374 | (conv): Conv2d(512, 128, kernel_size=(1, 1), stride=(1, 1)) |
| 375 | (act): SiLU(inplace=True) |
| 376 | ) |
| 377 | (cv3): Conv( |
| 378 | (conv): Conv2d(256, 256, kernel_size=(1, 1), stride=(1, 1)) |
| 379 | (act): SiLU(inplace=True) |
| 380 | ) |
| 381 | (m): Sequential( |
| 382 | (0): Bottleneck( |
| 383 | (cv1): Conv( |
| 384 | (conv): Conv2d(128, 128, kernel_size=(1, 1), stride=(1, 1)) |
| 385 | (act): SiLU(inplace=True) |
| 386 | ) |
| 387 | (cv2): Conv( |
| 388 | (conv): Conv2d(128, 128, kernel_size=(3, 3), stride=(1, 1), padding=(1, 1)) |
| 389 | (act): SiLU(inplace=True) |
| 390 | ) |
| 391 | ) |
| 392 | (1): Bottleneck( |
| 393 | (cv1): Conv( |
| 394 | (conv): Conv2d(128, 128, kernel_size=(1, 1), stride=(1, 1)) |
| 395 | (act): SiLU(inplace=True) |
| 396 | ) |
| 397 | (cv2): Conv( |
| 398 | (conv): Conv2d(128, 128, kernel_size=(3, 3), stride=(1, 1), padding=(1, 1)) |
| 399 | (act): SiLU(inplace=True) |
| 400 | ) |
| 401 | ) |
| 402 | (2): Bottleneck( |
| 403 | (cv1): Conv( |
| 404 | (conv): Conv2d(128, 128, kernel_size=(1, 1), stride=(1, 1)) |
| 405 | (act): SiLU(inplace=True) |
| 406 | ) |
| 407 | (cv2): Conv( |
| 408 | (conv): Conv2d(128, 128, kernel_size=(3, 3), stride=(1, 1), padding=(1, 1)) |
| 409 | (act): SiLU(inplace=True) |
| 410 | ) |
| 411 | ) |
| 412 | ) |
| 413 | ) |
| 414 | (18): Conv( |
| 415 | (conv): Conv2d(256, 256, kernel_size=(3, 3), stride=(2, 2), padding=(1, 1)) |
| 416 | (act): SiLU(inplace=True) |
| 417 | ) |
| 418 | (19): Concat( ) |
| 419 | (20): C3( |
| 420 | (cv1): Conv( |
| 421 | (conv): Conv2d(512, 256, kernel_size=(1, 1), stride=(1, 1)) |
| 422 | (act): SiLU(inplace=True) |

TABLE 6-continued

YOLOv5l Model-46.5M parameters

| Line # | Sample Code |
|---|---|

```
423                )
424            (cv2): Conv(
425               (conv): Conv2d(512, 256, kernel_size=(1, 1), stride=(1, 1))
426               (act): SiLU(inplace=True)
427            )
428            (cv3): Conv(
429               (conv): Conv2d(512, 512, kernel_size=(1, 1), stride=(1, 1))
430               (act): SiLU(inplace=True)
431            )
432            (m): Sequential(
433               (0): Bottleneck(
434                  (cv1): Conv(
435                     (conv): Conv2d(256, 256, kernel_size=(1, 1), stride=(1, 1))
436                     (act): SiLU(inplace=True)
437                  )
438                  (cv2): Conv(
439                     (conv): Conv2d(256, 256, kernel_size=(3, 3), stride=(1, 1), padding=(1,
       1))
440                     (act): SiLU(inplace=True)
441                  )
442               )
443               (1): Bottleneck(
444                  (cv1): Conv(
445                     (conv): Conv2d(256, 256, kernel_size=(1, 1), stride=(1, 1))
446                     (act): SiLU(inplace=True)
447                  )
448                  (cv2): Conv(
449                     (conv): Conv2d(256, 256, kernel_size=(3, 3), stride=(1, 1), padding=(1,
       1))
450                     (act): SiLU(inplace=True)
451                  )
452               )
453               (2): Bottleneck(
454                  (cv1): Conv(
455                     (conv): Conv2d(256, 256, kernel_size=(1, 1), stride=(1, 1))
456                     (act): SiLU(inplace=True)
457                  )
458                  (cv2): Conv(
459                     (conv): Conv2d(256, 256, kernel_size=(3, 3), stride=(1, 1), padding=(1,
       1))
460                     (act): SiLU(inplace=True)
461                  )
462               )
463            )
464         )
465         (21): Conv(
466            (conv): Conv2d(512, 512, kernel_size=(3, 3), stride=(2, 2), padding=(1, 1))
467            (act): SiLU(inplace=True)
468         )
469         (22): Concat( )
470         (23): C3(
471            (cv1): Conv(
472               (conv): Conv2d(1024, 512, kernel_size=(1, 1), stride=(1, 1))
473               (act): SiLU(inplace=True)
474            )
475            (cv2): Conv(
476               (conv): Conv2d(1024, 512, kernel_size=(1, 1), stride=(1, 1))
477               (act): SiLU(inplace=True)
478            )
479            (cv3): Conv(
480               (conv): Conv2d(1024, 1024, kernel_size=(1, 1), stride=(1, 1))
481               (act): SiLU(inplace=True)
482            )
483            (m): Sequential(
484               (0): Bottleneck(
485                  (cv1): Conv(
486                     (conv): Conv2d(512, 512, kernel_size=(1, 1), stride=(1, 1))
487                     (act): SiLU(inplace=True)
488                  )
489                  (cv2): Conv(
490                     (conv): Conv2d(512, 512, kernel_size=(3, 3), stride=(1, 1), padding=(1,
       1))
491                     (act): SiLU(inplace=True)
492                  )
493               )
494               (1): Bottleneck(
```

TABLE 6-continued

YOLOv5l Model-46.5M parameters

| Line # | Sample Code |
|---|---|
| 495 | (cv1): Conv( |
| 496 | (conv): Conv2d(512, 512, kernel_size=(1, 1), stride=(1, 1)) |
| 497 | (act): SiLU(inplace=True) |
| 498 | ) |
| 499 | (cv2): Conv( |
| 500 | (conv): Conv2d(512, 512, kernel_size=(3, 3), stride=(1, 1), padding=(1, |
| | 1)) |
| 501 | (act): SiLU(inplace=True) |
| 502 | ) |
| 503 | ) |
| 504 | (2): Bottleneck( |
| 505 | (cv1): Conv( |
| 506 | (conv): Conv2d(512, 512, kernel_size=(1, 1), stride=(1, 1)) |
| 507 | (act): SiLU(inplace=True) |
| 508 | ) |
| 509 | (cv2): Conv( |
| 510 | (conv): Conv2d(512, 512, kernel_size=(3, 3), stride=(1, 1), padding=(1, |
| | 1)) |
| 511 | (act): SiLU(inplace=True) |
| 512 | ) |
| 513 | ) |
| 514 | ) |
| 515 | ) |
| 516 | (24): Detect( |
| 517 | (m): ModuleList( |
| 518 | (0): Conv2d(256, 18, kernel_size=(1, 1), stride=(1, 1)) |
| 519 | (1): Conv2d(512, 18, kernel_size=(1, 1), stride=(1, 1)) |
| 520 | (2): Conv2d(1024, 18, kernel_size=(1, 1), stride=(1, 1)) |
| 521 | ) |
| 522 | ) |
| 523 | ) |
| 524 | ) |
| 525 | ) |
| 526 | ) |

Table 7 below illustrates an exemplary embodiment of the second portion of the trained machine learning model, in accordance with some embodiments of the technology described herein.

TABLE 7

Hidden Catalytic Converter Classifier

| Layer # | Layer Type | Output Shape | Parameters |
|---|---|---|---|
| 1 | Conv2d-1 | [−1, 48, 325, 112] | 1,296 |
| 2 | BatchNorm2d-2 | [−1, 48, 325, 112] | 96 |
| 3 | SiLU-3 | [−1, 48, 325, 112] | 0 |
| 4 | Conv2d-4 | [−1, 48, 325, 112] | 432 |
| 5 | BatchNorm2d-5 | [−1, 48, 325, 112] | 96 |
| 6 | SiLU-6 | [−1, 48, 325, 112] | 0 |
| 7 | AdaptiveAvgPool2d-7 | [−1, 48, 1, 1] | 0 |
| 8 | Conv2d-8 | [−1, 12, 1, 1] | 588 |
| 9 | SiLU-9 | [−1, 12, 1, 1] | 0 |
| 10 | Conv2d-10 | [−1, 48, 1, 1] | 624 |
| 11 | Sigmoid-11 | [−1, 48, 1, 1] | 0 |
| 12 | SqueezeExcitation-12 | [−1, 48, 325, 112] | 0 |
| 13 | Conv2d-13 | [−1, 24, 325, 112] | 1,152 |
| 14 | BatchNorm2d-14 | [−1, 24, 325, 112] | 48 |
| 15 | MBConv-15 | [−1, 24, 325, 112] | 0 |
| 16 | Conv2d-16 | [−1, 24, 325, 112] | 216 |
| 17 | BatchNorm2d-17 | [−1, 24, 325, 112] | 48 |
| 18 | SiLU-18 | [−1, 24, 325, 112] | 0 |
| 19 | AdaptiveAvgPool2d-19 | [−1, 24, 1, 1] | 0 |
| 20 | Conv2d-20 | [−1, 6, 1, 1] | 150 |
| 21 | SiLU-21 | [−1, 6, 1, 1] | 0 |
| 22 | Conv2d-22 | [−1, 24, 1, 1] | 168 |
| 23 | Sigmoid-23 | [−1, 24, 1, 1] | 0 |
| 24 | SqueezeExcitation-24 | [−1, 24, 325, 112] | 0 |
| 25 | Conv2d-25 | [−1, 24, 325, 112] | 576 |
| 26 | BatchNorm2d-26 | [−1, 24, 325, 112] | 48 |

TABLE 7-continued

Hidden Catalytic Converter Classifier

| Layer # | Layer Type | Output Shape | Parameters |
|---|---|---|---|
| 27 | StochasticDepth-27 | [−1, 24, 325, 112] | 0 |
| 28 | MBConv-28 | [−1, 24, 325, 112] | 0 |
| 29 | Conv2d-29 | [−1, 144, 325, 112] | 3,456 |
| 30 | BatchNorm2d-30 | [−1, 144, 325, 112] | 288 |
| 31 | SiLU-31 | [−1, 144, 325, 112] | 0 |
| 32 | Conv2d-32 | [−1, 144, 163, 56] | 1,296 |
| 33 | BatchNorm2d-33 | [−1, 144, 163, 56] | 288 |
| 34 | SiLU-34 | [−1, 144, 163, 56] | 0 |
| 35 | AdaptiveAvgPool2d-35 | [−1, 144, 1, 1] | 0 |
| 36 | Conv2d-36 | [−1, 6, 1, 1] | 870 |
| 37 | SiLU-37 | [−1, 6, 1, 1] | 0 |
| 38 | Conv2d-38 | [−1, 144, 1, 1] | 1,008 |
| 39 | Sigmoid-39 | [−1, 144, 1, 1] | 0 |
| 40 | SqueezeExcitation-40 | [−1, 144, 163, 56] | 0 |
| 41 | Conv2d-41 | [−1, 32, 163, 56] | 4,608 |
| 42 | BatchNorm2d-42 | [−1, 32, 163, 56] | 64 |
| 43 | MBConv-43 | [−1, 32, 163, 56] | 0 |
| 44 | Conv2d-44 | [−1, 192, 163, 56] | 6,144 |
| 45 | BatchNorm2d-45 | [−1, 192, 163, 56] | 384 |
| 46 | SiLU-46 | [−1, 192, 163, 56] | 0 |
| 47 | Conv2d-47 | [−1, 192, 163, 56] | 1,728 |
| 48 | BatchNorm2d-48 | [−1, 192, 163, 56] | 384 |
| 49 | SiLU-49 | [−1, 192, 163, 56] | 0 |
| 50 | AdaptiveAvgPool2d-50 | [−1, 192, 1, 1] | 0 |
| 51 | Conv2d-51 | [−1, 8, 1, 1] | 1,544 |
| 52 | SiLU-52 | [−1, 8, 1, 1] | 0 |
| 53 | Conv2d-53 | [−1, 192, 1, 1] | 1,728 |
| 54 | Sigmoid-54 | [−1, 192, 1, 1] | 0 |
| 55 | SqueezeExcitation-55 | [−1, 192, 163, 56] | 0 |
| 56 | Conv2d-56 | [−1, 32, 163, 56] | 6,144 |
| 57 | BatchNorm2d-57 | [−1, 32, 163, 56] | 64 |
| 58 | StochasticDepth-58 | [−1, 32, 163, 56] | 0 |

TABLE 7-continued

Hidden Catalytic Converter Classifier

| Layer # | Layer Type | Output Shape | Parameters |
|---|---|---|---|
| 59 | MBConv-59 | [-1, 32, 163, 56] | 0 |
| 60 | Conv2d-60 | [-1, 192, 163, 56] | 6,144 |
| 61 | BatchNorm2d-61 | [-1, 192, 163, 56] | 384 |
| 62 | SiLU-62 | [-1, 192, 163, 56] | 0 |
| 63 | Conv2d-63 | [-1, 192, 163, 56] | 1,728 |
| 64 | BatchNorm2d-64 | [-1, 192, 163, 56] | 384 |
| 65 | SiLU-65 | [-1, 192, 163, 56] | 0 |
| 66 | AdaptiveAvgPool2d-66 | [-1, 192, 1, 1] | 0 |
| 67 | Conv2d-67 | [-1, 8, 1, 1] | 1,544 |
| 68 | SiLU-68 | [-1, 8, 1, 1] | 0 |
| 69 | Conv2d-69 | [-1, 192, 1, 1] | 1,728 |
| 70 | Sigmoid-70 | [-1, 192, 1, 1] | 0 |
| 71 | SqueezeExcitation-71 | [-1, 192, 163, 56] | 0 |
| 72 | Conv2d-72 | [-1, 32, 163, 56] | 6,144 |
| 73 | BatchNorm2d-73 | [-1, 32, 163, 56] | 64 |
| 74 | StochasticDepth-74 | [-1, 32, 163, 56] | 0 |
| 75 | MBConv-75 | [-1, 32, 163, 56] | 0 |
| 76 | Conv2d-76 | [-1, 192, 163, 56] | 6,144 |
| 77 | BatchNorm2d-77 | [-1, 192, 163, 56] | 384 |
| 78 | SiLU-78 | [-1, 192, 163, 56] | 0 |
| 79 | Conv2d-79 | [-1, 192, 163, 56] | 1,728 |
| 80 | BatchNorm2d-80 | [-1, 192, 163, 56] | 384 |
| 81 | SiLU-81 | [-1, 192, 163, 56] | 0 |
| 82 | AdaptiveAvgPool2d-82 | [-1, 192, 1, 1] | 0 |
| 83 | Conv2d-83 | [-1, 8, 1, 1] | 1,544 |
| 84 | SiLU-84 | [-1, 8, 1, 1] | 0 |
| 85 | Conv2d-85 | [-1, 192, 1, 1] | 1,728 |
| 86 | Sigmoid-86 | [-1, 192, 1, 1] | 0 |
| 87 | SqueezeExcitation-87 | [-1, 192, 163, 56] | 0 |
| 88 | Conv2d-88 | [-1, 32, 163, 56] | 6,144 |
| 89 | BatchNorm2d-89 | [-1, 32, 163, 56] | 64 |
| 90 | StochasticDepth-90 | [-1, 32, 163, 56] | 0 |
| 91 | MBConv-91 | [-1, 32, 163, 56] | 0 |
| 92 | Conv2d-92 | [-1, 192, 163, 56] | 6,144 |
| 93 | BatchNorm2d-93 | [-1, 192, 163, 56] | 384 |
| 94 | SiLU-94 | [-1, 192, 163, 56] | 0 |
| 95 | Conv2d-95 | [-1, 192, 82, 28] | 4,800 |
| 96 | BatchNorm2d-96 | [-1, 192, 82, 28] | 384 |
| 97 | SiLU-97 | [-1, 192, 82, 28] | 0 |
| 98 | AdaptiveAvgPool2d-98 | [-1, 192, 1, 1] | 0 |
| 99 | Conv2d-99 | [-1, 8, 1, 1] | 1,544 |
| 100 | SiLU-100 | [-1, 8, 1, 1] | 0 |
| 101 | Conv2d-101 | [-1, 192, 1, 1] | 1,728 |
| 102 | Sigmoid-102 | [-1, 192, 1, 1] | 0 |
| 103 | SqueezeExcitation-103 | [-1, 192, 82, 28] | 0 |
| 104 | Conv2d-104 | [-1, 56, 82, 28] | 10,752 |
| 105 | BatchNorm2d-105 | [-1, 56, 82, 28] | 112 |
| 106 | MBConv-106 | [-1, 56, 82, 28] | 0 |
| 107 | Conv2d-107 | [-1, 336, 82, 28] | 18,816 |
| 108 | BatchNorm2d-108 | [-1, 336, 82, 28] | 672 |
| 109 | SiLU-109 | [-1, 336, 82, 28] | 0 |
| 110 | Conv2d-110 | [-1, 336, 82, 28] | 8,400 |
| 111 | BatchNorm2d-111 | [-1, 336, 82, 28] | 672 |
| 112 | SiLU-112 | [-1, 336, 82, 28] | 0 |
| 113 | AdaptiveAvgPool2d-113 | [-1, 336, 1, 1] | 0 |
| 114 | Conv2d-114 | [-1, 14, 1, 1] | 4,718 |
| 115 | SiLU-115 | [-1, 14, 1, 1] | 0 |
| 116 | Conv2d-116 | [-1, 336, 1, 1] | 5,040 |
| 117 | Sigmoid-117 | [-1, 336, 1, 1] | 0 |
| 118 | SqueezeExcitation-118 | [-1, 336, 82, 28] | 0 |
| 119 | Conv2d-119 | [-1, 56, 82, 28] | 18,816 |
| 120 | BatchNorm2d-120 | [-1, 56, 82, 28] | 112 |
| 121 | StochasticDepth-121 | [-1, 56, 82, 28] | 0 |
| 122 | MBConv-122 | [-1, 56, 82, 28] | 0 |
| 123 | Conv2d-123 | [-1, 336, 82, 28] | 18,816 |
| 124 | BatchNorm2d-124 | [-1, 336, 82, 28] | 672 |
| 125 | SiLU-125 | [-1, 336, 82, 28] | 0 |
| 126 | Conv2d-126 | [-1, 336, 82, 28] | 8,400 |
| 127 | BatchNorm2d-127 | [-1, 336, 82, 28] | 672 |
| 128 | SiLU-128 | [-1, 336, 82, 28] | 0 |
| 129 | AdaptiveAvgPool2d-129 | [-1, 336, 1, 1] | 0 |
| 130 | Conv2d-130 | [-1, 14, 1, 1] | 4,718 |
| 131 | SiLU-131 | [-1, 14, 1, 1] | 0 |
| 132 | Conv2d-132 | [-1, 336, 1, 1] | 5,040 |
| 133 | Sigmoid-133 | [-1, 336, 1, 1] | 0 |
| 134 | SqueezeExcitation-134 | [-1, 336, 82, 28] | 0 |
| 135 | Conv2d-135 | [-1, 56, 82, 28] | 18,816 |
| 136 | BatchNorm2d-136 | [-1, 56, 82, 28] | 112 |
| 137 | StochasticDepth-137 | [-1, 56, 82, 28] | 0 |
| 138 | MBConv-138 | [-1, 56, 82, 28] | 0 |
| 139 | Conv2d-139 | [-1, 336, 82, 28] | 18,816 |
| 140 | BatchNorm2d-140 | [-1, 336, 82, 28] | 672 |
| 141 | SiLU-141 | [-1, 336, 82, 28] | 0 |
| 142 | Conv2d-142 | [-1, 336, 82, 28] | 8,400 |
| 143 | BatchNorm2d-143 | [-1, 336, 82, 28] | 672 |
| 144 | SiLU-144 | [-1, 336, 82, 28] | 0 |
| 145 | AdaptiveAvgPool2d-145 | [-1, 336, 1, 1] | 0 |
| 146 | Conv2d-146 | [-1, 14, 1, 1] | 4,718 |
| 147 | SiLU-147 | [-1, 14, 1, 1] | 0 |
| 148 | Conv2d-148 | [-1, 336, 1, 1] | 5,040 |
| 149 | Sigmoid-149 | [-1, 336, 1, 1] | 0 |
| 150 | SqueezeExcitation-150 | [-1, 336, 82, 28] | 0 |
| 151 | Conv2d-151 | [-1, 56, 82, 28] | 18,816 |
| 152 | BatchNorm2d-152 | [-1, 56, 82, 28] | 112 |
| 153 | StochasticDepth-153 | [-1, 56, 82, 28] | 0 |
| 154 | MBConv-154 | [-1, 56, 82, 28] | 0 |
| 155 | Conv2d-155 | [-1, 336, 82, 28] | 18,816 |
| 156 | BatchNorm2d-156 | [-1, 336, 82, 28] | 672 |
| 157 | SiLU-157 | [-1, 336, 82, 28] | 0 |
| 158 | Conv2d-158 | [-1, 336, 41, 14] | 3,024 |
| 159 | BatchNorm2d-159 | [-1, 336, 41, 14] | 672 |
| 160 | SiLU-160 | [-1, 336, 41, 14] | 0 |
| 161 | AdaptiveAvgPool2d-161 | [-1, 336, 1, 1] | 0 |
| 162 | Conv2d-162 | [-1, 14, 1, 1] | 4,718 |
| 163 | SiLU-163 | [-1, 14, 1, 1] | 0 |
| 164 | Conv2d-164 | [-1, 336, 1, 1] | 5,040 |
| 165 | Sigmoid-165 | [-1, 336, 1, 1] | 0 |
| 166 | SqueezeExcitation-166 | [-1, 336, 41, 14] | 0 |
| 167 | Conv2d-167 | [-1, 112, 41, 14] | 37,632 |
| 168 | BatchNorm2d-168 | [-1, 112, 41, 14] | 224 |
| 169 | MBConv-169 | [-1, 112, 41, 14] | 0 |
| 170 | Conv2d-170 | [-1, 672, 41, 14] | 75,264 |
| 171 | BatchNorm2d-171 | [-1, 672, 41, 14] | 1,344 |
| 172 | SiLU-172 | [-1, 672, 41, 14] | 0 |
| 173 | Conv2d-173 | [-1, 672, 41, 14] | 6,048 |
| 174 | BatchNorm2d-174 | [-1, 672, 41, 14] | 1,344 |
| 175 | SiLU-175 | [-1, 672, 41, 14] | 0 |
| 176 | AdaptiveAvgPool2d-176 | [-1, 672, 1, 1] | 0 |
| 177 | Conv2d-177 | [-1, 28, 1, 1] | 18,844 |
| 178 | SiLU-178 | [-1, 28, 1, 1] | 0 |
| 179 | Conv2d-179 | [-1, 672, 1, 1] | 19,488 |
| 180 | Sigmoid-180 | [-1, 672, 1, 1] | 0 |
| 181 | SqueezeExcitation-181 | [-1, 672, 41, 14] | 0 |
| 182 | Conv2d-182 | [-1, 112, 41, 14] | 75,264 |
| 183 | BatchNorm2d-183 | [-1, 112, 41, 14] | 224 |
| 184 | StochasticDepth-184 | [-1, 112, 41, 14] | 0 |
| 185 | MBConv-185 | [-1, 112, 41, 14] | 0 |
| 186 | Conv2d-186 | [-1, 672, 41, 14] | 75,264 |
| 187 | BatchNorm2d-187 | [-1, 672, 41, 14] | 1,344 |
| 188 | SiLU-188 | [-1, 672, 41, 14] | 0 |
| 189 | Conv2d-189 | [-1, 672, 41, 14] | 6,048 |
| 190 | BatchNorm2d-190 | [-1, 672, 41, 14] | 1,344 |
| 191 | SiLU-191 | [-1, 672, 41, 14] | 0 |
| 192 | AdaptiveAvgPool2d-192 | [-1, 672, 1, 1] | 0 |
| 193 | Conv2d-193 | [-1, 28, 1, 1] | 18,844 |
| 194 | SiLU-194 | [-1, 28, 1, 1] | 0 |
| 195 | Conv2d-195 | [-1, 672, 1, 1] | 19,488 |
| 196 | Sigmoid-196 | [-1, 672, 1, 1] | 0 |
| 197 | SqueezeExcitation-197 | [-1, 672, 41, 14] | 0 |
| 198 | Conv2d-198 | [-1, 112, 41, 14] | 75,264 |
| 199 | BatchNorm2d-199 | [-1, 112, 41, 14] | 224 |
| 200 | StochasticDepth-200 | [-1, 112, 41, 14] | 0 |
| 201 | MBConv-201 | [-1, 112, 41, 14] | 0 |
| 202 | Conv2d-202 | [-1, 672, 41, 14] | 75,264 |
| 203 | BatchNorm2d-203 | [-1, 672, 41, 14] | 1,344 |
| 204 | SiLU-204 | [-1, 672, 41, 14] | 0 |
| 205 | Conv2d-205 | [-1, 672, 41, 14] | 6,048 |
| 206 | BatchNorm2d-206 | [-1, 672, 41, 14] | 1,344 |
| 207 | SiLU-207 | [-1, 672, 41, 14] | 0 |
| 208 | AdaptiveAvgPool2d-208 | [-1, 672, 1, 1] | 0 |
| 209 | Conv2d-209 | [-1, 28, 1, 1] | 18,844 |
| 210 | SiLU-210 | [-1, 28, 1, 1] | 0 |

TABLE 7-continued

Hidden Catalytic Converter Classifier

| Layer # | Layer Type | Output Shape | Parameters |
|---|---|---|---|
| 211 | Conv2d-211 | [-1, 672, 1, 1] | 19,488 |
| 212 | Sigmoid-212 | [-1, 672, 1, 1] | 0 |
| 213 | SqueezeExcitation-213 | [-1, 672, 41, 14] | 0 |
| 214 | Conv2d-214 | [-1, 112, 41, 14] | 75,264 |
| 215 | BatchNorm2d-215 | [-1, 112, 41, 14] | 224 |
| 216 | StochasticDepth-216 | [-1, 112, 41, 14] | 0 |
| 217 | MBConv-217 | [-1, 112, 41, 14] | 0 |
| 218 | Conv2d-218 | [-1, 672, 41, 14] | 75,264 |
| 219 | BatchNorm2d-219 | [-1, 672, 41, 14] | 1,344 |
| 220 | SiLU-220 | [-1, 672, 41, 14] | 0 |
| 221 | Conv2d-221 | [-1, 672, 41, 14] | 6,048 |
| 222 | BatchNorm2d-222 | [-1, 672, 41, 14] | 1,344 |
| 223 | SiLU-223 | [-1, 672, 41, 14] | 0 |
| 224 | AdaptiveAvgPool2d-224 | [-1, 672, 1, 1] | 0 |
| 225 | Conv2d-225 | [-1, 28, 1, 1] | 18,844 |
| 226 | SiLU-226 | [-1, 28, 1, 1] | 0 |
| 227 | Conv2d-227 | [-1, 672, 1, 1] | 19,488 |
| 228 | Sigmoid-228 | [-1, 672, 1, 1] | 0 |
| 229 | SqueezeExcitation-229 | [-1, 672, 41, 14] | 0 |
| 230 | Conv2d-230 | [-1, 112, 41, 14] | 75,264 |
| 231 | BatchNorm2d-231 | [-1, 112, 41, 14] | 224 |
| 232 | StochasticDepth-232 | [-1, 112, 41, 14] | 0 |
| 233 | MBConv-233 | [-1, 112, 41, 14] | 0 |
| 234 | Conv2d-234 | [-1, 672, 41, 14] | 75,264 |
| 235 | BatchNorm2d-235 | [-1, 672, 41, 14] | 1,344 |
| 236 | SiLU-236 | [-1, 672, 41, 14] | 0 |
| 237 | Conv2d-237 | [-1, 672, 41, 14] | 6,048 |
| 238 | BatchNorm2d-238 | [-1, 672, 41, 14] | 1,344 |
| 239 | SiLU-239 | [-1, 672, 41, 14] | 0 |
| 240 | AdaptiveAvgPool2d-240 | [-1, 672, 1, 1] | 0 |
| 241 | Conv2d-241 | [-1, 28, 1, 1] | 18,844 |
| 242 | SiLU-242 | [-1, 28, 1, 1] | 0 |
| 243 | Conv2d-243 | [-1, 672, 1, 1] | 19,488 |
| 244 | Sigmoid-244 | [-1, 672, 1, 1] | 0 |
| 245 | SqueezeExcitation-245 | [-1, 672, 41, 14] | 0 |
| 246 | Conv2d-246 | [-1, 112, 41, 14] | 75,264 |
| 247 | BatchNorm2d-247 | [-1, 112, 41, 14] | 224 |
| 248 | StochasticDepth-248 | [-1, 112, 41, 14] | 0 |
| 249 | MBConv-249 | [-1, 112, 41, 14] | 0 |
| 250 | Conv2d-250 | [-1, 672, 41, 14] | 75,264 |
| 251 | BatchNorm2d-251 | [-1, 672, 41, 14] | 1,344 |
| 252 | SiLU-252 | [-1, 672, 41, 14] | 0 |
| 253 | Conv2d-253 | [-1, 672, 41, 14] | 16,800 |
| 254 | BatchNorm2d-254 | [-1, 672, 41, 14] | 1,344 |
| 255 | SiLU-255 | [-1, 672, 41, 14] | 0 |
| 256 | AdaptiveAvgPool2d-256 | [-1, 672, 1, 1] | 0 |
| 257 | Conv2d-257 | [-1, 28, 1, 1] | 18,844 |
| 258 | SiLU-258 | [-1, 28, 1, 1] | 0 |
| 259 | Conv2d-259 | [-1, 672, 1, 1] | 19,488 |
| 260 | Sigmoid-260 | [-1, 672, 1, 1] | 0 |
| 261 | SqueezeExcitation-261 | [-1, 672, 41, 14] | 0 |
| 262 | Conv2d-262 | [-1, 160, 41, 14] | 107,520 |
| 263 | BatchNorm2d-263 | [-1, 160, 41, 14] | 320 |
| 264 | MBConv-264 | [-1, 160, 41, 14] | 0 |
| 265 | Conv2d-265 | [-1, 960, 41, 14] | 153,600 |
| 266 | BatchNorm2d-266 | [-1, 960, 41, 14] | 1,920 |
| 267 | SiLU-267 | [-1, 960, 41, 14] | 0 |
| 268 | Conv2d-268 | [-1, 960, 41, 14] | 24,000 |
| 269 | BatchNorm2d-269 | [-1, 960, 41, 14] | 1,920 |
| 270 | SiLU-270 | [-1, 960, 41, 14] | 0 |
| 271 | AdaptiveAvgPool2d-271 | [-1, 960, 1, 1] | 0 |
| 272 | Conv2d-272 | [-1, 40, 1, 1] | 38,440 |
| 273 | SiLU-273 | [-1, 40, 1, 1] | 0 |
| 274 | Conv2d-274 | [-1, 960, 1, 1] | 39,360 |
| 275 | Sigmoid-275 | [-1, 960, 1, 1] | 0 |
| 276 | SqueezeExcitation-276 | [-1, 960, 41, 14] | 0 |
| 277 | Conv2d-277 | [-1, 160, 41, 14] | 153,600 |
| 278 | BatchNorm2d-278 | [-1, 160, 41, 14] | 320 |
| 279 | StochasticDepth-279 | [-1, 160, 41, 14] | 0 |
| 280 | MBConv-280 | [-1, 160, 41, 14] | 0 |
| 281 | Conv2d-281 | [-1, 960, 41, 14] | 153,600 |
| 282 | BatchNorm2d-282 | [-1, 960, 41, 14] | 1,920 |
| 283 | SiLU-283 | [-1, 960, 41, 14] | 0 |
| 284 | Conv2d-284 | [-1, 960, 41, 14] | 24,000 |
| 285 | BatchNorm2d-285 | [-1, 960, 41, 14] | 1,920 |
| 286 | SiLU-286 | [-1, 960, 41, 14] | 0 |

TABLE 7-continued

Hidden Catalytic Converter Classifier

| Layer # | Layer Type | Output Shape | Parameters |
|---|---|---|---|
| 287 | AdaptiveAvgPool2d-287 | [-1, 960, 1, 1] | 0 |
| 288 | Conv2d-288 | [-1, 40, 1, 1] | 38,440 |
| 289 | SiLU-289 | [-1, 40, 1, 1] | 0 |
| 290 | Conv2d-290 | [-1, 960, 1, 1] | 39,360 |
| 291 | Sigmoid-291 | [-1, 960, 1, 1] | 0 |
| 292 | SqueezeExcitation-292 | [-1, 960, 41, 14] | 0 |
| 293 | Conv2d-293 | [-1, 160, 41, 14] | 153,600 |
| 294 | BatchNorm2d-294 | [-1, 160, 41, 14] | 320 |
| 295 | StochasticDepth-295 | [-1, 160, 41, 14] | 0 |
| 296 | MBConv-296 | [-1, 160, 41, 14] | 0 |
| 297 | Conv2d-297 | [-1, 960, 41, 14] | 153,600 |
| 298 | BatchNorm2d-298 | [-1, 960, 41, 14] | 1,920 |
| 299 | SiLU-299 | [-1, 960, 41, 14] | 0 |
| 300 | Conv2d-300 | [-1, 960, 41, 14] | 24,000 |
| 301 | BatchNorm2d-301 | [-1, 960, 41, 14] | 1,920 |
| 302 | SiLU-302 | [-1, 960, 41, 14] | 0 |
| 303 | AdaptiveAvgPool2d-303 | [-1, 960, 1, 1] | 0 |
| 304 | Conv2d-304 | [-1, 40, 1, 1] | 38,440 |
| 305 | SiLU-305 | [-1, 40, 1, 1] | 0 |
| 306 | Conv2d-306 | [-1, 960, 1, 1] | 39,360 |
| 307 | Sigmoid-307 | [-1, 960, 1, 1] | 0 |
| 308 | SqueezeExcitation-308 | [-1, 960, 41, 14] | 0 |
| 309 | Conv2d-309 | [-1, 160, 41, 14] | 153,600 |
| 310 | BatchNorm2d-310 | [-1, 160, 41, 14] | 320 |
| 311 | StochasticDepth-311 | [-1, 160, 41, 14] | 0 |
| 312 | MBConv-312 | [-1, 160, 41, 14] | 0 |
| 313 | Conv2d-313 | [-1, 960, 41, 14] | 153,600 |
| 314 | BatchNorm2d-314 | [-1, 960, 41, 14] | 1,920 |
| 315 | SiLU-315 | [-1, 960, 41, 14] | 0 |
| 316 | Conv2d-316 | [-1, 960, 41, 14] | 24,000 |
| 317 | BatchNorm2d-317 | [-1, 960, 41, 14] | 1,920 |
| 318 | SiLU-318 | [-1, 960, 41, 14] | 0 |
| 319 | AdaptiveAvgPool2d-319 | [-1, 960, 1, 1] | 0 |
| 320 | Conv2d-320 | [-1, 40, 1, 1] | 38,440 |
| 321 | SiLU-321 | [-1, 40, 1, 1] | 0 |
| 322 | Conv2d-322 | [-1, 960, 1, 1] | 39,360 |
| 323 | Sigmoid-323 | [-1, 960, 1, 1] | 0 |
| 324 | SqueezeExcitation-324 | [-1, 960, 41, 14] | 0 |
| 325 | Conv2d-325 | [-1, 160, 41, 14] | 153,600 |
| 326 | BatchNorm2d-326 | [-1, 160, 41, 14] | 320 |
| 327 | StochasticDepth-327 | [-1, 160, 41, 14] | 0 |
| 328 | MBConv-328 | [-1, 160, 41, 14] | 0 |
| 329 | Conv2d-329 | [-1, 960, 41, 14] | 153,600 |
| 330 | BatchNorm2d-330 | [-1, 960, 41, 14] | 1,920 |
| 331 | SiLU-331 | [-1, 960, 41, 14] | 0 |
| 332 | Conv2d-332 | [-1, 960, 41, 14] | 24,000 |
| 333 | BatchNorm2d-333 | [-1, 960, 41, 14] | 1,920 |
| 334 | SiLU-334 | [-1, 960, 41, 14] | 0 |
| 335 | AdaptiveAvgPool2d-335 | [-1, 960, 1, 1] | 0 |
| 336 | Conv2d-336 | [-1, 40, 1, 1] | 38,440 |
| 337 | SiLU-337 | [-1, 40, 1, 1] | 0 |
| 338 | Conv2d-338 | [-1, 960, 1, 1] | 39,360 |
| 339 | Sigmoid-339 | [-1, 960, 1, 1] | 0 |
| 340 | SqueezeExcitation-340 | [-1, 960, 41, 14] | 0 |
| 341 | Conv2d-341 | [-1, 160, 41, 14] | 153,600 |
| 342 | BatchNorm2d-342 | [-1, 160, 41, 14] | 320 |
| 343 | StochasticDepth-343 | [-1, 160, 41, 14] | 0 |
| 344 | MBConv-344 | [-1, 160, 41, 14] | 0 |
| 345 | Conv2d-345 | [-1, 960, 41, 14] | 153,600 |
| 346 | BatchNorm2d-346 | [-1, 960, 41, 14] | 1,920 |
| 347 | SiLU-347 | [-1, 960, 41, 14] | 0 |
| 348 | Conv2d-348 | [-1, 960, 21, 7] | 24,000 |
| 349 | BatchNorm2d-349 | [-1, 960, 21, 7] | 1,920 |
| 350 | SiLU-350 | [-1, 960, 21, 7] | 0 |
| 351 | AdaptiveAvgPool2d-351 | [-1, 960, 1, 1] | 0 |
| 352 | Conv2d-352 | [-1, 40, 1, 1] | 38,440 |
| 353 | SiLU-353 | [-1, 40, 1, 1] | 0 |
| 354 | Conv2d-354 | [-1, 960, 1, 1] | 39,360 |
| 355 | Sigmoid-355 | [-1, 960, 1, 1] | 0 |
| 356 | SqueezeExcitation-356 | [-1, 960, 21, 7] | 0 |
| 357 | Conv2d-357 | [-1, 272, 21, 7] | 261,120 |
| 358 | BatchNorm2d-358 | [-1, 272, 21, 7] | 544 |
| 359 | MBConv-359 | [-1, 272, 21, 7] | 0 |
| 360 | Conv2d-360 | [-1, 1632, 21, 7] | 443,904 |
| 361 | BatchNorm2d-361 | [-1, 1632, 21, 7] | 3,264 |
| 362 | SiLU-362 | [-1, 1632, 21, 7] | 0 |

TABLE 7-continued

Hidden Catalytic Converter Classifier

| Layer # | Layer Type | Output Shape | Parameters |
|---|---|---|---|
| 363 | Conv2d-363 | [−1, 1632, 21, 7] | 40,800 |
| 364 | BatchNorm2d-364 | [−1, 1632, 21, 7] | 3,264 |
| 365 | SiLU-365 | [−1, 1632, 21, 7] | 0 |
| 366 | AdaptiveAvgPool2d-366 | [−1, 1632, 1, 1] | 0 |
| 367 | Conv2d-367 | [−1, 68, 1, 1] | 111,044 |
| 368 | SiLU-368 | [−1, 68, 1, 1] | 0 |
| 369 | Conv2d-369 | [−1, 1632, 1, 1] | 112,608 |
| 370 | Sigmoid-370 | [−1, 1632, 1, 1] | 0 |
| 371 | SqueezeExcitation-371 | [−1, 1632, 21, 7] | 0 |
| 372 | Conv2d-372 | [−1, 272, 21, 7] | 443,904 |
| 373 | BatchNorm2d-373 | [−1, 272, 21, 7] | 544 |
| 374 | StochasticDepth-374 | [−1, 272, 21, 7] | 0 |
| 375 | MBConv-375 | [−1, 272, 21, 7] | 0 |
| 376 | Conv2d-376 | [−1, 1632, 21, 7] | 443,904 |
| 377 | BatchNorm2d-377 | [−1, 1632, 21, 7] | 3,264 |
| 378 | SiLU-378 | [−1, 1632, 21, 7] | 0 |
| 379 | Conv2d-379 | [−1, 1632, 21, 7] | 40,800 |
| 380 | BatchNorm2d-380 | [−1, 1632, 21, 7] | 3,264 |
| 381 | SiLU-381 | [−1, 1632, 21, 7] | 0 |
| 382 | AdaptiveAvgPool2d-382 | [−1, 1632, 1, 1] | 0 |
| 383 | Conv2d-383 | [−1, 68, 1, 1] | 111,044 |
| 384 | SiLU-384 | [−1, 68, 1, 1] | 0 |
| 385 | Conv2d-385 | [−1, 1632, 1, 1] | 112,608 |
| 386 | Sigmoid-386 | [−1, 1632, 1, 1] | 0 |
| 387 | SqueezeExcitation-387 | [−1, 1632, 21, 7] | 0 |
| 388 | Conv2d-388 | [−1, 272, 21, 7] | 443,904 |
| 389 | BatchNorm2d-389 | [−1, 272, 21, 7] | 544 |
| 390 | StochasticDepth-390 | [−1, 272, 21, 7] | 0 |
| 391 | MBConv-391 | [−1, 272, 21, 7] | 0 |
| 392 | Conv2d-392 | [−1, 1632, 21, 7] | 443,904 |
| 393 | BatchNorm2d-393 | [−1, 1632, 21, 7] | 3,264 |
| 394 | SiLU-394 | [−1, 1632, 21, 7] | 0 |
| 395 | Conv2d-395 | [−1, 1632, 21, 7] | 40,800 |
| 396 | BatchNorm2d-396 | [−1, 1632, 21, 7] | 3,264 |
| 397 | SiLU-397 | [−1, 1632, 21, 7] | 0 |
| 398 | AdaptiveAvgPool2d-398 | [−1, 1632, 1, 1] | 0 |
| 399 | Conv2d-399 | [−1, 68, 1, 1] | 111,044 |
| 400 | SiLU-400 | [−1, 68, 1, 1] | 0 |
| 401 | Conv2d-401 | [−1, 1632, 1, 1] | 112,608 |
| 402 | Sigmoid-402 | [−1, 1632, 1, 1] | 0 |
| 403 | SqueezeExcitation-403 | [−1, 1632, 21, 7] | 0 |
| 404 | Conv2d-404 | [−1, 272, 21, 7] | 443,904 |
| 405 | BatchNorm2d-405 | [−1, 272, 21, 7] | 544 |
| 406 | StochasticDepth-406 | [−1, 272, 21, 7] | 0 |
| 407 | MBConv-407 | [−1, 272, 21, 7] | 0 |
| 408 | Conv2d-408 | [−1, 1632, 21, 7] | 443,904 |
| 409 | BatchNorm2d-409 | [−1, 1632, 21, 7] | 3,264 |
| 410 | SiLU-410 | [−1, 1632, 21, 7] | 0 |
| 411 | Conv2d-411 | [−1, 1632, 21, 7] | 40,800 |
| 412 | BatchNorm2d-412 | [−1, 1632, 21, 7] | 3,264 |
| 413 | SiLU-413 | [−1, 1632, 21, 7] | 0 |
| 414 | AdaptiveAvgPool2d-414 | [−1, 1632, 1, 1] | 0 |
| 415 | Conv2d-415 | [−1, 68, 1, 1] | 111,044 |
| 416 | SiLU-416 | [−1, 68, 1, 1] | 0 |
| 417 | Conv2d-417 | [−1, 1632, 1, 1] | 112,608 |
| 418 | Sigmoid-418 | [−1, 1632, 1, 1] | 0 |
| 419 | SqueezeExcitation-419 | [−1, 1632, 21, 7] | 0 |
| 420 | Conv2d-420 | [−1, 272, 21, 7] | 443,904 |
| 421 | BatchNorm2d-421 | [−1, 272, 21, 7] | 544 |
| 422 | StochasticDepth-422 | [−1, 272, 21, 7] | 0 |
| 423 | MBConv-423 | [−1, 272, 21, 7] | 0 |
| 424 | Conv2d-424 | [−1, 1632, 21, 7] | 443,904 |
| 425 | BatchNorm2d-425 | [−1, 1632, 21, 7] | 3,264 |
| 426 | SiLU-426 | [−1, 1632, 21, 7] | 0 |
| 427 | Conv2d-427 | [−1, 1632, 21, 7] | 40,800 |
| 428 | BatchNorm2d-428 | [−1, 1632, 21, 7] | 3,264 |
| 429 | SiLU-429 | [−1, 1632, 21, 7] | 0 |
| 430 | AdaptiveAvgPool2d-430 | [−1, 1632, 1, 1] | 0 |
| 431 | Conv2d-431 | [−1, 68, 1, 1] | 111,044 |
| 432 | SiLU-432 | [−1, 68, 1, 1] | 0 |
| 433 | Conv2d-433 | [−1, 1632, 1, 1] | 112,608 |
| 434 | Sigmoid-434 | [−1, 1632, 1, 1] | 0 |
| 435 | SqueezeExcitation-435 | [−1, 1632, 21, 7] | 0 |
| 436 | Conv2d-436 | [−1, 272, 21, 7] | 443,904 |
| 437 | BatchNorm2d-437 | [−1, 272, 21, 7] | 544 |
| 438 | StochasticDepth-438 | [−1, 272, 21, 7] | 0 |

TABLE 7-continued

Hidden Catalytic Converter Classifier

| Layer # | Layer Type | Output Shape | Parameters |
|---|---|---|---|
| 439 | MBConv-439 | [−1, 272, 21, 7] | 0 |
| 440 | Conv2d-440 | [−1, 1632, 21, 7] | 443,904 |
| 441 | BatchNorm2d-441 | [−1, 1632, 21, 7] | 3,264 |
| 442 | SiLU-442 | [−1, 1632, 21, 7] | 0 |
| 443 | Conv2d-443 | [−1, 1632, 21, 7] | 40,800 |
| 444 | BatchNorm2d-444 | [−1, 1632, 21, 7] | 3,264 |
| 445 | SiLU-445 | [−1, 1632, 21, 7] | 0 |
| 446 | AdaptiveAvgPool2d-446 | [−1, 1632, 1, 1] | 0 |
| 447 | Conv2d-447 | [−1, 68, 1, 1] | 111,044 |
| 448 | SiLU-448 | [−1, 68, 1, 1] | 0 |
| 449 | Conv2d-449 | [−1, 1632, 1, 1] | 112,608 |
| 450 | Sigmoid-450 | [−1, 1632, 1, 1] | 0 |
| 451 | SqueezeExcitation-451 | [−1, 1632, 21, 7] | 0 |
| 452 | Conv2d-452 | [−1, 272, 21, 7] | 443,904 |
| 453 | BatchNorm2d-453 | [−1, 272, 21, 7] | 544 |
| 454 | StochasticDepth-454 | [−1, 272, 21, 7] | 0 |
| 455 | MBConv-455 | [−1, 272, 21, 7] | 0 |
| 456 | Conv2d-456 | [−1, 1632, 21, 7] | 443,904 |
| 457 | BatchNorm2d-457 | [−1, 1632, 21, 7] | 3,264 |
| 458 | SiLU-458 | [−1, 1632, 21, 7] | 0 |
| 459 | Conv2d-459 | [−1, 1632, 21, 7] | 40,800 |
| 460 | BatchNorm2d-460 | [−1, 1632, 21, 7] | 3,264 |
| 461 | SiLU-461 | [−1, 1632, 21, 7] | 0 |
| 462 | AdaptiveAvgPool2d-462 | [−1, 1632, 1, 1] | 0 |
| 463 | Conv2d-463 | [−1, 68, 1, 1] | 111,044 |
| 464 | SiLU-464 | [−1, 68, 1, 1] | 0 |
| 465 | Conv2d-465 | [−1, 1632, 1, 1] | 112,608 |
| 466 | Sigmoid-466 | [−1, 1632, 1, 1] | 0 |
| 467 | SqueezeExcitation-467 | [−1, 1632, 21, 7] | 0 |
| 468 | Conv2d-468 | [−1, 272, 21, 7] | 443,904 |
| 469 | BatchNorm2d-469 | [−1, 272, 21, 7] | 544 |
| 470 | StochasticDepth-470 | [−1, 272, 21, 7] | 0 |
| 471 | MBConv-471 | [−1, 272, 21, 7] | 0 |
| 472 | Conv2d-472 | [−1, 1632, 21, 7] | 443,904 |
| 473 | BatchNorm2d-473 | [−1, 1632, 21, 7] | 3,264 |
| 474 | SiLU-474 | [−1, 1632, 21, 7] | 0 |
| 475 | Conv2d-475 | [−1, 1632, 21, 7] | 14,688 |
| 476 | BatchNorm2d-476 | [−1, 1632, 21, 7] | 3,264 |
| 477 | SiLU-477 | [−1, 1632, 21, 7] | 0 |
| 478 | AdaptiveAvgPool2d-478 | [−1, 1632, 1, 1] | 0 |
| 479 | Conv2d-479 | [−1, 68, 1, 1] | 111,044 |
| 480 | SiLU-480 | [−1, 68, 1, 1] | 0 |
| 481 | Conv2d-481 | [−1, 1632, 1, 1] | 112,608 |
| 482 | Sigmoid-482 | [−1, 1632, 1, 1] | 0 |
| 483 | SqueezeExcitation-483 | [−1, 1632, 21, 7] | 0 |
| 484 | Conv2d-484 | [−1, 448, 21, 7] | 731,136 |
| 485 | BatchNorm2d-485 | [−1, 448, 21, 7] | 896 |
| 486 | MBConv-486 | [−1, 448, 21, 7] | 0 |
| 487 | Conv2d-487 | [−1, 2688, 21, 7] | 1,204,224 |
| 488 | BatchNorm2d-488 | [−1, 2688, 21, 7] | 5,376 |
| 489 | SiLU-489 | [−1, 2688, 21, 7] | 0 |
| 490 | Conv2d-490 | [−1, 2688, 21, 7] | 24,192 |
| 491 | BatchNorm2d-491 | [−1, 2688, 21, 7] | 5,376 |
| 492 | SiLU-492 | [−1, 2688, 21, 7] | 0 |
| 493 | AdaptiveAvgPool2d-493 | [−1, 2688, 1, 1] | 0 |
| 494 | Conv2d-494 | [−1, 112, 1, 1] | 301,168 |
| 495 | SiLU-495 | [−1, 112, 1, 1] | 0 |
| 496 | Conv2d-496 | [−1, 2688, 1, 1] | 303,744 |
| 497 | Sigmoid-497 | [−1, 2688, 1, 1] | 0 |
| 498 | SqueezeExcitation-498 | [−1, 2688, 21, 7] | 0 |
| 499 | Conv2d-499 | [−1, 448, 21, 7] | 1,204,224 |
| 500 | BatchNorm2d-500 | [−1, 448, 21, 7] | 896 |
| 501 | StochasticDepth-501 | [−1, 448, 21, 7] | 0 |
| 502 | MBConv-502 | [−1, 448, 21, 7] | 0 |
| 503 | Conv2d-503 | [−1, 1792, 21, 7] | 802,816 |
| 504 | BatchNorm2d-504 | [−1, 1792, 21, 7] | 3,584 |
| 505 | SiLU-505 | [−1, 1792, 21, 7] | 0 |
| 506 | AdaptiveAvgPool2d-506 | [−1, 1792, 1, 1] | 0 |
| 507 | Dropout-507 | [−1, 1792] | 0 |
| 508 | Linear-508 | [−1, 1] | 1,793 |

The total number of parameters for the model shown in Table 7 is 17,550,409 parameters. All of the 17,550,409 parameters are trainable parameters and none of the parameters are non-trainable parameters. The input size for the model is 1.67 MB. The forward/backward pass size is 1314.7 MB. The parameters size is 66.95 MB. The estimated total size is 1383.32 MB.

Trained machine learning model 1104 may be trained using a data set of curated Virtual Lift images of the undercarriages of a collection of vehicles. The images may be selected based on a comprehensive analysis of the vehicles commonly sold through an online auction platform that were also found to be missing catalytic converters. To ensure accuracy and reliability, a manual investigation was conducted for each car model, focusing on their undercarriage equipment, as well as their undercarriage emission system configuration. To gain performance on the most troublesome vehicles a large portion of the dataset may be selected to be distributed over the top 30 problematic vehicle models (e.g., the vehicle models which are difficult to detect missing catalytic converters on). To guarantee performance on all vehicles, additional data which was evenly distributed over the vehicle types involved in auctions sold on the platform was included. For example, the distribution of vehicles sold on the platform could be considered and a distribution for the dataset could be selected to reflect the diversity of vehicle types involved in auctions on the platform. The size of the dataset is depicted in Table 8, shown below.

TABLE 8

|  | Train | Validation | Test |
| --- | --- | --- | --- |
| Top 30 | 3062 | 531 | 0 |
| All Auctions | 2200 | 500 | 1000 |

For the training data set, vehicle components, of the vehicle emission system of each vehicle used in the training data, were identified by a group of a vehicle inspection team. This labeling accounted for various vehicle models and years. Additionally, vehicle models which include hard-to-detect emission systems were intentionally included in the data set to enhance the performance of the one or more trained machine learning models. To curate the dataset for the hidden catalytic converter classifier, the output of the trained catalytic converter detection model was used to select specific year, make, model, trim, and engine description that had a low rate of catalytic converter detections to generate a class of hidden vehicles. The list was subsequently verified by members of the vehicle inspection team. The positive class of visible catalytic converters could then be easily generated from vehicles that already had a hand labeled visible catalytic converter. The size of the resulting dataset is shown below in Table 9.

TABLE 9

| Data | Positive | Negative |
| --- | --- | --- |
| Train | 4233 | 1620 |
| Validation | 872 | 347 |
| Test | 801 | 348 |

The output of the first trained machine learning model and the output of the second machine learning model may be processed as described herein, especially in connection with FIG. 10, to generate outputs 1106.

In some embodiments, outputs 1106 include the likelihood of a visible catalytic converter being present in the image 1116. In some embodiments, outputs 1106 include a visual indication overlaid on an image of the undercarriage of the vehicle that may indicate the presence of a catalytic converter or may indicate the location at which a catalytic converter is expected but not detected. In some embodiments, outputs 1106 may include an amended vehicle condition report that includes a determination of whether the vehicle includes a catalytic converter or whether a catalytic converter is missing from the vehicle.

Figure 12:
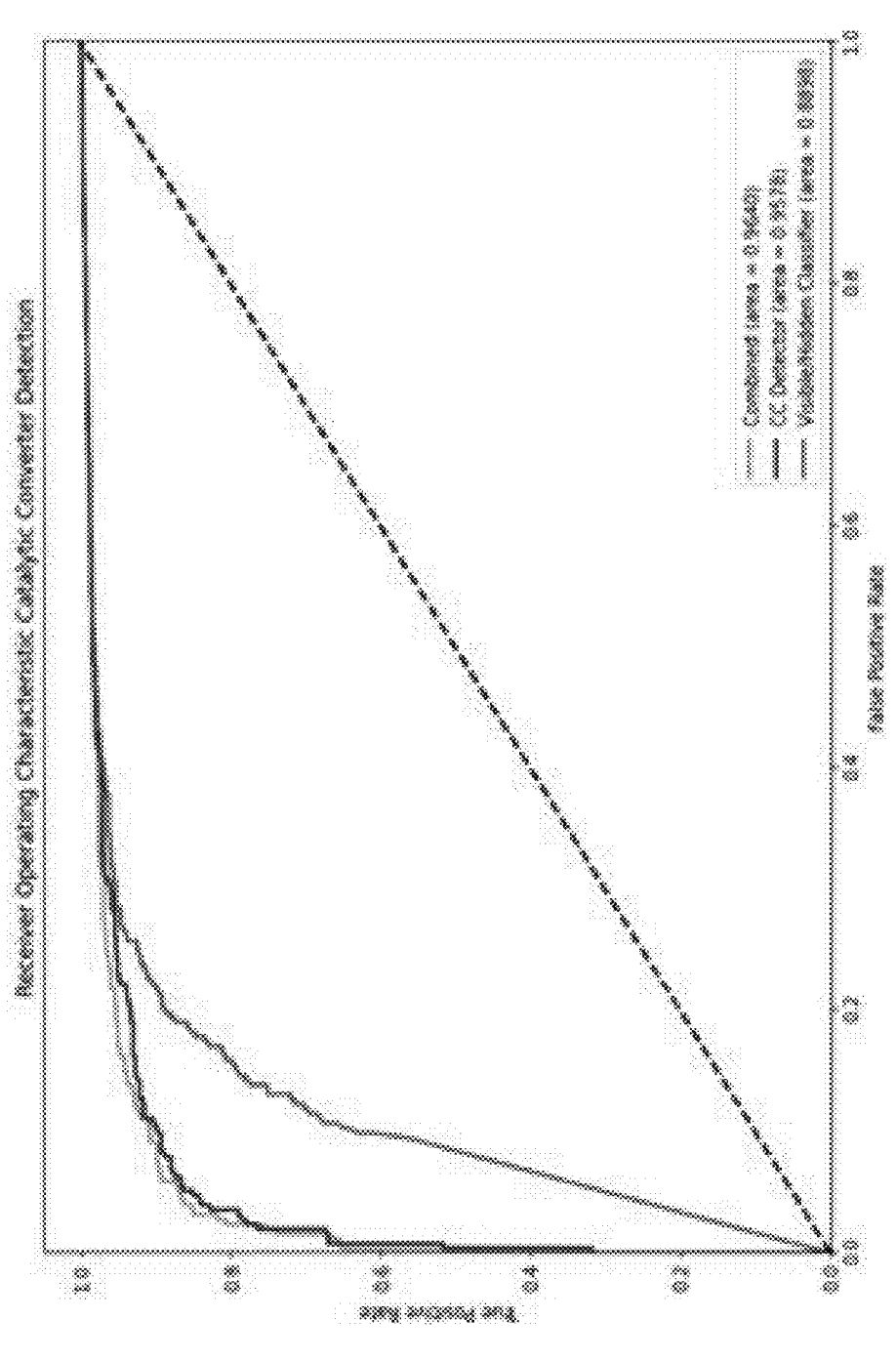
FIG. 12 illustrates receiver operating characteristic (ROC) curves representing performance of a trained catalytic converter detection machine learning model, in accordance with some embodiments of the technology described herein.

FIG. 12 illustrates receiver operating characteristic curves 1200 representing performance of a trained catalytic converter detection machine learning model, in accordance with some embodiments of the technology described herein. The accuracy of the model with respect to the validation and tests sets is included below in Table 10.

TABLE 10

| Results | Validation | Test |
| --- | --- | --- |
| Accuracy | 95.3% | 93.6% |

IV.C ML Techniques for Identifying Presence of Rust in Vehicle Undercarriage Images The inventors have appreciated that the detection of structural rust may be difficult as components which are prone to rust are generally located out of sight, requiring the use of a vehicle lift or an undercarriage view. Furthermore, the presence of rust on a vehicle may be easy to miss especially when located in hard-to-view areas or in areas with many components, such that there may be many exposed surfaces to check. In particular, the inventors have recognized that structural rust, which may be confused for surface rust, is of particular interest as it may compromise the safety or structural integrity of the vehicle. As referenced herein, structural rust is: 1) rust on a component that is part of the frame, wherein the frame supports the mechanical systems of the vehicle (rather than an exterior component); and 2) is an oxidation of the component volume (rather than a surface, sacrificial, or protective layer).

The inventors have recognized that trained machine learning models provide key advantages for detecting the presence of rust on a vehicle. In particular, the trained machine learning models can consider multiple views of a vehicle concurrently (e.g., multiple images may be acquired from different views and combined into a single image depicting the respective views for processing) and therefore provide more accurate detection of structural rust, compared to conventional visual inspections.

Therefore, the inventors have developed trained machine learning models to detect the presence of rust on a vehicle based on a set of images taken from different views of various vehicle components which may be prone to rust including a vehicle undercarriage image as well as additional views from different perspectives of a vehicle undercarriage.

Accordingly, some embodiments provide for a computer-implemented method to detect the presence of rust on an undercarriage of a vehicle, the method comprising using at least one computer hardware processor to perform: (A) obtaining at least one image of the undercarriage of the vehicle and metadata indicating one or more properties of the vehicle (e.g., a reading of the vehicle's odometer, an age of the vehicle, a type of drivetrain in the vehicle, a measure of displacement of the vehicle's engine, a fuel type of the vehicle, an inspection location, etc.); (B) processing the at least one image (e.g., an image of at least one rocker panel of the vehicle, at least one image of the vehicle's frame, or at least one image of the undercarriage) and the metadata to detect presence of the rust, the processing comprising: generating image input from the at least one image (e.g., concatenating two or more images into a single wide image to be used as the image input); (C) generating metadata input from the metadata (e.g., generating metadata features includes generating a numeric representation of text in the metadata); and (D) processing the image input and the metadata input using the one or more trained machine learning models (e.g., a deep neural network model having a plurality of parameters) to obtain output (e.g., a numeric value) indicative of presence or absence of the rust on the undercarriage of the vehicle.

In some embodiments, the one or more trained machine learning models includes a first neural network portion comprising a plurality of 2D convolutional layers and configured to process the image input; a second neural network portion comprising a plurality of residual neural network blocks and configured to process the metadata input; and a fusion neural network portion comprising one or more 2D convolutional layers and configured to combine outputs produced by the first neural network portion and the second neural network portion to obtain the output indicative of presence or absence of the rust (e.g., structural rust).

In some embodiments, the one or more trained machine learning models includes a plurality of parameters (e.g., between one million and one hundred million parameters) and processing the image input and the metadata using the one or more trained machine learning models includes computing the output using values of the plurality of parameters, the image input, and the metadata input.

In some embodiments, the at least one image may be at least one composite image of the undercarriage of the vehicle, the at least one composite image having been generated by combining multiple images of the undercarriage of the vehicle. For example, a virtual lift image generated by acquiring images of a vehicle driven over a mobile device, as described herein.

In some embodiments, the at least one image may include at least one image of the at least one rocker panel, the at least one image of the at least one rocker panel comprising an image of the right rocker panel of the vehicle and an image of the left rocker panel of the vehicle.

In some embodiments, the at least one image may include at least one image of the vehicle's frame, the at least on image of the vehicle's frame comprising an image of a left portion of the vehicle's frame, a rear portion of the vehicle's frame, and a right portion of the vehicle's frame.

In some embodiments, the generating the input image may include, prior to the concatenating, normalizing each of the plurality of images.

In some embodiments, a vehicle condition report is generated indicating the presence or absence of rust based on the output.

FIG. 13 is a flowchart of illustrative process 1300 for using one or more trained machine learning models to detect the presence of rust on the undercarriage of a vehicle, in accordance with some embodiments of the technology described herein. Process 1300 may be executed by any suitable computing device(s). For example, process 1300 may be executed by a mobile device (e.g., mobile device 104), a server or servers (e.g., server(s) 129), or any other suitable computing device(s) including any of the devices described herein in particular with reference to FIG. 1.

Prior to the start of process 1300, an image of the undercarriage and/or other portions of the vehicle (e.g., an image of a rocker panel, an image of the left/right/rear frame, additional undercarriage images representing different perspectives) may be processed by a machine learning model to determine whether the image of the undercarriage is of sufficient quality to be processed by one or more trained machine learning models to detect the presence of a catalytic converter in the image of the undercarriage of the vehicle. For example, process 700 described above in connection with FIG. 7 may be used to process the image of the undercarriage to obtain output indicative of the presence of zero, one, or multiple image quality defects in the image of the undercarriage of the vehicle in connection with determining whether the image of the undercarriage of the vehicle is of sufficient quality for subsequent processing.

Process 1300 starts at act 1302 by obtaining an image of the undercarriage of the vehicle and metadata. The image of the undercarriage of the vehicle and the metadata may be obtained from a vehicle condition report, as described herein. In some embodiments, additional images of the vehicle may be obtained including images of different portions of the vehicle and/or images of different views of a same portion of the vehicle. For example, act 1302 may include obtaining 10 images of the vehicle. The images may include a reconstructed undercarriage image acquired using a virtual lift system, images of the rocker panels, image(s) of the frame, and/or additional images of the undercarriage acquired by inspectors using a mobile device either with or without the virtual lift system. In some embodiments, a subset of the images may not be included with the vehicle condition report. For example, while an undercarriage image may be obtained through the vehicle condition report the additional input images obtained in connection with process 1300 may be obtained directly from the inspector or may be associated with a vehicle identifier included in the vehicle condition report but may be located separately, such that the images may only be available to an inspector and not to a potential buyer or seller of the vehicle. In some embodiments, all of the images may be included in the vehicle condition report. In some embodiments, all of the images may be obtained separate from a vehicle condition report and/or may be obtained during a vehicle inspection prior to the generation of the vehicle condition report. For example, in connection with an inspector's vehicle inspection images may be input to a vehicle diagnostic system such as the vehicle diagnostic system described above in connection with FIG. 1.

In some embodiments, the image of the undercarriage of the vehicle may be a composite image having been generated by combining multiple images of the undercarriage of the vehicle, as described herein. For example, the image of the undercarriage of the vehicle may have been acquired using a mobile device in connection with a virtual lift system, as described herein.

The images of the rocker panels may include two or more images. The rocker panels are generally located on each side of a vehicle under the doors spanning a distance between the front and rear wheel openings. In some embodiments, the images of the rocker panels may include two images such as an image of the left rocker panel and an image of the right rocker panel. The images of the rocker panels may further include a view of a wheel opening and/or the trim around a door of the vehicle. In some embodiments, the images of the rocker panels may include four images such as an image that includes a front portion of a left rocker panel and a front left wheel opening, an image that includes a back portion of a left rocker panel and a back left wheel opening, an image that includes a front portion of a right rocker panel and a front right wheel opening, and an image that includes a back portion of a right rocker panel and a back right wheel opening. In some embodiments, the images of the rocker panels may include more than four images for example images may be centered on each wheel opening and each door of the vehicle thereby capturing separate portions and/or overlapping portions of views of the rocker panels which when combined or when considered together may represent the full length of the rocker panel on each side of the vehicle.

The image(s) of the frame may include one or more images of a vehicle frame. In some embodiments, the one or more images of the vehicle frame may include three images such as a left image of a left portion of the frame, a right image of a right portion of the frame, and a rear image of a rear portion of the frame. In some embodiments, the one or more images of the vehicle frame may include four images such as a left image of a left portion of the frame, a right image of a right portion of the frame, a front image of a front portion of the frame, and a rear image of a rear portion of the frame. In some embodiments, the one or more images of the vehicle frame may include images centered around specific components which attach to the frame and/or may be centered around joints of the frame where two frame portions meet or diverge in separate directions.

Additional undercarriage images may include one or more images that capture views from additional perspectives of the undercarriage of the vehicle. In some embodiments, the one or more additional images may include four additional images acquired without the use of a virtual lift system by inspectors using a mobile device, as described herein. The one or more additional images may depict views of the undercarriage taken from perspectives along the perimeter of the vehicle thereby capturing views of the undercarriage from a different perspective than the virtual lift image. Accordingly, the one or more additional images may include components which are obscured from view in an undercarriage image based on the view from directly beneath the vehicle as opposed to a view from a perimeter of the vehicle of the undercarriage. In some embodiments, one or more additional images may be acquired using a virtual lift either with different placement of the system and/or with different acquisition settings.

Next process 1300 proceeds to act 1304 where an input image is generated from the images of the vehicle. The input image may include images of different portions of the vehicle and/or different views of the vehicle which are arranged together in a single image.

The input image may include multiple images concatenated together. In some embodiments, the image inputs may include of 10 images concatenated together. For example, the 10 images may include: a reconstructed undercarriage image ("Virtual Lift"), two rocker panel photos included a photo of right rocker panel and a photo of a left rocker panels, three frame photos including a photo of a left portion of the frame, a photo of a right portion of the frame, and a photo of a rear portion of the frame, and four additional undercarriage images taken by inspectors. In some embodiments, the input image may include fewer than 10 images concatenated together. For example, the input image may include between 1 and 10 images, or 2 and 8 images concatenated together. In some embodiments, the input image may include greater than 10 images concatenated together. For example, the input image may include between 10 and 15 images, between 10 and 20 images, or between 10 and 30 images concatenated together.

In some embodiments, generating the input image, from the obtained images, may include resizing the images. Resizing the images may include cropping and/or resampling the images. In some embodiments, the images may be copped to a particular size. In some embodiments, the images may be resampled, as described herein, to have a particular size. In some embodiments, resizing the images may include a combination of cropping and resampling to obtain images having a particular size. For example, the images may be resized to 200×200 pixels, 300×300 pixels, 400×400 pixels, 500×500 pixels, or 600×600 pixels. In other embodiments, the images may be resized to have a different aspect ratio (e.g., a rectangular aspect ratio).

Additionally, in some embodiments, the RGB pixel values of each image are normalized by subtracting the pixel mean and dividing by pixel standard deviation for each color channel, as described herein. In some embodiments, zero Z-scores are used for missing images.

The normalized images are concatenated together to form a single image. In some embodiments, the images are concatenated together vertically to form a single vertical image. In some embodiments, the images are concatenated together to form a two-dimensional array of images. In some embodiments, the images are concatenated together horizontally to form a single wide image. Accordingly, in some embodiments, the resulting vector is 3C×400H×4000 W.

Next process 1300 proceeds to act 1306 where a metadata input is generated from the received metadata. In some embodiments, the metadata input includes various features (e.g., vehicle properties) obtained during a vehicle inspection. For example, the metadata input may include an odometer gauge reading, the vehicle age in decades, the vehicle engine displacement in liters, a latitude coordinate associated with the vehicle inspection locations, a longitude coordinate associated with the vehicle inspection location, the Koppen climate code at the inspection location, a two letter US state code associated with the state in which the inspection location is located, the drivetrain type of the vehicle, the fuel type of the vehicle, a BlackBook-reported engine property, and a list of Carfax® alerts. In some embodiments, the metadata inputs may include other features, such as the features described herein in connection with FIGS. 2-4.

In some embodiments, properties that contain text values (e.g., fuel type, climate code, engine properties) are word-vectorized. Word-vectorizing may include creating sub-features of the property where each sub-feature represents the presence of certain words in the vehicle property. The certain words represented by each sub-feature may be compiled in a dictionary of those words which includes words that occurred at least 100 times within each textual property in the training dataset. In some embodiments, vectors of numeric, Boolean, and word-vectorized properties may be normalized by their column means and standard deviations.

Next process 1300 proceeds to act 1308 where the image and the metadata inputs are processed using one or more trained machine learning models to obtain an output indicative of the presence of rust on the undercarriage of the vehicle. In some embodiments, the one or more trained machine learning models is a deep neural network. In some embodiments, the one or more trained machine learning models may have separate portions to process the image and metadata inputs separately. For example, the one or more trained machine learning models may include a first neural network portion including a plurality of 2D convolutional layers. The first neural network portion being configured to process the image input. The one or more trained machine learning models may further include a second neural network portion including a plurality of residual neural network blocks. The second neural network portion being configured to process the metadata input. The one or more trained machine learning models may further include a fusion neural network portion including one or more 2D convolutional layers. The fusion neural network portion being configured to combine outputs produced by the first neural network portion and the second neural network portion to obtain the output indicative of the presence or absence of rust on the vehicle.

In some embodiments, the one or more trained machine learning models includes a plurality of parameters between 500,000 and 100 million parameters, 1 million and 50 million parameters, 5 million and 40 million parameters, or 10 million 30 million parameters. For example, the one or more trained machine learning models may include approximately 4,000,000 trainable parameters where the metadata portion and the fusion portion have 12,000 and 4000 parameters respectively. In some embodiments, the image inputs may be processed by an EfficientNet backbone. The EfficientNet backbone may be the model described in Mingxing Tan & Quoc V. Le, "EfficientNet: Rethinking Model Scaling for Convolutional Neural Networks," ICML 2019, which is incorporated by reference herein in its entirety. The metadata and fusion layers may process their respective inputs without using the EfficientNet backbone. In some embodiments, processing the image input and the metadata input using the one or more trained machine learning models to obtain output indicative of the presence or absence of rust on the vehicle includes computing the output using values of the plurality of parameters the image input and the metadata input.

In some embodiments, the output is a numeric value indicative of a likelihood that the undercarriage of the vehicle has rust. In some embodiments, the output may be a textual value descriptive of the presence of rust in the vehicle. For example, the textual value may be "low risk of structural rust" or "small risk of structural rust" or "high risk of structural rust."

Following act 1308, process 1300 concludes. Following the conclusion of process 1300, a vehicle condition report may be generated indicating the presence or absence of rust based on the output of the one or more trained machine learning models. Additionally, following the conclusion of process 1000, an initial vehicle condition report, comprising inspection results, may be obtained. The inspection results may indicate a first set of zero, one, or more vehicle defects that the inspector determined to be present in the vehicle. Based on the first set of zero, one, or more vehicle defects, and the output of process 1000, an indication of agreement or discrepancy between the first set of vehicle defects that the inspector determined to be present in the vehicle and the determination that rust is absent or present on the vehicle may be generated.

Figure 14:
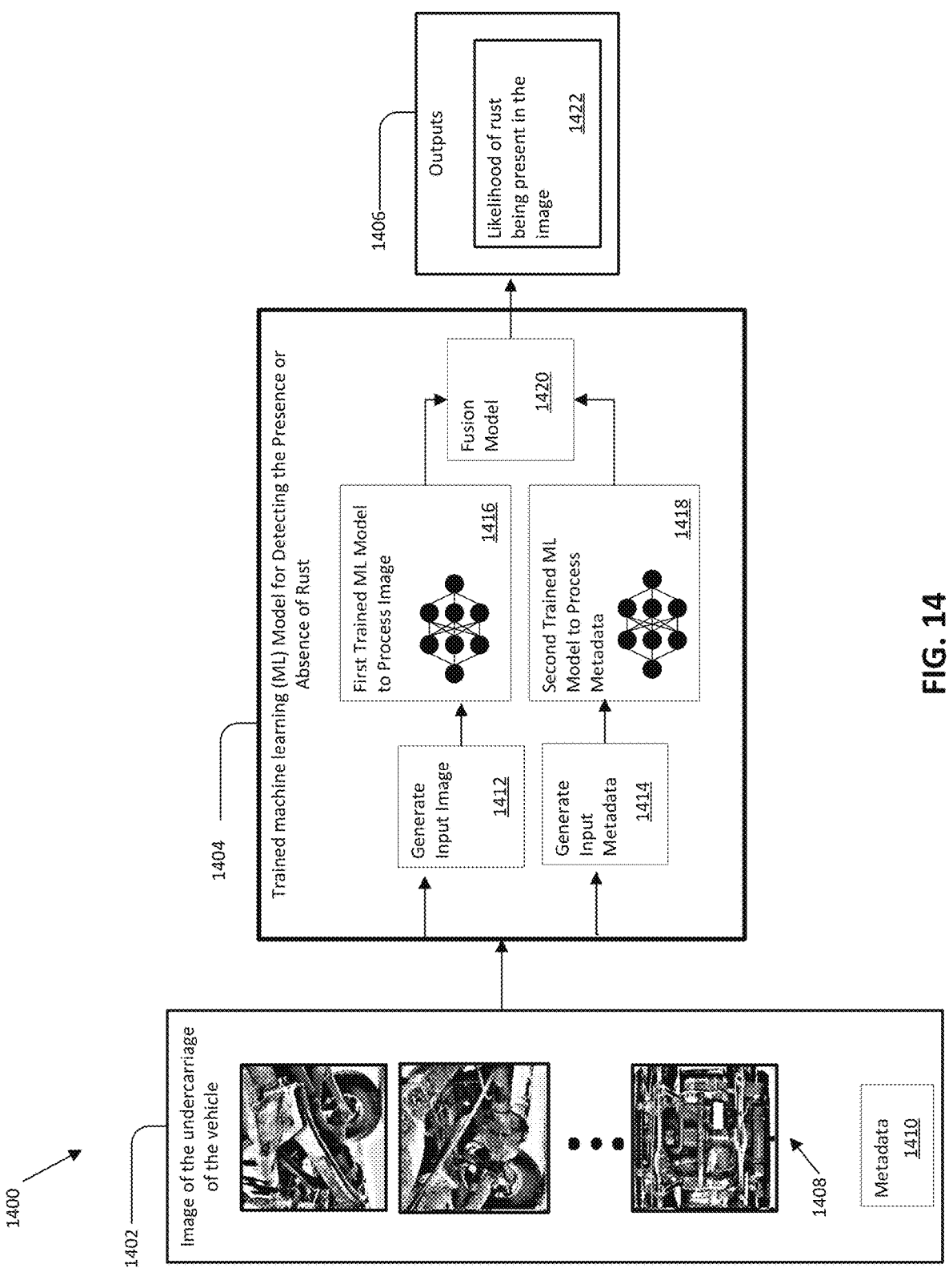
FIG. 14 illustrates one or more trained machine learning models for detecting the presence of rust on the undercarriage of a vehicle, in accordance with some embodiments of the technology described herein.

FIG. 14 illustrates one or more trained machine learning models 1400 for detecting the presence of rust on the undercarriage of a vehicle, in accordance with some embodiments of the technology described herein. As shown in FIG. 14, trained machine learning model 1400 includes trained machine learning model 1404 for processing inputs 1402 to generate an output 1406 indicative of the presence or absence of rust on the vehicle.

In some embodiments, inputs 1402 include images 1408 and metadata 1410. Images 1408 may include an undercarriage image of the vehicle in addition to rocker images, frame images, and additional undercarriage images, as described herein. Metadata 1410 may include vehicle parameters acquired and/or input during a vehicle inspection, as described herein.

Metadata 1410 may include 12 features (e.g., vehicle parameters) as described above in connection with FIG. 13. An example of the input features of metadata 1410 is included below in Table 11.

TABLE 11

| odometer | 142672 |
|---|---|
| year | 2000 |
| age_decades | 2.2 |
| displacement | 4.0 |
| long | −75.66 |
| lat | 41.4 |
| climate | Dfb |
| pickup_state | PA |
| drivetrain | 4WD |
| fuel_type | Gas |
| engine_properties | I-6 SFI |
| carfax | [BLANK] |

In some embodiments, trained machine learning model 1404 includes a first portion 1416 configured to process an image input 1412 and a second portion 1418 configured to process input metadata 1414. Input image 1112 may be generated by concatenating together input images 1408, as described herein. The input image may therefore include a set of views of the vehicle arranged adjacent to one another in a single array of pixels. Metadata input 1414 may be generated by vectorizing metadata 1410, as described herein. The metadata input may therefore be a vector of numeric values representative of numeric, Boolean, and textual components of metadata 1410.

For trained machine learning model 1404, samples including 10 images and the respective metadata were divided into training, validation, and test datasets. The training, validation, and test datasets included 215,000; 10,000; and 54,000 samples respectively. In some embodiments, the model may be implemented using the PyTorch library. In other embodiments, other libraries may be used to implement the one or more trained machine learning models, as aspects of the technology described herein are not limited in this respect.

During training, the machine learning model was trained to minimize cross entropy loss when predicting the binary labels of whether the vehicle inspector had identified at least surface, at least heavy, or at least penetrating rust on the vehicle undercarriage. In some embodiments, the three binary labels are used to train the model, but only the last label (e.g., penetrating rust) is predicted by the full pipeline and included with the model output 1406.

For optimizing model performance, a stochastic gradient descent was used. The labels were weighted by the inverse of their occurrence frequency in the training dataset. The learning rate and momentum of the optimizer were controlled by the one-cycle scheduling algorithm. The one-cycle maximum learning rate was set by performing the learning rate range test three times and selecting the median value. The model was trained for 100 epochs using 10 sample mini-batches. The parameter combination that yielded the highest score on the validation dataset was retained for evaluation on the test set. The score consisted of the sum of two sub-metrics: ROCAUC and AP. ROCAUC was the area under the receiver operating characteristic curve, and AP was the area under the precision-recall curve.

The hyperparameters of the training pipeline were optimized using the Ray Tune framework. Eight parallel processes were used for 200 generations of the OnePlusOne genetic algorithm from the Nevergrad library. The parallel processes in combination with the median stopping rule were used to explore the hyperparameter space. The hyperparameters included: label smoothing amount, metadata input jitter amount, input_image size, image gaussian noise amount, Gaussian blur amount, blank image probability, image color jitter amount, maximum random erase area, maximum random rotate degrees, metadata branch residual layer units and dropout. The best hyperparameter combination was chosen based on the largest validation score, as described herein.

The three outputs of the trained neural network were used to calibrate the probability of penetrating undercarriage rust, which was the final output of the model. A sklearn.preprocessing.PolynomialFeatures class was used to append pairwise multiplication features of the three outputs, which were then passed into the sklearn.calibration.CalibratedClassifierCV calibrator. A 25-calibrator ensemble, obtained from training 25-fold cross validations using the "isotonic" method, was used to compute the final probability of penetrating undercarriage rust.

The first portion 1416 of the trained machine learning model include an EfficientNet backbone (torchvision.models.efficientnet_b0 class). The first submodule of the original network ("features") is used to extract the features, while the original average pool and classifier layers are discarded. This branch receives 3C×400H×4000 W input vectors and produces 1280C×13H×125 W output vectors. The EfficientNet feature layers may be used in their original form.

The first portion 1416 of the trained machine learning model may be trained by shuffling the order of input images, and each image is randomly altered in the following ways. A random image pixel values are set to zero (random missing image), the brightness, contrast, and saturation of the image is jittered by a random amount (using torchvision.transforms.ColorJitter class), a random amount of blur is added (using torchvision.transforms.GaussianBlur), image is randomly horizontally flipped, a random patch of the image is replaced by noise (using torchvision.transforms.RandomErasing), a random amount of normally distributed noise is added to pixel values, and the image is rotated by a random number of degrees.

An example of the architecture of the first portion of the machine learning model is illustrated below in Table 12.

TABLE 12

| | Image Processing Portion with EfficientNet Structure | | | |
|---|---|---|---|---|
| Stage | Operator | Resolution (H × W) | # of Channels | # of Layers |
| 1 | Conv3 × 3 | 224 × 224 | 32 | 1 |
| 2 | MBConv2, k3 × 3 | 112 × 112 | 16 | 1 |
| 3 | MBConv6, k3 × 3 | 112 × 112 | 24 | 2 |
| 4 | MBConv6, k5 × 5 | 56 × 56 | 40 | 2 |
| 5 | MBConv6, k3 × 3 | 28 × 28 | 80 | 3 |
| 6 | MBConv6, k5 × 5 | 14 × 14 | 112 | 3 |
| 7 | MBConv6, k5 × 5 | 14 × 14 | 192 | 4 |
| 8 | MBConv6, k3 × 3 | 7 × 7 | 320 | 1 |
| 9 | Conv 1 × 1 & Pooling &FC | 7 × 7 | 1280 | 1 |

The second portion 1418 of the trained machine learning model may be trained by adding a random amount of normally distributed noise is added to the normalized metadata vector (meta-data augmentation). For example, the resulting vector may contain 186 elements.

An example of the architecture of the second portion of the machine learning model is illustrated below in Table 13.

TABLE 13

| | Metadata Processing Portion |
|---|---|
| Line # | Sample Code |
| 1 | Sequential( |
| 2 | (0): ResidualBlock( |
| 3 | (detour): Sequential( |
| 4 | (0): Dropout(p=0.23476909002573876, inplace=False) |
| 5 | (1): Linear(in_features=186, out_features=26, bias=True) |
| 6 | (2): BatchNorm1d(26, eps=1e−05, momentum=0.1, affine=True, track_running_stats=True) |
| 7 | (3): LeakyReLU(negative_slope=0.01) |
| 8 | ) |
| 9 | (dim_changer): Sequential( |
| 10 | (0): Dropout(p=0.23476909002573876, inplace=False) |
| 11 | (1): Linear(in_features=186, out_features=26, bias=True) |
| 12 | (2): BatchNorm1d(26, eps=1e−05, momentum=0.1, affine=True, track_running_stats=True) |
| 13 | ) |
| 14 | ) |
| 15 | (1): ResidualBlock( |
| 16 | (detour): Sequential( |
| 17 | (0): Dropout(p=0.23476909002573876, inplace=False) |
| 18 | (1): Linear(in_features=26, out_features=46, bias=True) |
| 19 | (2): BatchNorm1d(46, eps=1e−05, momentum=0.1, affine=True, track_running_stats=True) |
| 20 | (3): LeakyReLU(negative_slope=0.01) |
| 21 | ) |
| 22 | (dim_changer): Sequential( |
| 23 | (0): Dropout(p=0.23476909002573876, inplace=False) |
| 24 | (1): Linear(in_features=26, out_features=46, bias=True) |
| 25 | (2): BatchNorm1d(46, eps=1e−05, momentum=0.1, affine=True, track_running_stats=True) |
| 26 | ) |
| 27 | ) |
| 28 | ) |

Trained machine learning model 1404 may further include a fusion model portion 1420. Fusion model 1420 may be configured to receive the output of the first portion of the trained machine learning model 1416 and the output of the second portion of the trained machine learning model. For example, the output of the first trained machine learning model portion may be an output vector having 1280 channels with a height and width of 13 by 125 values respectively. The output of the second trained machine learning model portion 1418 may include 46 features. Accordingly, the 46 metadata branch features may be appended to each of the 1280 dimensional 13 by 125 feature patches produced by the image branch resulting in an input vector to the fusion model portion 1420 having a dimensionality of 1326 channels with a height and width of 13 by 125 respectively. In some embodiments, the metadata branch consists of two residual layers which have a linear dimension changing branch ("dim_changer") and a non-linear ("detour") branch. The sum of the two branches is the output of a residual layer. An example of the architecture of the metadata branch is shown below in Table 14.

TABLE 14

| Fusion Portion |
| --- |
| Line #  Sample Code |
| 1  Sequential( |
| 2  (0): AdaptiveAvgPool2d(output_size=1) |
| 3  (1): Conv2d(1326, 3, kernel_size=(1, 1), stride=(1, 1)) |
| 4  (2): BatchNorm2d(3, eps=1e-05, momentum=0.1, affine=True, track_running_stats=True) |
| 5  (3): LeakyReLU(negative_slope=0.01) |
| 6  ) |

In some embodiments, the patches of the input vector may be pooled, such as with an average pooling technique, and the resulting 1326 features may be processed by a final nonlinear convolution to produce 3 probability logits. In some embodiments, these three probability logits are processed to provide a single output score 1422 representing the likelihood that rust is present in the image of the vehicle. Accordingly output 1406 may be a likelihood that rust is present in the image of the vehicle. In some embodiments, output 1406 may include a single likelihood 1422 indicative of the presence of rust on the vehicle. In some embodiments, output 1406 may include an output vector 1422 indicative of the presence of rust for each image of the images input to the model such that the indication provides A probability of rust being present on a particular vehicle component corresponding to the components in the image in which the rust was detected. In some embodiments, output 1422 may include an output vector having three values, the three values corresponding to the likelihoods that the vehicle has surface, heavy, or penetrating rust—respectively.

FIG. 15 illustrates a receiver operating characteristic curve 1500 representing performance of a trained rust detection machine learning model, in accordance with some embodiments of the technology described herein. For training, the labels for penetrating rust on the vehicle undercarriage for each sample were obtained from trained inspectors as part of their regular workflow inspecting vehicles for ACV Auctions. The labels were binary Yes/No flags indicating the presence of that type of rust. After training, the model produced a score between 0 and 1, where higher values indicate a higher probability of penetrating undercarriage rust. The accuracy of the model as measured using the ROC AUC score is 0.954.

V. User Interfaces

Figure 16A:
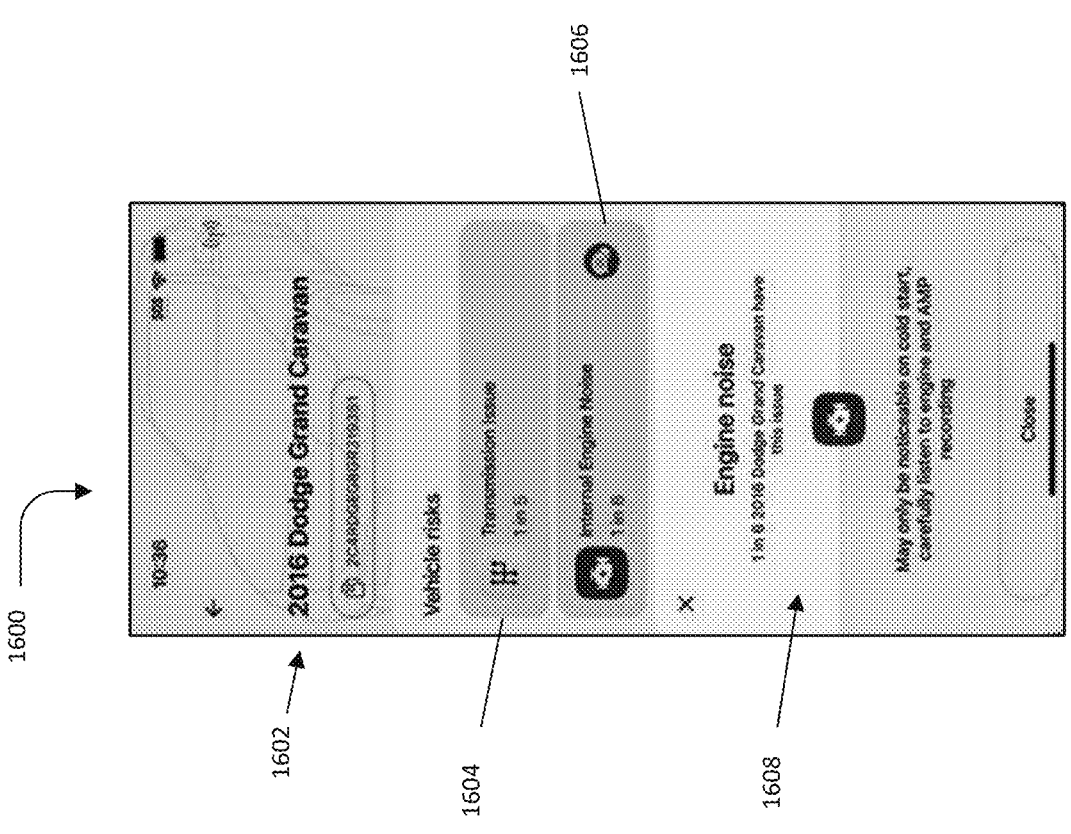
FIG. 16A illustrates an example user interface for notifying an inspector of one or more potential vehicle defects prior to a vehicle inspection, in accordance with some embodiments of the technology described herein.

FIG. 16A illustrates an example user interface 1600 for notifying an inspector of one or more potential vehicle defects prior to a vehicle inspection, in accordance with some embodiments of the technology described herein. As shown in FIG. 16A, the user interface 1600 displays the vehicle information 1602, including the year, make, and model of the vehicle above a vehicle identifier. Potential vehicle defects 1604 and 1606 are included in the display to alert the inspector of potential vehicle defects to look for in the course of a vehicle inspection. Potential vehicle defect 1604 indicates that the vehicle has a 1 in 5 likelihood of having a transmission issue. Potential vehicle defect 1606 indicates that the vehicle has a 1 in 6 likelihood of having an internal engine noise defect. In addition to including the potential vehicle defects, 1604 and 1606, user interface 1600 displays details about how to detect, during the vehicle inspection, the potential vehicle defect 1606. For example, the display indicates to an inspector that the engine noise defect may only be noticeable on cold start and further indicates that the inspector should listen to the engine and/or a recording of the engine.

In some embodiments, user interface 1600 is displayed to an inspector after the inspector scans the VIN of the vehicle. The workflow of the mobile application used by the inspectors may display the most likely issues as soon as basic information about the vehicle was available (e.g. shortly before an inspector is about to start the inspection). Predicted issues were sorted so that those with the highest predicted probabilities showed up at the top of the screen. Probabilities were shown in odds form (e.g. 1 in 8 chance of Transmission Issue). For example, the inspector may be shown the display through a mobile app on their mobile device. The UI is configured to show defects with probabilities above 5%. In this example Transmission and Internal Engine Noise defects had probabilities above the threshold and were shown as a list using the odds form (e.g. 0.22 may be represented as 1 in 5). Internal Engine Noise also had an associated professional inspection instruction for 2016 Dodge Caravans. The instruction is shown at the bottom of the screen when the inspector taps the Internal Engine Noise alert.

Additionally, in some embodiments, in addition to issue probabilities, the same screen also showed a list of professional inspection instructions targeted to the vehicle model-year being inspected. The instructions were collected over the course of ACV history from arbitration claims and earlier defect analyses. While the probabilities estimated the likelihood of finding an issue, the instructions specify where to look/how to test information.

Figure 16B:
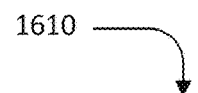
FIG. 16B illustrates an example user interface for notifying an inspector of one or more audio quality defects, in accordance with some embodiments of the technology described herein.

FIG. 16B illustrates an example user interface for notifying an inspector of one or more audio quality defect, in accordance with some embodiments of the technology described herein. As shown in FIG. 16B, the user interface 1610 displays an audio quality defect 1612, indicating that the audio recording of the vehicle is missing one rev period. A waveform of the audio recording 1614 is displayed on the interface. Vehicle operations 1616 include separate indicators to show whether the respective vehicle operation is included in the audio recording. For example, the audio recording, in order to be suitable for further analysis, may include audio from prior to an engine start, the engine start, an idle period, and one or more rev periods. As indicated on the display, vehicle operations 1616 are indicating an error with respect to the rev period. The user interface further includes an accept button 1618 for an inspector to accept the analysis indicated on the user interface. Additionally, the user interface includes a dispute button 1620 that the inspector may select to indicate that the rev period is present, and that the inspector believes the result of the model which indicates that the rev period is either not present or not of sufficient quality is in error.

In some embodiments, the user interfaces shown in FIG. 16-18 may be received by the inspector prior to completing a vehicle inspection report. In such instances, an accept and dispute button may be used to include or reject, respectively, the result indicated on this display from the vehicle inspection report. In some embodiments, the user interfaces shown in FIG. 16-18 may be received by the inspector subsequent to completing a vehicle inspection report. In such instances, the accept and dispute button may be used to revise the vehicle inspector report to resolve a dispute between the list of defects in the vehicle inspection report and a defect identified by one or more trained machine learning models the presence of which is not in agreement with the list of defects in the vehicle inspection report. For example, the accept button may be used to revise the vehicle inspection report to include a defect that the display is indicating is present in the vehicle despite the vehicle inspection report not indicating the presence of the defect. The reject button may be used to ignore the dispute indicated on the display such that no changes are made to the vehicle inspection report.

Figure 16C:
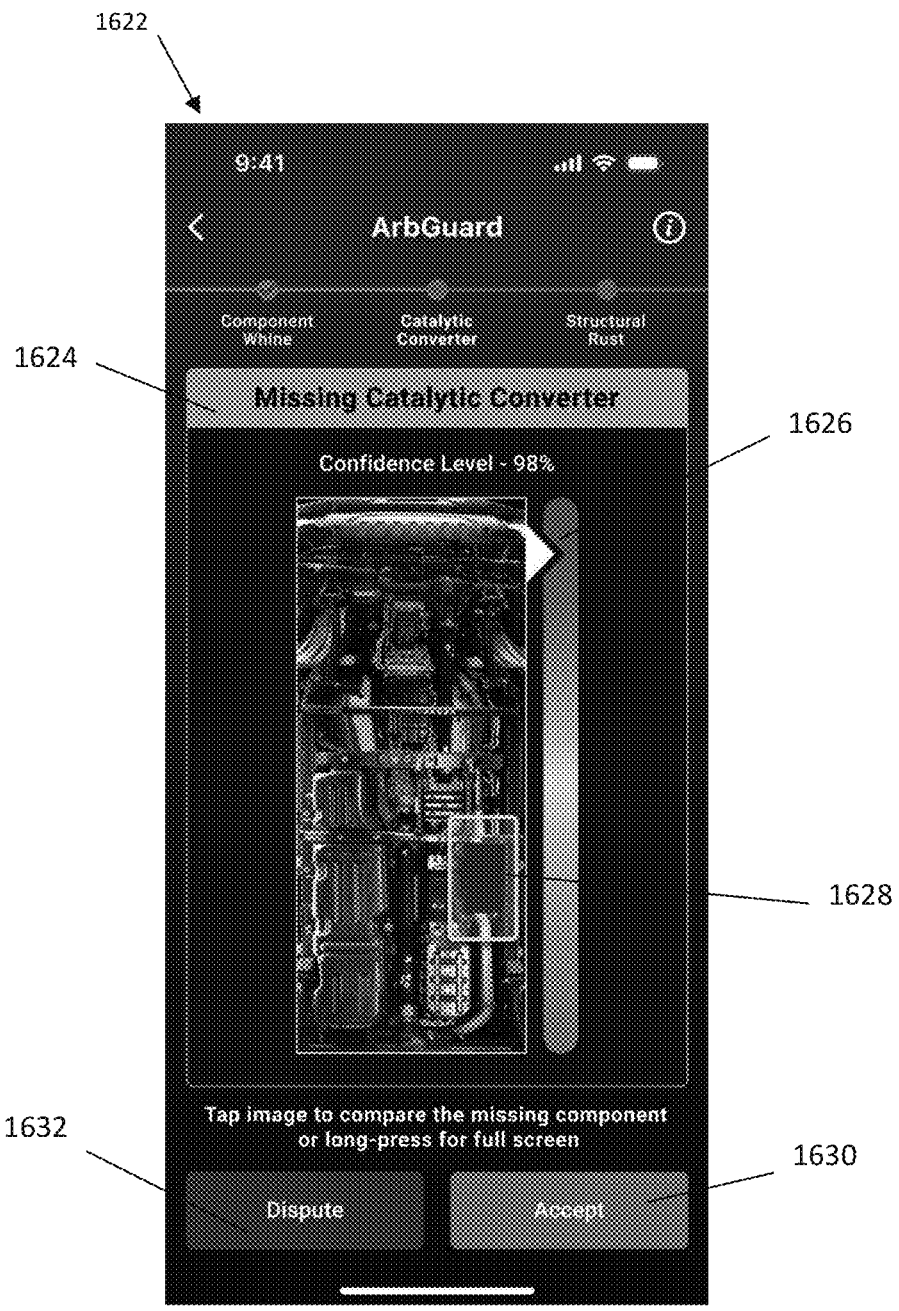
FIG. 16C illustrates an example user interface for notifying an inspector of an output obtained from one or more trained machine learning models that indicates the absence of a catalytic converter in an image of the undercarriage of a vehicle, in accordance with some embodiments of the technology described herein.

FIG. 16C illustrates an example user interface 1622 for notifying an inspector of an output obtained from one or more trained machine learning models that indicates the absence of a catalytic converter in an image of the undercarriage of a vehicle, in accordance with some embodiments of the technology described herein. As shown in FIG. 16C, the user interface 1622 displays a missing catalytic converter vehicle defect 1624 and corresponding confidence level 1626 and a region of interest box 1628 corresponding to the location on the undercarriage image where a catalytic converter would be expected. Accept and dispute buttons 1630 and 1632 respectively are included for the inspector to accept or dispute the finding of the model.

Figure 16D:
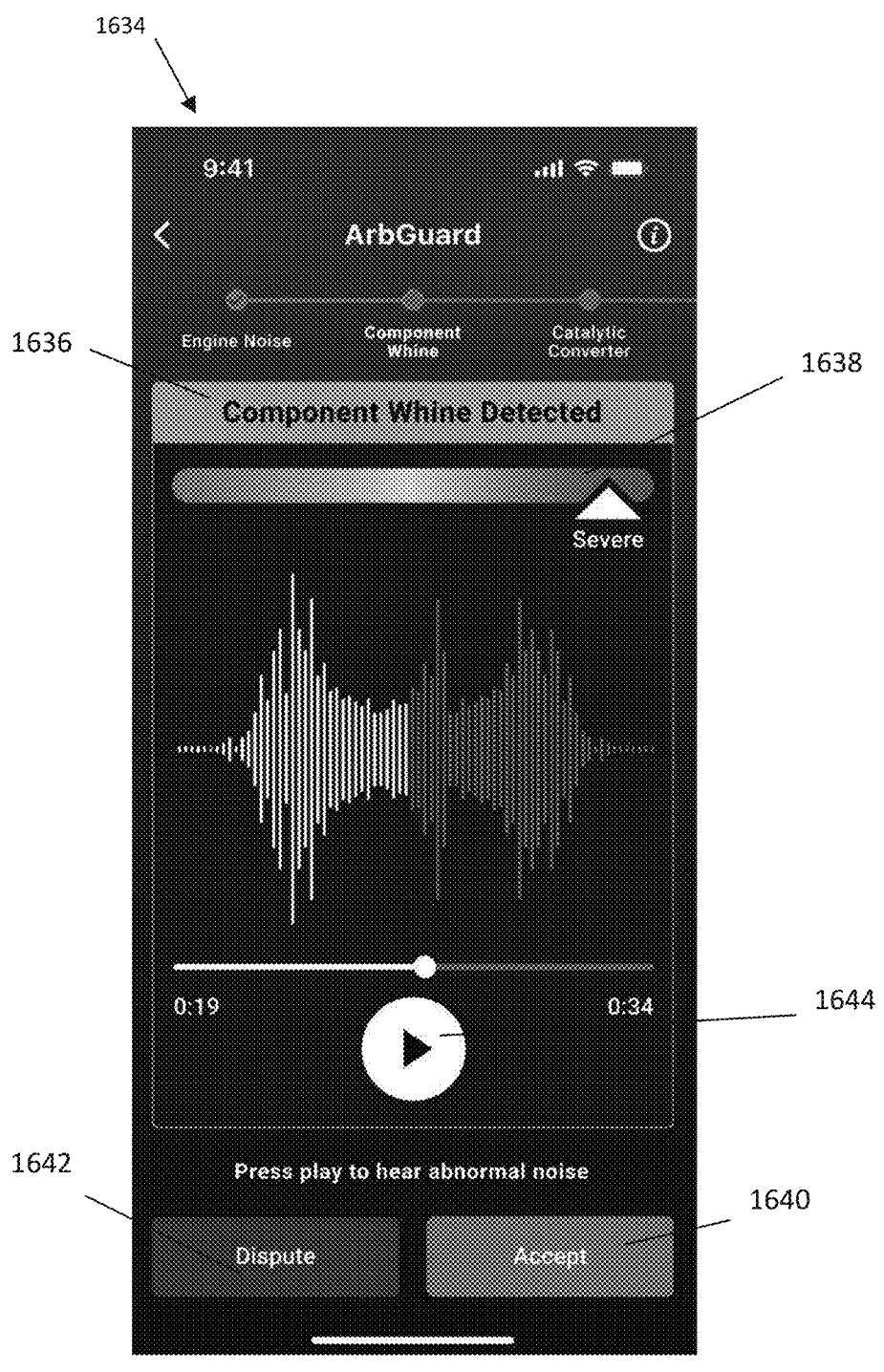
FIG. 16D illustrates an example user interface for notifying an inspector of an output indicative of a component whine being present in an audio recording of the vehicle obtained from an engine bay audio defect detection model, in accordance with some embodiments of the technology described herein.

FIG. 16D illustrates an example user interface for notifying an inspector of an output indicative of a component whine being present in an audio recording of the vehicle obtained from an engine bay audio defect detection model, in accordance with some embodiments of the technology described herein. As shown in FIG. 16D, the user interface 1634 displays a component whine vehicle defect 1636 and associated degree of whine 1638. A waveform and playback controls 1644 are shown in the display that an inspector may use to initiate, pause, or seek through the audio recording. Accept and dispute buttons 1640 and 1642 respectively are included for the inspector to accept or dispute the finding of the model.

Figure 16E:
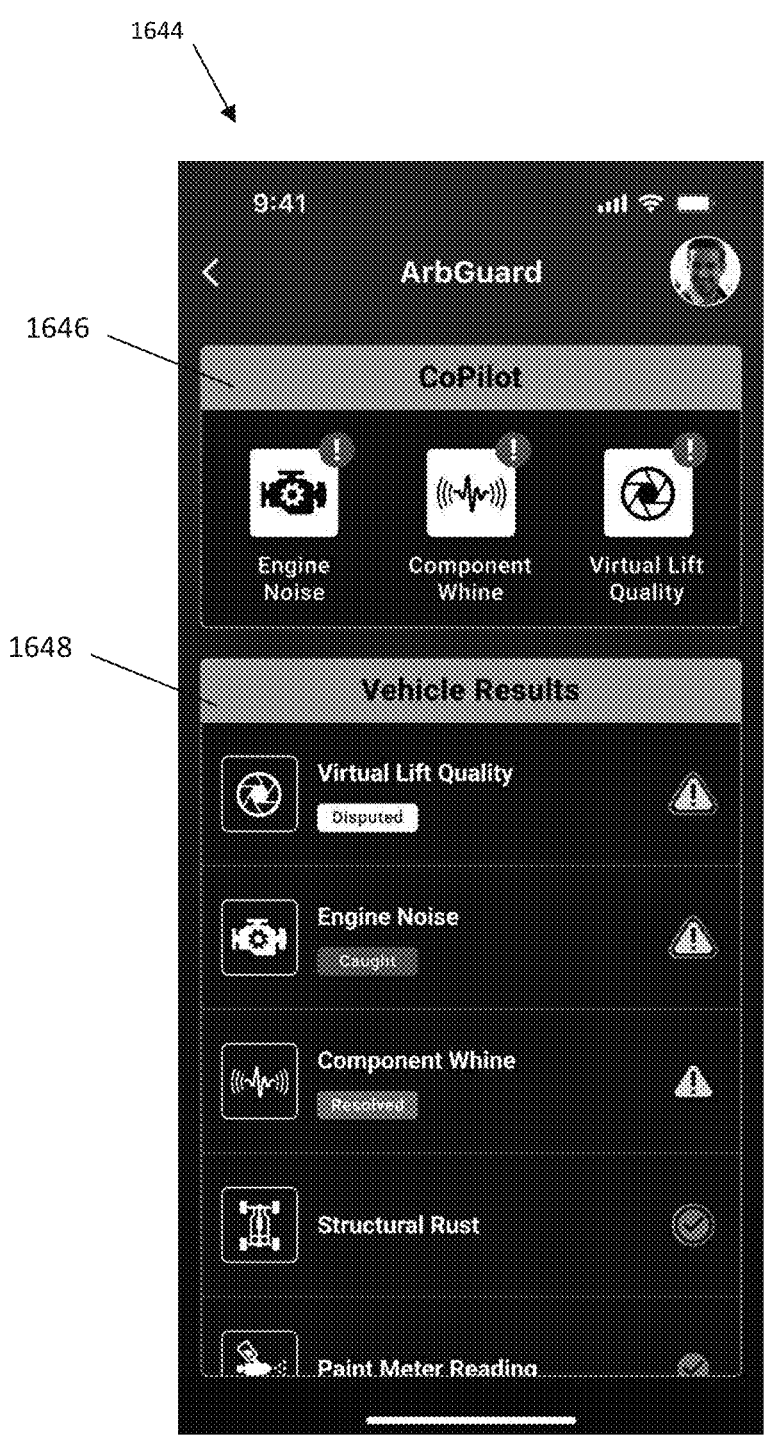
FIG. 16E illustrates an example user interface for providing an inspector with an overview of potential vehicle defects and the results of a set of trained machine learning models trained to detect vehicle defects, in accordance with some embodiments of the technology described herein.

FIG. 16E illustrates an example user interface for providing an inspector with an overview of potential vehicle defects and the results of a set of trained machine learning models trained to detect vehicle defects, in accordance with some embodiments of the technology described herein. As shown in FIG. 16E, the user interface 1644 displays potential vehicle defects determined in accordance with outputs 1646 of a model configured to operate prior to a vehicle inspection such as the model described herein in connection with FIGS. 2-4. User interface 1644 further displays agreement or discrepancies between vehicle conditions included in a vehicle condition report and the outputs of the respective models in a set of trained machine learning models configured to process vehicle information obtained in connection with a vehicle inspection as described herein in connection with FIGS. 5-6B.

Figure 16F:
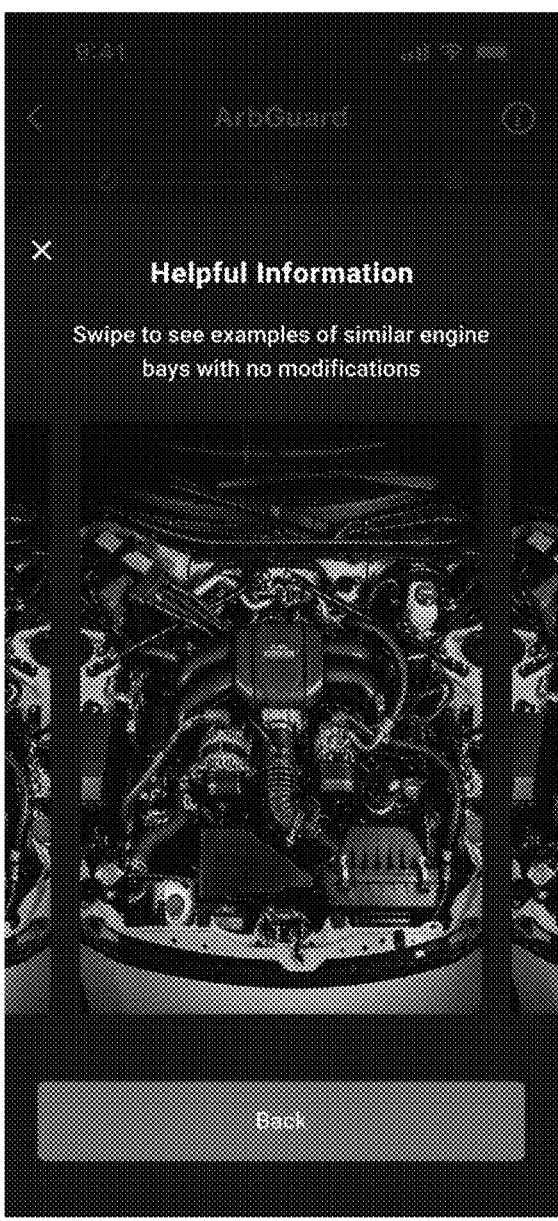
FIG. 16F illustrates an example user interface for providing a vehicle inspector with information to help the inspector perform a vehicle inspection, in accordance with some embodiments of the technology described herein.

FIG. 16F illustrates an example user interface for providing a vehicle inspector with information to help the inspector perform a vehicle inspection, in accordance with some embodiments of the technology described herein. As shown in FIG. 16F, the user interface 1650 displays information for a vehicle inspector to aid in the determination of whether vehicle modifications are present in the vehicle. For example, the user interface 1650 illustrates an image of a vehicle engine bay that includes no modifications that the vehicle inspector may compare the engine bay of a vehicle undergoing a vehicle inspection.

Figure 17A:
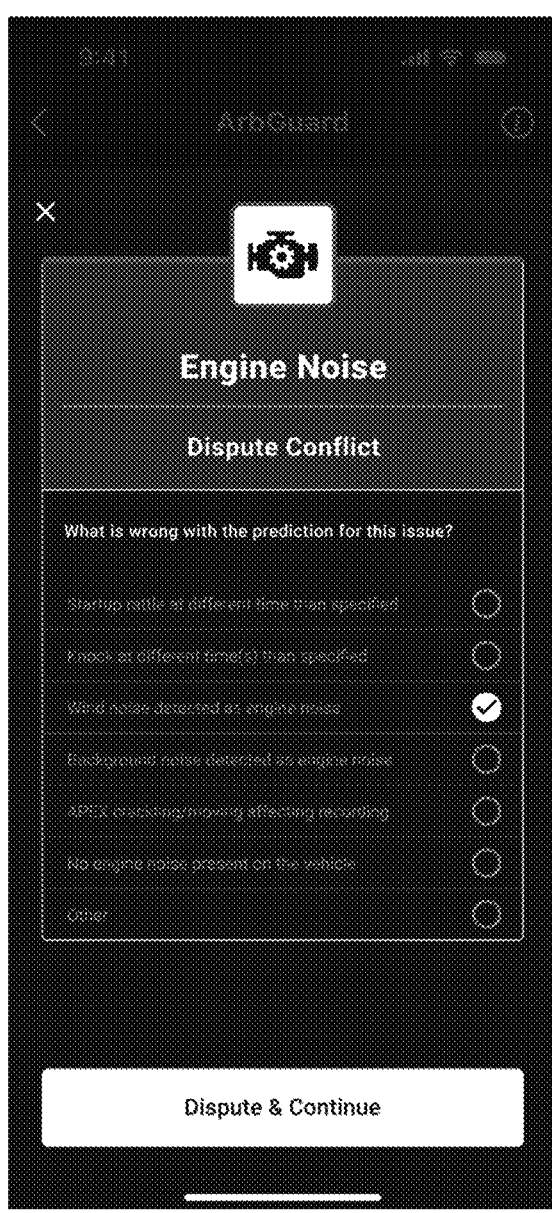
FIG. 17A illustrates an example user interface for notifying an inspector of a discrepancy between a vehicle condition report and an output obtained from one or more trained machine learning models, in accordance with some embodiments of the technology described herein.

FIG. 17A illustrates an example user interface for notifying an inspector of a discrepancy between a vehicle condition report and an output obtained from one or more trained machine learning models, in accordance with some embodiments of the technology described herein. As shown in FIG. 17A, user interface 1700 displays a dispute interface where a vehicle inspector, in response to selecting a dispute button, such as those described in connection with FIG. 16, is prompted to select a prediction issue from a set of potential prediction issues and submit the dispute for further review.

Figure 17B:
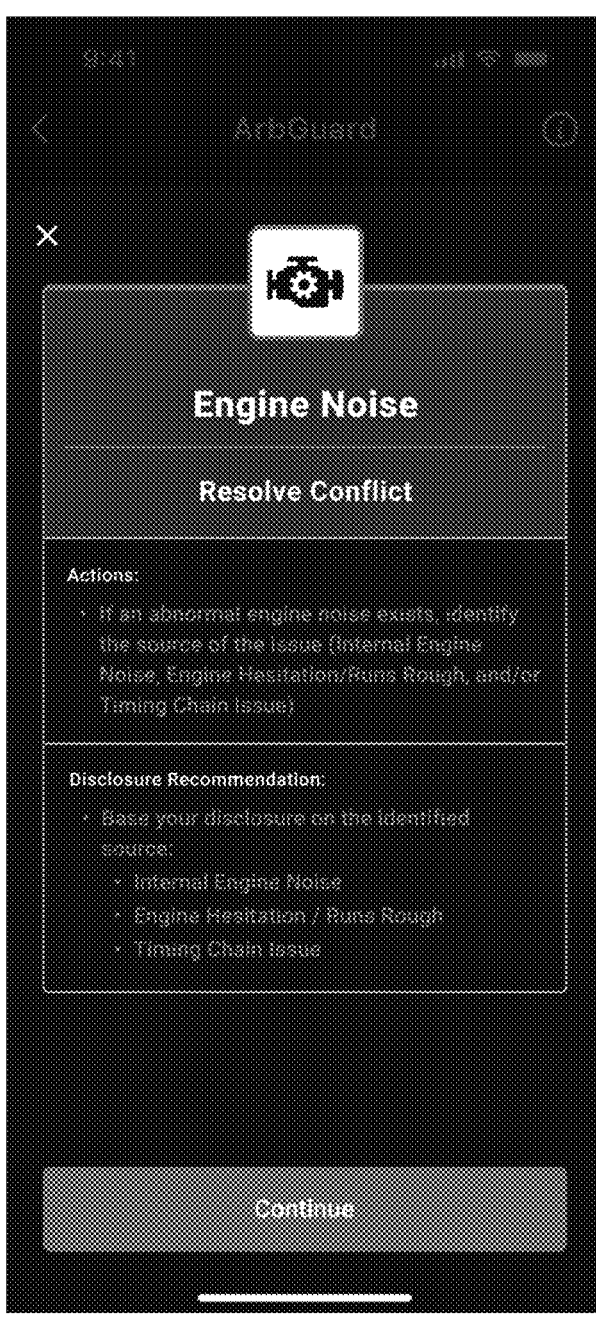
FIG. 17B illustrates a second example user interface for notifying an inspector of a discrepancy between a vehicle condition report and an output obtained from one or more trained machine learning models, in accordance with some embodiments of the technology described herein.

FIG. 17B illustrates a second example user interface for notifying an inspector of a discrepancy between a vehicle condition report and an output obtained from one or more trained machine learning models, in accordance with some embodiments of the technology described herein. As shown in FIG. 17B, user interface 1702 displays a dispute interface where a vehicle inspector, in response to receiving a discrepancy indication between the vehicle condition report and the output of a machine learning model, is prompted with additional checks to perform to determine a resolution to the discrepancy. Accept and dispute buttons are included for the inspector to accept or dispute the finding of the model.

Figure 17C:
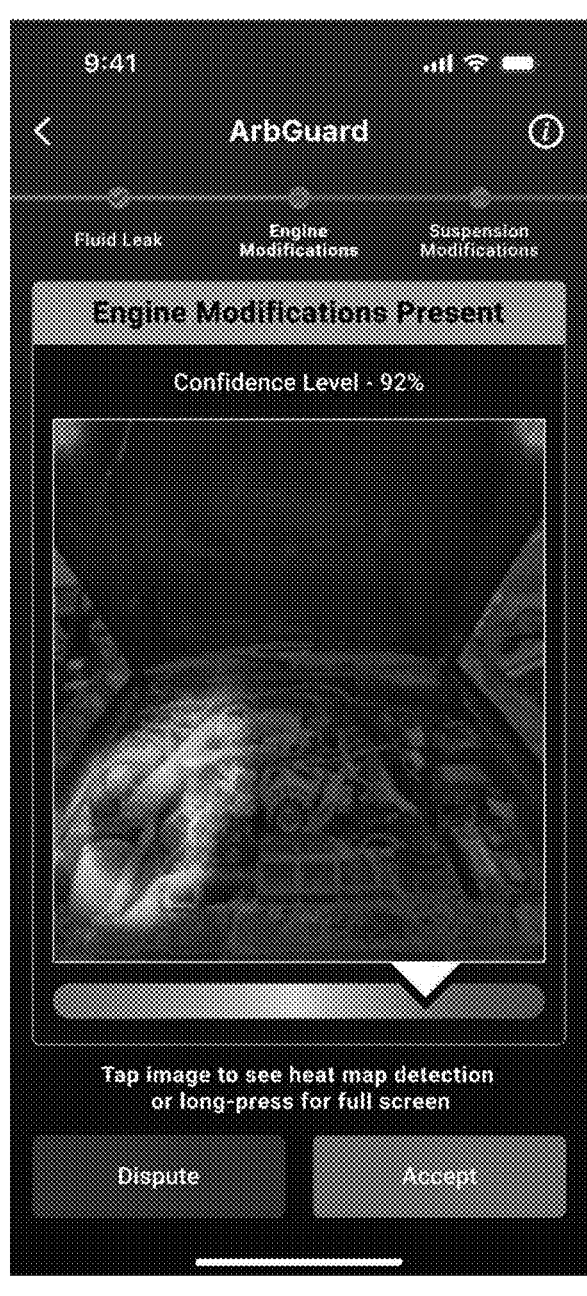
FIG. 17C illustrates an example user interface for notifying an inspector of a vehicle modification, in accordance with some embodiments of the technology described herein.

FIG. 17C illustrates an example user interface for notifying an inspector of a vehicle modification, in accordance with some embodiments of the technology described herein. As shown in FIG. 17C, user interface 1704 illustrates a heat map of a detected engine modification and an associated confidence level that an engine modification is present in the image of the vehicle.

Figure 17D:
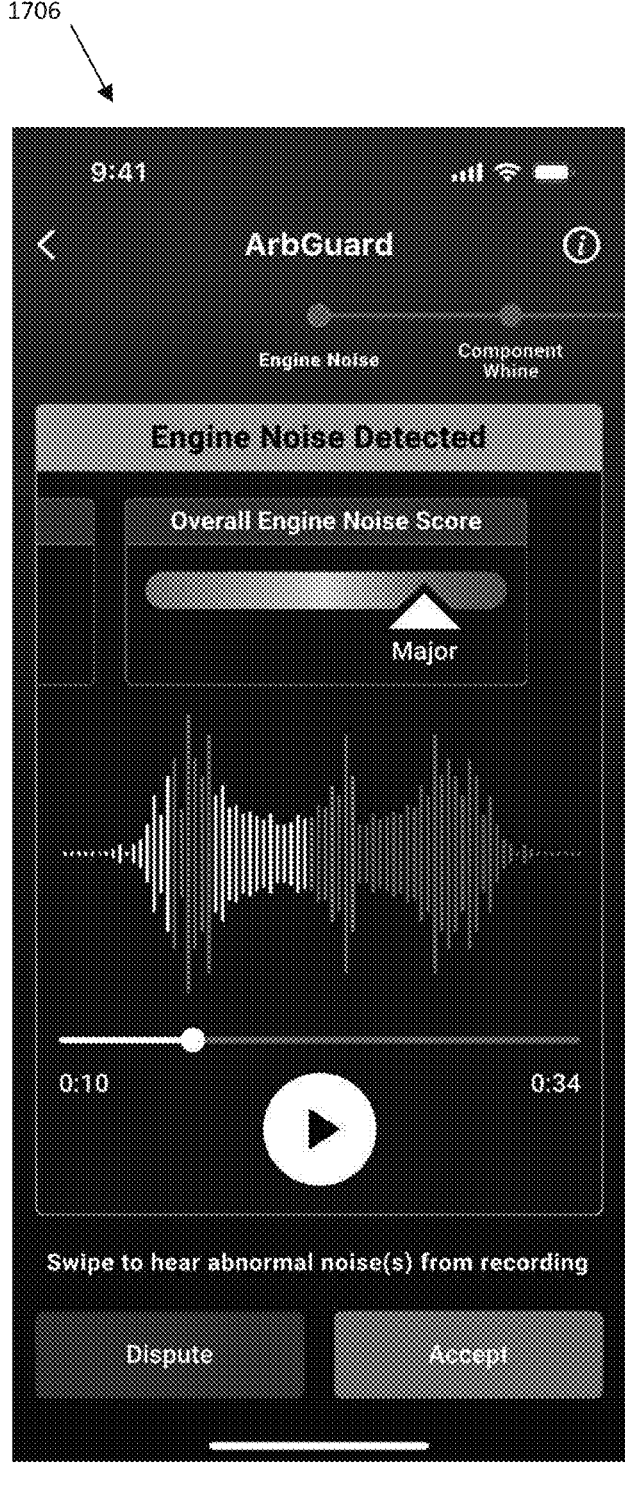
FIG. 17D illustrates an example user interface for notifying an inspector of a defect, indicated to be present by the output of one or more trained machine learning models, obtained by processing an audio recording of the vehicle engine operation with the one or more trained machine learning models, in accordance with some embodiments of the technology described herein.

FIG. 17D illustrates an example user interface for notifying an inspector of a defect indicated to be present by the output of one or more trained machine learning models obtained by processing an audio recording of the vehicle engine operation with the one or more trained machine learning models, in accordance with some embodiments of the technology described herein. As shown in FIG. 17D, user interface 1706 illustrates a waveform of an audio recording of a vehicle engine as well as an indication that vehicle defects have been detected based on the audio recording. Accept and dispute buttons are included for the inspector to accept or dispute the finding of the model.

Figure 17E:
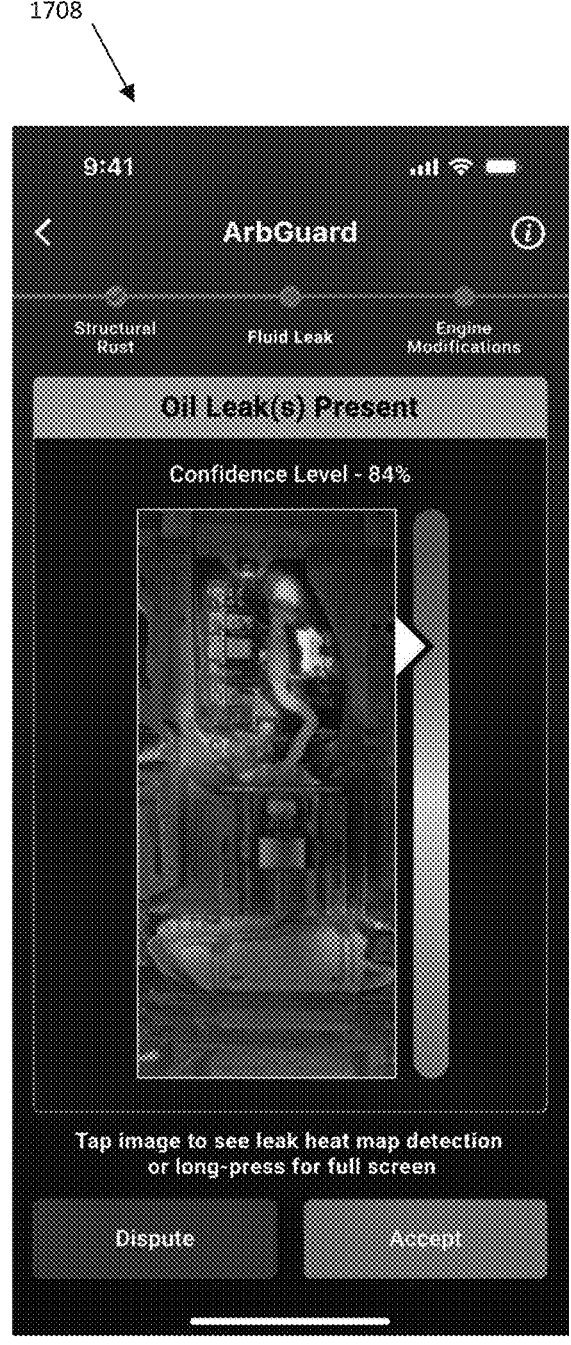
FIG. 17E illustrates an example user interface for notifying an inspector of a fluid leak defect indicated to be present by the output of one or more trained machine learning models, in accordance with some embodiments of the technology described herein.

FIG. 17E illustrates an example user interface for notifying an inspector of a fluid leak defect indicated to be present by the output of one or more trained machine learning models, in accordance with some embodiments of the technology described herein. As shown in FIG. 17E, user interface 1708 illustrates a heat map indicating the location of potential oil leaks present in the vehicle and a corresponding confidence that the oil leaks are present. Accept and dispute buttons are included for the inspector to accept or dispute the finding of the model.

Figure 17F:
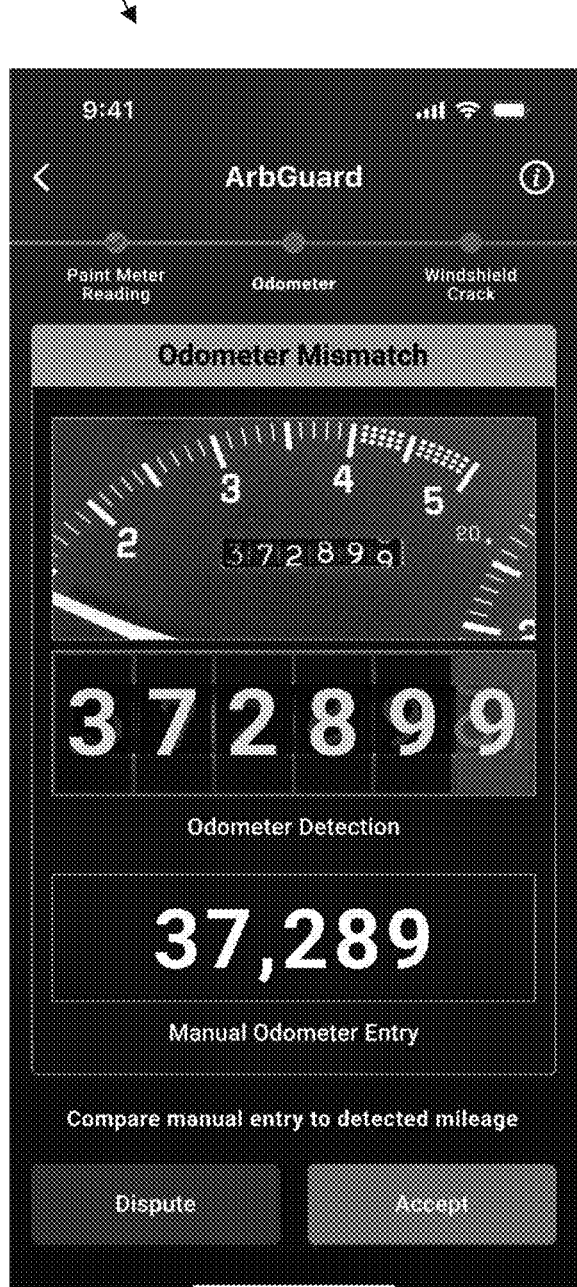
FIG. 17F illustrates an example user interface for notifying an inspector of a discrepancy between an odometer gauge reading provided with a vehicle inspection report and an odometer gauge value obtained by one or more trained machine learning models, in accordance with some embodiments of the technology described herein.

FIG. 17F illustrates an example user interface for notifying an inspector of discrepancy between an odometer gauge reading provided with a vehicle inspector report and an odometer gauge value obtained by one or more trained machine learning models, in accordance with some embodiments of the technology described herein. As shown in FIG. 17F, user interface 1710 illustrates a discrepancy between an odometer reading provided by the vehicle inspector and output of one or more trained machine learning models trained to determine a reading of the odometer gauge based on an image of the dashboard. Accept and dispute buttons are included for the inspector to accept or dispute the finding of the model.

Figure 18A:
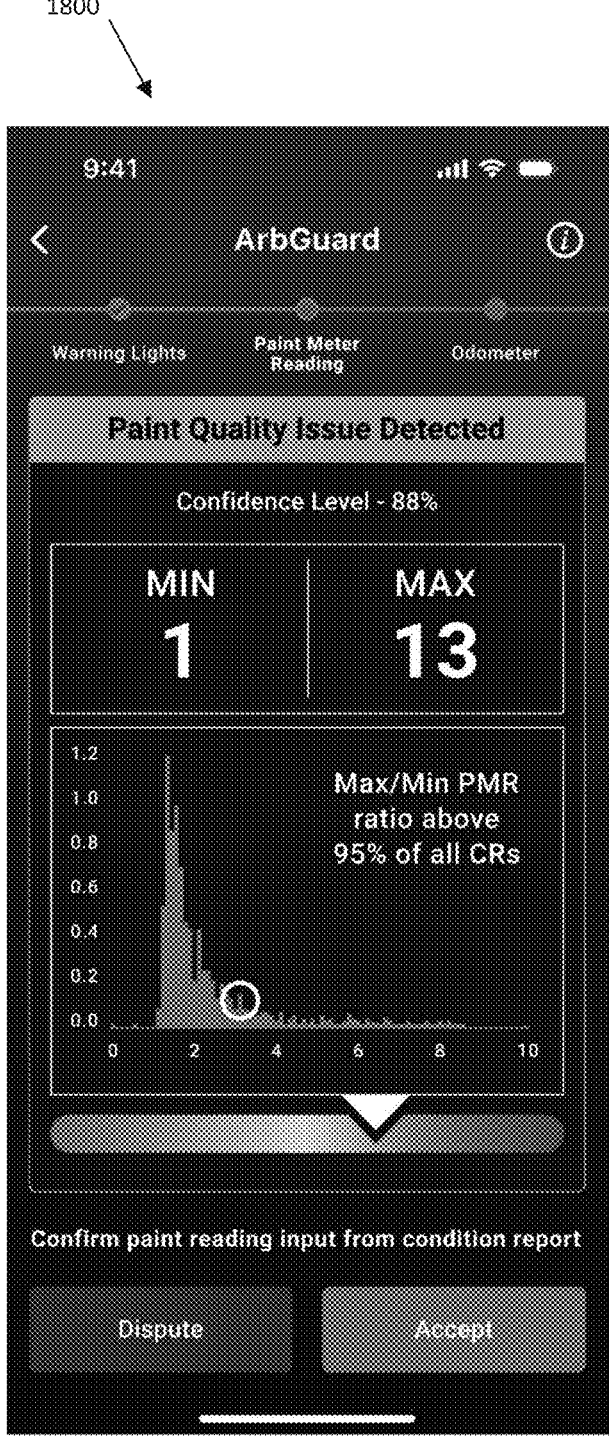
FIG. 18A illustrates an example user interface for notifying a vehicle inspector of a paint quality issue indicated to be present on the vehicle based on an output obtained by one or more trained machine learning models, in accordance with some embodiments of the technology described herein.

FIG. 18A illustrates an example user interface for notifying a vehicle inspector of a paint quality issue indicated to be present on the vehicle based on an output obtained by one or more trained machine learning models, in accordance with some embodiments of the technology described herein. As shown in FIG. 18A, user interface 1800 displays an indication that a paint quality defect is present on the vehicle and a corresponding confidence level. Accept and dispute buttons are included for the inspector to accept or dispute the finding of the model.

Figure 18B:
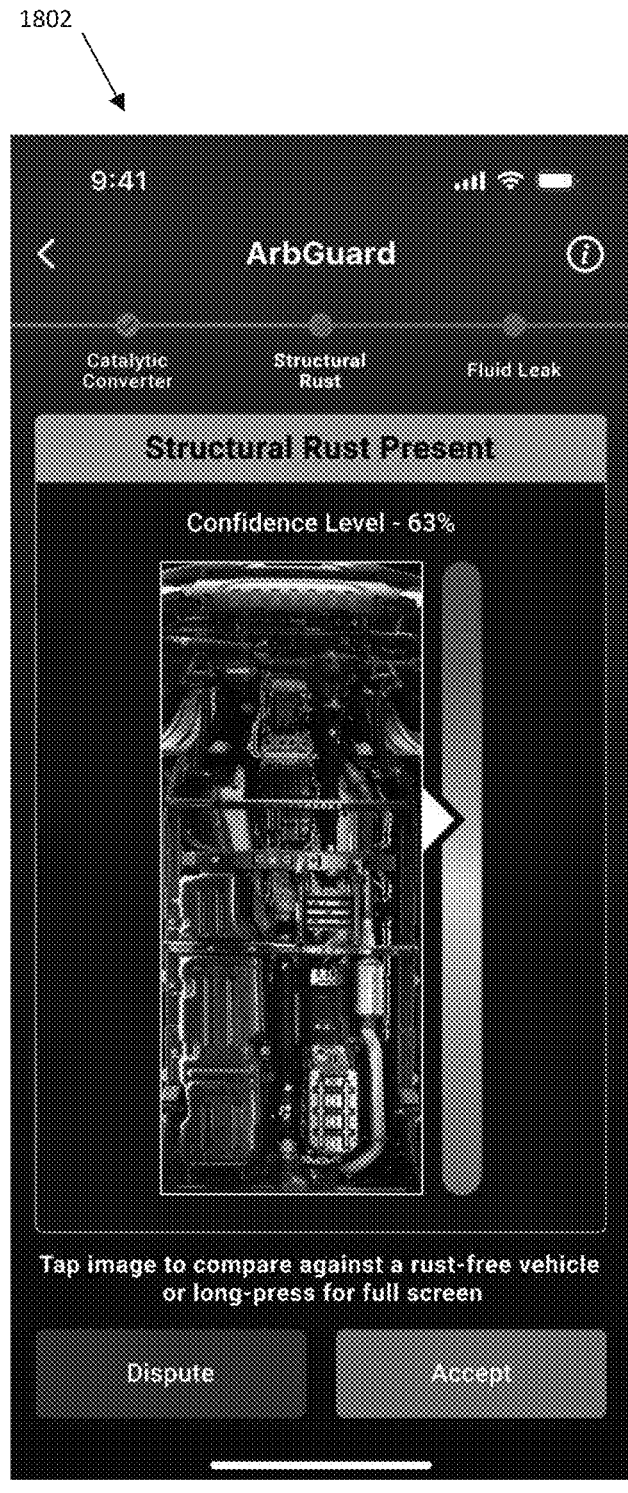
FIG. 18B illustrates an example user interface for notifying a vehicle inspector of a rust defect indicated to be present on the vehicle based on an output obtained by one or more trained machine learning models, in accordance with some embodiments of the technology described herein.

FIG. 18B illustrates an example user interface for notifying a vehicle inspector of a rust defect indicated to be present on the vehicle based on an output obtained by one or more trained machine learning models, in accordance with some embodiments of the technology described herein. As shown in FIG. 18B, user interface 1802 displays an indication that structural rust is present on the vehicle and a corresponding confidence level. Accept and dispute buttons are included for the inspector to accept or dispute the finding of the model.

Figure 18C:
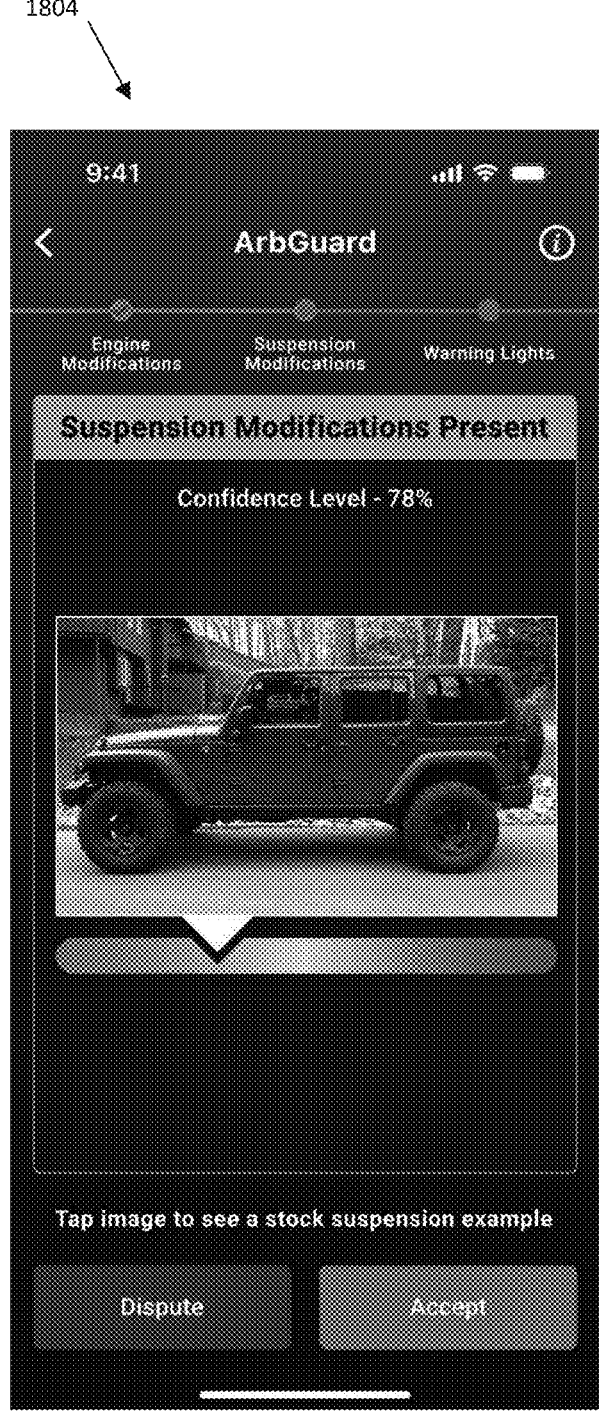
FIG. 18C illustrates an example user interface for notifying a vehicle inspector of a suspension modification being present in the vehicle, in accordance with some embodiments of the technology described herein.

FIG. 18C illustrates an example user interface for notifying a vehicle inspector of a suspension modification being present in the vehicle, in accordance with some embodiments of the technology described herein. As shown in FIG. 18C, user interface 1804 displays an indication that a suspension modification is present on the vehicle and a corresponding confidence level. Accept and dispute buttons are included for the inspector to accept or dispute the finding of the model.

Figure 18D:
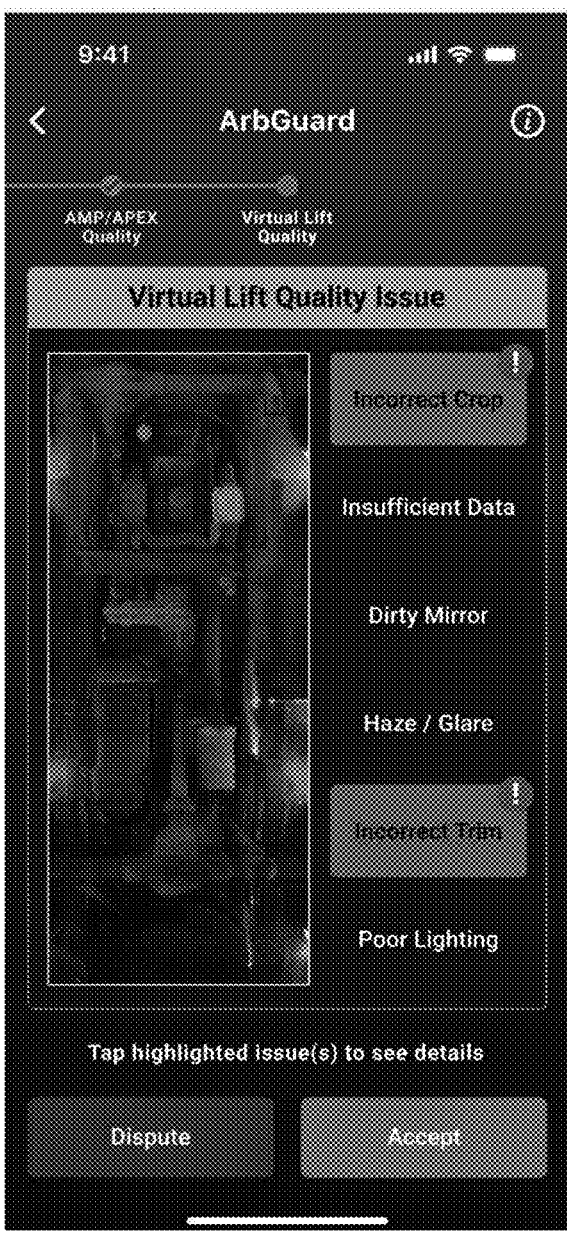
FIG. 18D illustrates an example user interface for notifying a vehicle inspector of an image defect indicated as being present in a virtual lift image by an output obtained by one or more trained machine learning models, in accordance with some embodiments of the technology described herein.

FIG. 18D illustrates an example user interface for notifying a vehicle inspector of an image defect indicated as being present in a virtual lift image by an output obtained by one or more trained machine learning models, in accordance with some embodiments of the technology described herein. As shown in FIG. 18D, user interface 1806 displays two virtual lift quality image quality defects as being present in a virtual lift image of an undercarriage of a vehicle. The virtual lift quality image defects may be detected as described herein. Accept and dispute buttons are included for the inspector to accept or dispute the finding of the model.

Figure 18E:
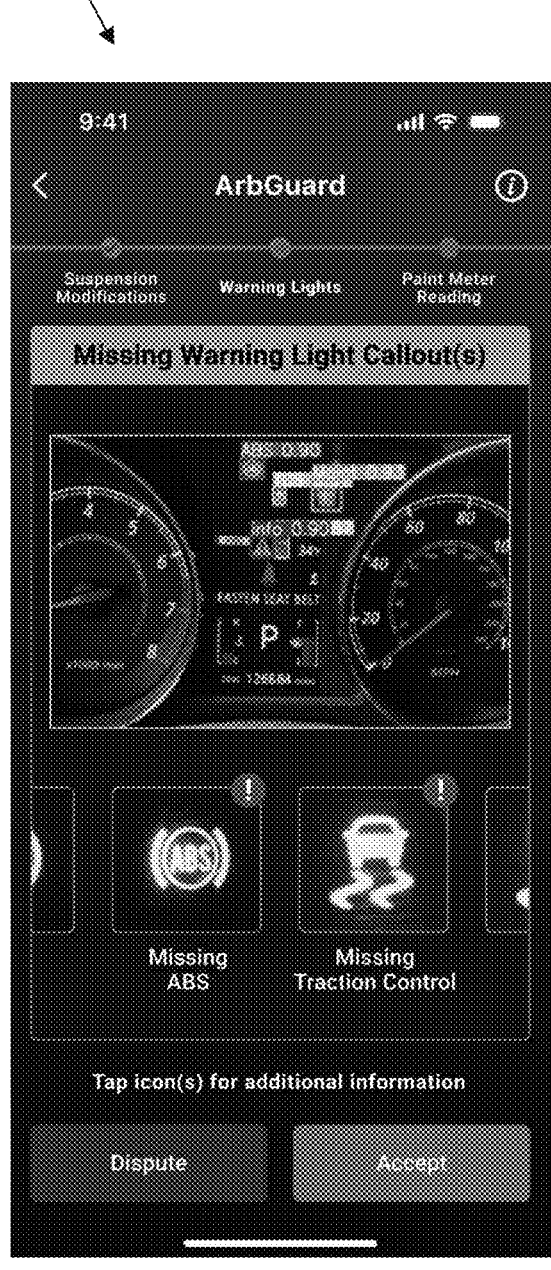
FIG. 18E illustrates an example user interface for notifying a vehicle inspector of the presence of vehicle warning lights based on the indication of an output of one or more trained machine learning models trained to detect vehicle dashboard defects, in accordance with some embodiments of the technology described herein.

FIG. 18E illustrates an example user interface for notifying a vehicle inspector of the presence of vehicle warning lights based on the indication of an output of one or more trained machine learning models trained to detect vehicle dashboard defects, in accordance with some embodiments of the technology described herein. As shown in FIG. 18E, user interface 1808 displays two vehicle warning lights detected as being present in an image of the vehicle dashboard by one or more trained machine learning models. Accept and dispute buttons are included for the inspector to accept or dispute the finding of the model.

Figure 18F:
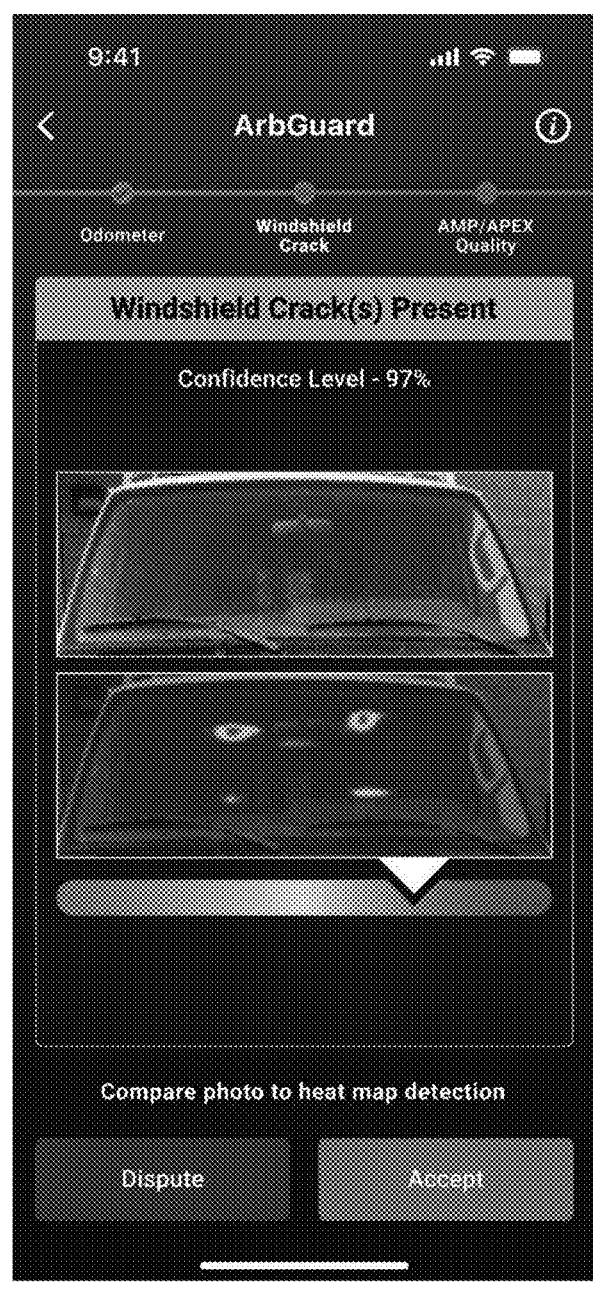
FIG. 18F illustrates an example user interface for notifying a vehicle inspector of the presence of a cracked windshield based on the indication of an output of one or more trained machine learning models, trained to detected cracked glass, in accordance with some embodiments of the technology described herein.

FIG. 18F illustrates an example user interface for notifying a vehicle inspector of the presence of a cracked windshield based on the indication of an output of one or more trained machine learning models trained to detected cracked glass, in accordance with some embodiments of the technology described herein. As shown in FIG. 18E, user interface 1810 displays a heatmap indicating the presence of a potential windshield crack and a corresponding confidence level as may be produce by one or more trained machine learning models trained to detect cracked glass. Accept and dispute buttons are included for the inspector to accept or dispute the finding of the model.

VI. Additional Implementation Details

Figure 19:
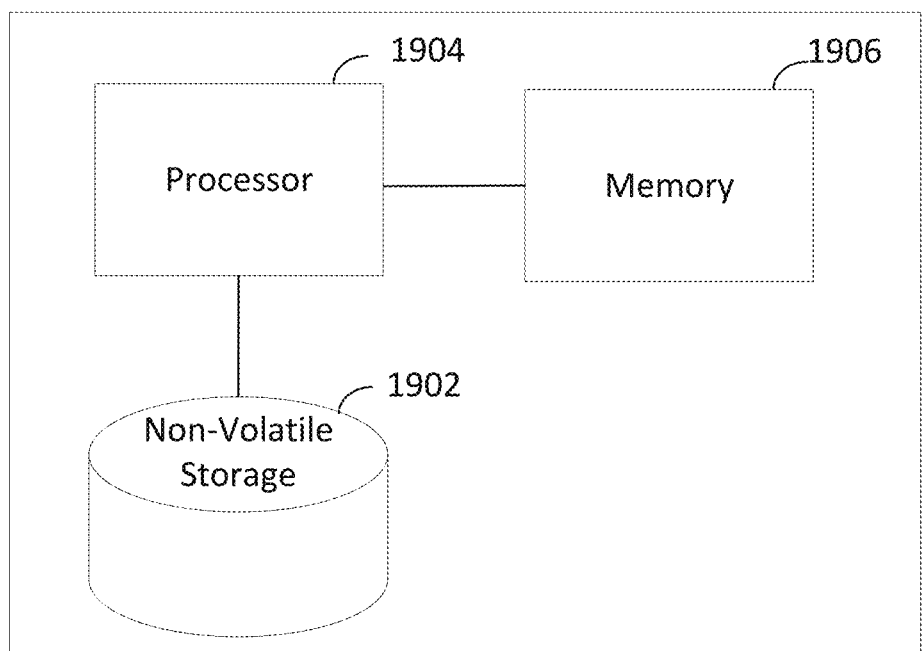
FIG. 19 illustrates a block diagram of an illustrative computing system that may be used in implementing some embodiments of the technology described herein.

FIG. 19 illustrates a block diagram of an illustrative computing system that may be used in implementing some embodiments of the technology described herein. An illustrative implementation of a computer system 1900 that may be used in connection with any of the embodiments of the disclosure provided herein is shown in FIG. 19. For example, any of the computing devices described herein (e.g., 104, 108, 112, 120, 128, 129) may be implemented as computer system 1900. The computer system 1900 may include one or more computer hardware processors 1904 and one or more articles of manufacture that comprise non-transitory computer-readable storage media, for example, one or more volatile storage device 1906 (e.g., random access memory or any other suitable type of memory) and/or one or more non-volatile storage devices 1902 (e.g., a hard disk, a flash memory, etc.). The hardware processor 1902($s$) may control writing data to and reading data from the volatile storage device(s) 1906 and the non-volatile storage device(s) 1902 in any suitable manner. To perform any of the functionality described herein, including with respect to any process described herein, the hardware processor(s) 1904 may execute one or more processor-executable instructions stored in one or more non-transitory computer-readable storage media (e.g., the volatile storage device(s) 1906 and/or non-volatile storage device(s) 1902), which may serve as non-transitory computer-readable storage media storing processor-executable instructions for execution by the hardware processor(s) 1904.

Having thus described several aspects of at least one embodiment of the technology described herein, it is to be appreciated that various alterations, modifications, and improvements will readily occur to those skilled in the art.

Such alterations, modifications, and improvements are intended to be part of this disclosure, and are intended to be within the spirit and scope of disclosure. Further, though advantages of the technology described herein are indicated, not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein may be implemented in any of numerous ways. For example, the embodiments may be implemented using hardware, software, or a combination thereof. When implemented in software, the software code may be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor.

Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone, tablet, or any other suitable portable or fixed electronic device.

Also, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks, fiber optic networks, or any suitable combination thereof.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media may be transportable, such that the program or programs stored thereon may be loaded onto one or more different computers or other processors to implement various aspects of the technology as described above. As used herein, the term "computer-readable storage medium" encompasses only a non-transitory computer readable medium that may be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that may be employed to program a computer or other processor to implement various aspects of the technology as described above.

Additionally, one or more computer programs that when executed perform methods of the technology described herein need not reside on a single computer or processor, but may be distributed in a modular fashion amongst a number of different computers or processors to implement various aspects of the technology described herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

VII. ML Techniques for Detecting Fluid Leaks

The inventors have appreciated that detecting whether or not a vehicle is leaking fluid may be difficult due to challenges associated with observing the components from which a leak originates. Vehicle fluids provide functions critical to the health and operation of vehicle components, including lubrication, cleaning, temperature regulation, and hydraulic pressure. Accordingly, a fluid leak may be indicative of a vehicle defect or wear. For example, engine oil is used to lubricate moving parts, maintain internal cleanliness, inhibit corrosion, and cool the engine. As a result, a vehicle with oil system defects has an increased likelihood of having engine issues relative to a vehicle without an oil system defect. Similarly, transmission systems, steering systems, braking systems, and auxiliary systems (e.g., engine coolant, windshield washer, clutch systems) rely on fluids. When a fluid system leaks, the fluid levels may fall below the level required to maintain healthy vehicle operation, which may result in catastrophic or chronic wear depending on the severity of the leak. As fluid systems may involve a variety of components connected through tubing, checking for leaks can be challenging based on the inaccessibility of the fluid system components relative to other vehicle components.

Accordingly, the inventors have recognized that a machine learning model trained to identify the presence of a fluid leak will improve the determination of vehicle defects by improving the detection of fluid leaks. Furthermore, the inventors have recognized that fluid leaks may result in visual indicators of the respective leaks visible on the undercarriage of the vehicle.

Therefore, the inventors have developed a machine learning model trained to detect the presence of fluid leaks in an image of the undercarriage of a vehicle. The machine learning model is trained to process an input image of the undercarriage to detect if the vehicle has one or more fluid leaks. For example, a vehicle that has an oil leak may be identified by providing an undercarriage image to a trained machine learning model that produces an output indicating whether an oil leak is present in the image of the undercarriage of the vehicle.

Accordingly, some embodiments provide for a computer-implemented method to detect the presence of a fluid leak (e.g., an oil leak, a transmission fluid leak, a coolant fluid leak, a brake fluid leak, and/or a power steering fluid leak) in an image of an undercarriage of a vehicle, the method comprising using at least one computer hardware processor to perform: (A) obtaining an image of the undercarriage of the vehicle (e.g., obtaining multiple images of portions of the undercarriage of the vehicle and generating a composite image of the undercarriage); and (B) processing the image of the undercarriage of the vehicle using a trained machine learning model (e.g., a deep neural network model comprising a plurality of 2D convolutional layers) to obtain an output indicating whether a fluid leak (e.g., an oil leak) is present in the image of the undercarriage of the vehicle, the processing comprising: (i) generating image input from the image of the undercarriage of the vehicle (e.g., resizing and/or normalizing the image of the undercarriage of the vehicle per channel based on statistical values determined from the training set of images), and (ii) processing the image input using the trained machine learning model, to obtain output indicating whether a fluid leak is present in the image of the undercarriage of the vehicle.

In some embodiments, the trained machine learning model includes between 14 and 26 convolutional blocks. The convolutional blocks may be organized sequentially or as separate branches where layers on respective branches are only connected to layers grouped on the same branch. In some embodiments of a branched neural network, there may additional be linking layers that provide exchange between the branches at specific points in the neural network architecture. In some embodiments, the convolutional blocks are organized into 4 groups for sequential analysis. For example, groups of convolutional blocks may be characterized by a fixed dimensionality of inputs and outputs. Between groups of convolutional blocks, the dimensionality of the layers may change and additional layers for normalizing and up or down sampling the data may be included.

In some embodiments, the trained machine learning model includes a plurality of parameters, wherein the plurality of parameters includes between one million and fifty million parameters. Accordingly, processing the image input using the trained machine learning model, to obtain the output indicating whether the fluid leak is present in the image of the undercarriage of the vehicle, includes computing the output using values of the plurality of parameters and the image input. In some embodiments, the plurality of parameters includes between fifteen million and forty million parameters, or between twenty million and thirty million parameters. For example, the trained machine learning model may include 27,814,273 trainable parameters. In some embodiments, the trained machine learning model may have other numbers of parameters, including both trainable and untrainable parameters.

In some embodiments, the output indicating whether the fluid leak is present in the image of the undercarriage of the vehicle is a binary indication whether a fluid leak is present in the image of the undercarriage.

In some embodiments, the output indicating whether the fluid leak is present in the image of the undercarriage of the vehicle indicates a plurality of likelihoods for a respective plurality of fluid leaks, each of the likelihoods indicating a likelihood that the image of the undercarriage of the vehicle has a respective fluid leak of the plurality of fluid leaks.

In some embodiments, the computer-implemented method to detect the presence of a fluid leak may further include: (A) prior to processing the image of the undercarriage of the vehicle to detect the presence of fluid leaks in the image of the undercarriage of the vehicle; (B) processing the image of the undercarriage of the vehicle using a second trained machine learning model to obtain output indicative of a presence of zero, one, or multiple image quality defects in the image of the undercarriage of the vehicle; (C) determining, based on the output indicative of the presence of image quality defects, whether the image of the undercarriage of the vehicle is of sufficient quality for subsequent processing; and (D) when it is determined that the image of the undercarriage of the vehicle is of sufficient quality for subsequent processing, processing the image to obtain the output indicating whether the fluid leak is present in the image of the undercarriage of the vehicle.

In some embodiments, the zero, one, or more image quality defects are identified as one or more defects from the group consisting of: an improper cropping defect, an insufficient detail defect, a dirty mirror defect, a glare defect, an incorrect trim defect, a lighting defect, and a recording defect.

In some embodiments, the output indicating whether the fluid leak is present in the image of the undercarriage of the vehicle indicates likelihoods corresponding to whether the undercarriage of the vehicle has zero, one, or multiple fluid leaks.

In some embodiment, the computer-implemented method to detect the presence of a fluid leak may further include generating an electronic vehicle condition report indicating the presence or absence of fluid leaks based on the output.

In some embodiments, the computer-implemented method to detect the presence of a fluid leak may further include: (A) obtaining an initial vehicle condition report including inspection results, the inspection results indicating a first set of zero, one, or more vehicle defects that the inspector determined to be present in the vehicle; (B) generating an indication of agreement or discrepancy between the first set of vehicle defects that the inspector determined to be present in the vehicle and the determination that the output indicating whether the fluid leak is present in the image of the undercarriage of the vehicle.

Figure 20:
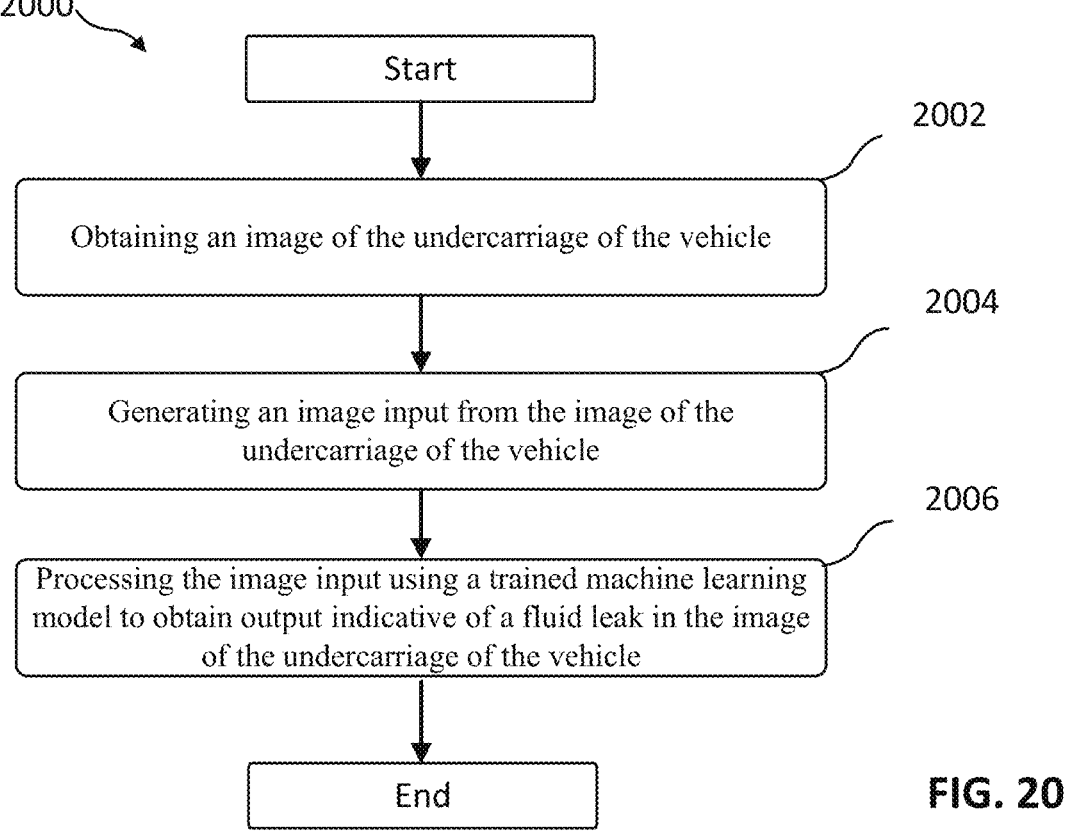
FIG. 20 is a flowchart of an illustrative process for a trained machine learning model to detect the presence of a fluid leak based on an image of an undercarriage of a vehicle, in accordance with some embodiments of the technology described herein.

FIG. 20 is a flowchart of an illustrative process 2000 for using a trained machine learning model to detect the presence of a fluid leak in a vehicle based on an image of the undercarriage of the vehicle, in accordance with some embodiments of the technology described herein.

Process 2000 may be executed by any suitable computer device(s). For example, process 2000 may be executed by a mobile device (e.g., mobile device 104), a server or servers (e.g., server(s) 129), or any other suitable computing device(s) including any of the devices described herein including with reference to FIG. 1.

Prior to the start of process 2000, an image of the undercarriage of the vehicle may be processed by one or more trained machine learning models to determine whether the image of the undercarriage is of sufficient quality to be processed by a subsequent trained machine learning model to detect the presence of a fluid leak. For example, process 700 described above in connection with FIG. 7 may be used to process the image of the undercarriage to obtain an output indicative of the presence of zero, one, or multiple image quality defects in the image of the undercarriage of the vehicle in connection with determining whether the image of the undercarriage of the vehicle is of sufficient quality for subsequent processing.

Process 2000 starts at act 2002 by obtaining an image of the undercarriage of the vehicle. In some embodiments, the image of the undercarriage of the vehicle may be a composite image. Accordingly, obtaining the image of the undercarriage of the vehicle may include obtaining multiple images of portions of the undercarriage of the vehicle and generating a composite image of the undercarriage of the vehicle by combining the multiple images of portions of the undercarriage into the composite image.

In some embodiments, the multiple images of portions of the undercarriage may correspond to the same or approximately the same (e.g., 80% similar) field of view of the vehicle undercarriage. Accordingly, generating a composite image may include processing together the multiple images of portions of the undercarriage to enhance the visibility of the undercarriage of the vehicle. For example, the multiple images may be combined to create a higher resolution image of the undercarriage of the vehicle. As another example, the multiple images may be combined such that noise in the image of the undercarriage of the vehicle is reduced. As yet another example, the composite image may be combined to increase the contrast of features within the image. In some embodiments, the multiple images may be acquired with different camera angles and/or with different camera settings (e.g., exposure, aperture, ISO). In some embodiments, the multiple images may be acquired of different portions of the undercarriage of the vehicle. For example, images may be captured using views which include different portions of the undercarriage of the vehicle. The multiple images may then be processed together to stitch the different views together such that a view of a larger portion of the undercarriage is provided.

In some embodiments, the image may have been generated prior to the initiation of process 2000. Accordingly, obtaining the image of the undercarriage of the vehicle may include receiving the image from a vehicle condition report or from a stored file on a server, such as those described above in connection with FIG. 1.

In some embodiments, the image may be a virtual lift image obtained using a virtual lift system, as described herein. In some embodiments, other images of the undercarriage of the vehicle may be used, as aspects of the technology described herein is not limited in this respect.

Next, process 2000 proceeds to act 2004 where an image input from the image of the undercarriage of the vehicle is generated. Generating the image input from the image of the undercarriage of the vehicle may include performing one or more image processing steps on the image of the undercarriage of the vehicle. The one or more image processing steps are pre-processing processes to process the image prior to providing the image to a trained machine learning model. The image processing technique may be any image processing technique as described herein. In some embodiments, the image processing technique includes normalizing each color channel of the image, as described herein. For example, normalizing each channel of the image may include subtracting a mean pixel value of a training set of images, on which the trained machine learning models was trained, for each respective particular channel of the image. Following subtraction, normalizing the image may further include dividing each channel of the image by a standard deviation of pixel values in the particular channel of the training set of images on which the trained machine learning models was trained.

Next, process 2000 proceeds to act 2006 where the image input is processed using a trained machine learning model to obtain an output indicative of one or more fluid leaks being present in the image of the undercarriage of the vehicle. In some embodiments, the output is indicative of an oil leak being present in the image of the undercarriage of the vehicle. In some embodiments, the output is indicative of other fluid leaks being present in the image of the undercarriage of the vehicle. For example, the output may be indicative of a of a transmission fluid leak, a coolant fluid leak, a brake fluid leak, and/or a power steering fluid leak. In some embodiments, the output indicative of one or more fluid leaks being present in the image of the undercarriage of the vehicle may be generalized to identify that a fluid leak is present while being agnostic to the type of fluid which is leaking. For example, the output may indicate that a fluid leak is present in the image of the undercarriage of the vehicle without being specific to the type of fluid that is leaking. In some embodiments, the output may indicate that another type of fluid leak is present in the image of the undercarriage of the vehicle, as aspects of the technology described herein are not limited in this respect.

In some embodiments, the output indicative of one or more fluid leaks in the image of the undercarriage of the vehicle indicate a likelihood that the fluid leak is present in the image of the undercarriage. For example, the output of trained machine learning model may be a decimal value between 0 and 1 corresponding to the likelihood that the fluid leak is present in the image of the undercarriage of the vehicle. In some embodiments, the output indicative of one or more fluid leaks in the image of the undercarriage of the vehicle provide a binary indication between a positive class (e.g., a fluid leak is present) and a negative class (e.g., a fluid leak is not present).

In some embodiments, the trained machine learning model is a deep neural network model including multiple 2D convolutional layers. For example, the trained neural network model may have an architecture like the architecture specified in Table 15. In other embodiments, other machine learning architectures for image classification and/or object identification may be used, as aspects of the technology described herein are not limited in this respect.

In some embodiments, the output indicating whether the fluid leak is present in the image of the undercarriage of the vehicle indicates multiple defect likelihoods for respective fluid leaks, each of the defect likelihoods indicating a likelihood that the image of the undercarriage of the vehicle has a respective fluid leak of the potential of fluid leaks. In some embodiments, the defect likelihoods for respective fluid leaks may correspond to the likelihoods of fluid leaks being present at specific positions on the undercarriage of the vehicle. In some embodiments, the likelihoods correspond to the likelihoods that respective types of fluid leaks are present in the vehicle. For example, the output may include a respective likelihood that each of an oil leak, a transmission fluid leak, a coolant fluid leak, a brake fluid leak, and a power steering fluid leak are present in the vehicle.

In some embodiments, the trained machine learning model includes a plurality of parameters, wherein the plurality of parameters includes between one million and fifty million parameters, and wherein processing the image input using the trained machine learning model to obtain the output indicating whether the fluid leak is present in the image of the undercarriage of the vehicle includes computing the output using values of the plurality of parameters and the image input. In some embodiments, the plurality of parameters includes between fifteen million and forty million parameters, as described herein.

In some embodiments, the trained machine learning model may further consider metadata that identifies a given year, make, model, trim, and engine version of a vehicle in connection with detecting the presence of a fluid leak in an image of an undercarriage of a vehicle.

Following act 2006, process 2000 concludes. Accordingly, following the conclusion of process 2000, the output may be provided to an inspector or otherwise included in a vehicle condition report that may include a tag that the vehicle has a fluid leak. Accordingly, following the conclusion of process 2000, the output may be provided to an inspector or otherwise included in a vehicle condition report that may include an indication that the vehicle includes a fluid leak. Additionally, following the conclusion of process 2000, an initial vehicle condition report comprising inspection results may be obtained. The inspection results may indicate a first set of zero, one, or more vehicle defects that the inspector determined to be present in the vehicle. Based on the first set of zero, one, or more vehicle defects, and the output of process 2000, an indication of agreement or discrepancy between the first set of vehicle defects that the inspector determined to be present in the vehicle, and the determination whether or not a fluid leak is present in the vehicle may be generated.

Figure 21:
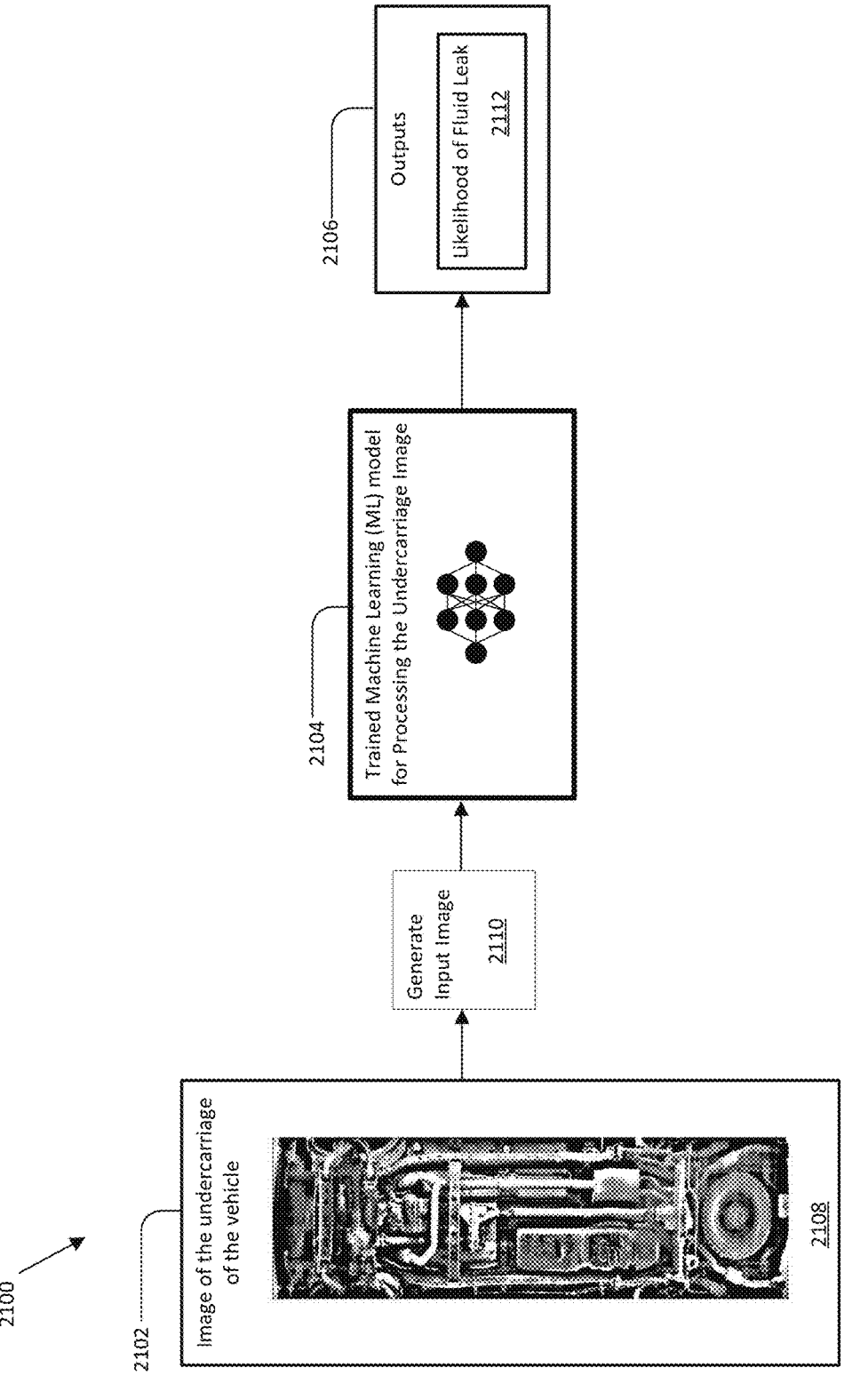
FIG. 21 illustrates a trained machine learning model for detecting whether a fluid leak is present in a vehicle, in accordance with some embodiments of the technology described herein.

FIG. 21 illustrates a trained machine learning model facility 2100 for detecting whether a fluid leak is present in a vehicle, in accordance with some embodiments of the technology described herein. As shown in FIG. 21, trained machine learning model facility 2100 includes a trained machine learning model 2104 for processing the image of the undercarriage of the vehicle 2102 to obtain outputs 2106.

The image of the undercarriage of the vehicle 2102 may be a composite image, in accordance with some embodiments described herein. In some embodiments, the image of the undercarriage of the vehicle 2102 may be acquired by an inspector in connection with a vehicle inspection through a mobile device, as described herein. In some embodiments, the image of the undercarriage of the vehicle may be received in connection with a vehicle inspection report and/or may be retrieved from a link which indicates a file location of the image on a server associated with a vehicle diagnostic system, as described herein.

The image of the undercarriage of the vehicle 2102 may be a virtual lift image of the vehicle undercarriage. The virtual lift image of the vehicle may be obtained from a vehicle inspection report or may be acquired directly from the device capturing the virtual lift image, as described herein.

Prior to processing by the trained machine learning models, the image of the undercarriage of the vehicle may be processed to generate an input image 1108. In some embodiments, generating the input image 1108 may include modifying a characteristic of the image using an image processing technique, as described herein.

In some embodiments the image may be resized. For example, the image may be resized to be 512×512 pixels, keeping the aspect ratio and padding the image with zeros. In some embodiments, the aspect ratio of the image may be selected such that the image is square. In some embodiments, a resizing method may be used to adjust the size of the image such that it is appropriately sized for processing by the model. As an example, the resizing method may use bilinear interpolation. In some embodiments, the aspect ratio of the image may be rectangular. In some embodiments, the aspect ratio of the image may be determined by the aspect ratios used in training.

In some embodiments, two preprocessing techniques may be used to generate the input image. First, a filtering technique that detects defects in the virtual lift reconstruction, such as the technique described above in connection with FIG. 7. Second, a normalization technique that normalizes the values of the pixels for each color channel of the image is used to normalize the channels of the image. For example, each color channel of the image may be normalized based on the mean and standard deviation of each respective color channel in the images of a training set that was used to train the machine learning model. In some embodiments, the image may be normalized using an ImageNet normalization process. For example, the image ImageNet normalization process may use means 0.485, 0.456, 0.406 and standard deviations 0.229, 0.224, 0.225 for normalizing the three RGB channels, respectively. In some embodiments, the model transforms the input tensor from shape [2, 3, 512, 512] to a tensor of shape [2, 1] (batch size 2). In some embodiments, the normalization may use equation 1, as described herein.

The image of the undercarriage of the vehicle 2102 may be processed to generate an input image 2108 which may be provided as an input to the trained machine learning model. Trained machine learning model 2104 processes the input image 2108 to determine an output 2106. Trained machine learning model 2104 determines output 2106 by computing the output value using the trained parameters of the model and the input image. In some embodiments, the trained machine learning model 2104 is a deep neural network model including a plurality of 2D convolution layers. The trained machine learning model outputs a single value which is the confidence of the presence of a fluid leak in the image of the undercarriage. In some embodiments, the output is a decimal value between 0 and 1. Higher decimal values indicate a higher confidence that a fluid leak is present in the image of the undercarriage.

Table 15 below illustrates an exemplary embodiment of the trained machine learning model, in accordance with some embodiments of the technology described herein.

TABLE 15

```
1  ConvNeXtTiny(
2      (module): ConvNeXt(
3          (features): Sequential(
4              (0): Conv2dNormActivation(
5                  (0): Conv2d(3, 96, kernel_size=(4, 4), stride=(4, 4))
6                  (1): LayerNorm2d((96,), eps=1e-06, elementwise_affine=True)
7              )
8              (1): Sequential(
```

TABLE 15-continued

```
9          (0): CNBlock(
10             (block): Sequential(
11                 (0): Conv2d(96, 96, kernel_size=(7, 7), stride=(1, 1), padding=(3, 3),
       groups=96)
12                 (1): Permute( )
13                 (2): LayerNorm((96,), eps=1e-06, elementwise_affine=True)
14                 (3): Linear(in_features=96, out_features=384, bias=True)
15                 (4): GELU(approximate='none')
16                 (5): Linear(in_features=384, out_features=96, bias=True)
17                 (6): Permute( )
18             )
19             (stochastic_depth): StochasticDepth(p=0.0, mode=row)
20          )
21          (1): CNBlock(
22             (block): Sequential(
23                 (0): Conv2d(96, 96, kernel_size=(7, 7), stride=(1, 1), padding=(3, 3),
       groups=96)
24                 (1): Permute( )
25                 (2): LayerNorm((96,), eps=1e-06, elementwise_affine=True)
26                 (3): Linear(in_features=96, out_features=384, bias=True)
27                 (4): GELU(approximate='none')
28                 (5): Linear(in_features=384, out_features=96, bias=True)
29                 (6): Permute( )
30             )
31             (stochastic_depth): StochasticDepth(p=0.0058823529411764705,
       mode=row)
32          )
33          (2): CNBlock(
34             (block): Sequential(
35                 (0): Conv2d(96, 96, kernel_size=(7, 7), stride=(1, 1), padding=(3, 3),
       groups=96)
36                 (1): Permute( )
37                 (2): LayerNorm((96,), eps=1e-06, elementwise_affine=True)
38                 (3): Linear(in_features=96, out_features=384, bias=True)
39                 (4): GELU(approximate='none')
40                 (5): Linear(in_features=384, out_features=96, bias=True)
41                 (6): Permute( )
42             )
43             (stochastic_depth): StochasticDepth(p=0.011764705882352941, mode=row)
44          )
45      )
46      (2): Sequential(
47          (0): LayerNorm2d((96,), eps=1e-06, elementwise_affine=True)
48          (1): Conv2d(96, 192, kernel_size=(2, 2), stride=(2, 2))
49      )
50      (3): Sequential(
51          (0): CNBlock(
52             (block): Sequential(
53                 (0): Conv2d(192, 192, kernel_size=(7, 7), stride=(1, 1), padding=(3, 3),
       groups=192)
54                 (1): Permute( )
55                 (2): LayerNorm((192,), eps=1e-06, elementwise_affine=True)
56                 (3): Linear(in_features=192, out_features=768, bias=True)
57                 (4): GELU(approximate='none')
58                 (5): Linear(in_features=768, out_features=192, bias=True)
59                 (6): Permute( )
60             )
61             (stochastic_depth): StochasticDepth(p=0.017647058823529415, mode=row)
62          )
63          (1): CNBlock(
64             (block): Sequential(
65                 (0): Conv2d(192, 192, kernel_size=(7, 7), stride=(1, 1), padding=(3, 3),
       groups=192)
66                 (1): Permute( )
67                 (2): LayerNorm((192,), eps=1e-06, elementwise_affine=True)
68                 (3): Linear(in_features=192, out_features=768, bias=True)
69                 (4): GELU(approximate='none')
70                 (5): Linear(in_features=768, out_features=192, bias=True)
71                 (6): Permute( )
72             )
73             (stochastic_depth): StochasticDepth(p=0.023529411764705882, mode=row)
74          )
75          (2): CNBlock(
76             (block): Sequential(
77                 (0): Conv2d(192, 192, kernel_size=(7, 7), stride=(1, 1), padding=(3, 3),
       groups=192)
78                 (1): Permute( )
79                 (2): LayerNorm((192,), eps=1e-06, elementwise_affine=True)
80                 (3): Linear(in_features=192, out_features=768, bias=True)
81                 (4): GELU(approximate='none')
```

TABLE 15-continued

```
 82              (5): Linear(in_features=768, out_features=192, bias=True)
 83              (6): Permute( )
 84            )
 85            (stochastic_depth): StochasticDepth(p=0.029411764705882353, mode=row)
 86          )
 87        )
 88      (4): Sequential(
 89        (0): LayerNorm2d((192,), eps=1e-06, elementwise_affine=True)
 90        (1): Conv2d(192, 384, kernel_size=(2, 2), stride=(2, 2))
 91      )
 92      (5): Sequential(
 93        (0): CNBlock(
 94          (block): Sequential(
 95            (0): Conv2d(384, 384, kernel_size=(7, 7), stride=(1, 1), padding=(3, 3),
        groups=384)
 96            (1): Permute( )
 97            (2): LayerNorm((384,), eps=1e-06, elementwise_affine=True)
 98            (3): Linear(in_features=384, out_features=1536, bias=True)
 99            (4): GELU(approximate='none')
100            (5): Linear(in_features=1536, out_features=384, bias=True)
101            (6): Permute( )
102          )
103          (stochastic_depth): StochasticDepth(p=0.03529411764705883, mode=row)
104        )
105        (1): CNBlock(
106          (block): Sequential(
107            (0): Conv2d(384, 384, kernel_size=(7, 7), stride=(1, 1), padding=(3, 3),
        groups=384)
108            (1): Permute( )
109            (2): LayerNorm((384,), eps=1e-06, elementwise_affine=True)
110            (3): Linear(in_features=384, out_features=1536, bias=True)
111            (4): GELU(approximate='none')
112            (5): Linear(in_features=1536, out_features=384, bias=True)
113            (6): Permute( )
114          )
115          (stochastic_depth): StochasticDepth(p=0.0411764705882353, mode=row)
116        )
117        (2): CNBlock(
118          (block): Sequential(
119            (0): Conv2d(384, 384, kernel_size=(7, 7), stride=(1, 1), padding=(3, 3),
        groups=384)
120            (1): Permute( )
121            (2): LayerNorm((384,), eps=1e-06, elementwise_affine=True)
122            (3): Linear(in_features=384, out_features=1536, bias=True)
123            (4): GELU(approximate='none')
124            (5): Linear(in_features=1536, out_features=384, bias=True)
125            (6): Permute( )
126          )
127          (stochastic_depth): StochasticDepth(p=0.047058823529411764, mode=row)
128        )
129        (3): CNBlock(
130          (block): Sequential(
131            (0): Conv2d(384, 384, kernel_size=(7, 7), stride=(1, 1), padding=(3, 3),
        groups=384)
132            (1): Permute( )
133            (2): LayerNorm((384,), eps=1e-06, elementwise_affine=True)
134            (3): Linear(in_features=384, out_features=1536, bias=True)
135            (4): GELU(approximate='none')
136            (5): Linear(in_features=1536, out_features=384, bias=True)
137            (6): Permute( )
138          )
139          (stochastic_depth): StochasticDepth(p=0.052941176470588235, mode=row)
140        )
141        (4): CNBlock(
142          (block): Sequential(
143            (0): Conv2d(384, 384, kernel_size=(7, 7), stride=(1, 1), padding=(3, 3),
        groups=384)
144            (1): Permute( )
145            (2): LayerNorm((384,), eps=1e-06, elementwise_affine=True)
146            (3): Linear(in_features=384, out_features=1536, bias=True)
147            (4): GELU(approximate='none')
148            (5): Linear(in_features=1536, out_features=384, bias=True)
149            (6): Permute( )
150          )
151          (stochastic_depth): StochasticDepth(p=0.058823529411764705, mode=row)
152        )
153        (5): CNBlock(
154          (block): Sequential(
155            (0): Conv2d(384, 384, kernel_size=(7, 7), stride=(1, 1), padding=(3, 3),
        groups=384)
```

TABLE 15-continued

```
156          (1): Permute( )
157          (2): LayerNorm((384,), eps=1e-06, elementwise_affine=True)
158          (3): Linear(in_features=384, out_features=1536, bias=True)
159          (4): GELU(approximate='none')
160          (5): Linear(in_features=1536, out_features=384, bias=True)
161          (6): Permute( )
162        )
163        (stochastic_depth): StochasticDepth(p=0.06470588235294118, mode=row)
164      )
165     (6): CNBlock(
166       (block): Sequential(
167         (0): Conv2d(384, 384, kernel_size=(7, 7), stride=(1, 1), padding=(3, 3),
     groups=384)
168          (1): Permute( )
169          (2): LayerNorm((384,), eps=1e-06, elementwise_affine=True)
170          (3): Linear(in_features=384, out_features=1536, bias=True)
171          (4): GELU(approximate='none')
172          (5): Linear(in_features=1536, out_features=384, bias=True)
173          (6): Permute( )
174        )
175        (stochastic_depth): StochasticDepth(p=0.07058823529411766, mode=row)
176      )
177     (7): CNBlock(
178       (block): Sequential(
179         (0): Conv2d(384, 384, kernel_size=(7, 7), stride=(1, 1), padding=(3, 3),
     groups=384)
180          (1): Permute( )
181          (2): LayerNorm((384,), eps=1e-06, elementwise_affine=True)
182          (3): Linear(in_features=384, out_features=1536, bias=True)
183          (4): GELU(approximate='none')
184          (5): Linear(in_features=1536, out_features=384, bias=True)
185          (6): Permute( )
186        )
187        (stochastic_depth): StochasticDepth(p=0.07647058823529412, mode=row)
188      )
189     (8): CNBlock(
190       (block): Sequential(
191         (0): Conv2d(384, 384, kernel_size=(7, 7), stride=(1, 1), padding=(3, 3),
     groups=384)
192          (1): Permute( )
193          (2): LayerNorm((384,), eps=1e-06, elementwise_affine=True)
194          (3): Linear(in_features=384, out_features=1536, bias=True)
195          (4): GELU(approximate='none')
196          (5): Linear(in_features=1536, out_features=384, bias=True)
197          (6): Permute( )
198        )
199        (stochastic_depth): StochasticDepth(p=0.0823529411764706, mode=row)
200      )
201    )
202   (6): Sequential(
203     (0): LayerNorm2d((384,), eps=1e-06, elementwise_affine=True)
204     (1): Conv2d(384, 768, kernel_size=(2, 2), stride=(2, 2))
205   )
206   (7): Sequential(
207     (0): CNBlock(
208       (block): Sequential(
209         (0): Conv2d(768, 768, kernel_size=(7, 7), stride=(1, 1), padding=(3, 3),
     groups=768)
210          (1): Permute( )
211          (2): LayerNorm((768,), eps=1e-06, elementwise_affine=True)
212          (3): Linear(in_features=768, out_features=3072, bias=True)
213          (4): GELU(approximate='none')
214          (5): Linear(in_features=3072, out_features=768, bias=True)
215          (6): Permute( )
216        )
217        (stochastic_depth): StochasticDepth(p=0.08823529411764706, mode=row)
218      )
219     (1): CNBlock(
220       (block): Sequential(
221         (0): Conv2d(768, 768, kernel_size=(7, 7), stride=(1, 1), padding=(3, 3),
     groups=768)
222          (1): Permute( )
223          (2): LayerNorm((768,), eps=1e-06, elementwise_affine=True)
224          (3): Linear(in_features=768, out_features=3072, bias=True)
225          (4): GELU(approximate='none')
226          (5): Linear(in_features=3072, out_features=768, bias=True)
227          (6): Permute( )
228        )
229        (stochastic_depth): StochasticDepth(p=0.09411764705882353, mode=row)
230      )
```

TABLE 15-continued

```
231          (2): CNBlock(
232              (block): Sequential(
233                  (0): Conv2d(768, 768, kernel_size=(7, 7), stride=(1, 1), padding=(3, 3),
        groups=768)
234                  (1): Permute( )
235                  (2): LayerNorm((768,), eps=1e–06, elementwise_affine=True)
236                  (3): Linear(in_features=768, out_features=3072, bias=True)
237                  (4): GELU(approximate='none')
238                  (5): Linear(in_features=3072, out_features=768, bias=True)
239                  (6): Permute( )
240              )
241              (stochastic_depth): StochasticDepth(p=0.1, mode=row)
242          )
243          )
244      )
245      (avgpool): AdaptiveAvgPool2d(output_size=1)
246      (classifier): Sequential(
247          (0): LayerNorm2d((768,), eps=1e–06, elementwise_affine=True)
248          (1): Flatten(start_dim=1, end_dim =–1)
249          (2): Linear(in_features=768, out_features=1, bias=True)
250      )
251  )
252 )
```

Table 16 below illustrates layers and parameters associated with the example embodiment shown in Table 15. As shown in the example configuration of layers and parameters in Table 16, the exemplary trained machine learning model includes 27,814,273 trainable parameters. In other embodiments, the trained machine learning model may have other numbers of trainable and/or nontrainable parameters, as aspects of the technology described herein are not limited in this respect.

TABLE 16

| Layer (Type) | Output Shape | Param # |
|---|---|---|
| Conv2d-1 | [–1, 96, 128, 128] | 4,704 |
| LayerNorm2d-2 | [–1, 96, 128, 128] | 192 |
| Conv2d-3 | [–1, 96, 128, 128] | 4,800 |
| Permute-4 | [–1, 128, 128, 96] | 0 |
| LayerNorm-5 | [–1, 128, 128, 96] | 192 |
| Linear-6 | [–1, 128, 128, 384] | 37,248 |
| GELU-7 | [–1, 128, 128, 384] | 0 |
| Linear-8 | [–1, 128, 128, 96] | 36,960 |
| Permute-9 | [–1, 96, 128, 128] | 0 |
| StochasticDepth-10 | [–1, 96, 128, 128] | 0 |
| CNBlock-11 | [–1, 96, 128, 128] | 0 |
| Conv2d-12 | [–1, 96, 128, 128] | 4,800 |
| Permute-13 | [–1, 128, 128, 96] | 0 |
| LayerNorm-14 | [–1, 128, 128, 96] | 192 |
| Linear-15 | [–1, 128, 128, 384] | 37,248 |
| GELU-16 | [–1, 128, 128, 384] | 0 |
| Linear-17 | [–1, 128, 128, 96] | 36,960 |
| Permute-18 | [–1, 96, 128, 128] | 0 |
| StochasticDepth-19 | [–1, 96, 128, 128] | 0 |
| CNBlock-20 | [–1, 96, 128, 128] | 0 |
| Conv2d-21 | [–1, 96, 128, 128] | 4,800 |
| Permute-22 | [–1, 128, 128, 96] | 0 |
| LayerNorm-23 | [–1, 128, 128, 96] | 192 |
| Linear-24 | [–1, 128, 128, 384] | 37,248 |
| GELU-25 | [–1, 128, 128, 384] | 0 |
| Linear-26 | [–1, 128, 128, 96] | 36,960 |
| Permute-27 | [–1, 96, 128, 128] | 0 |
| StochasticDepth-28 | [–1, 96, 128, 128] | 0 |
| CNBlock-29 | [–1, 96, 128, 128] | 0 |
| LayerNorm2d-30 | [–1, 96, 128, 128] | 192 |
| Conv2d-31 | [–1, 192, 64, 64] | 73,920 |
| Conv2d-32 | [–1, 192, 64, 64] | 9,600 |
| Permute-33 | [–1, 64, 64, 192] | 0 |
| LayerNorm-34 | [–1, 64, 64, 192] | 384 |
| Linear-35 | [–1, 64, 64, 768] | 148,224 |
| GELU-36 | [–1, 64, 64, 768] | 0 |
| Linear-37 | [–1, 64, 64, 192] | 147,648 |

TABLE 16-continued

| Layer (Type) | Output Shape | Param # |
|---|---|---|
| Permute-38 | [–1, 192, 64, 64] | 0 |
| StochasticDepth-39 | [–1, 192, 64, 64] | 0 |
| CNBlock-40 | [–1, 192, 64, 64] | 0 |
| Conv2d-41 | [–1, 192, 64, 64] | 9,600 |
| Permute-42 | [–1, 64, 64, 192] | 0 |
| LayerNorm-43 | [–1, 64, 64, 192] | 384 |
| Linear-44 | [–1, 64, 64, 768] | 148,224 |
| GELU-45 | [–1, 64, 64, 768] | 0 |
| Linear-46 | [–1, 64, 64, 192] | 147,648 |
| Permute-47 | [–1, 192, 64, 64] | 0 |
| StochasticDepth-48 | [–1, 192, 64, 64] | 0 |
| CNBlock-49 | [–1, 192, 64, 64] | 0 |
| Conv2d-50 | [–1, 192, 64, 64] | 9,600 |
| Permute-51 | [–1, 64, 64, 192] | 0 |
| LayerNorm-52 | [–1, 64, 64, 192] | 384 |
| Linear-53 | [–1, 64, 64, 768] | 148,224 |
| GELU-54 | [–1, 64, 64, 768] | 0 |
| Linear-55 | [–1, 64, 64, 192] | 147,648 |
| Permute-56 | [–1, 192, 64, 64] | 0 |
| StochasticDepth-57 | [–1, 192, 64, 64] | 0 |
| CNBlock-58 | [–1, 192, 64, 64] | 0 |
| LayerNorm2d-59 | [–1, 192, 64, 64] | 384 |
| Conv2d-60 | [–1, 384, 32, 32] | 295,296 |
| Conv2d-61 | [–1, 384, 32, 32] | 19,200 |
| Permute-62 | [–1, 32, 32, 384] | 0 |
| LayerNorm-63 | [–1, 32, 32, 384] | 768 |
| Linear-64 | [–1, 32, 32, 1536] | 591,360 |
| GELU-65 | [–1, 32, 32, 1536] | 0 |
| Linear-66 | [–1, 32, 32, 384] | 590,208 |
| Permute-67 | [–1, 384, 32, 32] | 0 |
| StochasticDepth-68 | [–1, 384, 32, 32] | 0 |
| CNBlock-69 | [–1, 384, 32, 32] | 0 |
| Conv2d-70 | [–1, 384, 32, 32] | 19,200 |
| Permute-71 | [–1, 32, 32, 384] | 0 |
| LayerNorm-72 | [–1, 32, 32, 384] | 768 |
| Linear-73 | [–1, 32, 32, 1536] | 591,360 |
| GELU-74 | [–1, 32, 32, 1536] | 0 |
| Linear-75 | [–1, 32, 32, 384] | 590,208 |
| Permute-76 | [–1, 384, 32, 32] | 0 |
| StochasticDepth-77 | [–1, 384, 32, 32] | 0 |
| CNBlock-78 | [–1, 384, 32, 32] | 0 |
| Conv2d-79 | [–1, 384, 32, 32] | 19,200 |
| Permute-80 | [–1, 32, 32, 384] | 0 |
| LayerNorm-81 | [–1, 32, 32, 384] | 768 |
| Linear-82 | [–1, 32, 32, 1536] | 591,360 |
| GELU-83 | [–1, 32, 32, 1536] | 0 |
| Linear-84 | [–1, 32, 32, 384] | 590,208 |
| Permute-85 | [–1, 384, 32, 32] | 0 |
| StochasticDepth-86 | [–1, 384, 32, 32] | 0 |

TABLE 16-continued

| Layer (Type) | Output Shape | Param # |
|---|---|---|
| CNBlock-87 | [−1, 384, 32, 32] | 0 |
| Conv2d-88 | [−1, 384, 32, 32] | 19,200 |
| Permute-89 | [−1, 32, 32, 384] | 0 |
| LayerNorm-90 | [−1, 32, 32, 384] | 768 |
| Linear-91 | [−1, 32, 32, 1536] | 591,360 |
| GELU-92 | [−1, 32, 32, 1536] | 0 |
| Linear-93 | [−1, 32, 32, 384] | 590,208 |
| Permute-94 | [−1, 384, 32, 32] | 0 |
| StochasticDepth-95 | [−1, 384, 32, 32] | 0 |
| CNBlock-96 | [−1, 384, 32, 32] | 0 |
| Conv2d-97 | [−1, 384, 32, 32] | 19,200 |
| Permute-98 | [−1, 32, 32, 384] | 0 |
| LayerNorm-99 | [−1, 32, 32, 384] | 768 |
| Linear-100 | [−1, 32, 32, 1536] | 591,360 |
| GELU-101 | [−1, 32, 32, 1536] | 0 |
| Linear-102 | [−1, 32, 32, 384] | 590,208 |
| Permute-103 | [−1, 384, 32, 32] | 0 |
| StochasticDepth-104 | [−1, 384, 32, 32] | 0 |
| CNBlock-105 | [−1, 384, 32, 32] | 0 |
| Conv2d-106 | [−1, 384, 32, 32] | 19,200 |
| Permute-107 | [−1, 32, 32, 384] | 0 |
| LayerNorm-108 | [−1, 32, 32, 384] | 768 |
| Linear-109 | [−1, 32, 32, 1536] | 591,360 |
| GELU-110 | [−1, 32, 32, 1536] | 0 |
| Linear-111 | [−1, 32, 32, 384] | 590,208 |
| Permute-112 | [−1, 384, 32, 32] | 0 |
| StochasticDepth-113 | [−1, 384, 32, 32] | 0 |
| CNBlock-114 | [−1, 384, 32, 32] | 0 |
| Conv2d-115 | [−1, 384, 32, 32] | 19,200 |
| Permute-116 | [−1, 32, 32, 384] | 0 |
| LayerNorm-117 | [−1, 32, 32, 384] | 768 |
| Linear-118 | [−1, 32, 32, 1536] | 591,360 |
| GELU-119 | [−1, 32, 32, 1536] | 0 |
| Linear-120 | [−1, 32, 32, 384] | 590,208 |
| Permute-121 | [−1, 384, 32, 32] | 0 |
| StochasticDepth-122 | [−1, 384, 32, 32] | 0 |
| CNBlock-123 | [−1, 384, 32, 32] | 0 |
| Conv2d-124 | [−1, 384, 32, 32] | 19,200 |
| Permute-125 | [−1, 32, 32, 384] | 0 |
| LayerNorm-126 | [−1, 32, 32, 384] | 768 |
| Linear-127 | [−1, 32, 32, 1536] | 591,360 |
| GELU-128 | [−1, 32, 32, 1536] | 0 |
| Linear-129 | [−1, 32, 32, 384] | 590,208 |
| Permute-130 | [−1, 384, 32, 32] | 0 |
| StochasticDepth-131 | [−1, 384, 32, 32] | 0 |
| CNBlock-132 | [−1, 384, 32, 32] | 0 |
| Conv2d-133 | [−1, 384, 32, 32] | 19,200 |
| Permute-134 | [−1, 32, 32, 384] | 0 |
| LayerNorm-135 | [−1, 32, 32, 384] | 768 |
| Linear-136 | [−1, 32, 32, 1536] | 591,360 |
| GELU-137 | [−1, 32, 32, 1536] | 0 |
| Linear-138 | [−1, 32, 32, 384] | 590,208 |
| Permute-139 | [−1, 384, 32, 32] | 0 |
| StochasticDepth-140 | [−1, 384, 32, 32] | 0 |
| CNBlock-141 | [−1, 384, 32, 32] | 0 |
| LayerNorm2d-142 | [−1, 384, 32, 32] | 768 |
| Conv2d-143 | [−1, 768, 16, 16] | 1,180,416 |
| Conv2d-144 | [−1, 768, 16, 16] | 38,400 |
| Permute-145 | [−1, 16, 16, 768] | 0 |
| LayerNorm-146 | [−1, 16, 16, 768] | 1,536 |
| Linear-147 | [−1, 16, 16, 3072] | 2,362,368 |
| GELU-148 | [−1, 16, 16, 3072] | 0 |
| Linear-149 | [−1, 16, 16, 768] | 2,360,064 |
| Permute-150 | [−1, 768, 16, 16] | 0 |
| StochasticDepth-151 | [−1, 768, 16, 16] | 0 |
| CNBlock-152 | [−1, 768, 16, 16] | 0 |
| Conv2d-153 | [−1, 768, 16, 16] | 38,400 |
| Permute-154 | [−1, 16, 16, 768] | 0 |
| LayerNorm-155 | [−1, 16, 16, 768] | 1,536 |
| Linear-156 | [−1, 16, 16, 3072] | 2,362,368 |
| GELU-157 | [−1, 16, 16, 3072] | 0 |
| Linear-158 | [−1, 16, 16, 768] | 2,360,064 |
| Permute-159 | [−1, 768, 16, 16] | 0 |
| StochasticDepth-160 | [−1, 768, 16, 16] | 0 |
| CNBlock-161 | [−1, 768, 16, 16] | 0 |
| Conv2d-162 | [−1, 768, 16, 16] | 38,400 |
| Permute-163 | [−1, 16, 16, 768] | 0 |
| LayerNorm-164 | [−1, 16, 16, 768] | 1,536 |

TABLE 16-continued

| Layer (Type) | Output Shape | Param # |
|---|---|---|
| Linear-165 | [−1, 16, 16, 3072] | 2,362,368 |
| GELU-166 | [−1, 16, 16, 3072] | 0 |
| Linear-167 | [−1, 16, 16, 768] | 2,360,064 |
| Permute-168 | [−1, 768, 16, 16] | 0 |
| StochasticDepth-169 | [−1, 768, 16, 16] | 0 |
| CNBlock-170 | [−1, 768, 16, 16] | 0 |
| AdaptiveAvgPool2d-171 | [−1, 768, 1, 1] | 0 |
| LayerNorm2d-172 | [−1, 768, 1, 1] | 1,536 |
| Flatten-173 | [−1, 768] | 0 |
| Linear-174 | [−1, 1] | 769 |
| ConvNeXt-175 | [−1, 1] | 0 |

In some embodiments, detecting a fluid leak from under-carriage images may be treated as a binary classification problem. To train the machine learning model for binary classification, training data was collected by vehicle inspectors who are trained for inspecting vehicles. When identifying a vehicle with a fluid leak, the vehicle inspectors may tag the vehicle inspection report to indicate a "Fluid Leak" defect is present. For example, if vehicle inspectors visually identify an actively dripping fluid on the undercarriage of the vehicle or if they detect a burning oil smell from the engine compartment, they may include an indication of the fluid leak defect in the vehicle condition report such as by selecting a "Fluid Leak" tag. In some vehicle condition reports, specific comments may be included with the "Fluid Leak" tag. For example, some of the vehicle inspectors included comments could include comments such as see photos, see virtual lift, refer to virtual lift, residue on undercarriage, bottom of engine is wet, wet under engine, under front, oil on undercarriage, wet pan. However, recognizing that due to the nature of the data collection and the difficulty in detecting a fluid leak, the labels for the images included in the vehicle condition report may be noisy.

The positive class for the training set was not limited to images which had associated comments, rather the positive class for the training data included all undercarriage images which were associated with a vehicle that had been identified as having a fluid leak. Accordingly, all the images tagged with a fluid leak were included in the positive class set for training and the rest of the images were included in the negative class. Table 17, included below, summarizes the size of the dataset used to train an exemplary machine learning model, such as the model described in Table 16.

TABLE 17

| | Positives | Negatives | Total |
|---|---|---|---|
| Train | 68,111 | 123,603 | 191,714 |
| Validation | 2,209 | 2,559 | 4,768 |
| Test | 2,227 | 2,500 | 4,727 |

The model was trained using a binary cross entropy metric with a logits objective which was optimized using an Adam optimizer with a learning rate of 1e-5. The checkpoint with maximum of the sum of AUROC, Average Precision and F1 Score on the validation dataset was chosen as the final model for evaluation on the test dataset. To account for label noise in the positive class of images, an iterative label flipping process was used to improve the model accuracy. For example, the top 5% of the training data with highest loss was selected and the labels flipped. The process was repeated 3 times until negligible improvements in performance were observed. The libraries used to train the model are PyTorch, Lightning, Hydra and Wandb. As an example, the test set returned an AUROC of 0.817, an Average Precision 0.773, and a F1 Score 0.733.

Techniques described herein may be embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Unless otherwise specified, the terms "approximately," "substantially," and "about" may be used to mean within ±10% of a target value in some embodiments. The terms "approximately," "substantially" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

VIII. Exemplary Aspects Associated with the Disclosure

Various aspects are described in this disclosure, which include, but are not limited to, the following aspects:

1. A method for assisting an inspector to inspect a vehicle by providing the inspector with information about potential vehicle defects via a mobile device used by the inspector, the method comprising: using at least one computer hardware processor to perform, prior to completion of the inspector's inspection of the vehicle: obtaining first information about the vehicle, the first information about the vehicle comprising a vehicle identifier; obtaining second information about the vehicle using the vehicle identifier; identifying one or more potential vehicle defects by using one or more trained machine learning (ML) defect detection models, the trained ML defect detection models being trained to detect vehicle defects of different types and including a first trained ML model trained to detect vehicle defects of a first type, the identifying comprising: generating a first set of features using the first information about the vehicle and/or the second information about the vehicle; processing the first set of features using the first trained ML model to obtain a first likelihood that the vehicle has a defect of the first type; and identifying, based on the first likelihood, the defect of the first type as a first potential vehicle defect for the vehicle; and notifying the inspector of the identified one or more potential vehicle defects, the notifying comprising notifying the inspector of the first potential vehicle defect.

2. The method of aspect 1, wherein notifying the inspector of the first potential vehicle defect comprises: providing the inspector with information indicating the first potential vehicle defect and the first likelihood that the vehicle has the defect of the first type.

3. The method of aspect 1, wherein notifying the inspector of the first potential vehicle defect comprises: providing the inspector with instructions indicative of one or more actions for the inspector to take to confirm whether the first potential vehicle defect is present in the vehicle.

4. The method of aspect 1, wherein the first potential vehicle defect of the first type is an engine defect, an exhaust smoke defect, a transmission defect, a drivetrain defect, a frame rot defect, a frame damage defect, a vehicle title defect, a vehicle modification defect, a drivability defect, and/or a hail damage defect.

5. The method of aspect 1, wherein notifying the inspector of the identified one or more potential vehicle defects comprises: providing the inspector with information indicating: (1) a plurality of potential vehicle defects, including the first potential vehicle defect; and (2) a ranking of the plurality of potential vehicle defects, the ranking of potential vehicle defects being based on respective likelihoods of the vehicle defects being present in the vehicle.

6. The method of aspect 1, wherein the first information about the vehicle further comprises an odometer reading from the vehicle.

7. The method of aspect 1, wherein the second information about the vehicle further comprises information selected from the group consisting of: a year of manufacture of the vehicle, a make and model of the vehicle, an age of the vehicle at time of inspection, an engine displacement volume of the vehicle, a longitude coordinate of an inspection location, a latitude coordinate of the inspection location, a Koppen climate code associated with the inspection location, a drive train type of the vehicle, a fuel type of the vehicle, engine description keywords, a US state code associated with the inspection location, a Carfax® alert associated with the vehicle, and a National Highway Traffic Safety Administration (NHTSA) recall profile associated with the vehicle.

8. The method of aspect 1, wherein the first trained ML model is trained to detect an engine noise defect by processing the first set of features to obtain the first likelihood that the vehicle has the engine noise defect.

9. The method of aspect 8, wherein the first set of features comprises: an odometer reading of the vehicle, a year of manufacture of the vehicle, an age of vehicle at inspection, an engine displacement volume of the vehicle, a longitude coordinate of an inspection location, a latitude coordinate of the inspection location, a Koppen climate code associated with the inspection location, a drive train type of the vehicle, a fuel type of the vehicle, a make and model of the vehicle, engine description keywords, and a Carfax® alert associated with the vehicle.

10. The method of aspect 1, wherein the one or more trained ML defect detection models include a second trained ML model trained to detect vehicle defects of a second type different from the first type, wherein the identifying comprises: generating a second set of features using the first information about the vehicle and/or the second information about the vehicle; processing the second set of features using the second trained ML model to obtain a second likelihood that the vehicle has a defect of the second type; and identifying, based on the second likelihood, the defect of the second type as a second potential vehicle defect, and wherein the notifying comprises: notifying the inspector of the second potential vehicle defect.

11. The method of aspect 10, wherein the first set of features are different from the second set of features.

12. The method of aspect 10, wherein the first set of features comprise at least one feature obtained from the first information and at least one feature obtained from the second information.

13. The method of aspect 10 wherein the second trained ML model is trained to detect a transmission defect by processing the second set of features to obtain the second likelihood that the vehicle has the transmission defect.

14. The method of aspect 13, wherein the second set of features comprises: an odometer reading of the vehicle, a year of manufacture of the vehicle, an age of vehicle at inspection, an engine displacement volume of the vehicle, a drive train type of the vehicle, a fuel type of the vehicle, a make and model of the vehicle, engine description keywords, a Carfax® alert associated with the vehicle, and a National Highway Traffic Safety Administration (NHTSA) recall profile associated with the vehicle.

15. The method of aspect 1, wherein the first trained ML model is a trained random forest model having between 0.5 million and 17 million parameters.

16. A system, comprising: at least one computer hardware processor; and at least one non-transitory computer-readable storage medium storing processor executable instructions that when executed by the at least one computer hardware processor perform a method for assisting an inspector to inspect a vehicle by providing the inspector with information about potential vehicle defects via a mobile device used by the inspector, the method comprising: obtaining first information about the vehicle, the first information about the vehicle comprising a vehicle identifier; obtaining second information about the vehicle using the vehicle identifier; identifying one or more potential vehicle defects by using one or more trained machine learning (ML) defect detection models, the trained ML defect detection models being trained to detect vehicle defects of different types and including a first trained ML model trained to detect vehicle defects of a first type, the identifying comprising: generating a first set of features using the first information about the vehicle and/or the second information about the vehicle; processing the first set of features using the first trained ML model to obtain a first likelihood that the vehicle has a defect of the first type; and identifying, based on the first likelihood, the defect of the first type as a first potential vehicle defect for the vehicle; and notifying the inspector of the identified one or more potential vehicle defects, the notifying comprising notifying the inspector of the first potential vehicle defect.

17. The system of aspect 16, wherein the first trained ML model is trained to detect an engine noise defect by processing the first set of features to obtain the first likelihood that the vehicle has the engine noise defect.

18. The system of aspect 16, wherein the one or more trained ML defect detection models include a second trained ML model trained to detect vehicle defects of a second type different from the first type, wherein the identifying comprises: generating a second set of features using the first information about the vehicle and/or the second information about the vehicle; processing the second set of features using the second trained ML model to obtain a second likelihood that the vehicle has a defect of the second type; and identifying, based on the second likelihood, the defect of the second type as a second potential vehicle defect, and wherein the notifying comprises: notifying the inspector of the second potential vehicle defect.

19. At least one non-transitory computer-readable storage medium storing processor executable instructions that when executed by the at least one computer hardware processor perform a method for assisting an inspector to inspect a vehicle by providing the inspector with information about potential vehicle defects via a mobile device used by the inspector, the method comprising: obtaining first information about the vehicle, the first information about the vehicle comprising a vehicle identifier; obtaining second information about the vehicle using the vehicle identifier; identifying one or more potential vehicle defects by using one or more trained machine learning (ML) defect detection models, the trained ML defect detection models being trained to detect vehicle defects of different types and including a first trained ML model trained to detect vehicle defects of a first type, the identifying comprising: generating a first set of features using the first information about the vehicle and/or the second information about the vehicle; processing the first set of features using the first trained ML model to obtain a first likelihood that the vehicle has a defect of the first type; and identifying, based on the first likelihood, the defect of the first type as a first potential vehicle defect for the vehicle; and notifying the inspector of the identified one or more potential vehicle defects, the notifying comprising notifying the inspector of the first potential vehicle defect.

20. The at least one non-transitory computer-readable storage medium of aspect 19, wherein the one or more trained ML defect detection models include a second trained ML model trained to detect vehicle defects of a second type different from the first type, wherein the identifying comprises: generating a second set of features using the first information about the vehicle and/or the second information about the vehicle; processing the second set of features using the second trained ML model to obtain a second likelihood that the vehicle has a defect of the second type; and identifying, based on the second likelihood, the defect of the second type as a second potential vehicle defect, and wherein the notifying comprises: notifying the inspector of the second potential vehicle defect.

21. A method for using trained machine learning (ML) models to process data about a vehicle in furtherance of identifying one or more vehicle defects, the aspect comprising: using at least one computer hardware processor to perform, subsequent to completion of an inspector's inspection of the vehicle: obtaining an initial vehicle condition report comprising inspection results, the inspection results indicating a first set of zero, one or more vehicle defects that the inspector determined to be present in the vehicle; obtaining data about the vehicle gathered at least in part during inspection of the vehicle by the inspector; applying the trained ML models to the data about the vehicle to obtain a second set of zero, one or more vehicle defects that are indicated by the trained ML models to be present in the vehicle; generating an indication of agreement or discrepancy between the first set of vehicle defects that the inspector determined to be present in the vehicle and the second set of vehicle defects that are indicated by the trained ML models to be present in the vehicle; and outputting the initial vehicle condition report and/or the indication of agreement or discrepancy.

22. The method of aspect 21, wherein generating the indication of agreement or discrepancy between the first set of vehicle defects and the second set of vehicle defects comprises: processing the first set of vehicle defects and the second set of vehicle defects using a trained ML risk model to obtain a likelihood of a discrepancy being present between the first set of vehicle defects and the second set of vehicle defects.

23. The method of aspect 22, wherein the trained ML risk model comprises a trained random forest model trained to determine whether the likelihood of the discrepancy being present exceeds a threshold.

24. The method of aspect 21, wherein the trained ML risk model is trained to determine a likelihood a vehicle defect is present in the vehicle, the vehicle defect being from the group consisting of: engine noise, exhaust system, and structural rust.

25. The method of aspect 21, wherein generating the indication of agreement or discrepancy between the first set of vehicle defects and the second set of vehicle defects is performed using one or more ML risk models or is performed using one or more rules and generating the indication of agreement or discrepancy involves processing the inspection results and likelihoods, obtained by applying the trained ML models to the data about the vehicle, with the one or more ML risk models or one or more rules.

26. The method of aspect 21, wherein each of the trained ML models is trained to generate a likelihood that a respective type of a vehicle defect is present in the vehicle.

27. The method of aspect 21, wherein the trained ML models include a first trained ML model trained to generate a first likelihood that a first type of vehicle defect is present in the vehicle, wherein the first type of vehicle defect is an undercarriage defect, engine audio defect, dashboard defect, and/or exterior/mechanical defect.

28. The method of aspect 21, further comprising generating a revised vehicle condition report, the generating comprising: providing the initial vehicle condition report and the indication of agreement or discrepancy between the first set of vehicle defects and the second set of vehicle defects to a reviewer through a device used by the reviewer; receiving input from the device whether or not to modify the initial vehicle condition report based on the indication; and generating a final vehicle condition report, based on the input received from the device.

29. The method of aspect 28, wherein: upon receiving input from the device to modify the initial vehicle report, the generating the final vehicle condition report comprises modifying the inspection results indicating the first set of zero, one or more vehicle defects by replacing an indication of one or more vehicle defects in the first set with one or more corresponding indications from the second set.

30. The method of aspect 28, further comprising: prior to receiving the input whether or not to modify the initial vehicle condition report, providing, to an inspector, a recommendation to obtain additional inspection results; and subsequent to obtaining additional inspection results, determining whether or not to modify the initial vehicle condition report.

31. The method of aspect 21, wherein: the first set of vehicle defects does not indicate a vehicle defect of a first type being present in the vehicle; the second set of vehicle defects indicates a likelihood of the vehicle defect of the first type being present in the vehicle; and generating the indication of agreement or discrepancy comprises generating an indication of discrepancy with respect to the vehicle defect of the first type when the likelihood exceeds a threshold.

32. The method of aspect 21, wherein: the trained ML models include a first trained ML model trained to detect vehicle defects of the first type, and applying the trained (ML) models to the data about the vehicle comprises applying the first trained ML model to at least some of the data about the vehicle to obtain the likelihood of the vehicle defect of the first type being present in the vehicle.

33. The method of aspect 21, wherein: the first set of vehicle defects does not indicate presence of an engine vehicle defect; the second set of vehicle defects does indicate a likelihood of the engine vehicle defect being present in the vehicle; and generating the indication of agreement or discrepancy comprises generating an indication of discrepancy with respect to the engine vehicle defect based on the likelihood.

34. The method of aspect 21, wherein the first trained ML model comprises: a first neural network portion comprising a plurality of one-dimensional (1D) convolutional layers configured to process an audio waveform; a second neural network portion comprising a plurality of two-dimensional (2D) convolutional layers configured to process a 2D representation of the audio waveform; and a fusion neural network portion comprising one or more fully connected layers configured to combine outputs produced by the first neural network portion and the second neural network portion to obtain a likelihood indicative of the presence or absence of the at least one vehicle defect.

35. The method of aspect 21, wherein the data about the vehicle comprises data gathered during the inspection of the vehicle using at least one hardware sensor configured to record audio of the vehicle during operation and/or capture one or more images and/or videos of the vehicle.

36. The method of aspect 21, wherein the data about the vehicle comprises: an audio recording of the vehicle during its operation, an image of at least a portion of the vehicle, a video of at least a portion of the vehicle, and/or one or more on-board diagnostic (OBD) codes.

37. A system, comprising: at least one hardware processor; and at least one non-transitory computer-readable storage medium storing processor executable instructions that when executed by the at least one computer hardware processor perform a method for using trained machine learning (ML) models to process data about a vehicle in furtherance of identifying one or more vehicle defects, the method comprising: obtaining an initial vehicle condition report comprising inspection results, the inspection results indicating a first set of zero, one or more vehicle defects that the inspector determined to be present in the vehicle; obtaining data about the vehicle gathered at least in part during inspection of the vehicle by the inspector; applying the trained ML models to the data about the vehicle to obtain a second set of zero, one or more vehicle defects that are indicated by the trained ML models to be present in the vehicle; generating an indication of agreement or discrepancy between the first set of vehicle defects that the inspector determined to be present in the vehicle and the second set of vehicle defects that are indicated by the trained ML models to be present in the vehicle; and outputting the initial vehicle condition report and the indication of agreement or discrepancy.

38. The system of aspect 37, wherein generating the indication of agreement or discrepancy between the first set of vehicle defects and the second set of vehicle defects comprises comparing likelihoods, generated by the trained ML models, indicating that defects of the second set of vehicle defects are present in the vehicle, to the first set of vehicle defects.

39. At least one non-transitory computer-readable storage medium storing processor executable instructions that when executed by the at least one computer hardware processor perform a method for using trained machine learning ML models to process data about a vehicle in furtherance of identifying one or more vehicle defects, the method comprising: obtaining an initial vehicle condition report comprising inspection results, the inspection results indicating a first set of zero, one or more vehicle defects that the inspector determined to be present in the vehicle; obtaining data about the vehicle gathered at least in part during inspection of the vehicle by the inspector; applying the trained (ML) models to the data about the vehicle to obtain a second set of zero, one or more vehicle defects that are indicated by the trained ML models to be present in the vehicle; generating an indication of agreement or discrepancy between the first set of vehicle defects that the inspector determined to be present in the vehicle and the second set of vehicle defects that are indicated by the trained ML models to be present in the vehicle; and outputting the initial vehicle condition report and the indication of agreement or discrepancy.

40. The at least one non-transitory computer-readable storage medium of aspect 39, wherein generating the indication of agreement or discrepancy between the first set of vehicle defects and the second set of vehicle defects comprises comparing likelihoods, generated by the trained ML models, indicating that defects of the second set of vehicle defects are present in the vehicle, to the first set of vehicle defects.

41. A method for using a trained machine learning (ML) model to evaluate quality of an image of an undercarriage of a vehicle, the method comprising: using at least one computer hardware processor to perform: obtaining an image of the undercarriage of the vehicle; processing the image using the trained ML model, the processing comprising: generating image input from the image; processing the image input using the trained ML model to obtain output indicative of presence of zero, one, or multiple image quality defects in the image of the undercarriage of the vehicle.

42. The method of aspect 41, wherein the image of the undercarriage of the vehicle is a composite image of the undercarriage of the vehicle having been generated by combining multiple images of the undercarriage of the vehicle.

43. The method of aspect 41 or any other preceding claim, wherein generating the image input from the image comprises: normalizing the image, per channel, at least in part by: subtracting, in each particular channel, mean pixel values in the particular channel of a training set of images on which the trained ML model was trained; and dividing by a standard deviation of pixel values in the particular channel of the training set of images on which the trained ML model was trained.

44. The method of aspect 41 or any other preceding claim, wherein the trained ML model is a deep neural network model.

45. The method of aspect 44 or any other preceding claim, wherein the trained ML model comprises a plurality of 2D convolutional layers.

46. The method of aspect 45 or any other preceding claim, wherein the trained ML model comprises a plurality of parameters, wherein the plurality of parameters comprises between one million and fifty million parameters, and wherein processing the image input using the trained ML model to obtain the output indicative of the presence of zero, one, or multiple image quality defects in the image of the undercarriage of the vehicle comprises computing the output using values of the plurality of parameters and the image input.

47. The method of aspect 46 or any other preceding claim, wherein the trained ML model comprises a plurality of parameters, wherein the plurality of parameters comprises between ten million and thirty million parameters, and wherein processing the image input using the trained ML model to obtain the output indicative of the presence of zero, one, or multiple image quality defects in the image of the undercarriage of the vehicle comprises computing the output using values of the plurality of parameters and the image input.

48. The method of aspect 41 or any other preceding claim, wherein the output indicates a plurality of defect likelihoods for a respective plurality of image quality defects, each of the plurality of defect likelihoods indicating a likelihood that the image of the undercarriage of the vehicle has a respective image quality defect of the plurality of image quality defects.

49. The method of aspect 48, wherein the plurality of image defects includes one or more image defects selected from the group consisting of: an improper cropping defect, an insufficient detail defect, a dirty mirror defect, a glare defect, an incorrect trim defect, a lighting defect, and a recording defect.

50. The method of aspect 49, wherein the output indicates a likelihood that the image of the undercarriage of the vehicle is of sufficient quality for subsequent processing.

51. The method of aspect 50, further comprising: determining that the image of the undercarriage of the vehicle is of sufficient quality for subsequent processing when the likelihood that the image of the undercarriage of the vehicle is of sufficient quality for subsequent processing is greater than each of the plurality of defect likelihoods; and when it is determined that the image of the undercarriage of the vehicle is of sufficient quality for subsequent processing, processing the image of the undercarriage of the vehicle with one or more other trained ML models to determine whether the vehicle has one or more respective defects.

52. The method of aspect 41 or any other preceding claim, further comprising: determining, based on the output, that the image of the undercarriage of the vehicle is of sufficient quality for subsequent processing; and when it is determined that the image of the undercarriage of the vehicle is of sufficient quality for subsequent processing, processing the image of the undercarriage of the vehicle with one or more other trained ML models to determine whether the vehicle has one or more respective defects.

53. The method of aspect 51 or 52, wherein the one or more trained ML models comprises a first trained ML model trained to detect presence of rust on the undercarriage of the vehicle, and wherein processing the image of the undercarriage of the vehicle comprises processing the image of the undercarriage of the vehicle using the first trained ML to determine whether the undercarriage of the vehicle has rust.

54. The method of aspect 51 or 52, wherein the one or more trained ML models comprises a second trained ML model trained to detect presence of catalytic converters in images of vehicles, and wherein processing the image of the undercarriage of the vehicle comprises processing the image of the undercarriage of the vehicle using the second trained ML to detect the presence of a catalytic converter in the image of the undercarriage of the vehicle.

55. A system comprising, at least one computer hardware processor; and at least one non-transitory computer-readable storage medium storing processor executable instructions that, when executed by the at least one computer hardware processor, cause the at least one computer hardware processor to perform a method for using a trained machine learning (ML) model to evaluate quality of an image of an undercarriage of a vehicle, the method comprising: obtaining an image of the undercarriage of the vehicle; processing the image using the trained ML model, the processing comprising: generating image input from the image; processing the image input using the trained ML model to obtain output indicative of presence of zero, one, or multiple image quality defects in the image of the undercarriage of the vehicle.

56. At least one non-transitory computer-readable storage medium storing processor executable instructions that, when executed by at least one computer hardware processor, cause the at least one computer hardware processor to perform a method for using a trained machine learning (ML) model to evaluate quality of an image of an undercarriage of a vehicle, the method comprising: obtaining an image of the undercarriage of the vehicle; processing the image using the trained ML model, the processing comprising: generating image input from the image; processing the image input using the trained ML model to obtain output indicative of presence of zero, one, or multiple image quality defects in the image of the undercarriage of the vehicle.

57. A method for using machine learning (ML) models to detect presence of a catalytic converter in an image of an undercarriage of a vehicle, the method comprising: using at least one computer hardware processor to perform: obtaining an image of the undercarriage of the vehicle; generating image input from the image of the undercarriage of the vehicle; and processing the image input using multiple trained ML models to determine a probability that the catalytic converter is present in the image, the processing comprising: processing the image input using a first trained ML model, which is trained to detect catalytic converters in vehicle undercarriage images, to obtain first output indicating zero, one, or multiple catalytic converter detections and corresponding confidences; processing the image input using a second trained ML model, which is trained to determine from vehicle undercarriage images whether vehicles have visible catalytic converters, to obtain second output indicating a likelihood that the vehicle has a visible catalytic converter; and determining a probability that the catalytic converter is present in the image using the first output and the second output.

58. The method of aspect 57, wherein the image of the undercarriage of the vehicle is a composite image of the undercarriage of the vehicle having been generated by combining multiple images of the undercarriage of the vehicle.

59. The method of aspect 57 or any other preceding claim, further comprising:
   prior to processing the image input using the multiple trained ML models to determine the probability that the catalytic converter is present in the image, processing the image using a third trained ML model to obtain output indicative of presence of zero, one, or multiple image quality defects in the image of the undercarriage of the vehicle; and determining, based on the output, whether the image of the undercarriage of the vehicle is of sufficient quality for subsequent processing; and when it is determined that the image of the undercarriage of the vehicle is of sufficient quality for subsequent processing, processing the image input using the multiple trained ML models to determine the probability that the catalytic converter is present in the image.

60. The method of aspect 57, wherein generating the image input from the image comprises: normalizing the image, per channel, at least in part by: subtracting, in each particular channel, mean pixel values in the particular channel of a training set of images on which the first and second trained ML models were trained; and dividing by a standard deviation of pixel values in the particular channel of the training set of images on which the first and second trained ML models were trained.

61. The method of aspect 57 or any other preceding claim, wherein the first trained ML model is a deep neural network model for object detection.

62. The method of aspect 61 or any other preceding claim, wherein the first trained ML model comprises a plurality of 2D convolutional layers and a spatial pyramid pooling layer.

63. The method of aspect 62 or any other preceding claim, wherein the first trained ML model is implemented using architecture of the YOLOv5 object detection neural network.

64. The method of aspect 62 or any other preceding claim, wherein the first trained ML model comprises a plurality of parameters, wherein the plurality of parameters comprises between ten million and one hundred million parameters, and wherein processing the image input using the first trained ML model to obtain the first output indicating zero, one, or multiple catalytic converter detections and corresponding confidences comprises computing the first output using values of the plurality of parameters and the image input.

65. The method of aspect 62 or any other preceding claim, wherein the first trained ML model comprises a plurality of parameters, wherein the plurality of parameters comprises between thirty million and one sixty million parameters, and wherein processing the image input using the first trained ML model to obtain the first output indicating zero, one, or multiple catalytic converter detections and corresponding confidences comprises computing the first output using values of the plurality of parameters and the image input.

66. The method of aspect 57, wherein the second trained ML model is a deep neural network classification model.

67. The method of aspect 66 or any other preceding claim, wherein the second trained ML model comprises a plurality of 2D convolutional layers.

68. The method of aspect 66 or any other preceding claim, wherein the second trained ML model comprises a second plurality of parameters, wherein the second plurality of parameters comprises between one million and one fifty million parameters, and wherein processing the image input using the second trained ML model to obtain the second output indicating the likelihood that the vehicle has a visible catalytic converter comprises computing the second output using values of the second plurality of parameters and the image input.

69. The method of aspect 66 or any other preceding claim, wherein the second trained ML model comprises a second plurality of parameters, wherein the second plurality of parameters comprises between one million and one thirty million parameters, and wherein processing the image input using the second trained ML model to obtain the second output indicating the likelihood that the vehicle has a visible catalytic converter comprises computing the second output using values of the second plurality of parameters and the image input.

70. The method of aspect 57 or any other preceding claim, identifying, from the first output, a catalytic converter detection having a highest confidence; determining the probability that the catalytic converter is present in the image as a product of the highest confidence and the likelihood that the vehicle has a visible catalytic converter.

71. The method of aspect 57 or any other preceding claim, identifying, from the first output, a catalytic converter detection having a highest confidence; determining that a catalytic converter is missing from the vehicle when the highest confidence is below a first threshold and the likelihood that the vehicle has a visible catalytic converter is above a second threshold.

72. The method of aspect 71, further comprising: determining that the catalytic converter is missing from the vehicle; obtaining an initial vehicle condition report comprising inspection results, the inspection results indicating a first set of zero, one or more vehicle defects that the inspector determined to be present in the vehicle; and generating an indication of agreement or discrepancy between the first set of vehicle defects that the inspector determined to be present in the vehicle and the determination that the catalytic converter is missing from the vehicle.

73. A system comprising, at least one computer hardware processor; and at least one non-transitory computer-readable storage medium storing processor executable instructions that, when executed by the at least one computer hardware processor, cause the at least one computer hardware processor to perform a method for using machine learning (ML) models to detect presence of a catalytic converter in an image of an undercarriage of a vehicle, the method comprising: obtaining an image of the undercarriage of the vehicle; generating image input from the image of the undercarriage of the vehicle; and processing the image input using multiple trained ML models to determine a probability that the catalytic converter is present in the image, the processing comprising: processing the image input using a first trained ML model, which is trained to detect catalytic converters in vehicle undercarriage images, to obtain first output indicating zero, one, or multiple catalytic converter detections and corresponding confidences; processing the image input using a second trained ML model, which is trained to determine from vehicle undercarriage images whether vehicles have visible catalytic converters, to obtain second output indicating a likelihood that the vehicle has a visible catalytic converter; and determining a probability that the catalytic converter is present in the image using the first output and the second output.

74. At least one non-transitory computer-readable storage medium storing processor executable instructions that, when executed by at least one computer hardware processor, cause the at least one computer hardware processor to perform a method for using machine learning (ML) models to detect presence of a catalytic converter in an image of an undercarriage of a vehicle, the method comprising: obtaining an image of the undercarriage of the vehicle; generating image input from the image of the undercarriage of the vehicle; and processing the image input using multiple trained ML models to determine a probability that the catalytic converter is present in the image, the processing comprising: processing the image input using a first trained ML model, which is trained to detect catalytic converters in vehicle undercarriage images, to obtain first output indicating zero, one, or multiple catalytic converter detections and corresponding confidences; processing the image input using a second trained ML model, which is trained to determine from vehicle undercarriage images whether vehicles have visible catalytic converters, to obtain second output indicating a likelihood that the vehicle has a visible catalytic converter; and determining a probability that the catalytic converter is present in the image using the first output and the second output.

75. A method for using a trained machine learning (ML) model to detect presence of rust on an undercarriage of a vehicle, the method comprising: using at least one computer hardware processor to perform: obtaining at least one image of the undercarriage of the vehicle and metadata indicating one or more properties of the vehicle; processing the at least one image and the metadata to detect presence of the rust, the processing comprising: generating image input from the at least one image; generating metadata input from the metadata; and processing the image input and the metadata input using the trained ML model to obtain output indicative of presence or absence of the rust on the undercarriage of the vehicle.

76. The method of aspect 75, wherein the at least one image comprises: at least one image of at least one rocker panel of the vehicle; at least one image of the vehicle's frame; and at least one composite image of the undercarriage of the vehicle, the at least one composite image having been generated by combining multiple images of the undercarriage of the vehicle.

77. The method of aspect 76, wherein the at least one image of the at least one rocker panel comprises an image of the right rocker panel of the vehicle and an image of the left rocker panel of the vehicle, and wherein the at least one image of the vehicle's frame comprises an image of a left portion of the vehicle's frame, a rear portion of the vehicle's frame, and a right portion of the vehicle's frame.

78. The method of aspect 75 or any other preceding claim, wherein the at least one image comprises a plurality of images of the undercarriage of the vehicle, and wherein generating image input from the at least one image comprises concatenating the plurality of images into a single wide image to be used as the image input.

79. The method of aspect 78, further comprising: prior to the concatenating, normalizing each of the plurality of images.

80. The method of aspect 75 or any other preceding claim, wherein the properties of the vehicle are selected from the group consisting of: a reading of the vehicle's odometer, an age of the vehicle, a type of drivetrain in the vehicle, a measure of displacement of the vehicle's engine, a fuel type of the vehicle, a longitude coordinate of an inspection location, a latitude coordinate of the inspection location, a Koppen climate code associated with the inspection location, a U.S. state code associated with the inspection location, a model of the vehicle, a make of the vehicle, one or more Carfax® alerts associated with the vehicle, and a type of transmission in the vehicle.

81. The method of aspect 80 or any other preceding claim, wherein the metadata comprises text indicating at least one of the one or more properties, and generating the metadata features from the metadata comprises a numeric representation of the text.

82. The method of aspect 75 or any other preceding claim, wherein the trained ML model is a deep neural network model.

83. The method of aspect 82 or any other preceding claim, wherein the trained ML model comprises: a first neural network portion comprising a plurality of 2D convolutional layers and configured to process the image input; a second neural network portion comprising a plurality of residual neural network blocks and configured to process the metadata input; and a fusion neural network portion comprising one or more 2D convolutional layers and configured to combine outputs produced by the first neural network portion and the second neural network portion to obtain output indicative of presence or absence of the rust.

84. The method of aspect 83 or any other preceding claim, wherein the trained ML model comprises a plurality of parameters, wherein the plurality of parameters comprises between one million and ten million parameters, and wherein processing the image input and the metadata input using the trained ML model to obtain output indicative of presence or absence of the rust comprises computing the output using values of the plurality of parameters, the image input, and the metadata input.

85. The method of aspect 83 or any other preceding claim, wherein the trained ML model comprises a plurality of parameters, wherein the plurality of parameters comprises between one million and one hundred million parameters, and wherein processing the image input and the metadata input using the trained ML model to obtain output indicative of presence or absence of the rust comprises computing the output using values of the plurality of parameters, the image input, and the metadata input.

86. The method of aspect 75 or any other preceding claim, wherein the output is a numeric value indicative of a likelihood that the undercarriage of the vehicle has rust.

87. The method of aspect 75 or any other preceding claim, further comprising: prior to processing the at least one image and the metadata to detect presence of the rust, processing the at least one image using a second trained ML model to obtain output indicative of presence of zero, one, or multiple image quality defects in the at least one image; determining, based on the output, whether the at least one image of the undercarriage of the vehicle is of sufficient quality for subsequent processing; and when it is determined that the at least one image of the undercarriage of the vehicle is of sufficient quality for subsequent processing, processing the at least one image and the metadata to detect presence of the rust.

88. The method of aspect 75 or any other preceding claim, further comprising: generating an electronic vehicle condition report indicating the presence or absence of rust based on the output.

89. The method of aspect 75 or any other preceding claim, wherein the trained ML model is trained to detect, from the at least one image and the metadata, presence or absence of structural rust.

90. The method of aspect 75 or any other preceding claim, further comprising: obtaining an initial vehicle condition report comprising inspection results, the inspection results indicating a first set of zero, one or more vehicle defects that the inspector determined to be present in the vehicle; and generating an indication of agreement or discrepancy between the first set of vehicle defects that the inspector determined to be present in the vehicle and the output of the trained ML model indicating the presence or absence of rust in the undercarriage of the vehicle.

91. A system comprising, at least one computer hardware processor; and
    at least one non-transitory computer-readable storage
        medium storing processor executable instructions that, when executed by the at least one computer hardware processor, cause the at least one computer hardware processor to perform a method for using a trained machine learning (ML) model to detect presence of rust on an undercarriage of a vehicle, the method comprising: obtaining at least one image of the undercarriage of the vehicle and metadata indicating one or more properties of the vehicle; processing the at least one image and the metadata to detect presence of the rust, the processing comprising: generating image input from the at least one image; generating metadata input from the metadata; and processing the image input and the metadata input using the trained ML model to obtain output indicative of presence or absence of the rust on the undercarriage of the vehicle.

92. At least one non-transitory computer-readable storage medium storing processor executable instructions that, when executed by at least one computer hardware processor, cause the at least one computer hardware processor to perform a method for using a trained machine learning (ML) model to detect presence of rust on an undercarriage of a vehicle, the method comprising: obtaining at least one image of the undercarriage of the vehicle and metadata indicating one or more properties of the vehicle; processing the at least one image and the metadata to detect presence of the rust, the processing comprising: generating image input from the at least one image; generating metadata input from the metadata; and processing the image input and the metadata input using the trained ML model to obtain output indicative of presence or absence of the rust on the undercarriage of the vehicle.

93. A method for using a trained machine learning (ML) model to detect a presence of a fluid leak in an image of an undercarriage of a vehicle, the method comprising: using at least one computer hardware processor to perform: obtaining the image of the undercarriage of the vehicle; and processing the image of the undercarriage of the vehicle using the trained ML model to obtain an output indicating whether a fluid leak is present in the image of the undercarriage of the vehicle, the processing comprising: generating image input from the image of the undercarriage of the vehicle; and processing the image input using the trained ML model to obtain the output indicating whether the fluid leak is present in the image of the undercarriage of the vehicle.

94. The method of aspect 93, wherein obtaining the image of the undercarriage comprises: obtaining multiple images of portions of the undercarriage of the vehicle; and generating the image of the undercarriage of the vehicle by combining the multiple images of portions of the undercarriage of the vehicle into a composite image of the undercarriage of the vehicle.

95. The method of aspect 93 or any other preceding claim, wherein generating the image input from the image of the undercarriage of the vehicle comprises: normalizing the image of the undercarriage of the vehicle, per channel, at least in part by: subtracting, in each particular channel, mean pixel values of pixel values in the particular channel, the mean pixel values being determined from pixel values of a training set of images on which the trained ML model was trained; and dividing, in each particular channel, the pixel values in the particular channel by standard deviation values, the standard deviation values being standard deviations determined from the training set of images on which the trained ML model was trained.

96. The method of aspect 93 or any other preceding claim, wherein the trained ML model is a deep neural network model comprising a plurality of 2D convolutional layers.

97. The method of aspect 96, wherein the trained ML model comprises a plurality of parameters, wherein the plurality of parameters comprises between one million and fifty million parameters, and wherein processing the image input using the trained ML model to obtain the output indicating whether the fluid leak is present in the image of the undercarriage of the vehicle comprises computing the output using values of the plurality of parameters and the image input.

98. The method of aspect 93 or any other preceding claims, wherein the output indicating whether the fluid leak is present in the image of the undercarriage of the vehicle is a binary indication whether a fluid leak is present in the image of the undercarriage.

99. The method of aspect 93 or any other preceding claim, wherein the output indicating whether the fluid leak is present in the image of the undercarriage of the vehicle indicates a plurality of likelihoods for a respective plurality of fluid leaks, each of the likelihoods indicating a likelihood that the image of the undercarriage of the vehicle has a respective fluid leak of the plurality of fluid leaks.

100. The method of aspect 93 or any other preceding claim, wherein the output indicating whether the fluid leak is present in the image of the undercarriage of the vehicle indicates a likelihood that the fluid leak is present in the image of the undercarriage of the vehicle.

101. The method of aspect 93, wherein the fluid leak is selected from the group consisting of: an oil leak, a transmission fluid leak, a coolant fluid leak, a brake fluid leak, and a power steering fluid leak.

102. The method of aspect 93, wherein the fluid leak is an oil leak.

103. The method of aspect 93, wherein prior to processing the image of the undercarriage of the vehicle to detect the presence of fluid leaks in the image of the undercarriage of the vehicle, the method further comprises: processing the image of the undercarriage of the vehicle using a second trained ML model to obtain output indicative of a presence of zero, one, or multiple image quality defects in the image of the undercarriage of the vehicle; determining, based on the output indicative of the presence of image quality defects, whether the image of the undercarriage of the vehicle is of sufficient quality for subsequent processing; and when it is determined that the image of the undercarriage of the vehicle is of sufficient quality for subsequent processing, processing the image to obtain the output indicating whether the fluid leak is present in the image of the undercarriage of the vehicle.

104. The method of aspect 103, wherein the zero, one, or more image quality defects are identified as one or more defects from the group consisting of: an improper cropping defect, an insufficient detail defect, a dirty mirror defect, a glare defect, an incorrect trim defect, a lighting defect, and a recording defect.

105. The method of aspect 93 or any other preceding claim, further comprising: generating an electronic vehicle condition report indicating the presence or absence of fluid leaks based on the output.

106. The method of aspect 93 or any other preceding claim, further comprising: obtaining an initial vehicle condition report comprising inspection results, the inspection results indicating a first set of zero, one, or more vehicle defects that the inspector determined to be present in the vehicle; and generating an indication of agreement or discrepancy between the first set of vehicle defects that the inspector determined to be present in the vehicle and the determination that the output indicating whether the fluid leak is present in the image of the undercarriage of the vehicle.

107. A system comprising, at least one computer hardware processor; and at least one non-transitory computer-readable storage medium storing processor executable instructions that, when executed by the at least one computer hardware processor, cause the at least one computer hardware processor to perform a method for using a trained machine learning (ML) model to detect presence of a fluid leak in an image of an undercarriage of a vehicle, the method comprising: obtaining the image of the undercarriage of the vehicle; and processing the image of the undercarriage of the vehicle using the trained ML model to obtain an output indicating whether a fluid leak is present in the image of the undercarriage of the vehicle, the processing comprising: generating image input from the image of the undercarriage of the vehicle; and processing the image input using the trained ML model to obtain the output indicating whether the fluid leak is present in the image of the undercarriage of the vehicle.

108. At least one non-transitory computer-readable storage medium storing processor executable instructions that, when executed by at least one computer hardware processor, cause the at least one computer hardware processor to perform a method for using a trained machine learning (ML) model to detect presence of a fluid leak in an image of an undercarriage of a vehicle, the method comprising: obtaining the image of the undercarriage of the vehicle; and processing the image of the undercarriage of the vehicle using the trained ML model to obtain an output indicating whether a fluid leak is present in the image of the undercarriage of the vehicle, the processing comprising: generating image input from the image of the undercarriage of the vehicle; and processing the image input using the trained ML model to obtain the output indicating whether the fluid leak is present in the image of the undercarriage of the vehicle.

What is claimed is:

1. A method for using trained machine learning (ML) models to process data about a vehicle in furtherance of identifying one or more vehicle defects, the method comprising:

using at least one computer hardware processor to perform, subsequent to completion of an inspector's inspection of the vehicle:

obtaining an initial vehicle condition report comprising inspection results, the inspection results indicating a first set of zero, one or more vehicle defects that the inspector determined to be present in the vehicle;

obtaining data about the vehicle gathered at least in part during inspection of the vehicle by the inspector;

applying the trained ML models to the data about the vehicle to obtain a second set of zero, one or more vehicle defects that are indicated by the trained ML models to be present in the vehicle;

generating an indication of agreement or discrepancy between the first set of vehicle defects that the inspector determined to be present in the vehicle and the second set of vehicle defects that are indicated by the trained ML models to be present in the vehicle; and outputting the initial vehicle condition report and/or the indication of agreement or discrepancy.

2. The method of claim 1, wherein generating the indication of agreement or discrepancy between the first set of vehicle defects and the second set of vehicle defects comprises:

processing the first set of vehicle defects and the second set of vehicle defects using a trained ML risk model to obtain a likelihood of a discrepancy being present between the first set of vehicle defects and the second set of vehicle defects.

3. The method of claim 2, wherein the trained ML risk model comprises a trained random forest model trained to determine whether the likelihood of the discrepancy being present exceeds a threshold.

4. The method of claim 1, wherein the trained ML risk model is trained to determine a likelihood a vehicle defect is present in the vehicle, the vehicle defect being from the group consisting of: engine noise, exhaust system, and structural rust.

5. The method of claim 1, wherein generating the indication of agreement or discrepancy between the first set of vehicle defects and the second set of vehicle defects is performed using one or more ML risk models or is performed using one or more rules and generating the indication of agreement or discrepancy involves processing the inspection results and likelihoods, obtained by applying the trained ML models to the data about the vehicle, with the one or more ML risk models or one or more rules.

6. The method of claim 1, wherein each of the trained ML models is trained to generate a likelihood that a respective type of a vehicle defect is present in the vehicle.

7. The method of claim 1, wherein the trained ML models include a first trained ML model trained to generate a first likelihood that a first type of vehicle defect is present in the vehicle, wherein the first type of vehicle defect is an undercarriage defect, engine audio defect, dashboard defect, and/or exterior/mechanical defect.

8. The method of claim 1, further comprising generating a revised vehicle condition report, the generating comprising:

providing the initial vehicle condition report and the indication of agreement or discrepancy between the first set of vehicle defects and the second set of vehicle defects to a reviewer through a device used by the reviewer;

receiving input from the device whether or not to modify the initial vehicle condition report based on the indication; and generating a final vehicle condition report, based on the input received from the device.

9. The method of claim 8, wherein:

upon receiving input from the device to modify the initial vehicle report, the generating the final vehicle condition report comprises modifying the inspection results indicating the first set of zero, one or more vehicle defects by replacing an indication of one or more vehicle defects in the first set with one or more corresponding indications from the second set.

10. The method of claim 8, further comprising:

prior to receiving the input whether or not to modify the initial vehicle condition report, providing, to an inspector, a recommendation to obtain additional inspection results; and subsequent to obtaining additional inspection results, determining whether or not to modify the initial vehicle condition report.

11. The method of claim 1, wherein:

the first set of vehicle defects does not indicate a vehicle defect of a first type being present in the vehicle;

the second set of vehicle defects indicates a likelihood of the vehicle defect of the first type being present in the vehicle; and generating the indication of agreement or discrepancy comprises generating an indication of discrepancy with respect to the vehicle defect of the first type when the likelihood exceeds a threshold.

12. The method of claim 11, wherein:

the trained ML models include a first trained ML model trained to detect vehicle defects of the first type, and applying the trained (ML) models to the data about the vehicle comprises applying the first trained ML model to at least some of the data about the vehicle to obtain the likelihood of the vehicle defect of the first type being present in the vehicle.

13. The method of claim 11, wherein:

the first set of vehicle defects does not indicate presence of an engine vehicle defect;

the second set of vehicle defects does indicate a likelihood of the engine vehicle defect being present in the vehicle; and generating the indication of agreement or discrepancy comprises generating an indication of discrepancy with respect to the engine vehicle defect based on the likelihood.

14. The method of claim 11, wherein the first trained ML model comprises:

a first neural network portion comprising a plurality of one-dimensional (1D) convolutional layers configured to process an audio waveform;

a second neural network portion comprising a plurality of two-dimensional (2D) convolutional layers configured to process a 2D representation of the audio waveform; and a fusion neural network portion comprising one or more fully connected layers configured to combine outputs produced by the first neural network portion and the second neural network portion to obtain a likelihood indicative of the presence or absence of the at least one vehicle defect.

15. The method of claim 11, wherein the data about the vehicle comprises data gathered during the inspection of the vehicle using at least one hardware sensor configured to record audio of the vehicle during operation and/or capture one or more images and/or videos of the vehicle.

16. The method of claim 11, wherein the data about the vehicle comprises: an audio recording of the vehicle during its operation, an image of at least a portion of the vehicle, a video of at least a portion of the vehicle, and/or one or more on-board diagnostic (OBD) codes.

17. A system, comprising:

at least one hardware processor; and at least one non-transitory computer-readable storage medium storing processor executable instructions that when executed by the at least one computer hardware processor perform a method for using trained machine learning (ML) models to process data about a vehicle in furtherance of identifying one or more vehicle defects, the method comprising:

obtaining an initial vehicle condition report comprising inspection results, the inspection results indicating a first set of zero, one or more vehicle defects that the inspector determined to be present in the vehicle;

obtaining data about the vehicle gathered at least in part during inspection of the vehicle by the inspector;

applying the trained ML models to the data about the vehicle to obtain a second set of zero, one or more vehicle defects that are indicated by the trained ML models to be present in the vehicle;

generating an indication of agreement or discrepancy between the first set of vehicle defects that the inspector determined to be present in the vehicle and the second set of vehicle defects that are indicated by the trained ML models to be present in the vehicle; and outputting the initial vehicle condition report and the indication of agreement or discrepancy.

18. The system of claim 17, wherein generating the indication of agreement or discrepancy between the first set of vehicle defects and the second set of vehicle defects comprises comparing likelihoods, generated by the trained ML models, indicating that defects of the second set of vehicle defects are present in the vehicle, to the first set of vehicle defects.

19. At least one non-transitory computer-readable storage medium storing processor executable instructions that when executed by the at least one computer hardware processor perform a method for using trained machine learning ML models to process data about a vehicle in furtherance of identifying one or more vehicle defects, the method comprising:

obtaining an initial vehicle condition report comprising inspection results, the inspection results indicating a first set of zero, one or more vehicle defects that the inspector determined to be present in the vehicle;

obtaining data about the vehicle gathered at least in part during inspection of the vehicle by the inspector;

applying the trained (ML) models to the data about the vehicle to obtain a second set of zero, one or more vehicle defects that are indicated by the trained ML models to be present in the vehicle;

generating an indication of agreement or discrepancy between the first set of vehicle defects that the inspector determined to be present in the vehicle and the second set of vehicle defects that are indicated by the trained ML models to be present in the vehicle; and outputting the initial vehicle condition report and the indication of agreement or discrepancy.

20. The at least one non-transitory computer-readable storage medium of claim 19, wherein generating the indication of agreement or discrepancy between the first set of vehicle defects and the second set of vehicle defects comprises comparing likelihoods, generated by the trained ML models, indicating that defects of the second set of vehicle defects are present in the vehicle, to the first set of vehicle defects.

* * * * *